April 19, 1960 J. G. PEARCE ET AL 2,933,564

MULTIOFFICE INTERLOCKED SIGNALING TELEPHONE SYSTEM

Filed May 21, 1959 104 Sheets-Sheet 1

INVENTORS
JAMES G. PEARCE
MATTHEW P. TUBINIS

BY F. H. Henson
ATTORNEY

April 19, 1960 J. G. PEARCE ET AL 2,933,564

MULTIOFFICE INTERLOCKED SIGNALING TELEPHONE SYSTEM

Filed May 21, 1959 104 Sheets-Sheet 2

April 19, 1960 J. G. PEARCE ET AL 2,933,564

MULTIOFFICE INTERLOCKED SIGNALING TELEPHONE SYSTEM

Filed May 21, 1959 104 Sheets-Sheet 3

April 19, 1960 J. G. PEARCE ET AL 2,933,564

MULTIOFFICE INTERLOCKED SIGNALING TELEPHONE SYSTEM

Filed May 21, 1959 104 Sheets-Sheet 5

AUDIO AMPLIFIER-AUA

AUDIO AMPLIFIER-AUE

AUDIO AMPLIFIER-AUG

BLOCKING OSCILLATOR GATE-BOG

CONVERTER - CVB

EMITTER FOLLOWER-EFC

EMITTER FOLLOWER-EFD

EMITTER FOLLOWER-EFE

EMITTER FOLLOWER-EFJ

FLIP-FLIP- FIA

FLIP-FLOP-FOA

HIGH SPEED INVERTER-ING

INVERTER-INK

INVERTER-INS

INVERTER-INU

INVERTER-INX

EQUALIZER-LAB

MONOSTABLE MULTIVIBRATOR-MAA

HOLDOVER CIRCUIT-MMD

HIGH SPEED AMPLIFIER-PUH

HIGH SPEED AMPLIFIER-PUJ

HIGH SPEED AMPLIFIER-PUM

INTEGRATOR TRIGGER-STA

LOW PASS FILTER-FLN

PHASE SPLITTER-APA

TIME POSITION & HIGHWAY ASSIGNMENT

| TIME SLOT | HIGHWAYS | | | | | |
|---|---|---|---|---|---|---|
| | 1 | 2 | 3 | 4 | 5 | 6 |
| 1-10 | LOCAL TRKS. 1-10 | LOCAL TRKS. 11-20 | LOCAL TRKS. 21-30 | LOCAL TRKS. 31-40 | LOCAL TRKS. 41-50 | LOCAL TRKS. 51-60 |
| 11 | SERVICE LINE 01 | SERVICE LINE 02 | SERVICE LINE 03 | SERVICE LINE 04 | SPARE | SPARE |
| 12-28 | L.D. TRKS. 1-17 | L.D. TRKS. 18-34 | L.D. TRKS. 35-51 | L.D. TRKS. 52-68 | L.D. TRKS. 69-85 | L.D. TRKS. 86-100 |
| 29 | TAPE ANNOUNCER TRK.GRP.-2 | T.A. TRK.GRP.-3 | T.A. TRK.GRP.-4 | T.A. TRK.GRP.-5 | T.A. TRK.GRP.-6 | T.A. TRK.GRP.-7 |
| 30 | TAPE ANNOUNCER TRK.GRP.-8 | T.A. TRK.GRP.-9 | SPARE | SPARE | BUSY MARK SERVICE LINES | BUSY MARK LOCAL TRKS. |
| 31 | ← UNASSIGNED → | | | | | |
| 32 | ← TEST → | | | | | |

FIG. 36

SEIZE DETECTOR CONTROL CIRCUIT

SEIZE DETECTOR CONTROL CIRCUIT

REGISTER ALLOTTER

REGISTER ALLOTTER

REGISTER FINDER

REGISTER FINDER

SLOT PULSE REGENERATION CIRCUIT

HIGHWAY CLAMP CIRCUIT

TIME SLOT STORAGE COUNTER

CALLING TIME STORE

CALLING TIME STORE

CALLING TIME STORE

FIVE DIGIT STORE

FIVE DIGIT STORE

FIVE DIGIT STORE

April 19, 1960 J. G. PEARCE ET AL 2,933,564

MULTIOFFICE INTERLOCKED SIGNALING TELEPHONE SYSTEM

Filed May 21, 1959 104 Sheets-Sheet 30

FIVE DIGIT STORE

FIVE DIGIT STORE

FIVE DIGIT STORE

FIVE DIGIT STORE

April 19, 1960 J. G. PEARCE ET AL 2,933,564

MULTIOFFICE INTERLOCKED SIGNALING TELEPHONE SYSTEM

Filed May 21, 1959 104 Sheets-Sheet 34

FIVE DIGIT STORE

FIVE DIGIT STORE

CONTROL "A"

CONTROL "A"

CONTROL "A"

CONTROL "A"

CONTROL "A"

CONTROL "A"

CONTROL "A"

April 19, 1960 J. G. PEARCE ET AL 2,933,564

MULTIOFFICE INTERLOCKED SIGNALING TELEPHONE SYSTEM

Filed May 21, 1959 104 Sheets-Sheet 43

CONTROL "A"

CONTROL "A"

TERMINATING TIME STORE

TERMINATING TIME STORE

TERMINATING TIME STORE

CONTROL "B"

CONTROL "B"

April 19, 1960 J. G. PEARCE ET AL 2,933,564

MULTIOFFICE INTERLOCKED SIGNALING TELEPHONE SYSTEM

Filed May 21, 1959 104 Sheets-Sheet 50

CONTROL "B"

CONTROL "B"

CONTROL "B"

CONTROL "B"

CONTROL "B"

POSITION TIME STORE

POSITION TIME STORE

POSITION TIME STORE

TWO DIGIT STORE

TWO DIGIT STORE

TWO DIGIT STORE

TWO DIGIT STORE

TWO DIGIT STORE

TWO DIGIT STORE

April 19, 1960 J. G. PEARCE ET AL 2,933,564

MULTIOFFICE INTERLOCKED SIGNALING TELEPHONE SYSTEM

Filed May 21, 1959 104 Sheets-Sheet 65

ROUTE SELECTOR

ROUTE SELECTOR

ROUTE SELECTOR

ROUTE SELECTOR

April 19, 1960 J. G. PEARCE ET AL 2,933,564

MULTIOFFICE INTERLOCKED SIGNALING TELEPHONE SYSTEM

Filed May 21, 1959 104 Sheets-Sheet 74

ROUTE SELECTOR

ROUTE SELECTOR

ROUTE SELECTOR

ROUTE SELECTOR

ROUTE SELECTOR

April 19, 1960 J. G. PEARCE ET AL 2,933,564

MULTIOFFICE INTERLOCKED SIGNALING TELEPHONE SYSTEM

Filed May 21, 1959 104 Sheets-Sheet 79

ROUTE SELECTOR

ROUTE SELECTOR

ROUTE SELECTOR

ROUTE SELECTOR

ROUTE SELECTOR

ROUTE SELECTOR

April 19, 1960 J. G. PEARCE ET AL 2,933,564

MULTIOFFICE INTERLOCKED SIGNALING TELEPHONE SYSTEM

Filed May 21, 1959 104 Sheets-Sheet 86

ROUTE SELECTOR

LINK ALLOTTER

LINK ALLOTTER

LINK ALLOTTER

LINK CONNECTOR

LINK CONNECTOR

LINK CONNECTOR

LINK CIRCUIT

LINK CIRCUIT

April 19, 1960 J. G. PEARCE ET AL 2,933,564

MULTIOFFICE INTERLOCKED SIGNALING TELEPHONE SYSTEM

Filed May 21, 1959 104 Sheets-Sheet 95

LINK CIRCUIT

MULTIOFFICE INTERLOCKED SIGNALING TELEPHONE SYSTEM

Filed May 21, 1959 104 Sheets-Sheet 96

LINK CIRCUIT

LINK CIRCUIT

LINK CIRCUIT

LINK CIRCUIT

POSITION COUPLING CIRCUIT

April 19, 1960 J. G. PEARCE ET AL 2,933,564

MULTIOFFICE INTERLOCKED SIGNALING TELEPHONE SYSTEM

Filed May 21, 1959 104 Sheets-Sheet 101

CALL FINDER

KEYBOARD CIRCUIT

KEYBOARD CIRCUIT

United States Patent Office 2,933,564

Patented Apr. 19, 1960

2,933,564

MULTIOFFICE INTERLOCKED SIGNALING TELEPHONE SYSTEM

James G. Pearce, Rochester, and Matthew P. Tubinis, Penfield, N.Y., assignors to General Dynamics Corporation, Rochester, N.Y., a corporation of Delaware Application May 21, 1959, Serial No. 814,923

30 Claims. (Cl. 179—18)

This invention relates in general to telephone systems and, more particularly, to multioffice interlocked signaling telephone systems.

A multioffice interlocked signaling telephone system is disclosed in copending application, Serial No. 729,351, filed April 18, 1958, now Patent No. 2,897,283, and assigned to the same assignee as the present invention. In the system disclosed in the above-identified application, calls incoming from a local office to a long distance switching center are automatically extended to an operator position at that long distance switching center. If the call is to be further extended, the operator keys the digits corresponding to the local office at which the desired subscriber line terminates into a keysender register and the keysender register then controls the further extension of the call through further along distance switching centers to that particular local office. The operator at the controlling long distance switching center then orally passes the number of the desired subscriber station to the answering attendant at that local office.

In the system disclosed in the above-identified application, signal interlocking is used between long distance switching centers. That is, the keysender register in the controlling long distance switching center transmits each line selecting signal until the succeeding long distance switching center verifies that it has correctly registered the numerical digital value corresponding to that line selecting signal. There is no signal interlocking with the called local office, however, since the subscriber station number is orally passed from the operator in the controlling long distance switching center to an answering attendant at the local office. Obviously, in a system of this type, a great number of operator positions are required in each long distance switching center and a considerable number of attendant positions are required in each local office of the system.

Accordingly, it is the general object of this invention to provide a new and improved telephone system.

It is a more particular object of this invention to provide a new and improved telephone system in which the signaling between offices of the system is completely interlocked and in which interoffice calls can be extended without utilizing the services of an operator.

Each long distance switching center in the system herein disclosed comprises a direct dialing register and an incoming register. Calls incoming from a local office to the long distance switching center serving that local office are extended to a direct dialing register in that long distance switching center and line selecting signals thereafter received from the calling subscriber station are registered in that direct dialing register. The call is further extended by the direct dialing register through the further long distance switching centers and local office to the called subscriber station identified by the signals registered in said direct dialing register. In each of the further long distance switching centers involved in the extension of the connection, an incoming register is taken into use to register the line selecting signals corresponding to the next succeeding long distance switching center or local office, to automatically transmit an acknowledgement signal to the controlling direct dialing register following the receipt of each line selecting signal, and to then extend the connection to the next succeeding center or office and release from the connection.

Each local office in the system herein disclosed comprises a so-called subscriber register which serves both calling subscriber lines and trunk lines terminating at that office and is adapted to transmit dial tone to a calling line when connected thereto. Therefore, when a call incoming over a trunk line is extended to the subscriber register, dial tone is routed back over the extended connection to the direct dialing register controlling the establishment of the connection and serves as a local office identifying signal to that direct dialing register. The direct dialing register is responsive to the receipt of dial tone to transmit an interlock request signal to the subscriber register before transmitting the line selecting signals identifying the desired subscriber station and the subscriber register is responsive to the receipt of an interlock register signal to transmit an acknowledgement signal following the receipt of each line selecting signal. Thus, it can be seen that the signaling is completely interlocked between the direct dialing register in the originating long distance switching center and the final local office involved in a connection.

A particular feature of the invention is that an end of call signal is transmitted back over the connection to the direct dialing register if an incoming register encounters an all trunks busy condition to the next succeeding center or local office or when sufficient line selecting signals have been received by a local office subscriber register to identify a subscriber station in that local office. The direct dialing register is responsive to the receipt of an end of call signal to complete a connection between the calling line and the extended connection and to then release from the connection. Thus, the calling party is enabled to hear an all trunks busy signal or recorded message transmitted from the long distance switching center in which a busy condition is encountered or is switched through to the final local office so that a ringback tone signal may be heard.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings which comprise 133 figures on 104 sheets.

Fig. 1 shows the trunking diagram of the disclosed telephone system.

Figs. 2A–2F, when arranged in order from left to right, show a long distance switching center in block diagram form.

Figs. 3A–35B show the logic symbols, together with a typical circuit represented by each symbol, which are used throughout the detailed circuit drawings.

Fig. 36 is a chart which shows a typical assignment of time positions and highways to the line terminating units of a long distance switching center.

Figure 39:
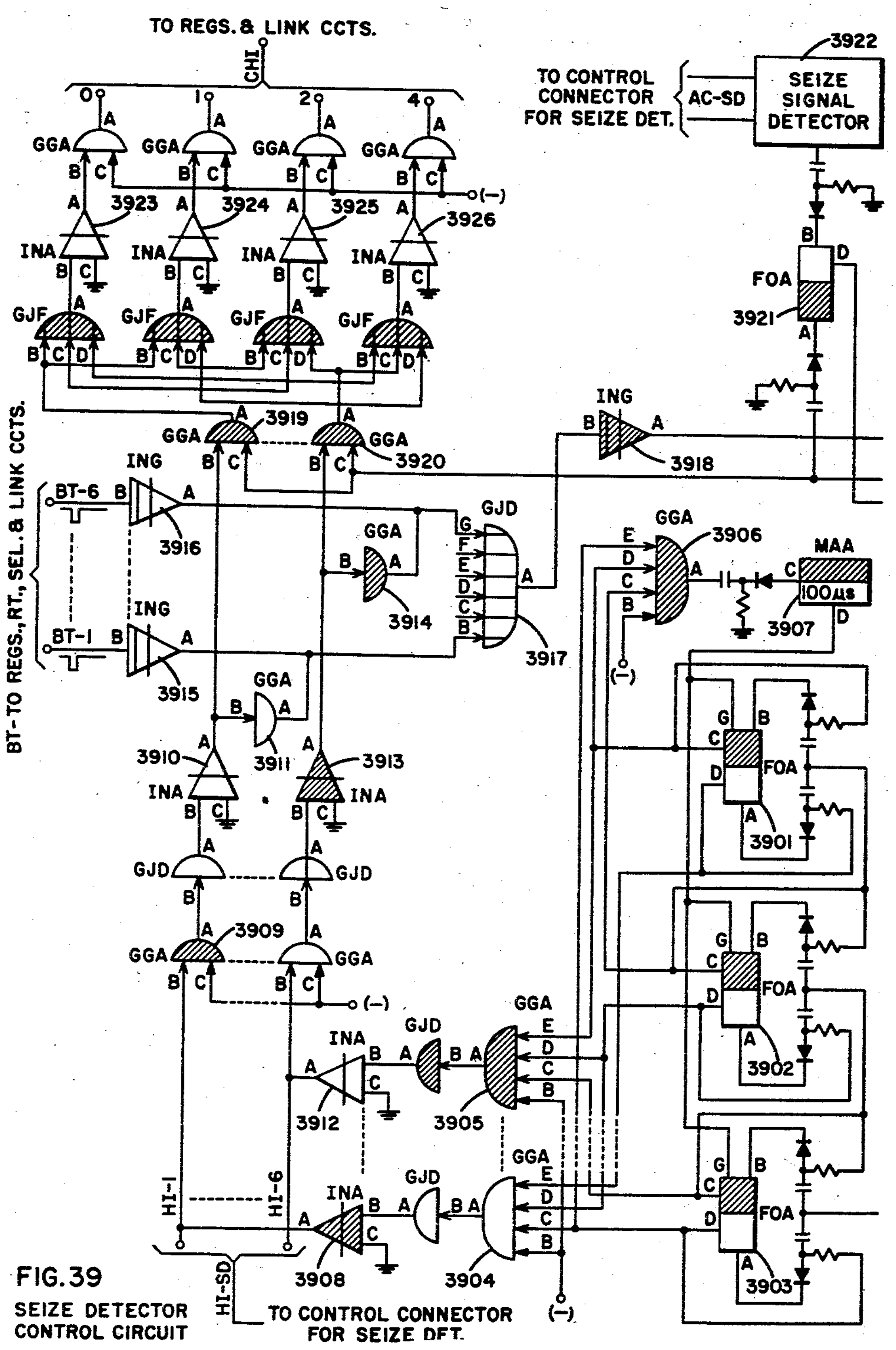
Figure 40:
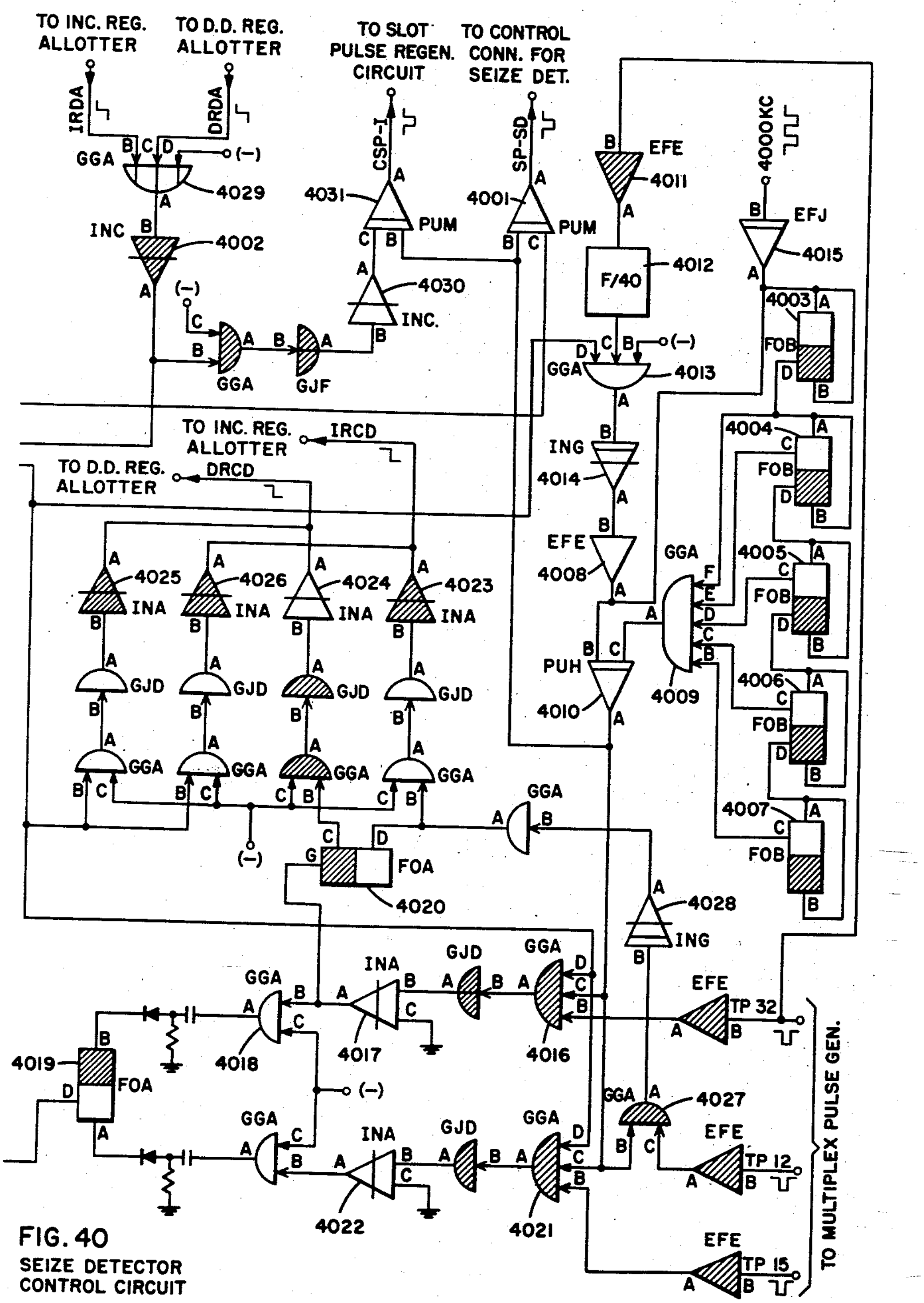

Figs. 39 and 40, when arranged with Fig. 40 to the right of Fig. 39, show a seize detector control circuit for use in a long distance switching center.

Figure 41:
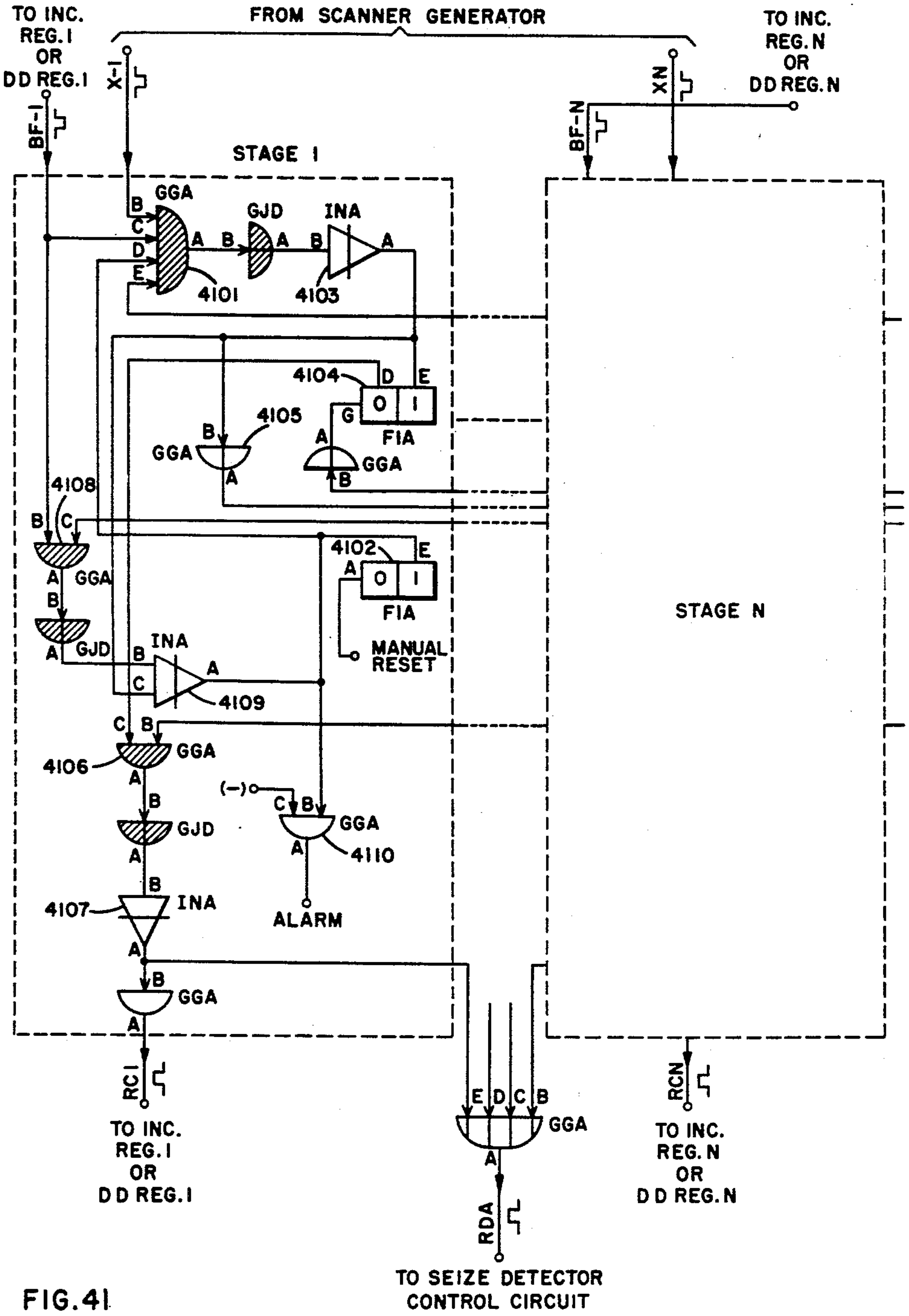
Figure 42:
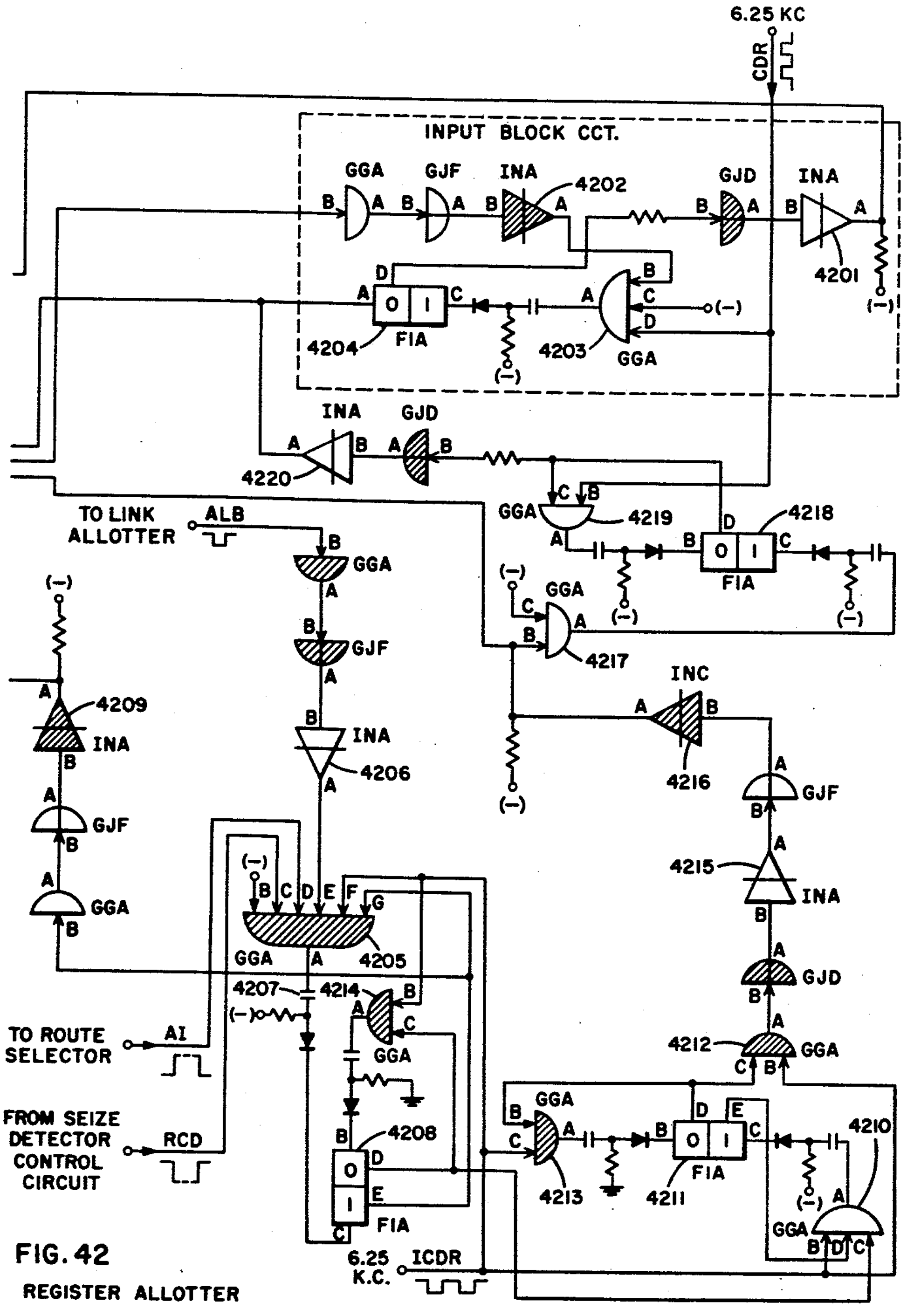

Figs. 41 and 42, when arranged with Fig. 42 to the right of Fig. 41, show a register allotter for use in a long distance switching center.

Figure 43:
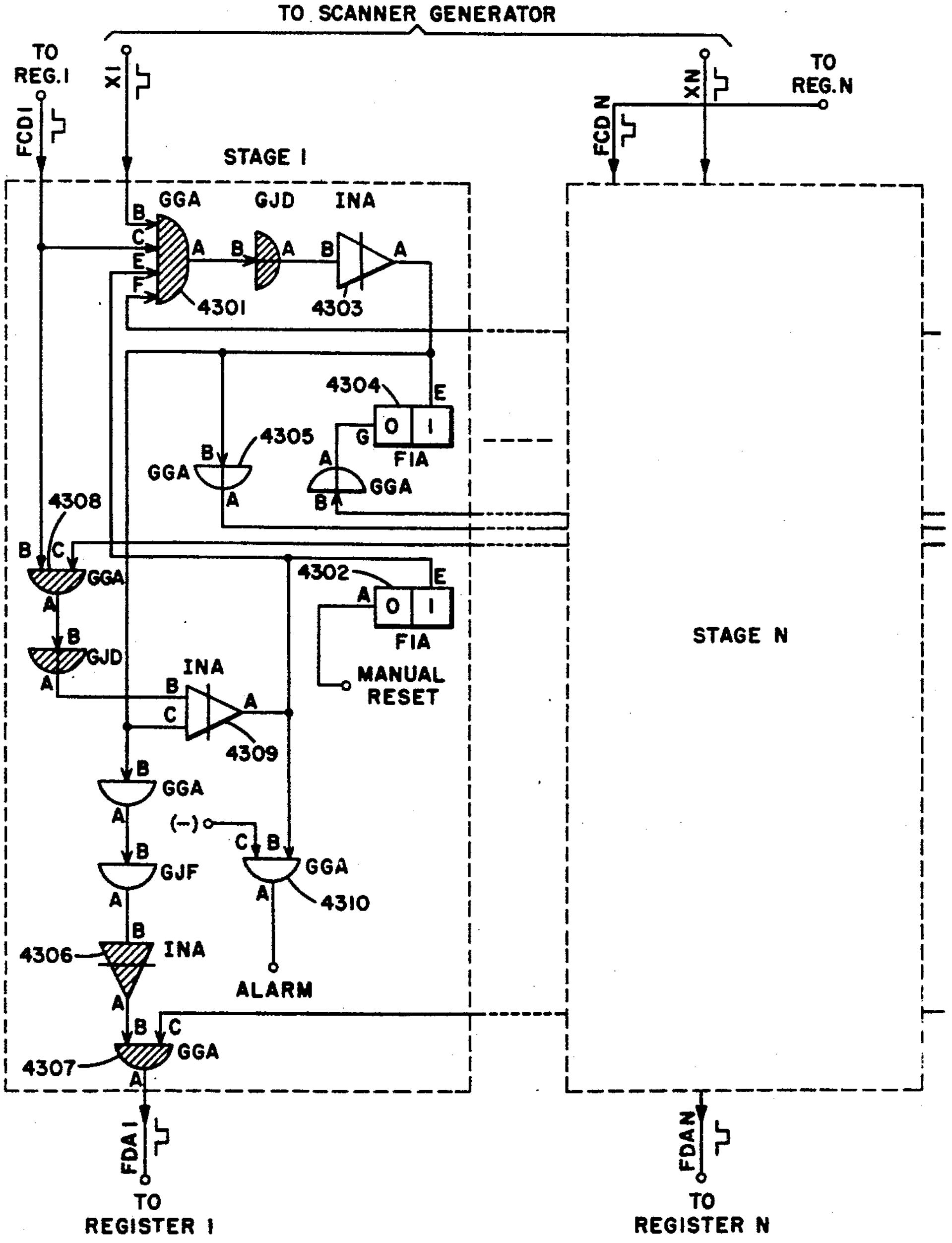
Figure 44:
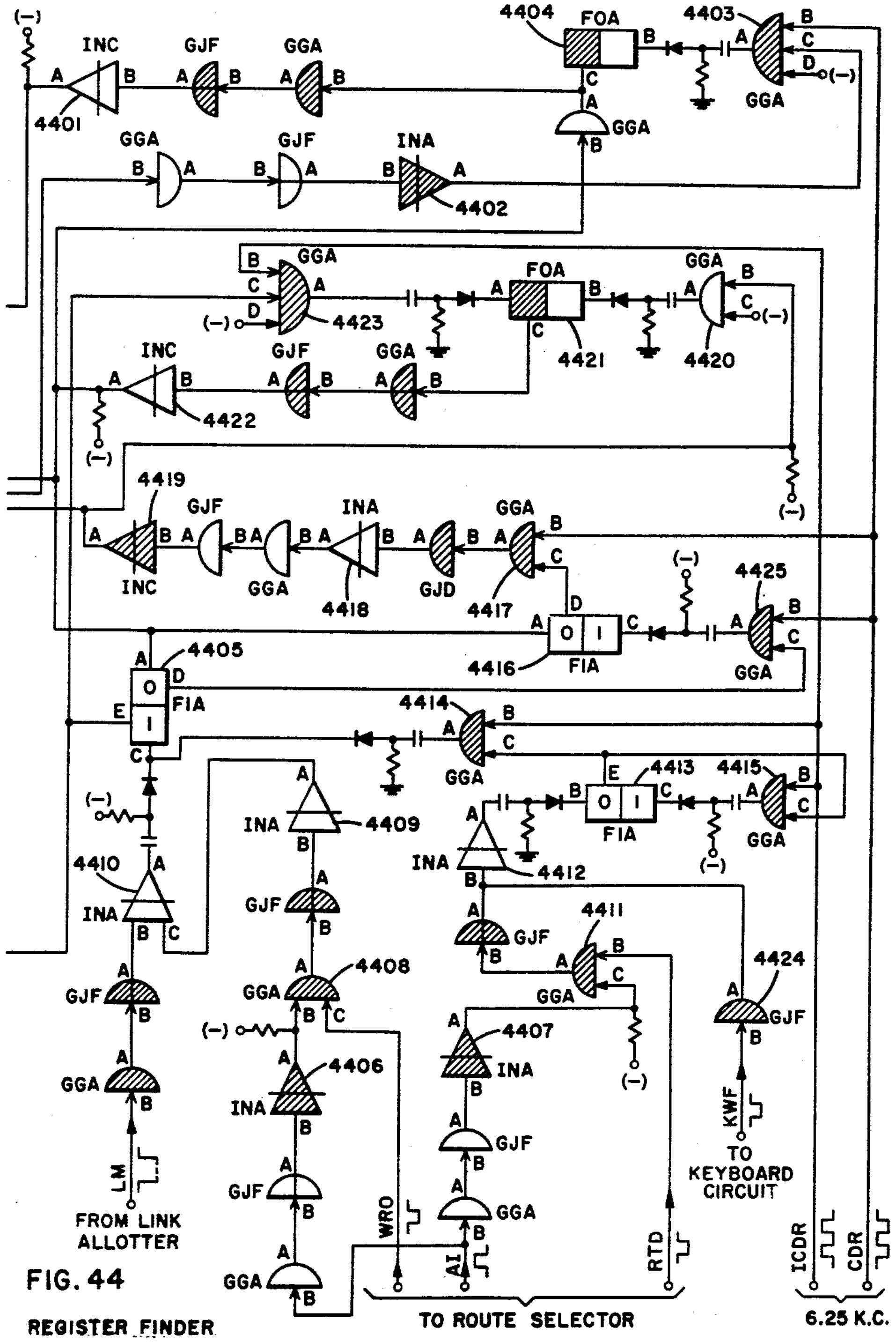

Figs. 43 and 44, when arranged with Fig. 44 to the right of Fig. 43, show a register finder for use in a long distance switching center.

Figure 45:
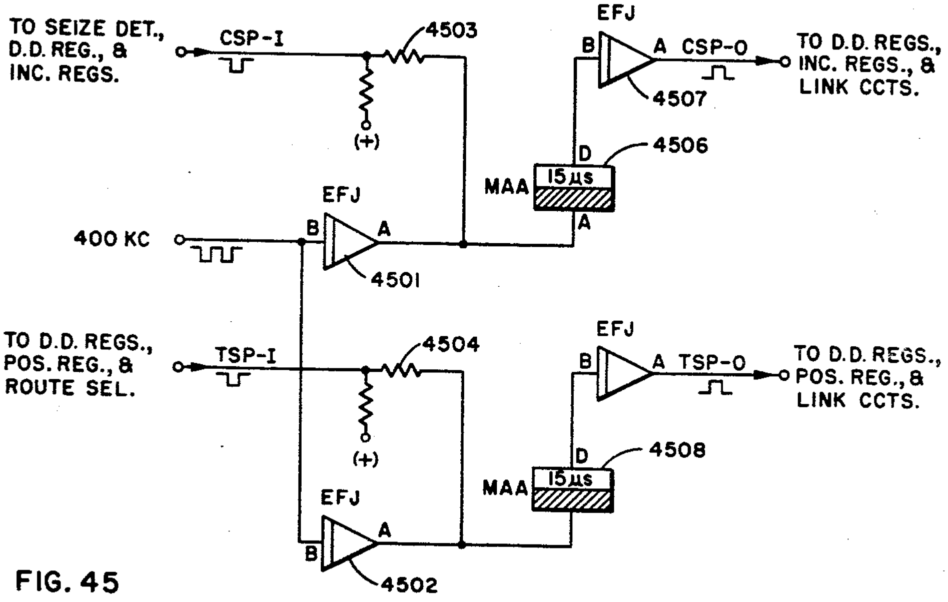

Fig. 45 shows a slot pulse regeneration circuit for use in a long distance switching center.

Figure 46:
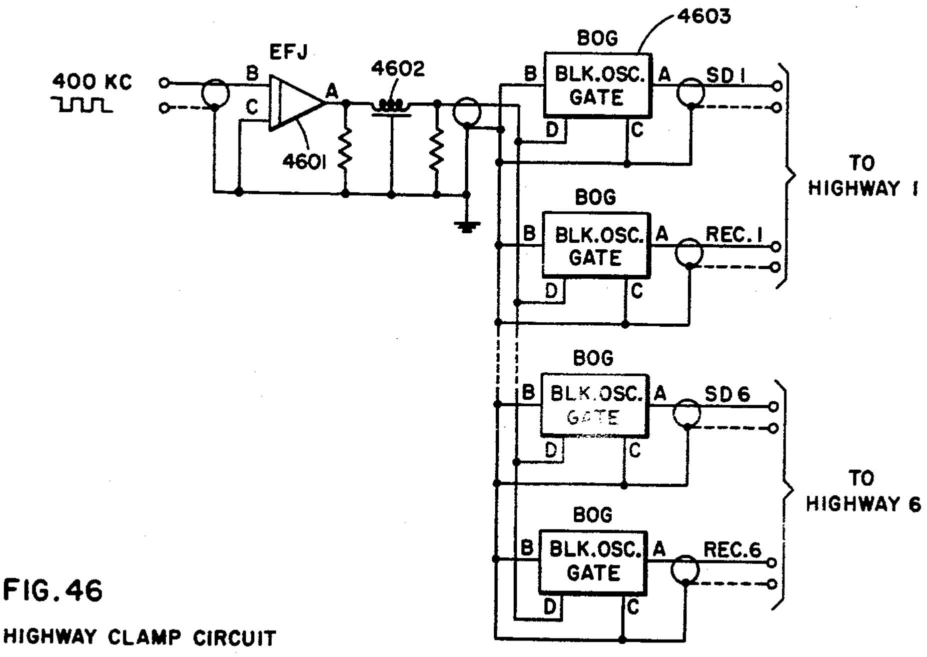

Fig. 46 shows a highway clamp circuit for use in a long distance switching center.

Figure 47:
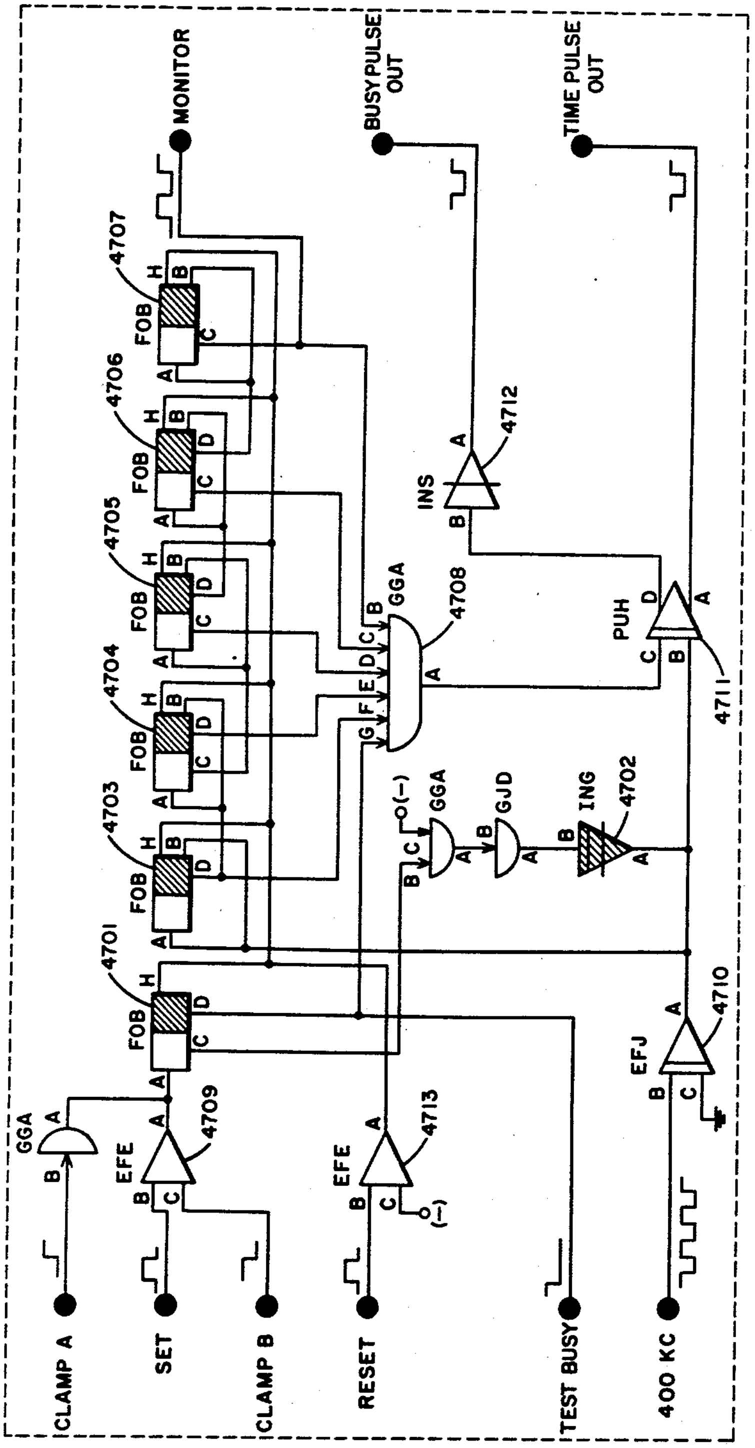

Fig. 47 shows a time slot storage counter for use in a long distance switching center.

Figure 48:
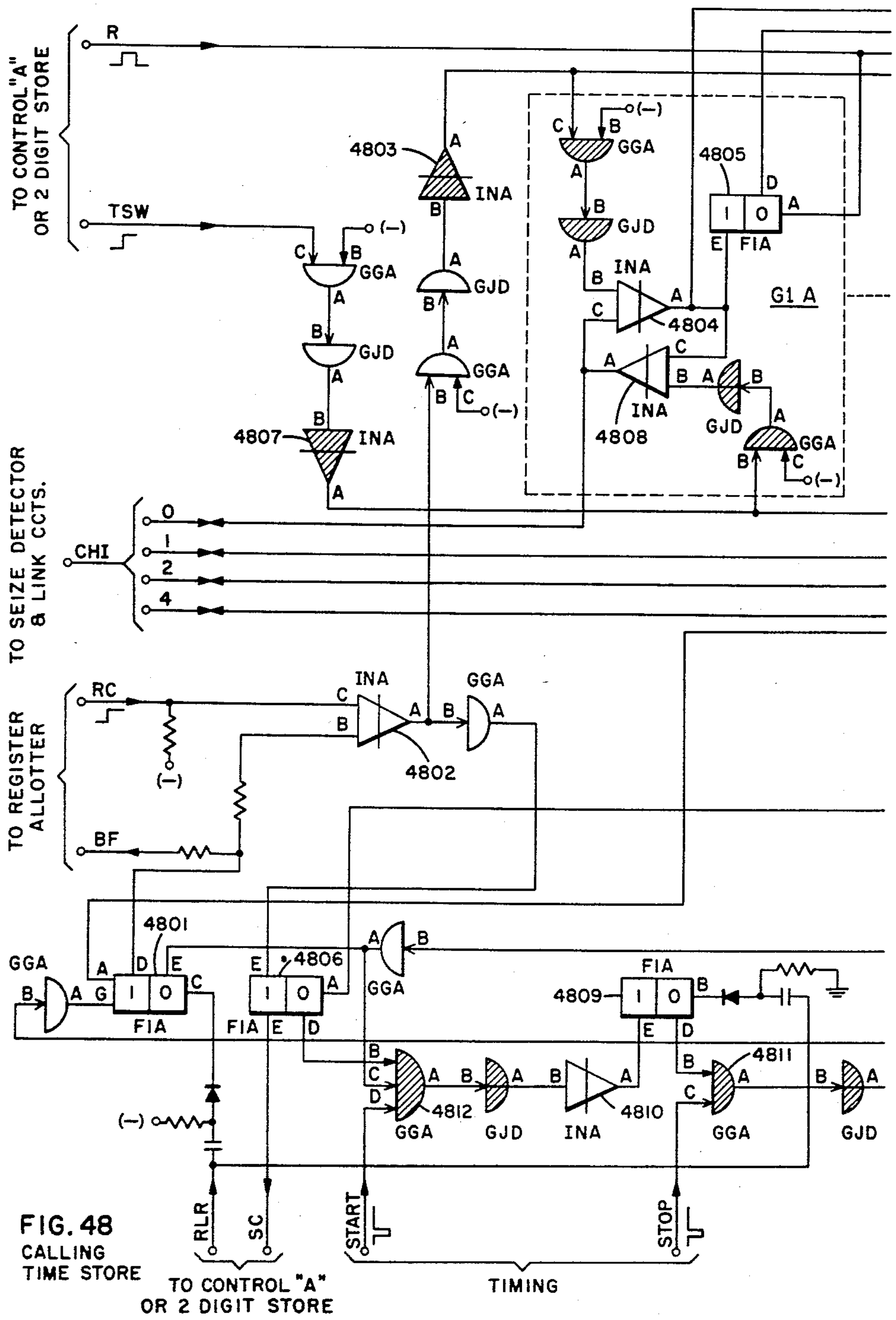
Figure 49:
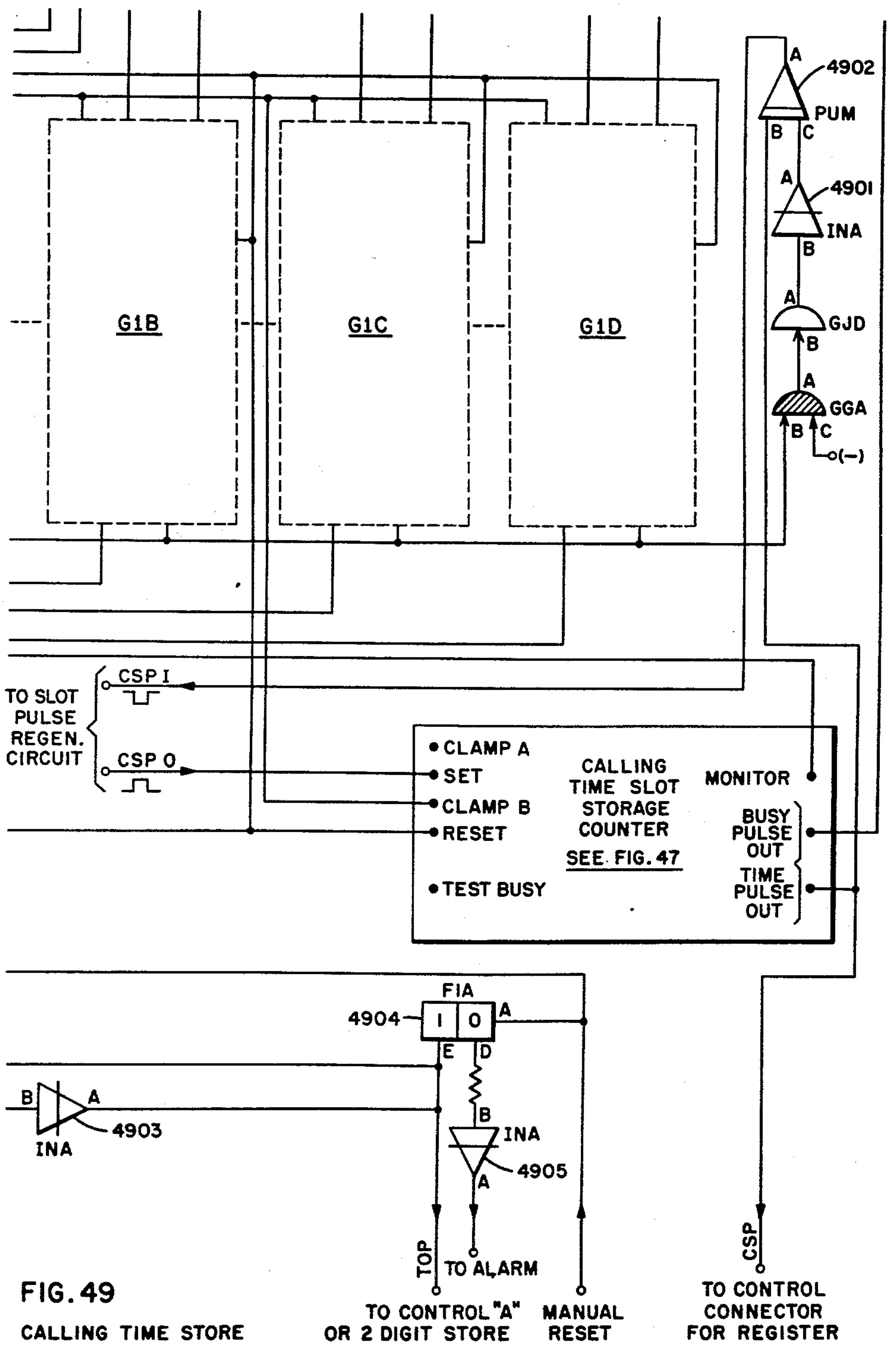
Figure 50:
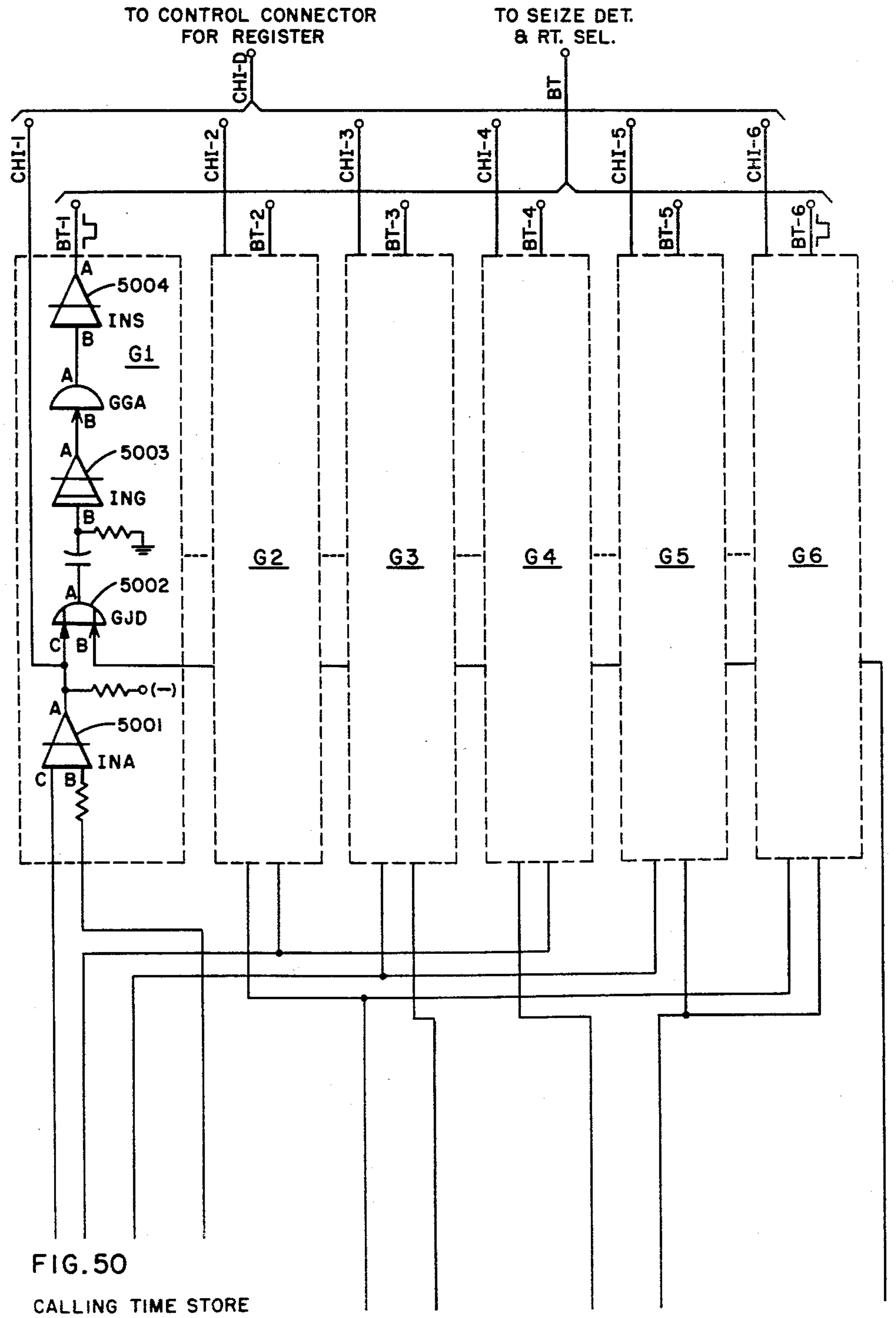

Figs. 48–50, when arranged with Fig. 49 to the right of Fig. 48 and below Fig. 50, show a calling time store for use in a long distance switching center.

Figure 128:
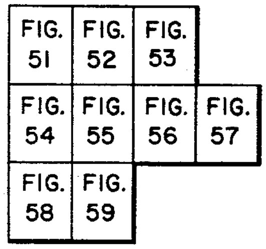

Figs. 51–59, when arranged as shown in Fig. 128, show a five digit store for use in a long distance switching center.

Figure 129:
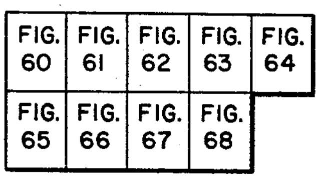

Figs. 60–68, when arranged as shown in Fig. 129, show a control A circuit for use in a long distance switching center.

Figure 69:
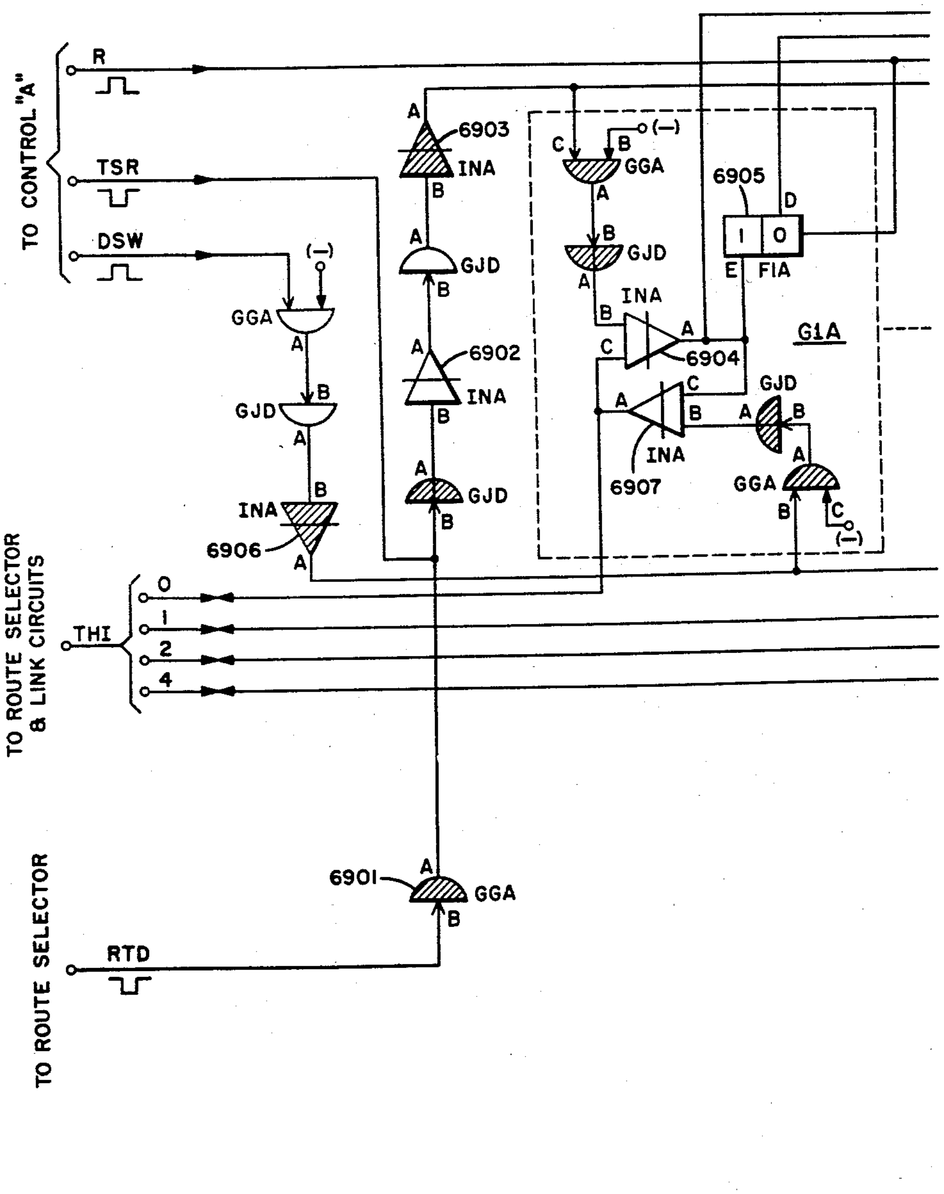
Figure 70:
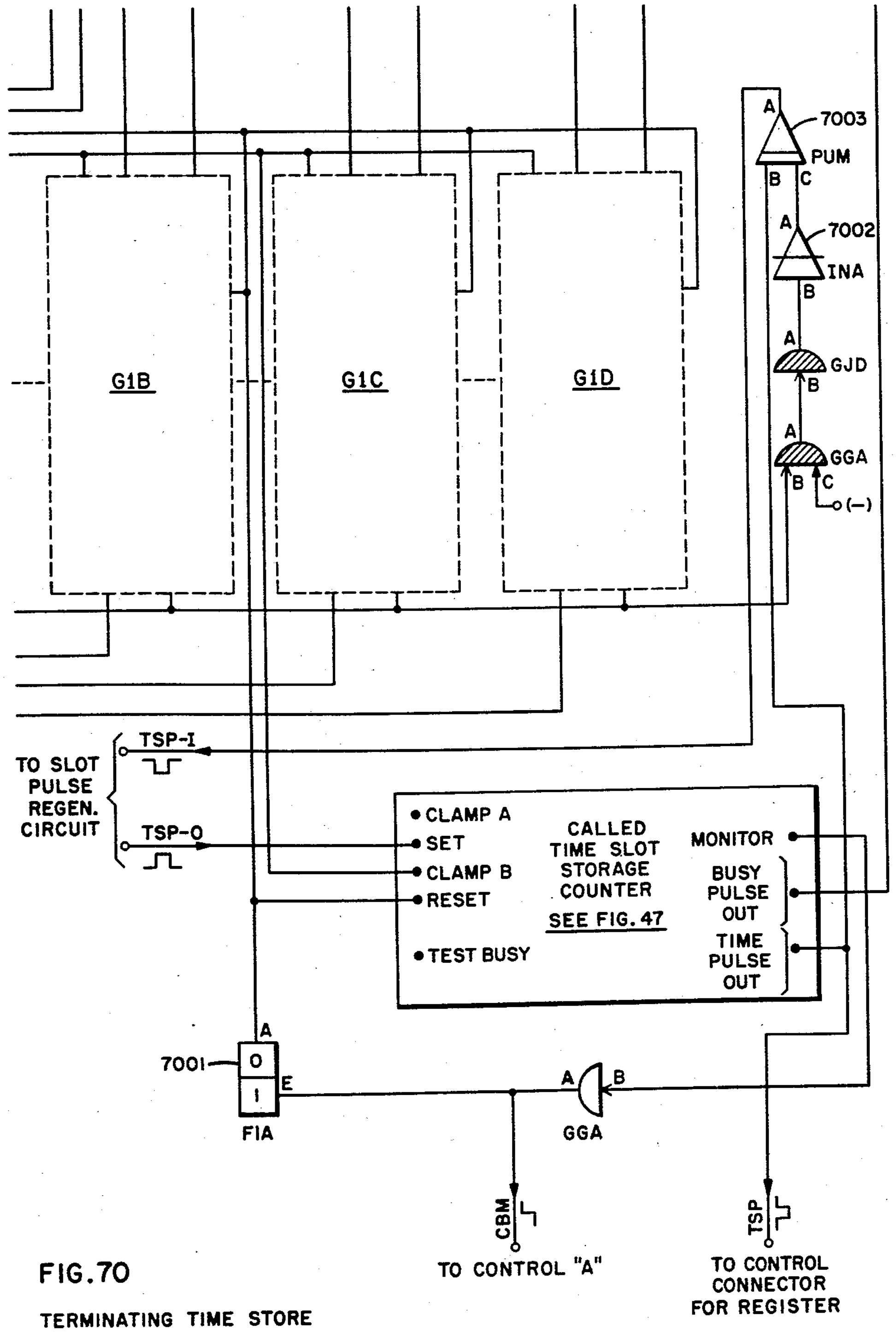
Figure 71:
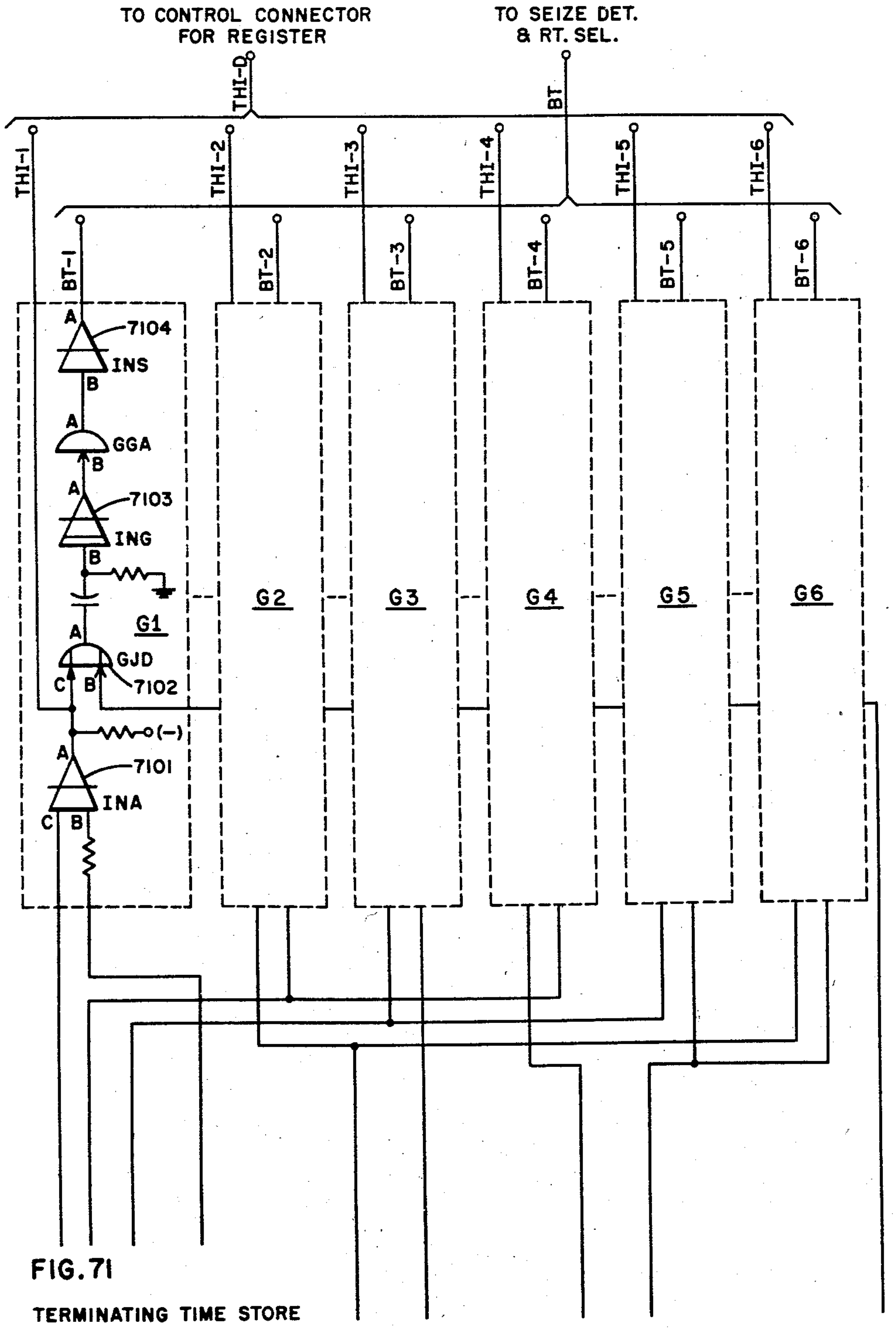
Figure 72:
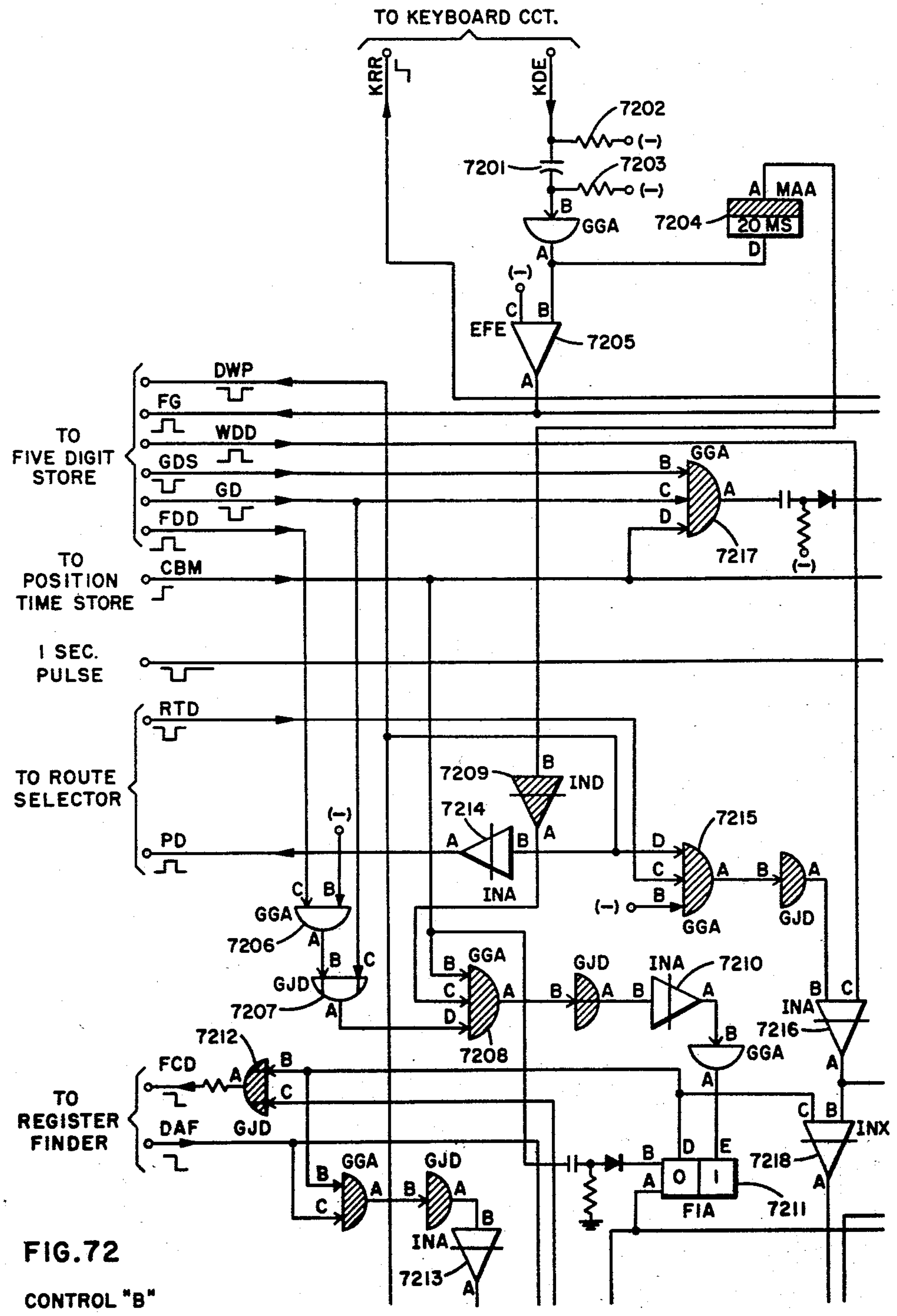
Figure 73:
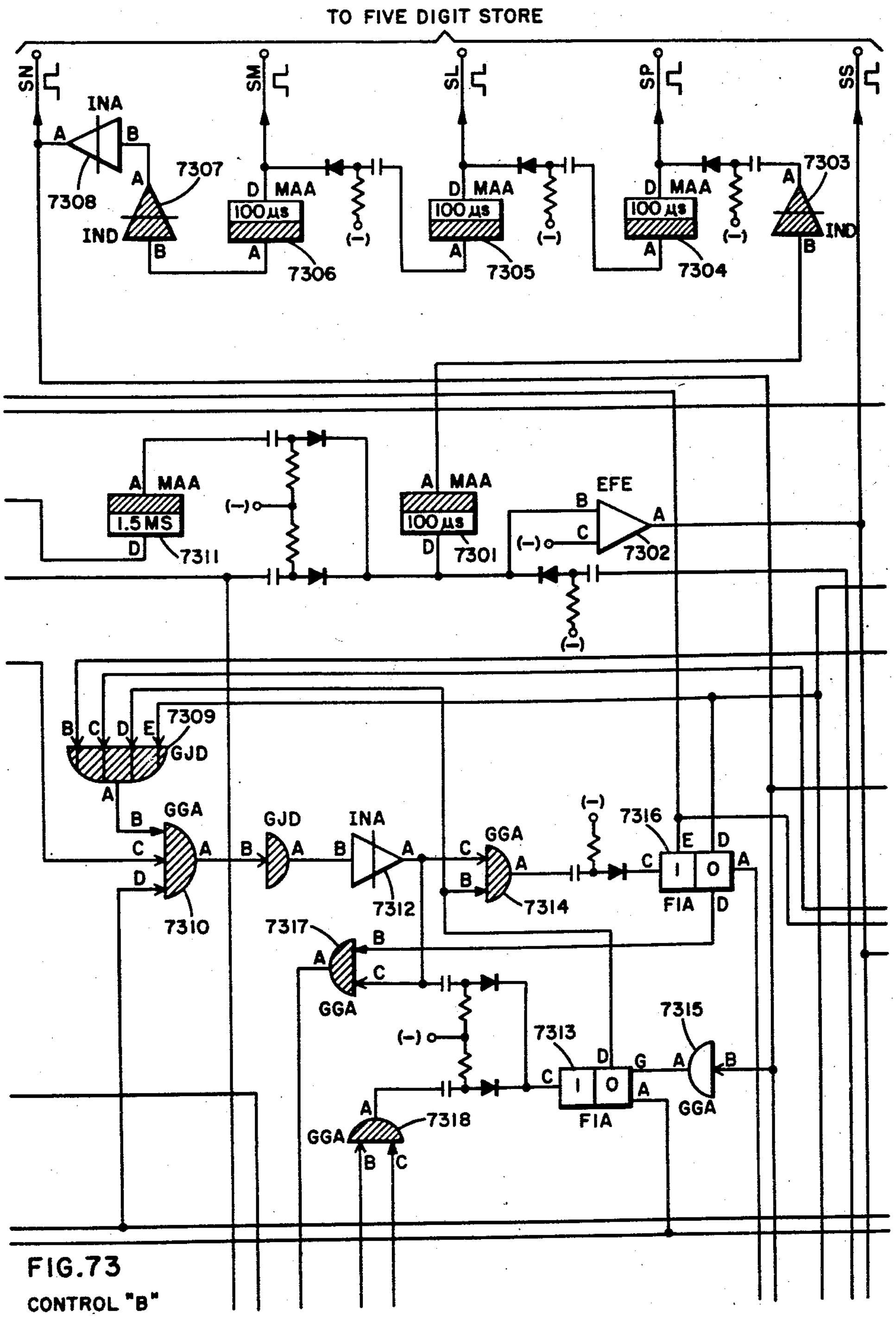
Figure 74:
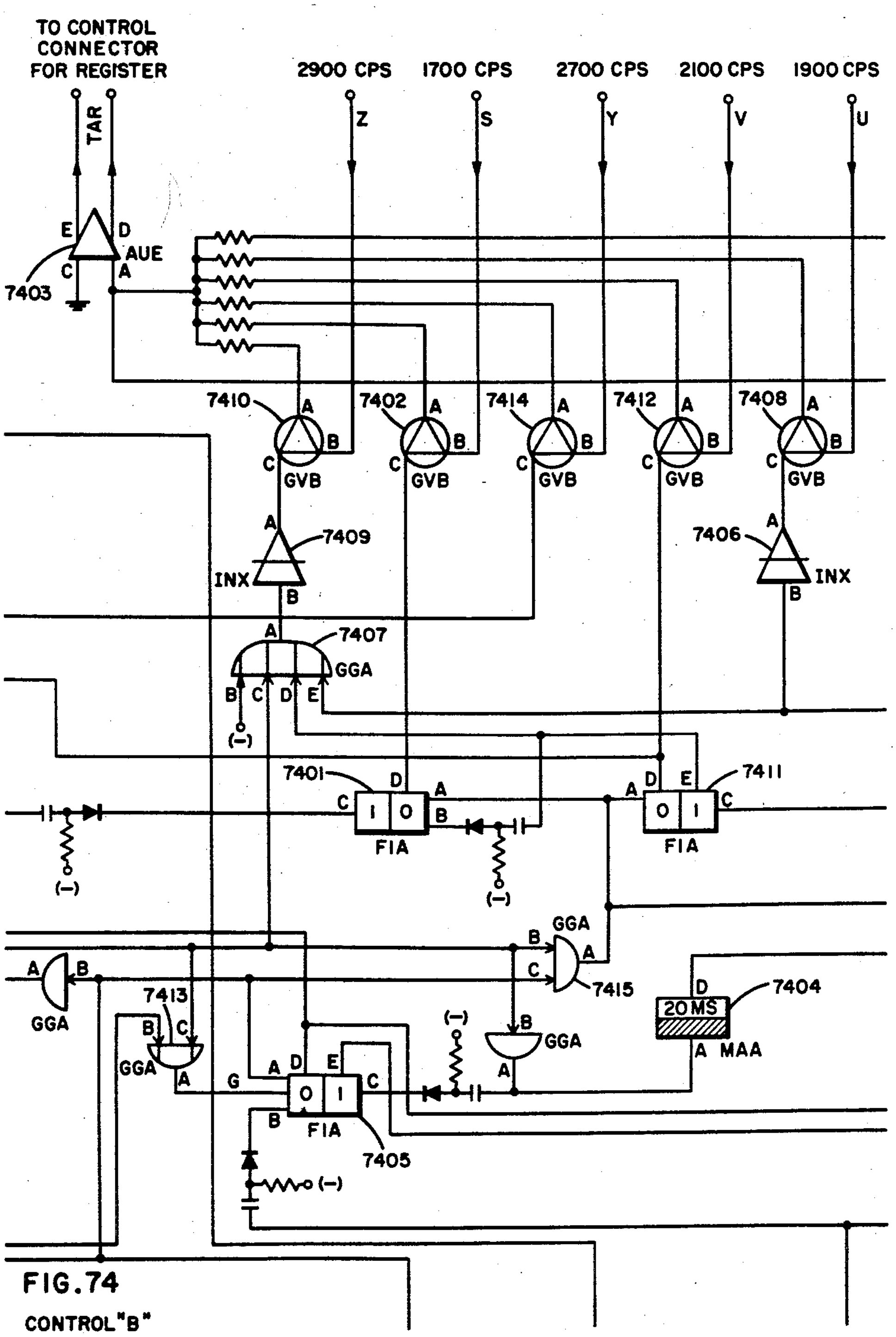
Figure 75:
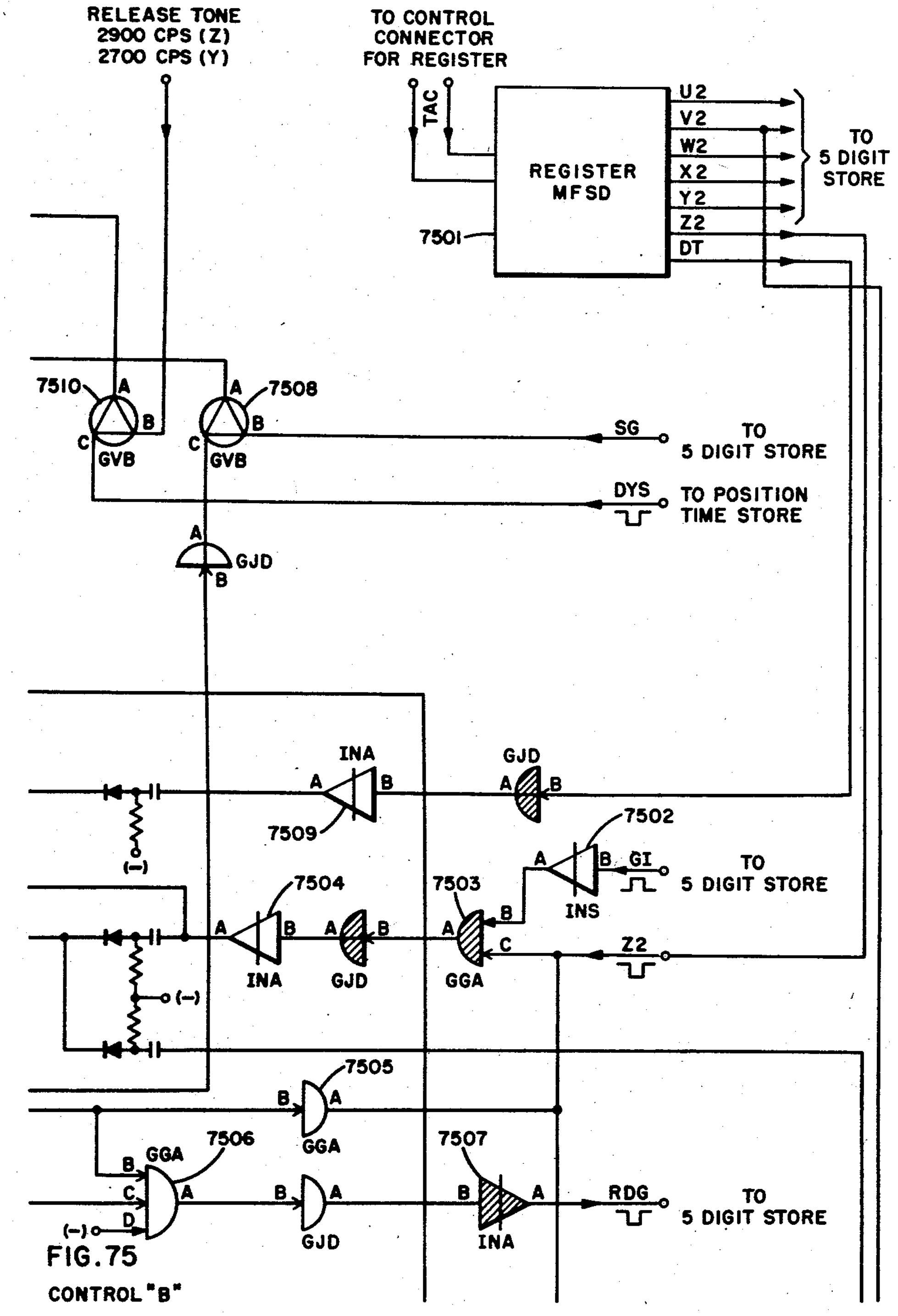
Figure 76:
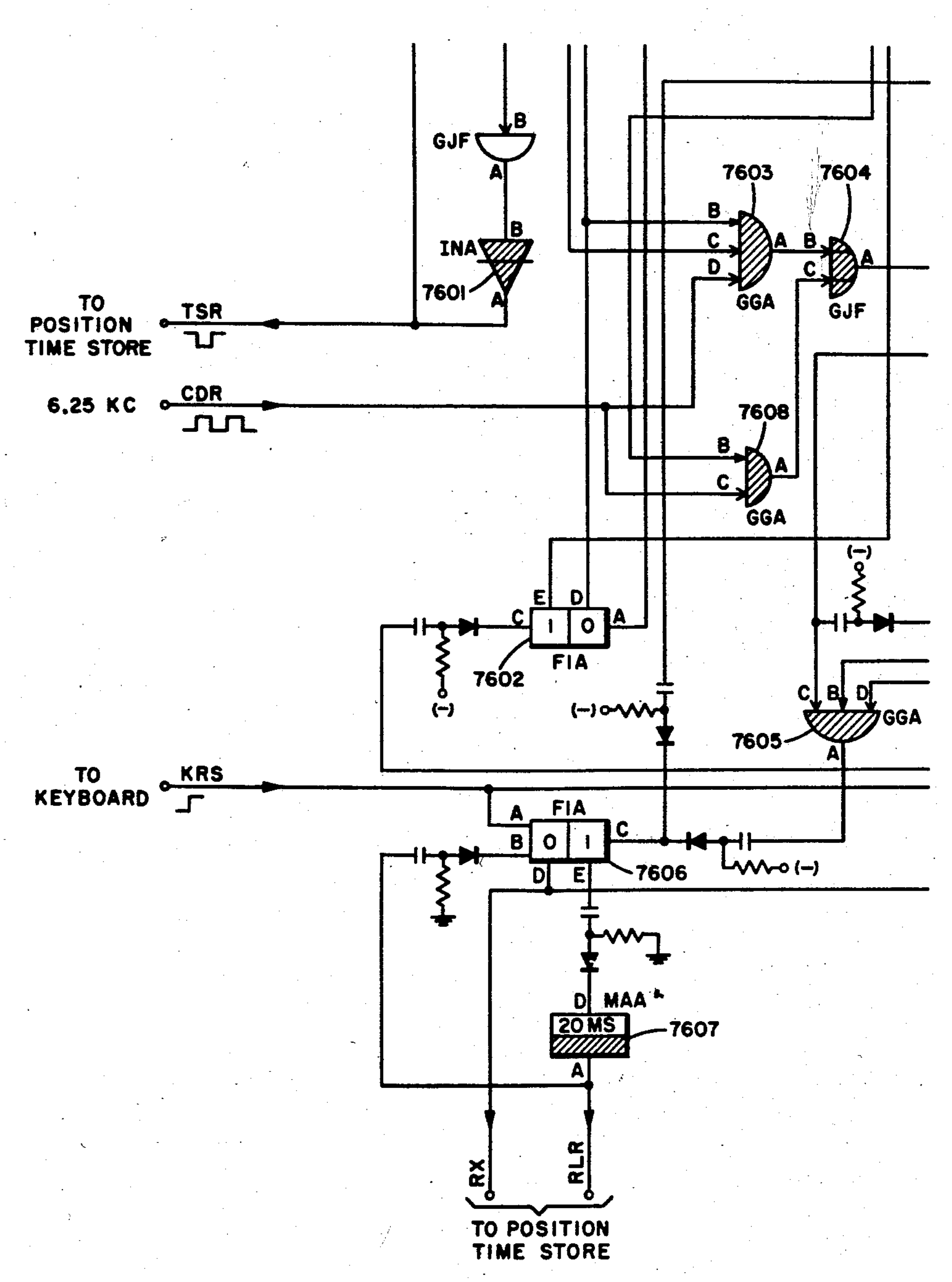
Figure 77:
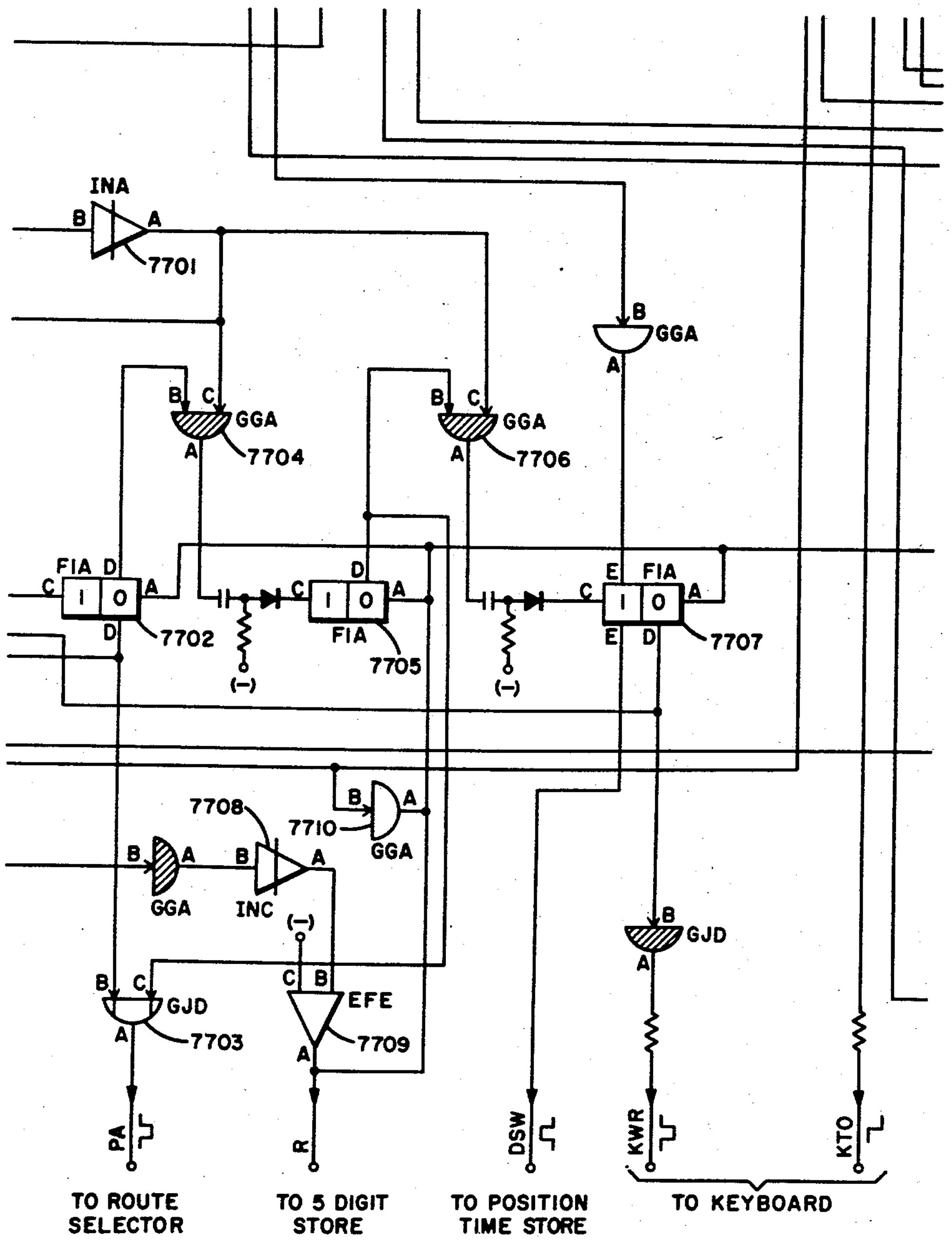
Figure 78:
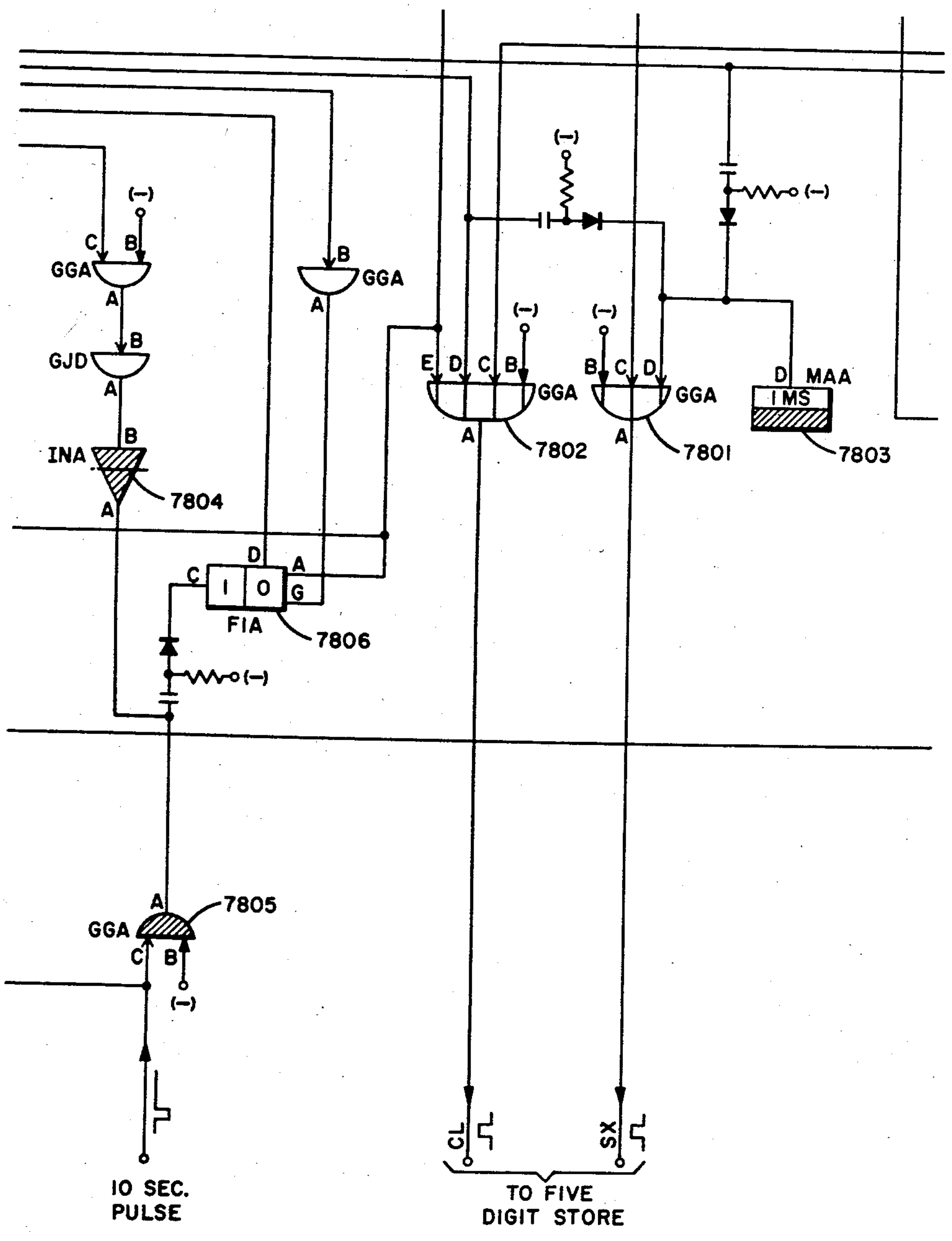
Figure 79:
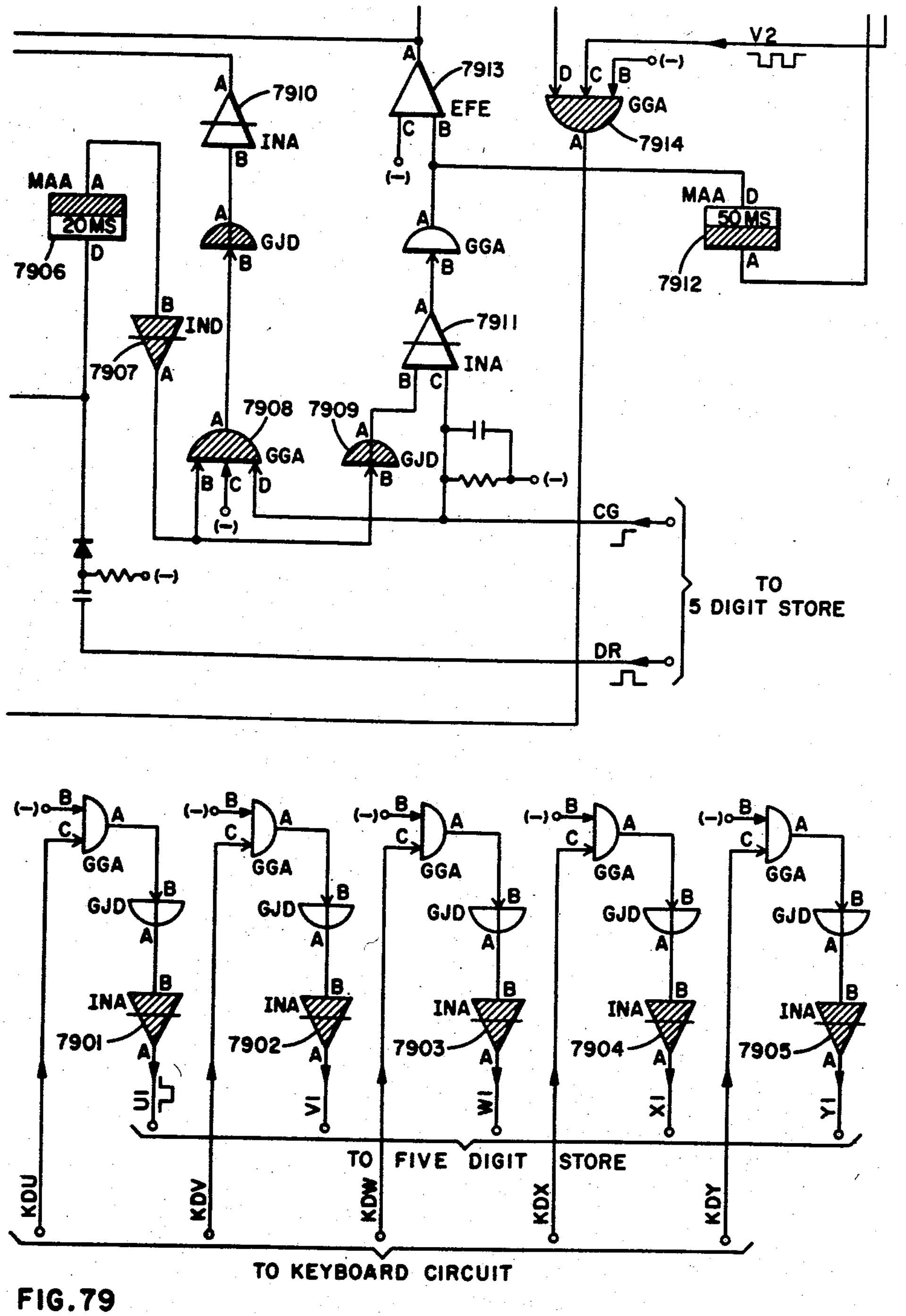

Figs. 69–71, when arranged with Fig. 70 to the right of Fig. 69 and below Fig. 71, show a terminating time store for use in a long distance switching center.

Figure 130:
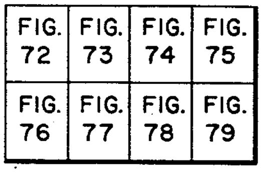

Figs. 72–79, when arranged as shown in Fig. 130, show a control B circuit for use in a long distance switching center.

Figure 80:
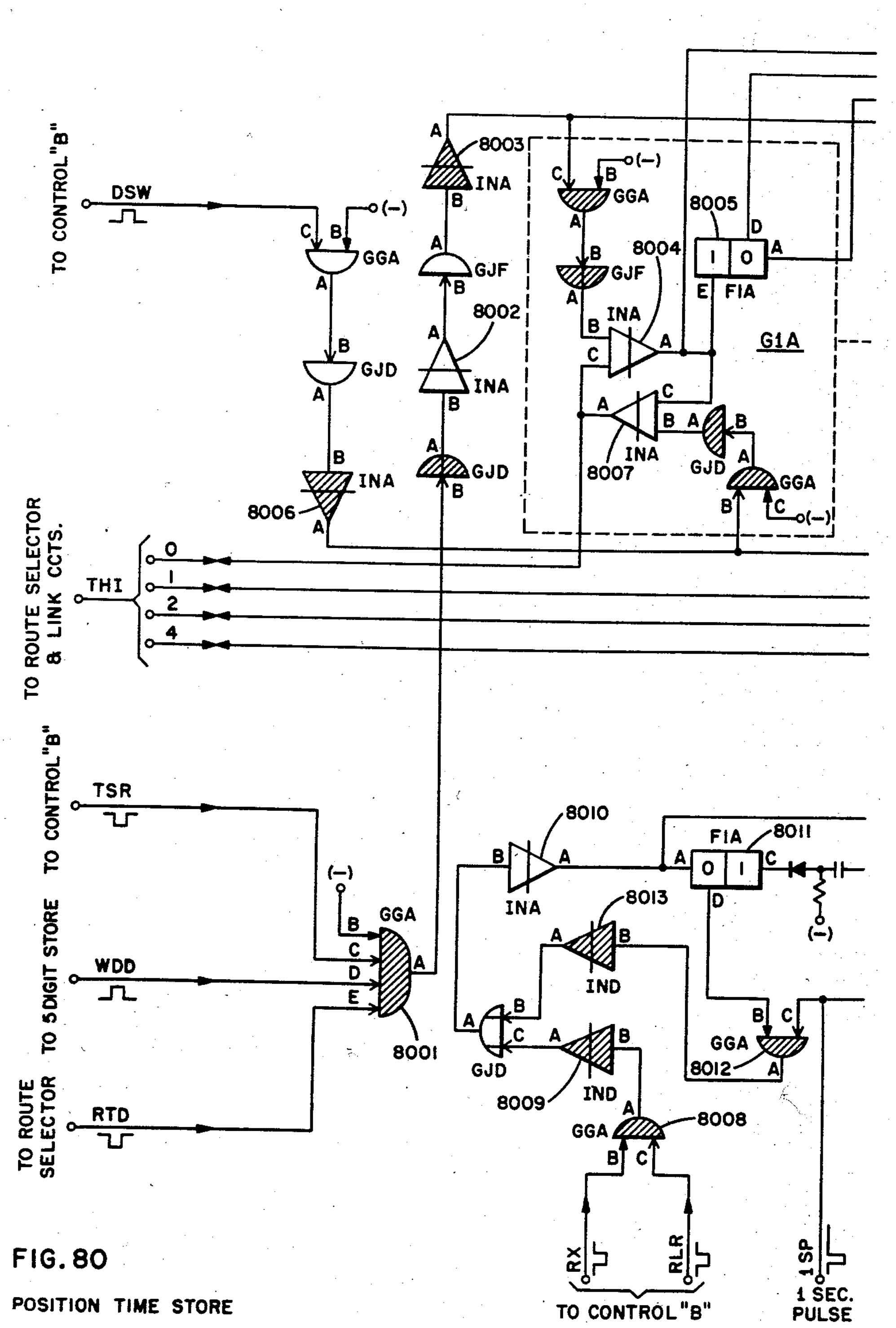
Figure 81:
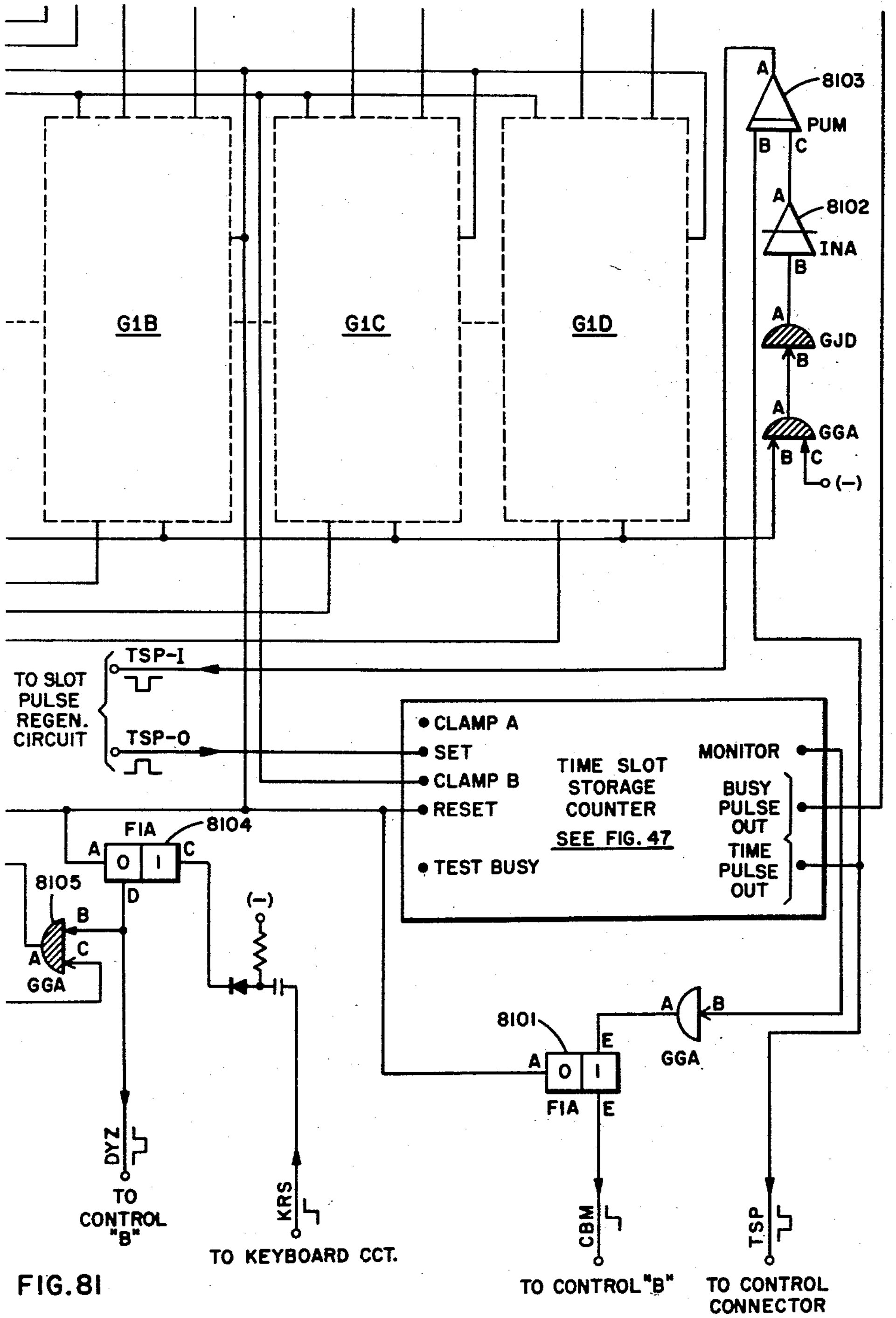
Figure 82:
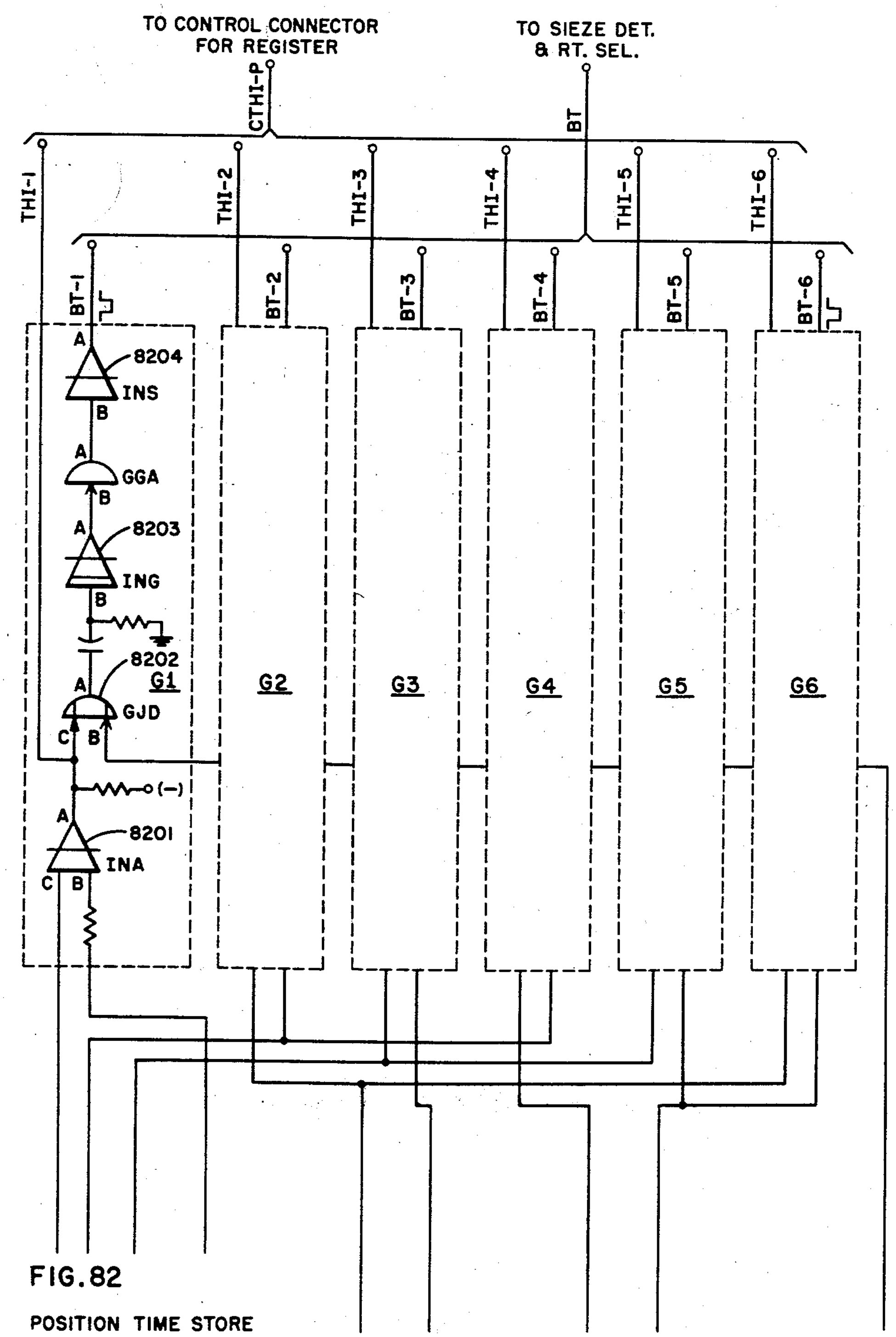
Figure 83:
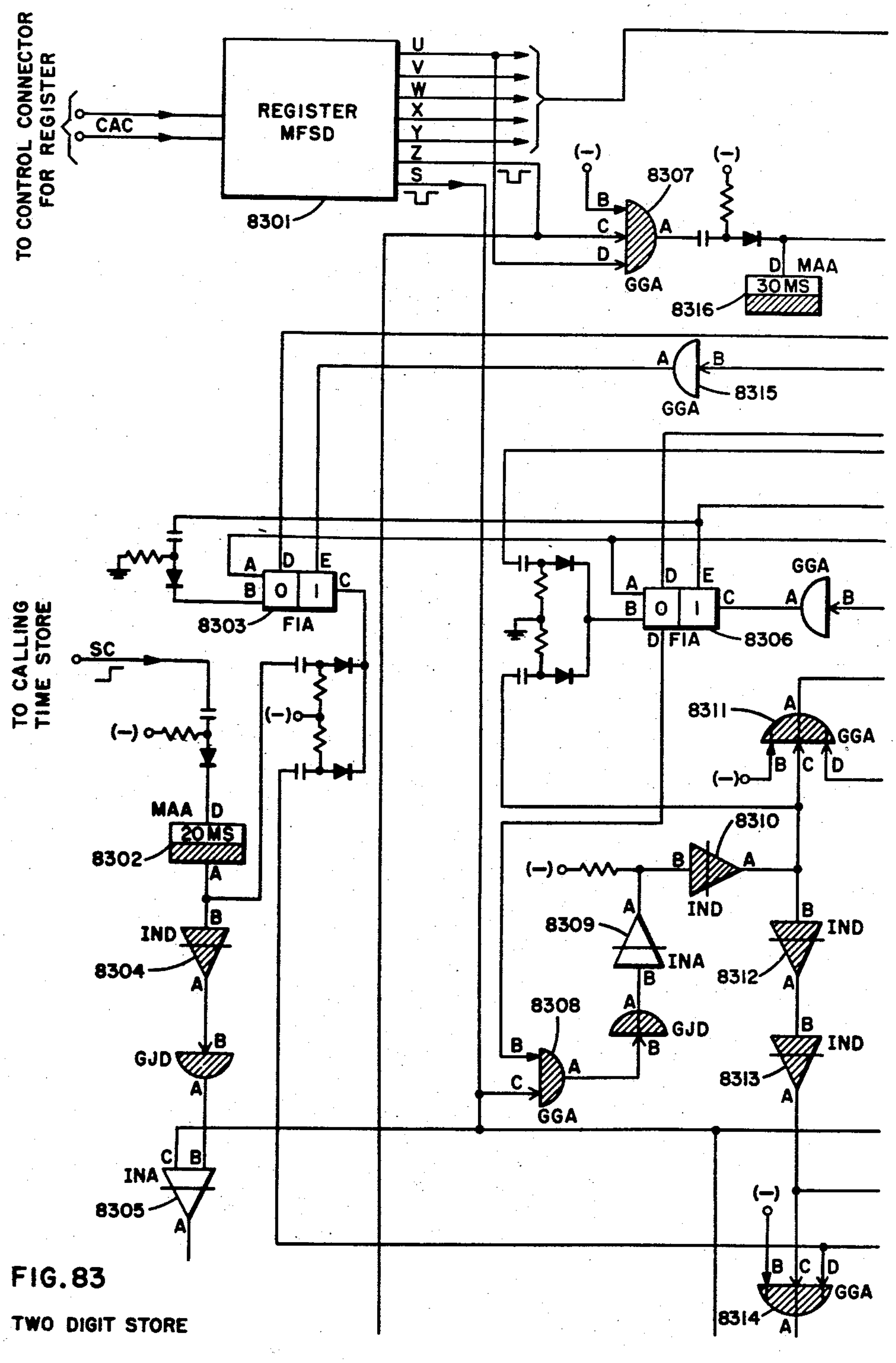
Figure 84:
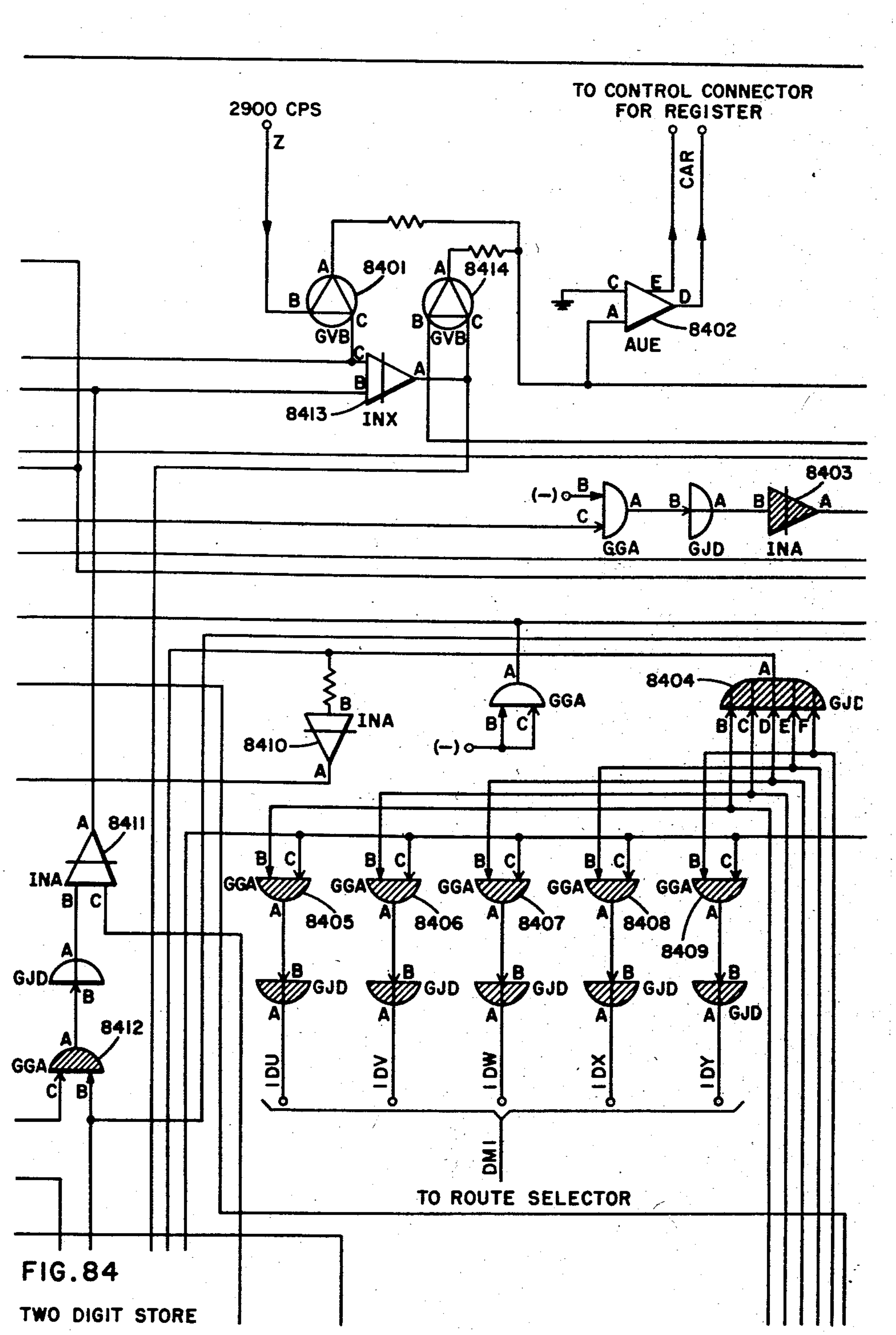
Figure 85:
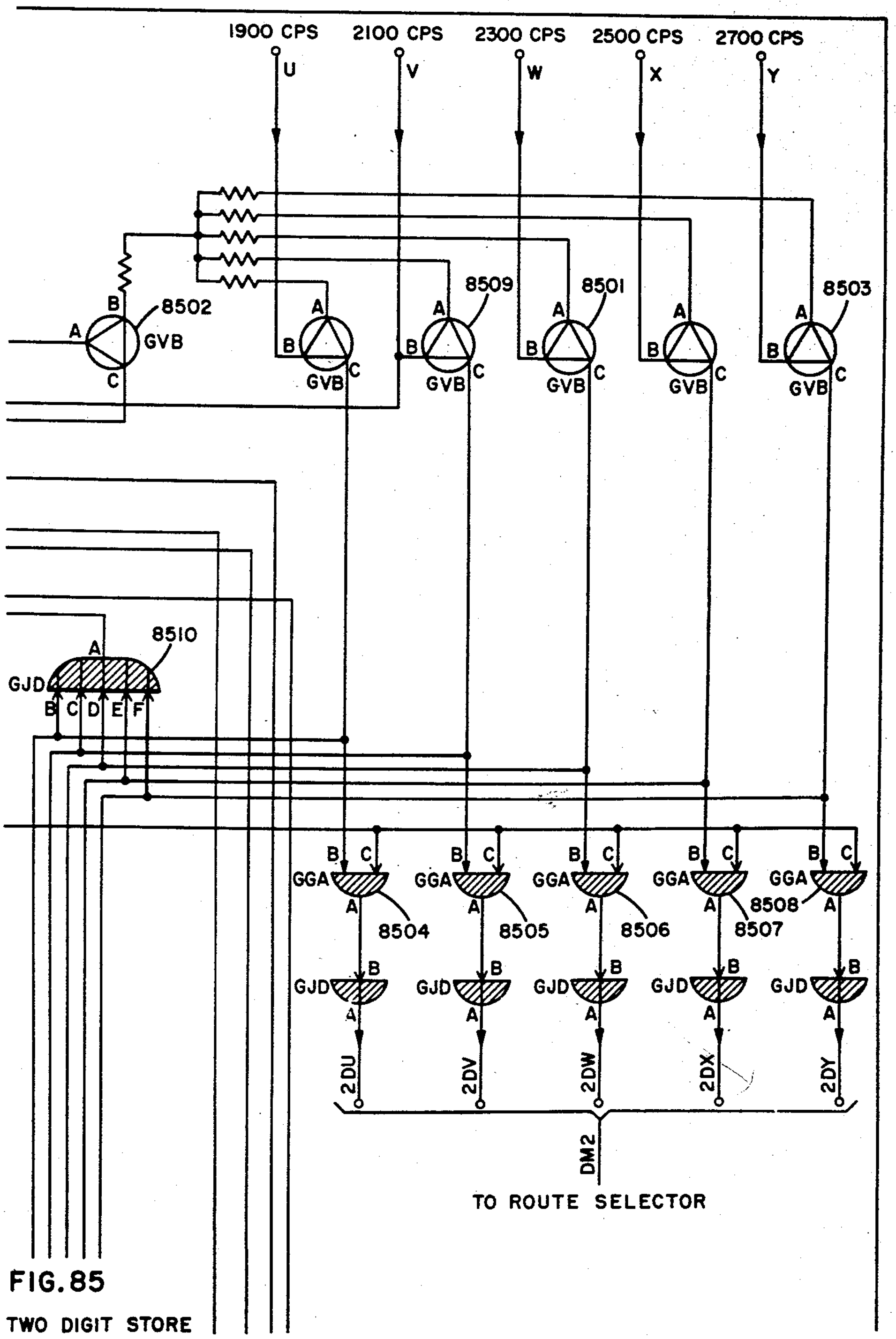
Figure 86:
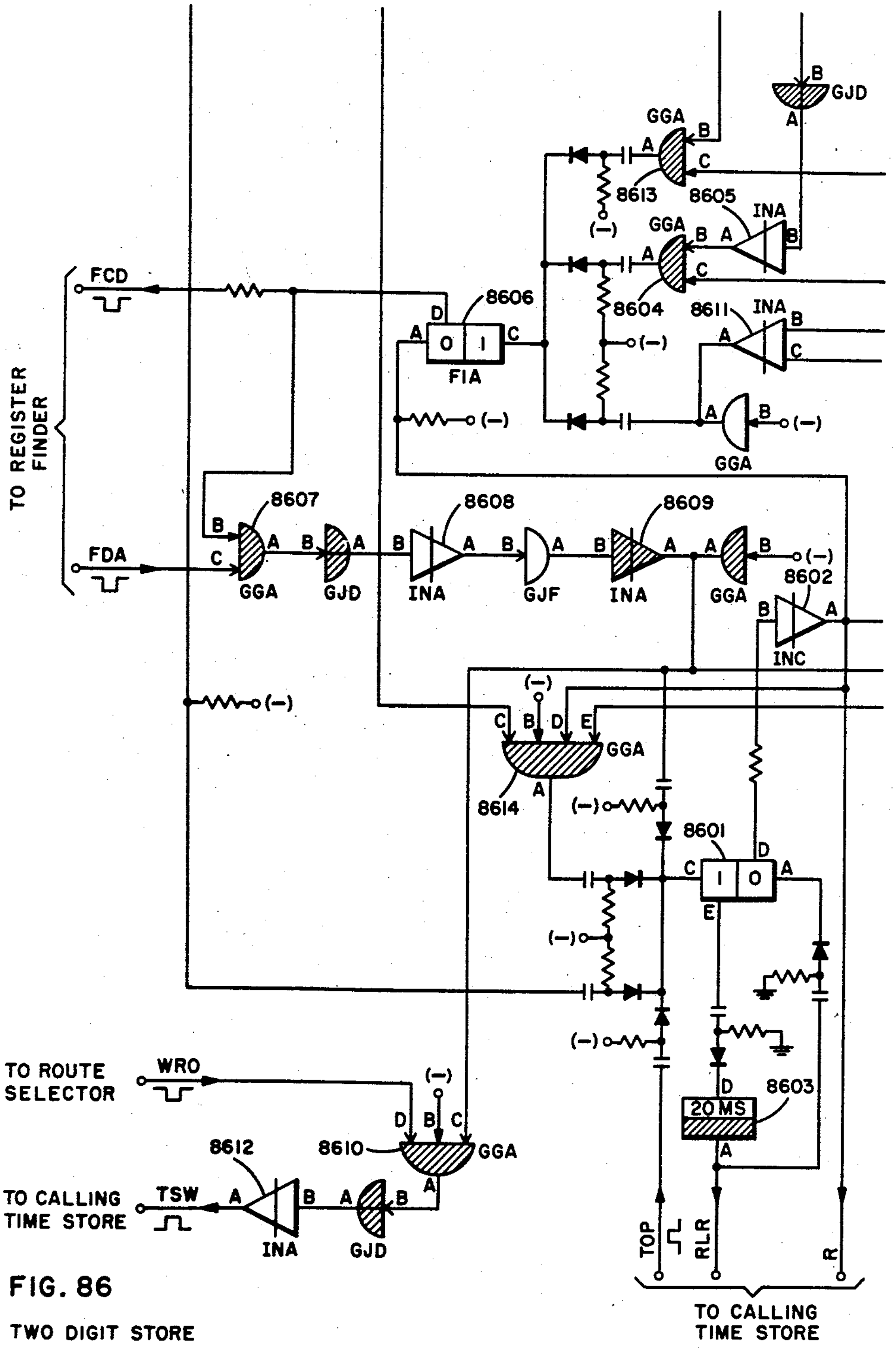
Figure 87:
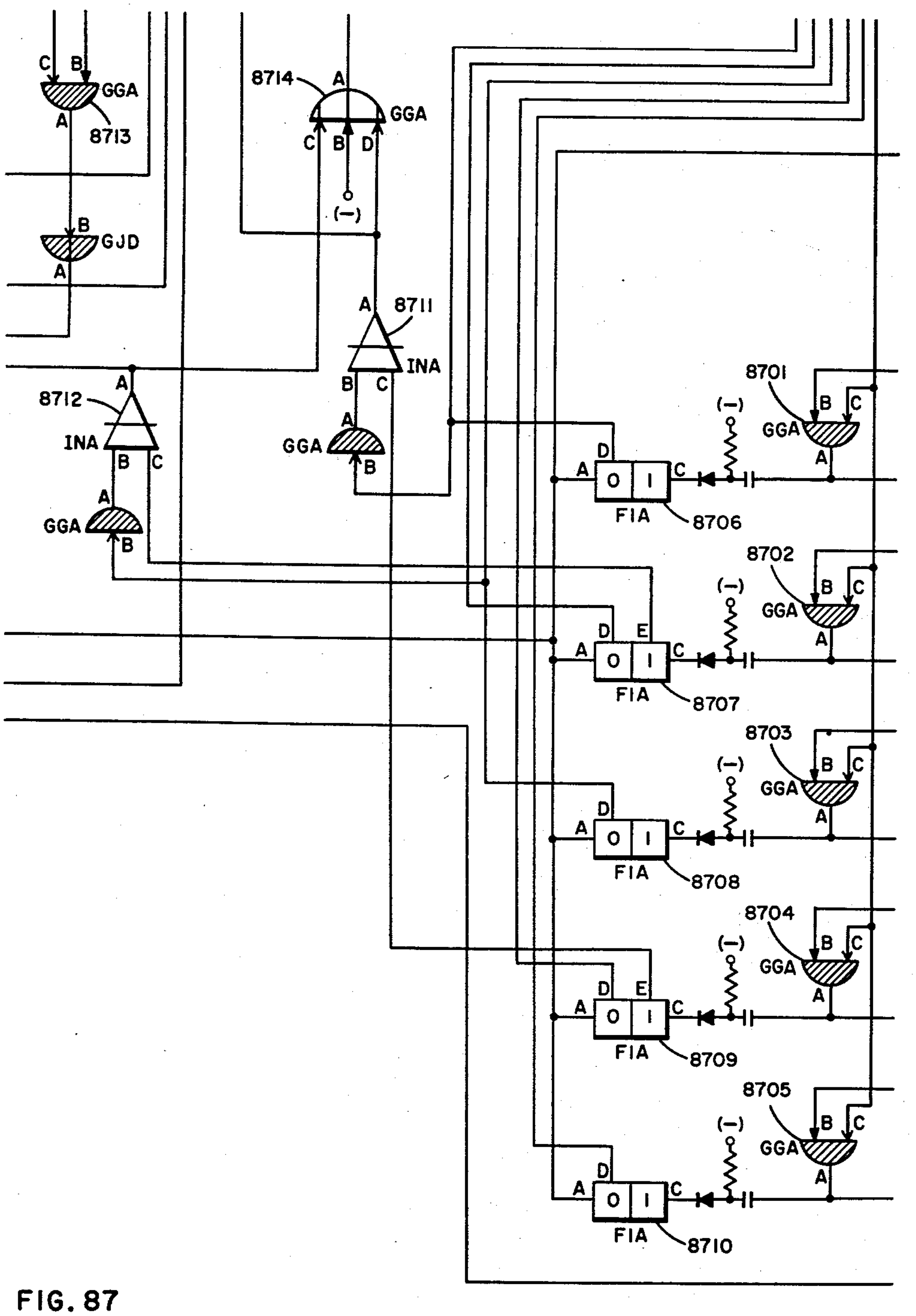
Figure 88:
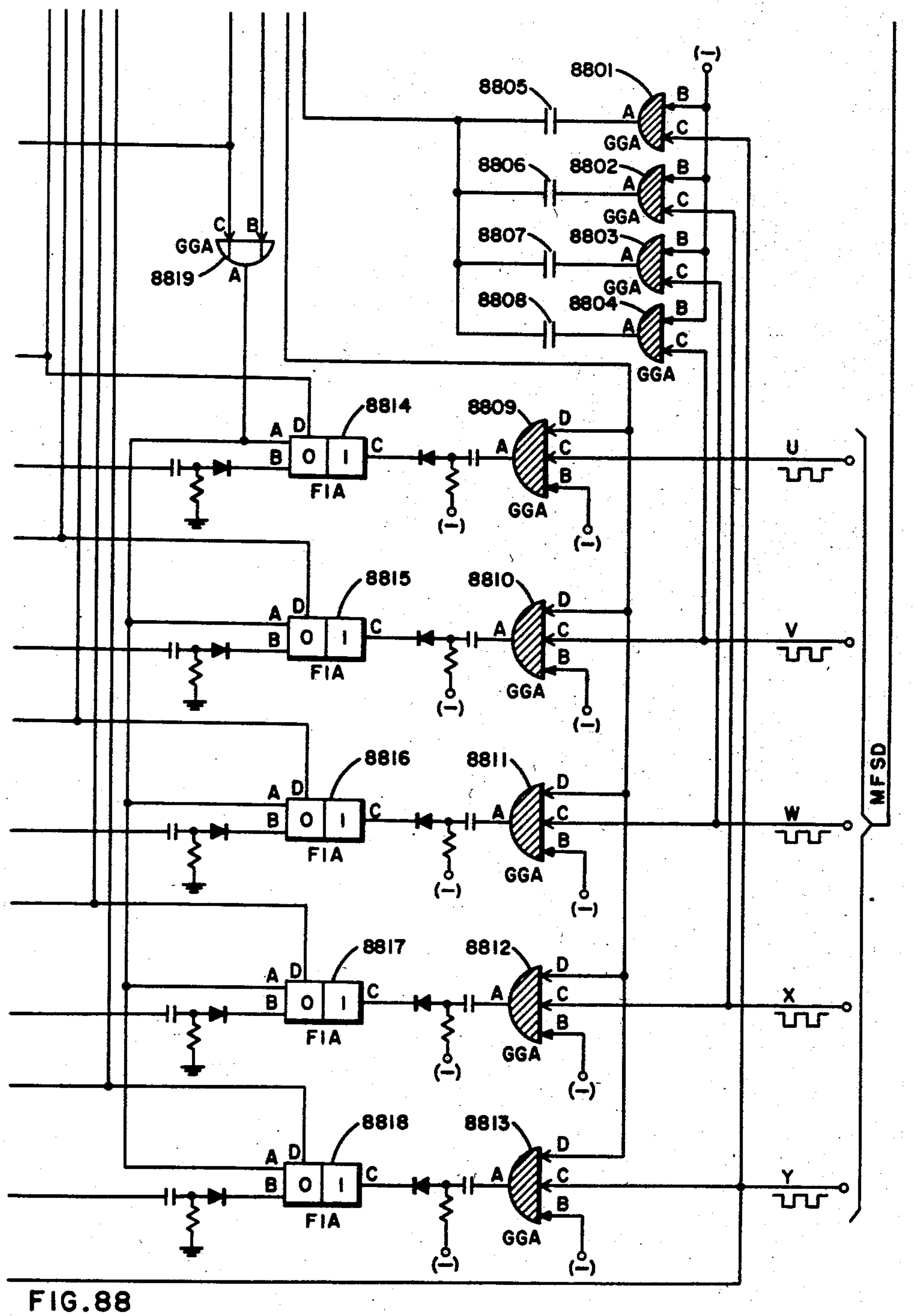
Figure 89:
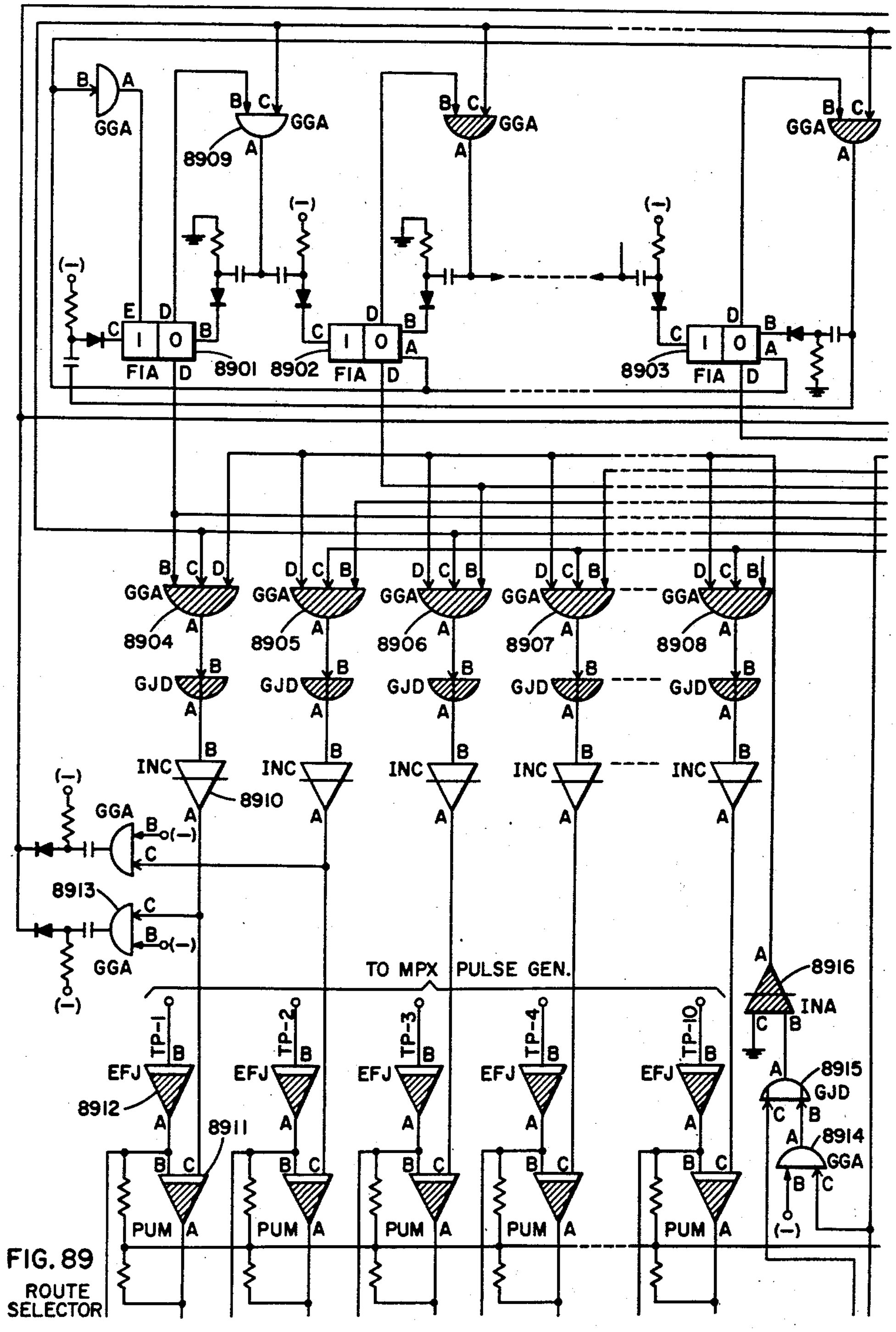
Figure 90:
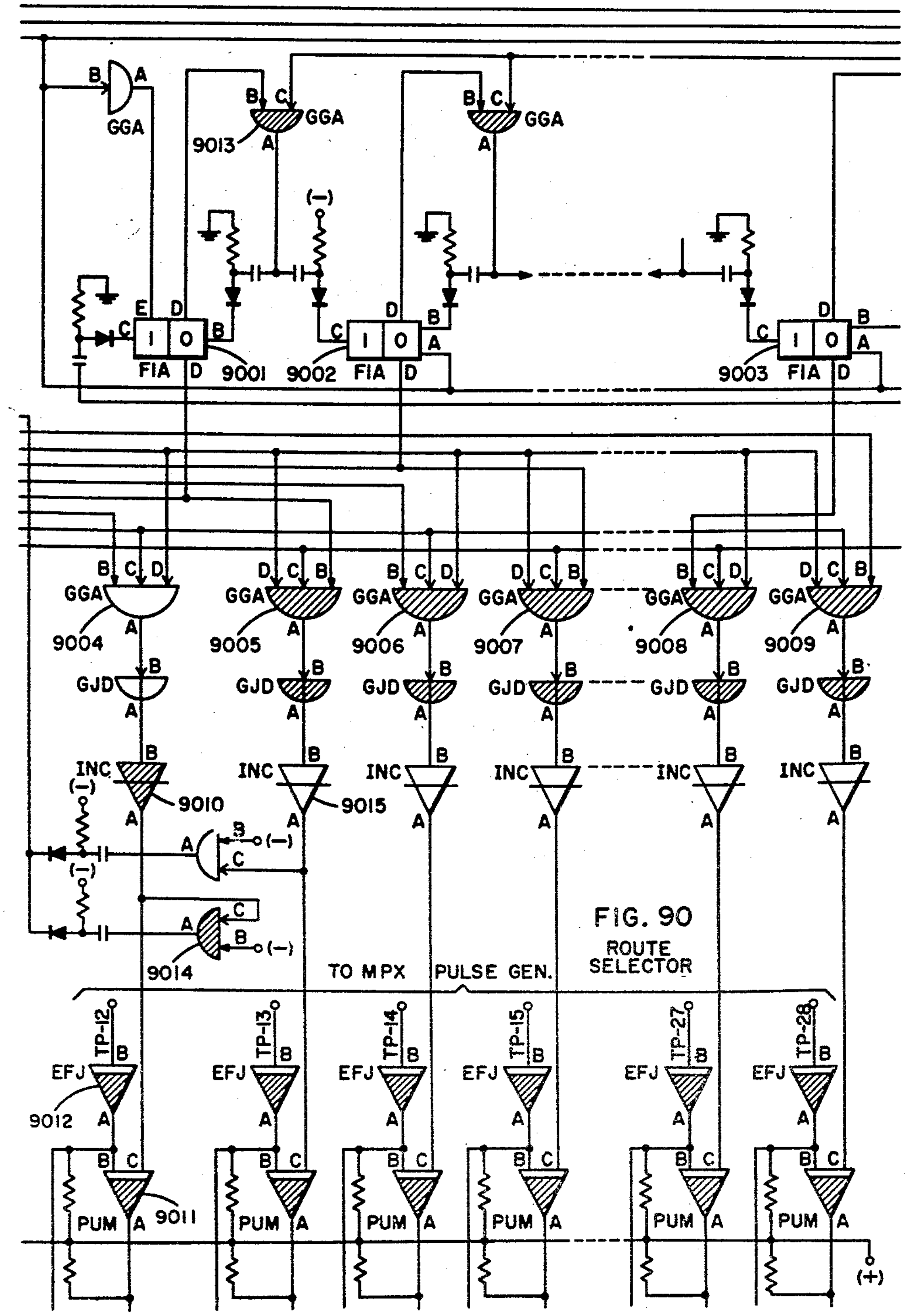
Figure 91:
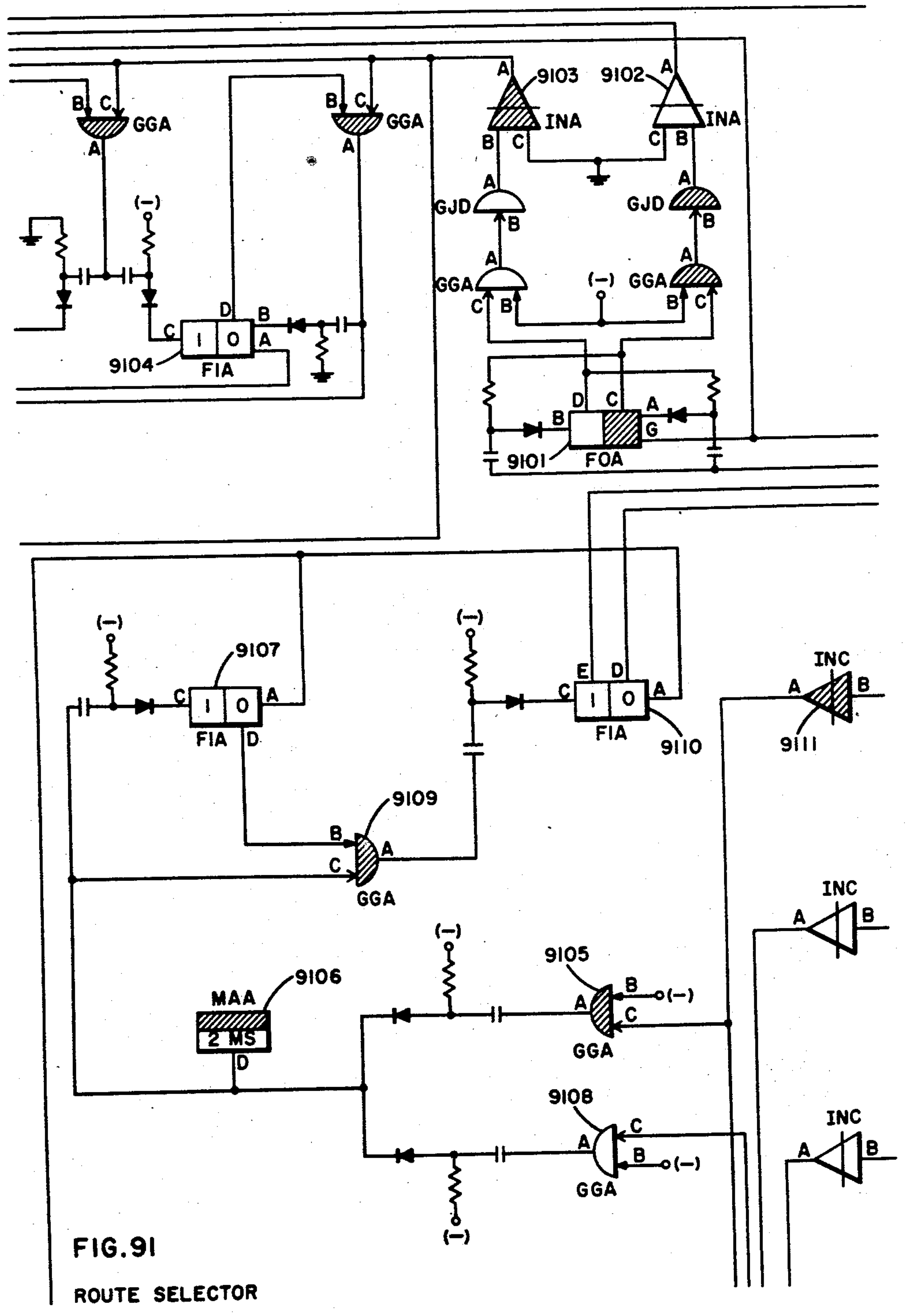
Figure 92:
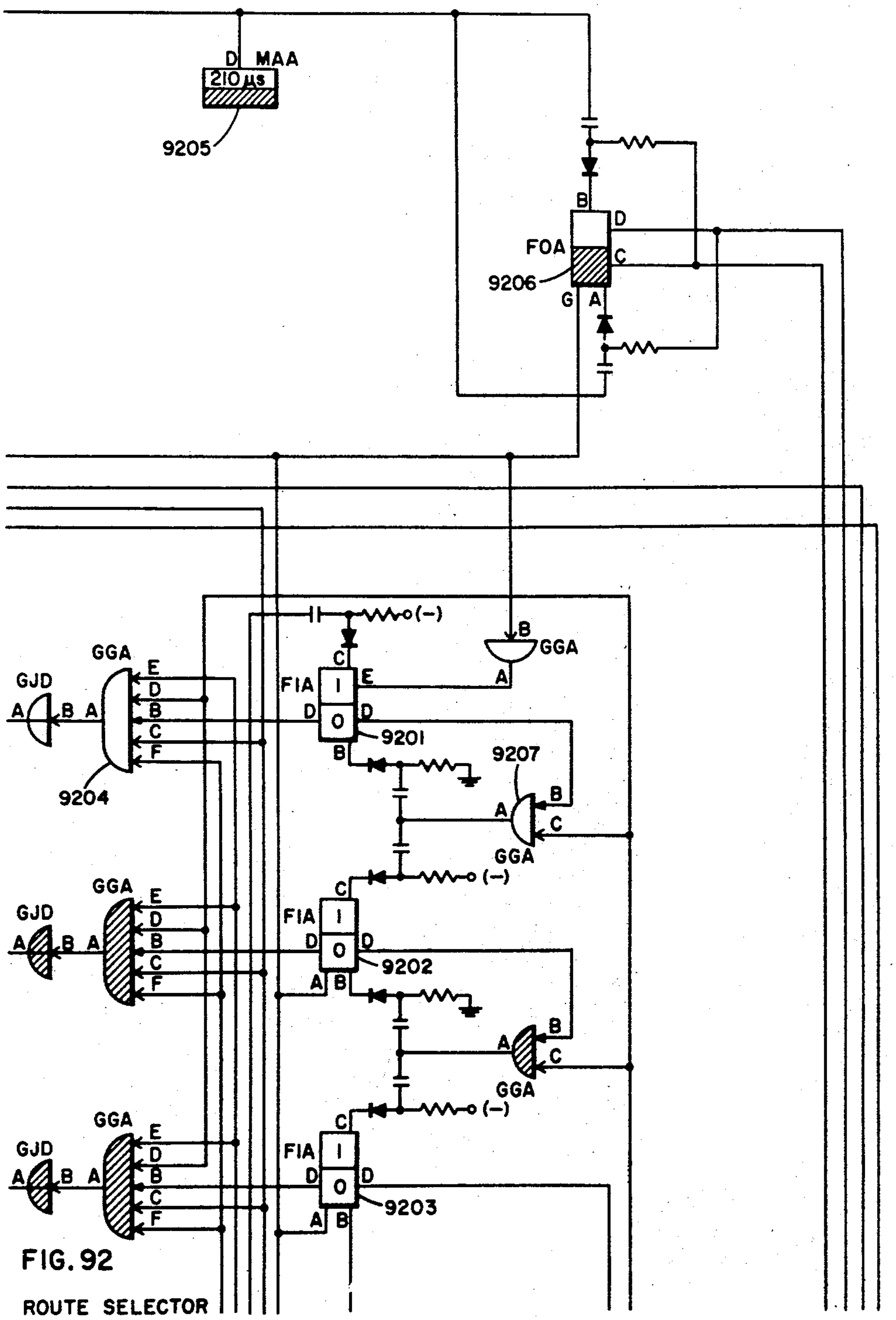
Figure 93:
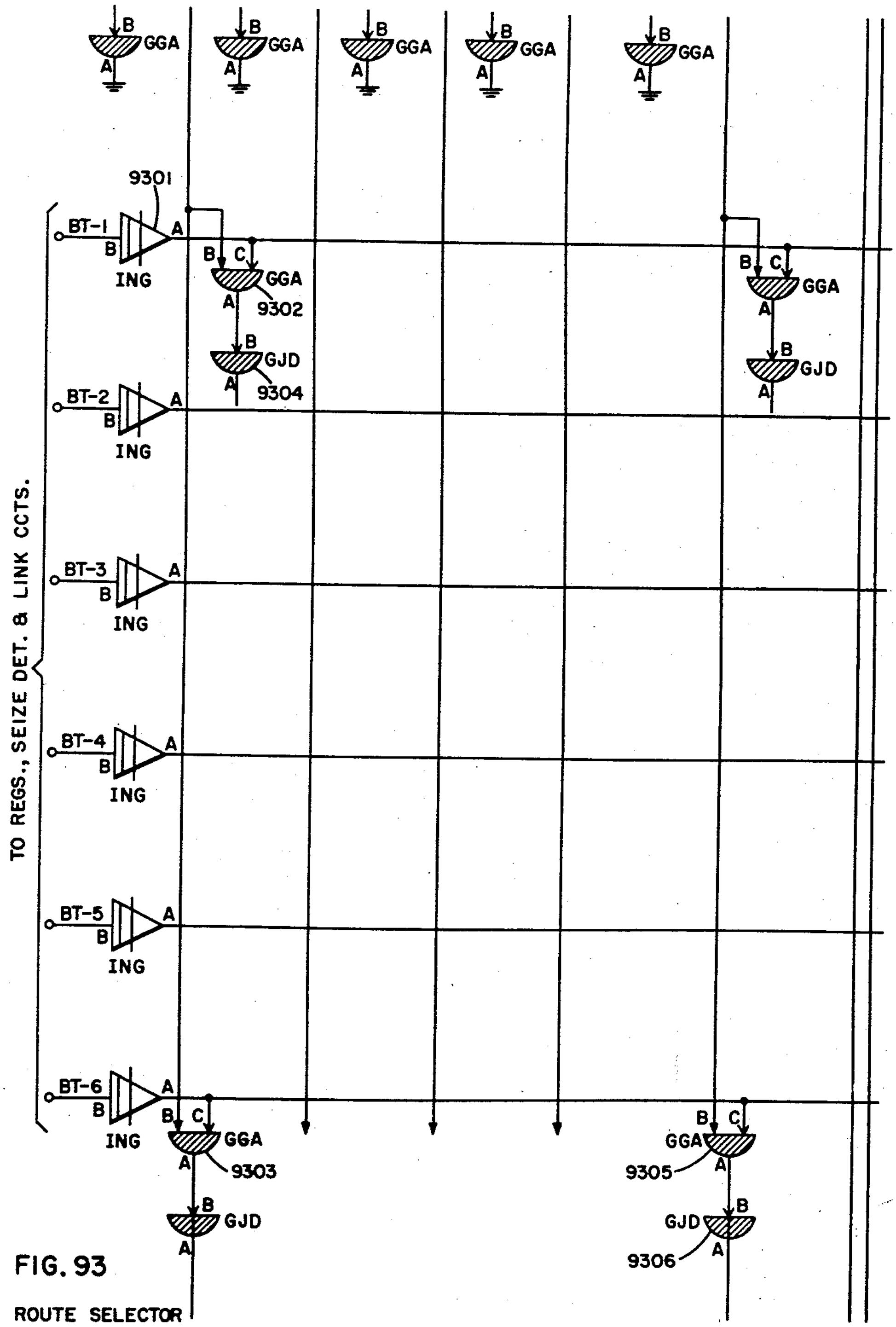
Figure 94:
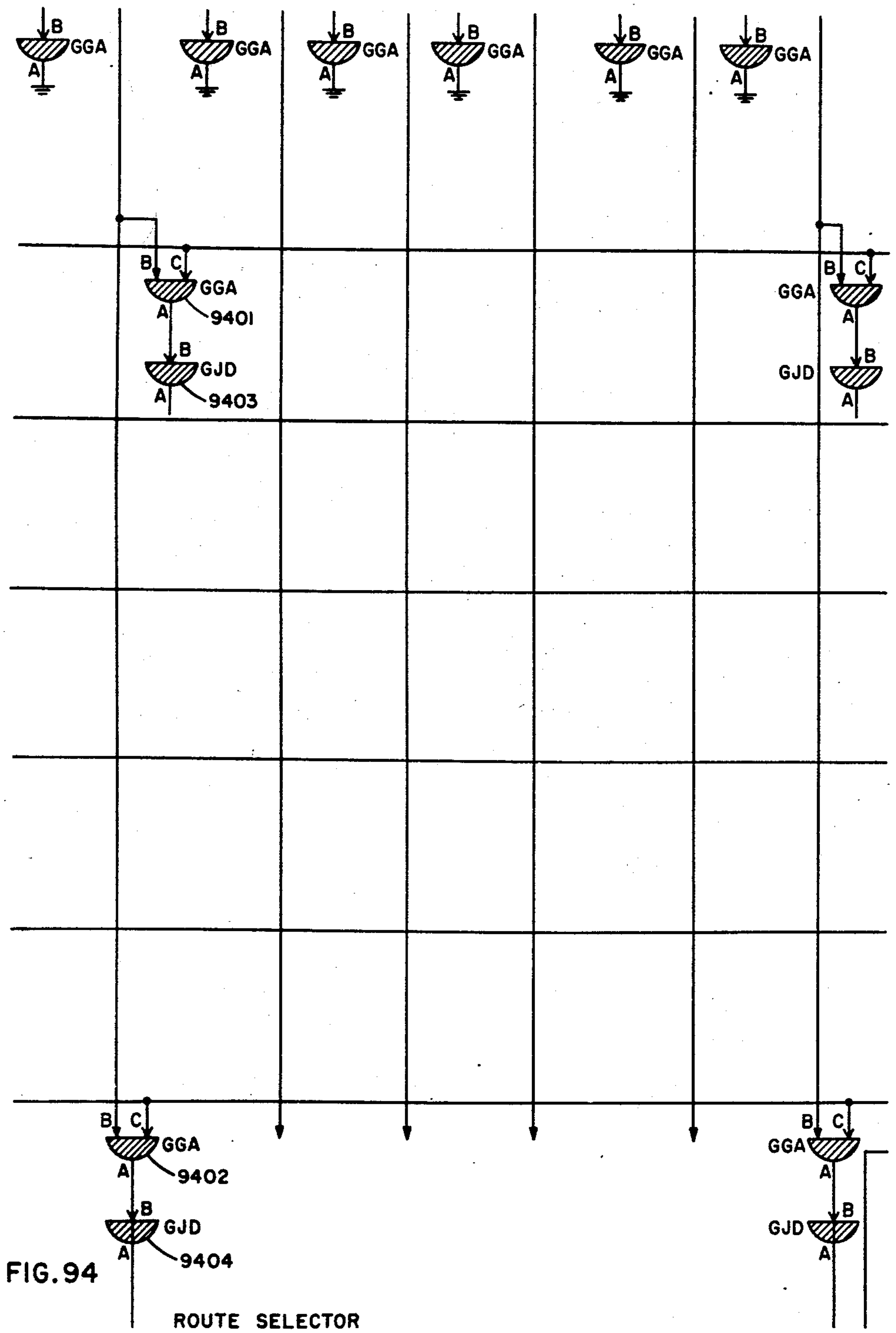
Figure 95:
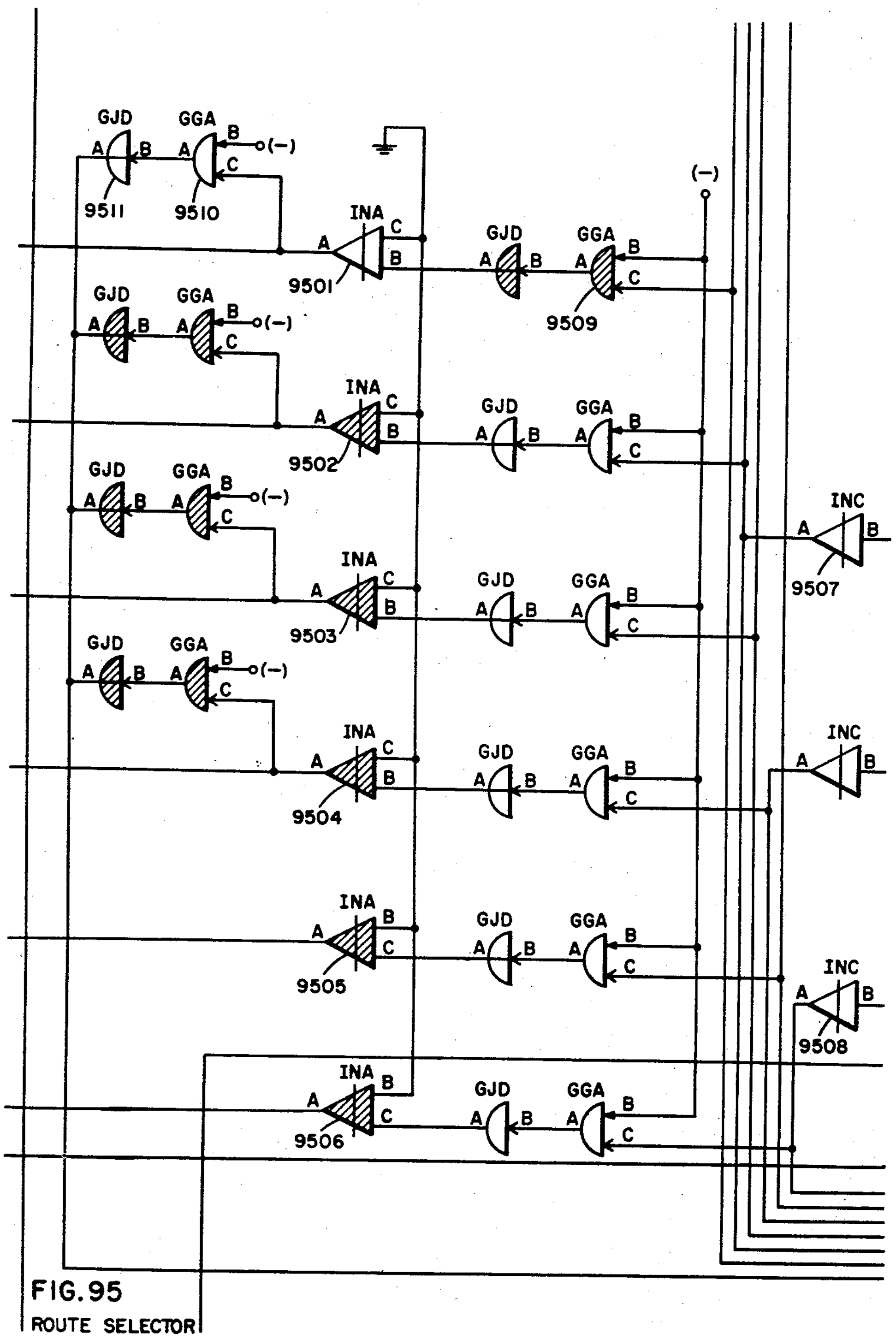
Figure 96:
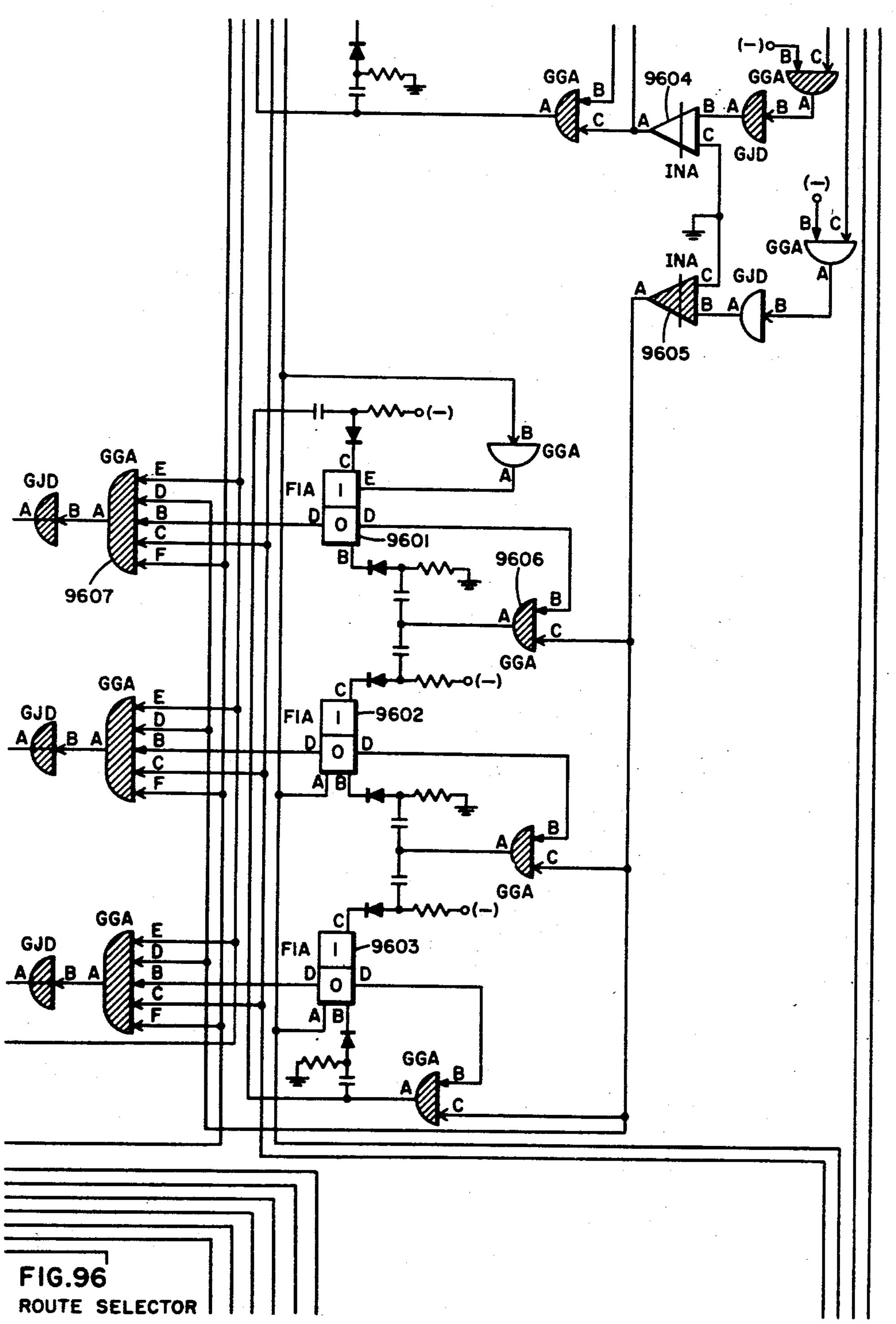
Figure 97:
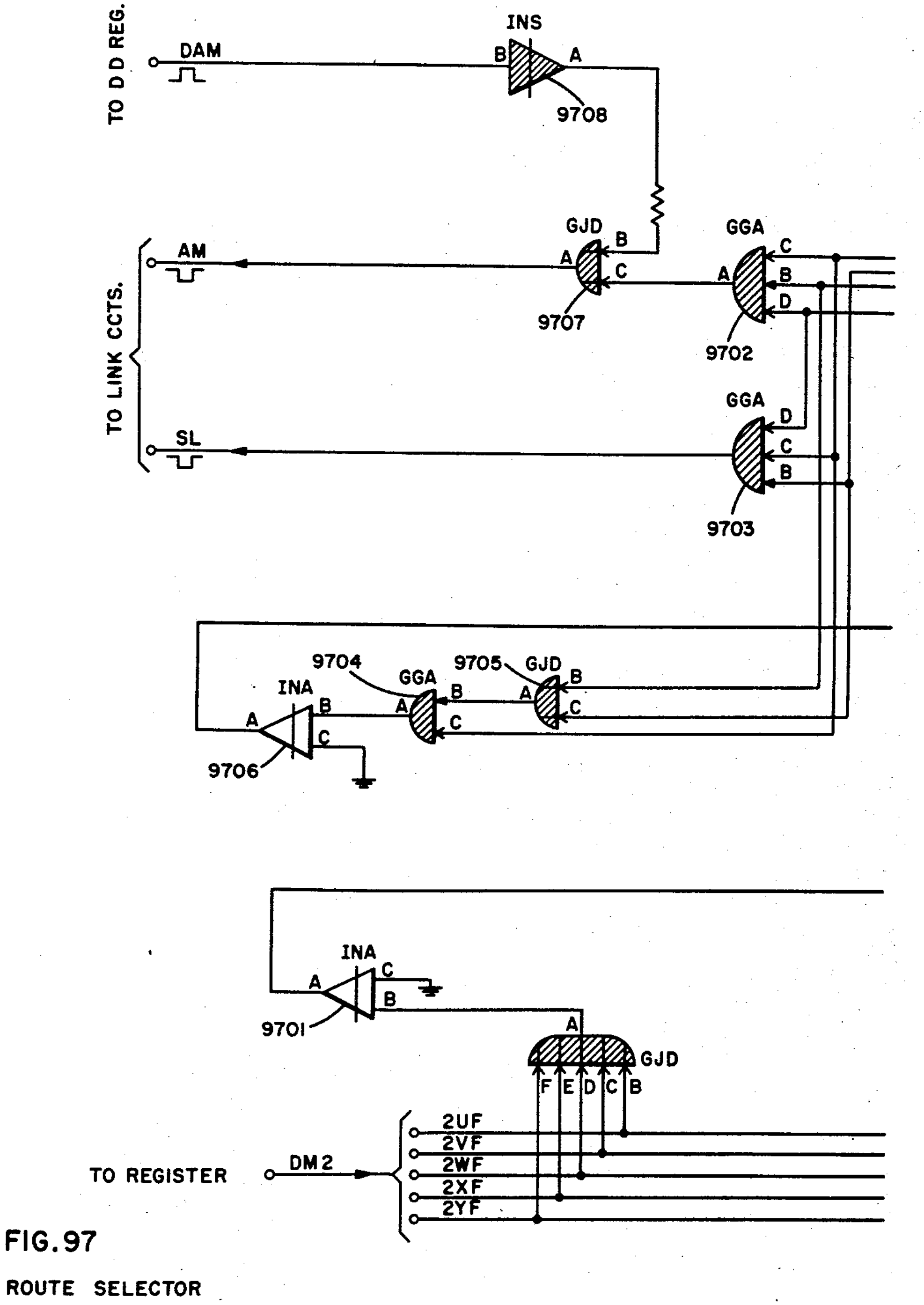
Figure 98:
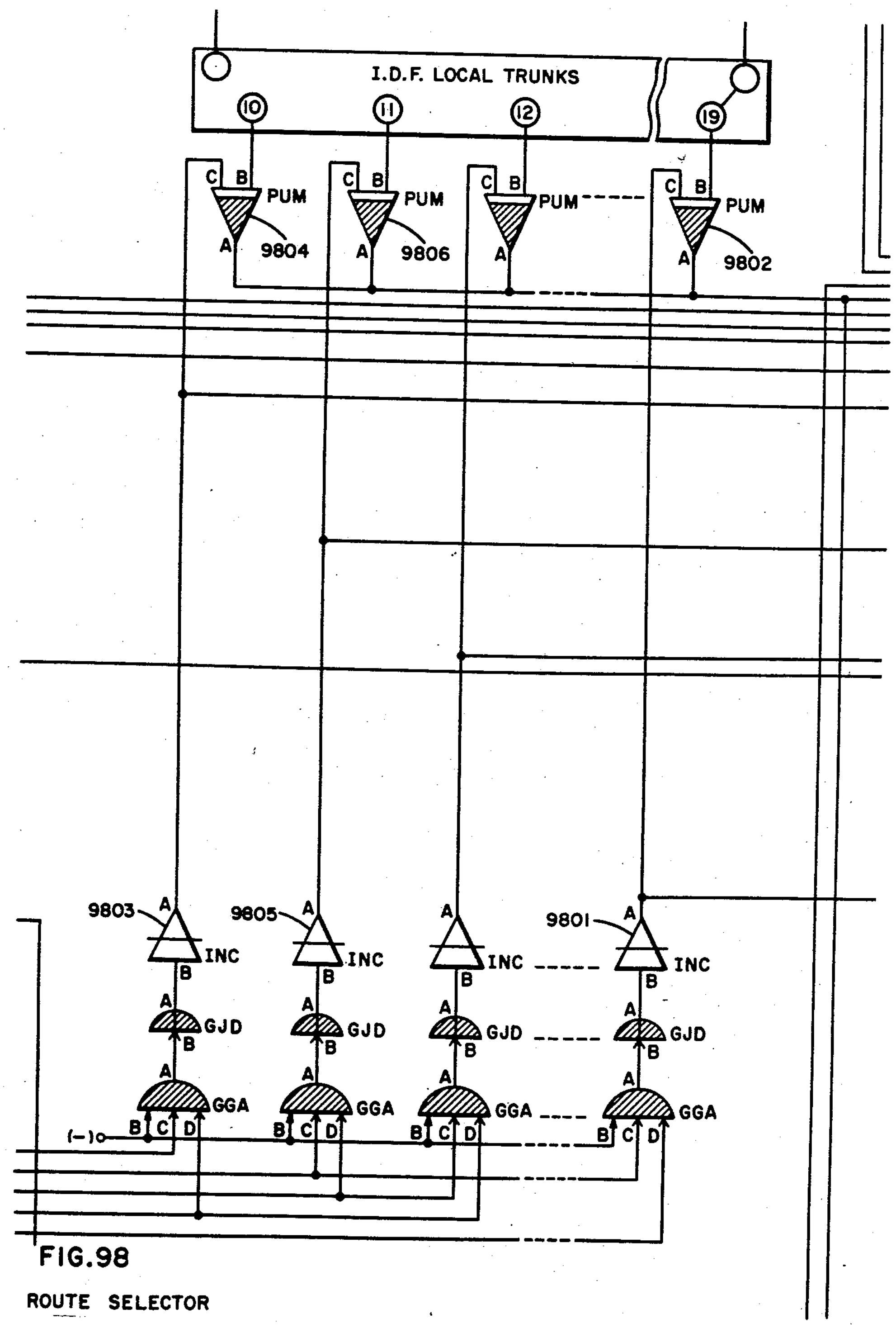
Figure 99:
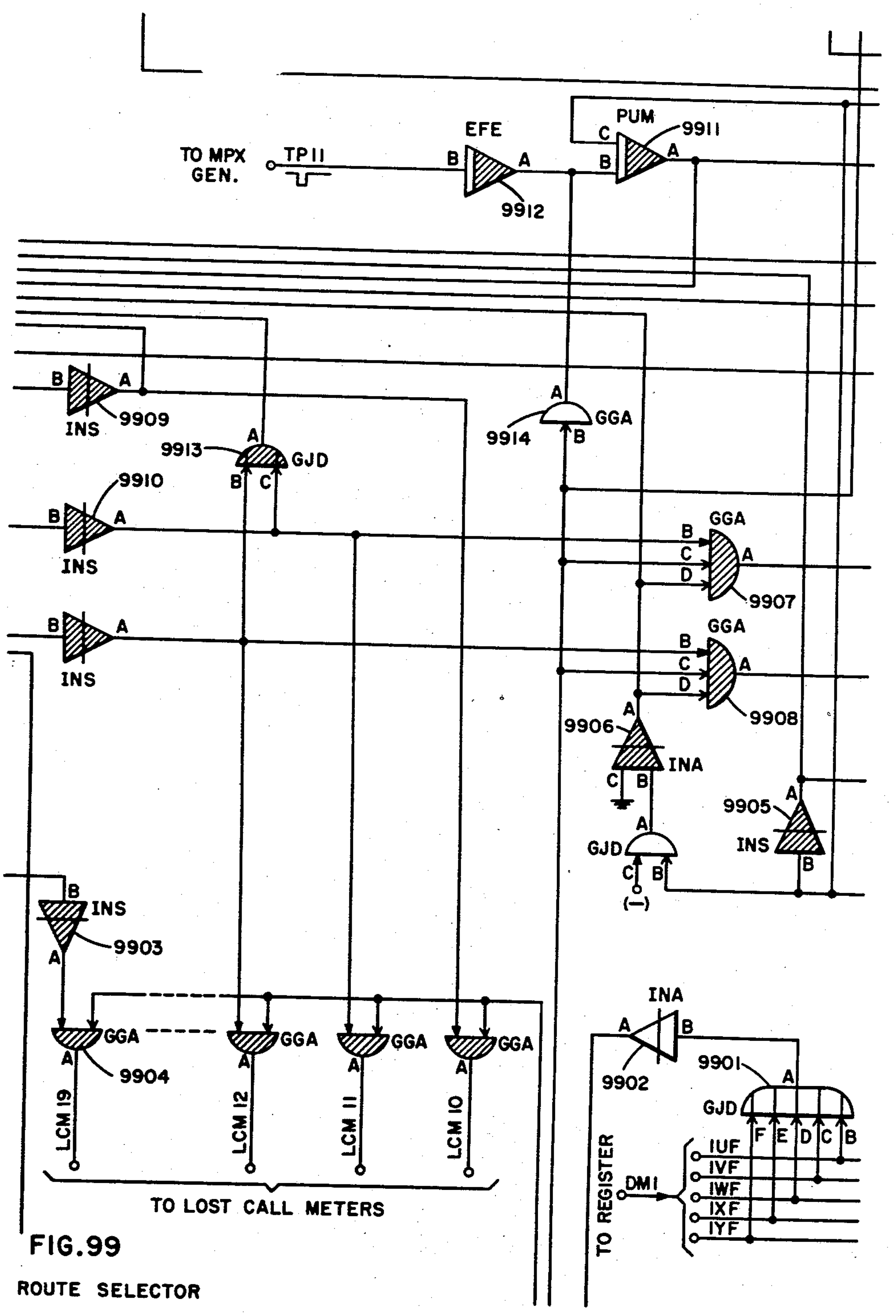
Figure 100:
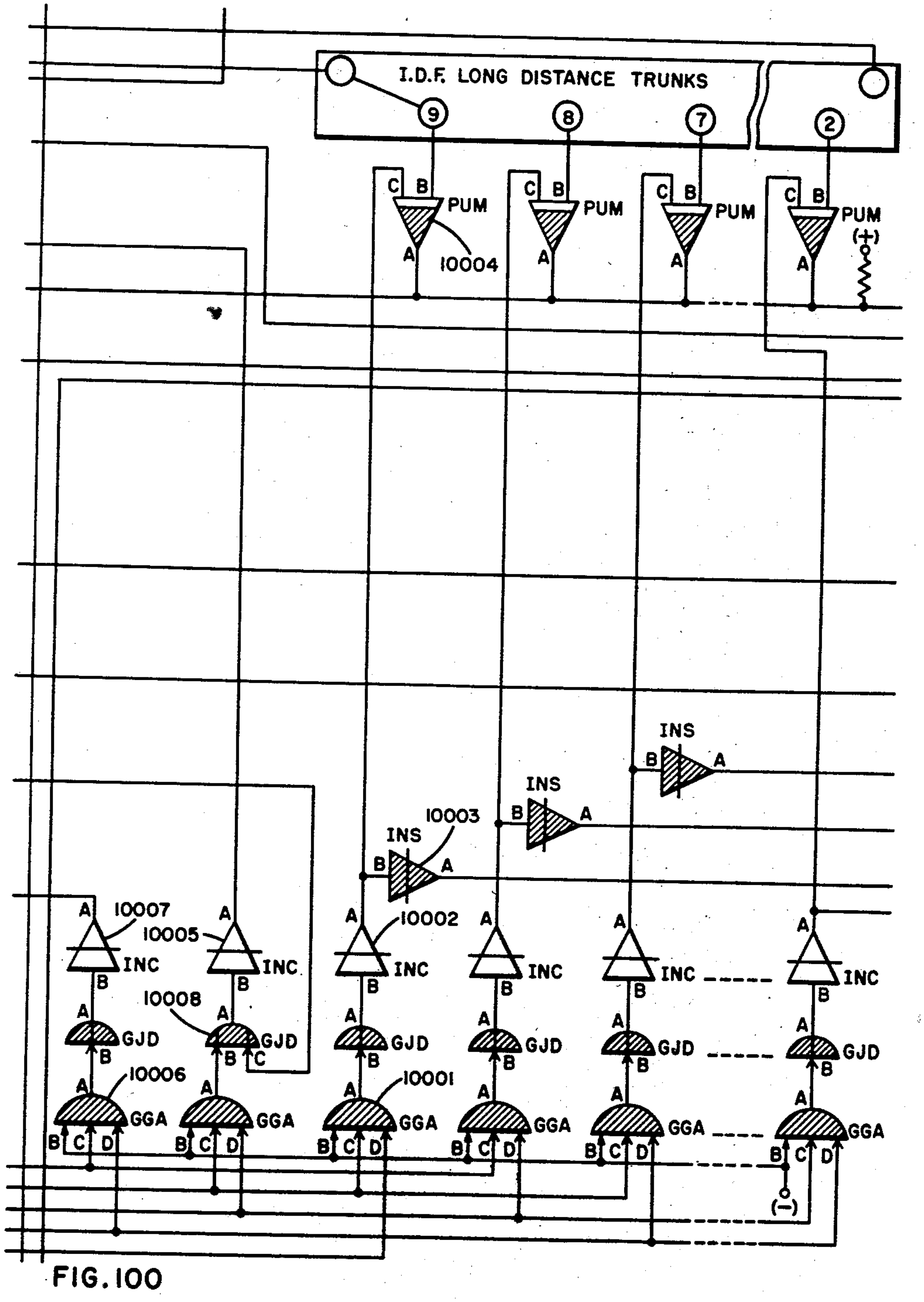
Figure 101:
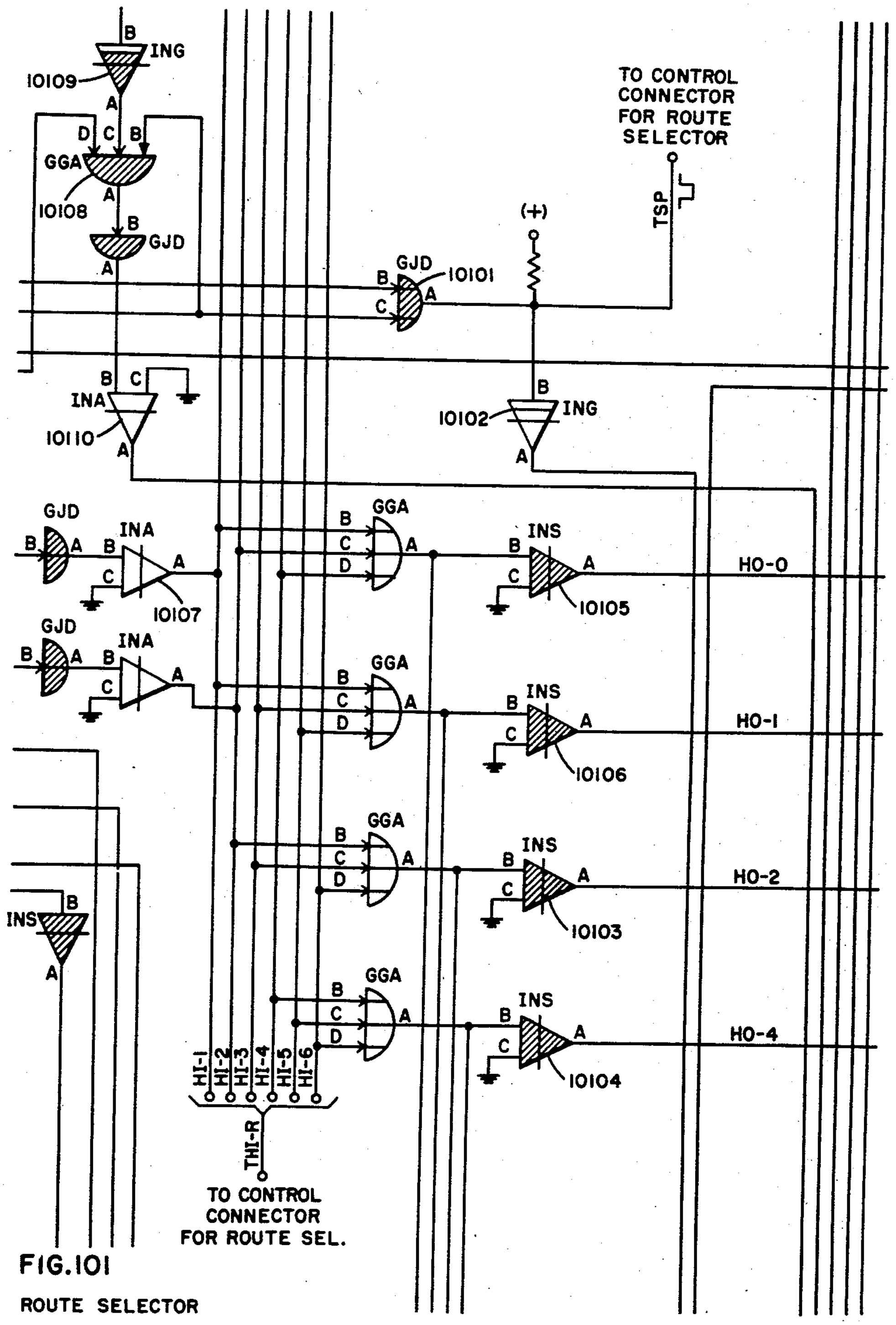
Figure 102:
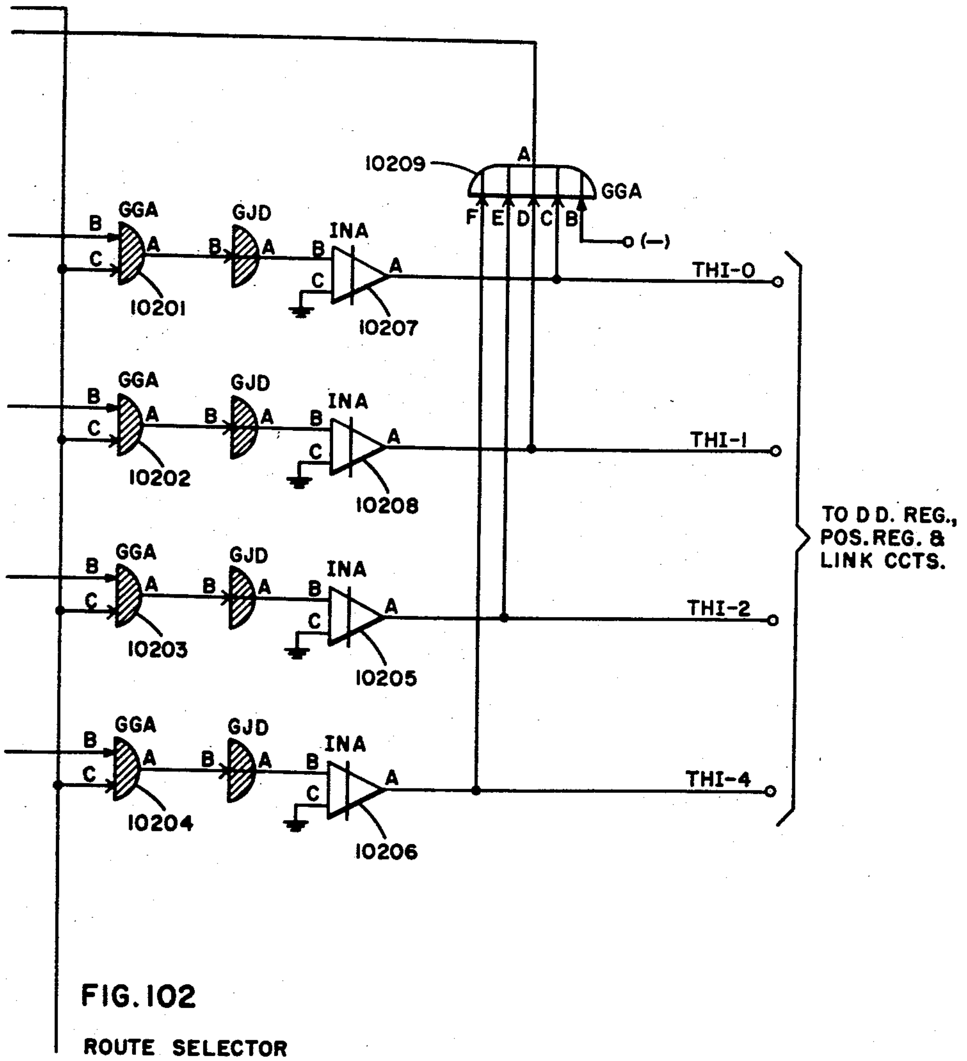
Figure 103:
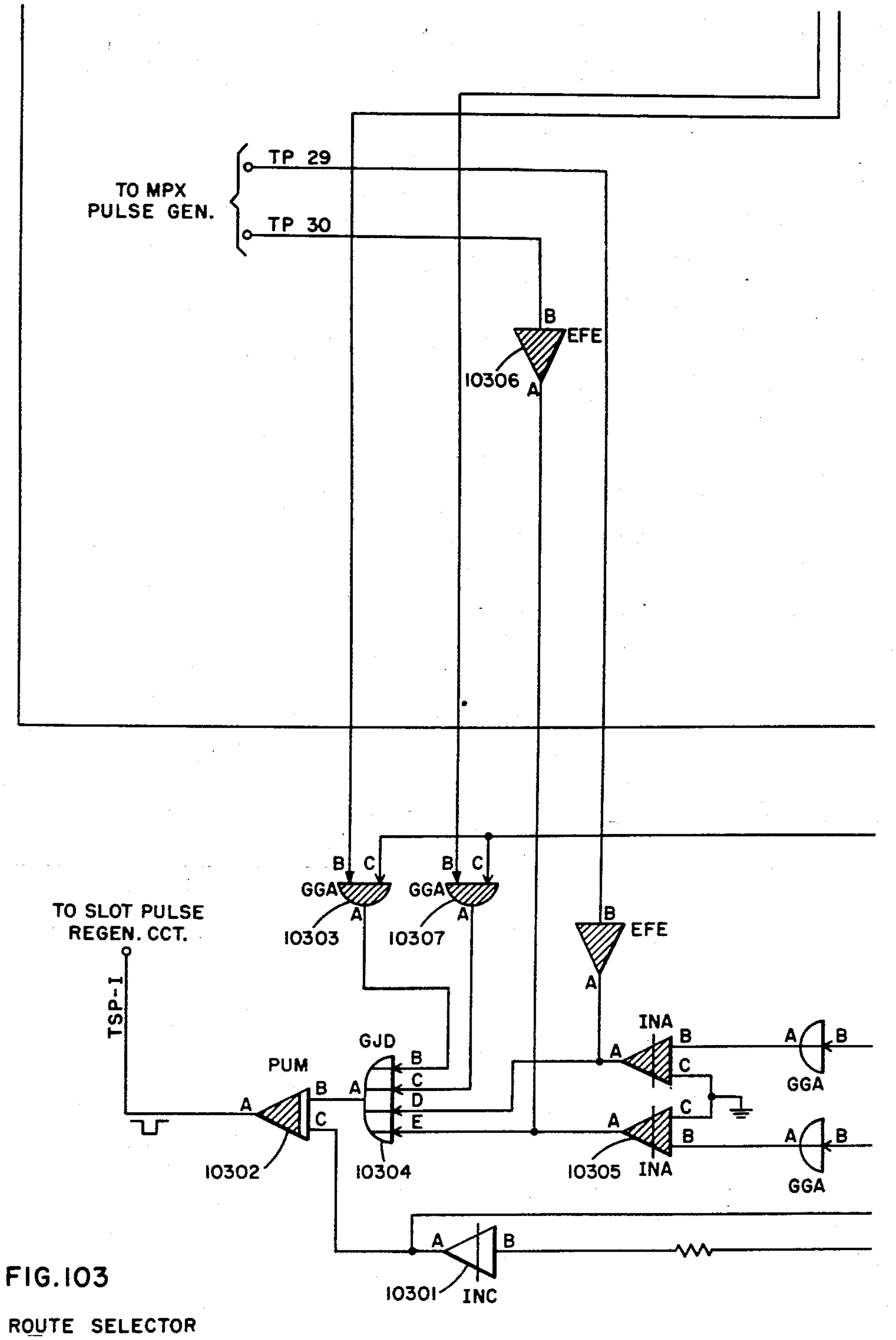
Figure 104:
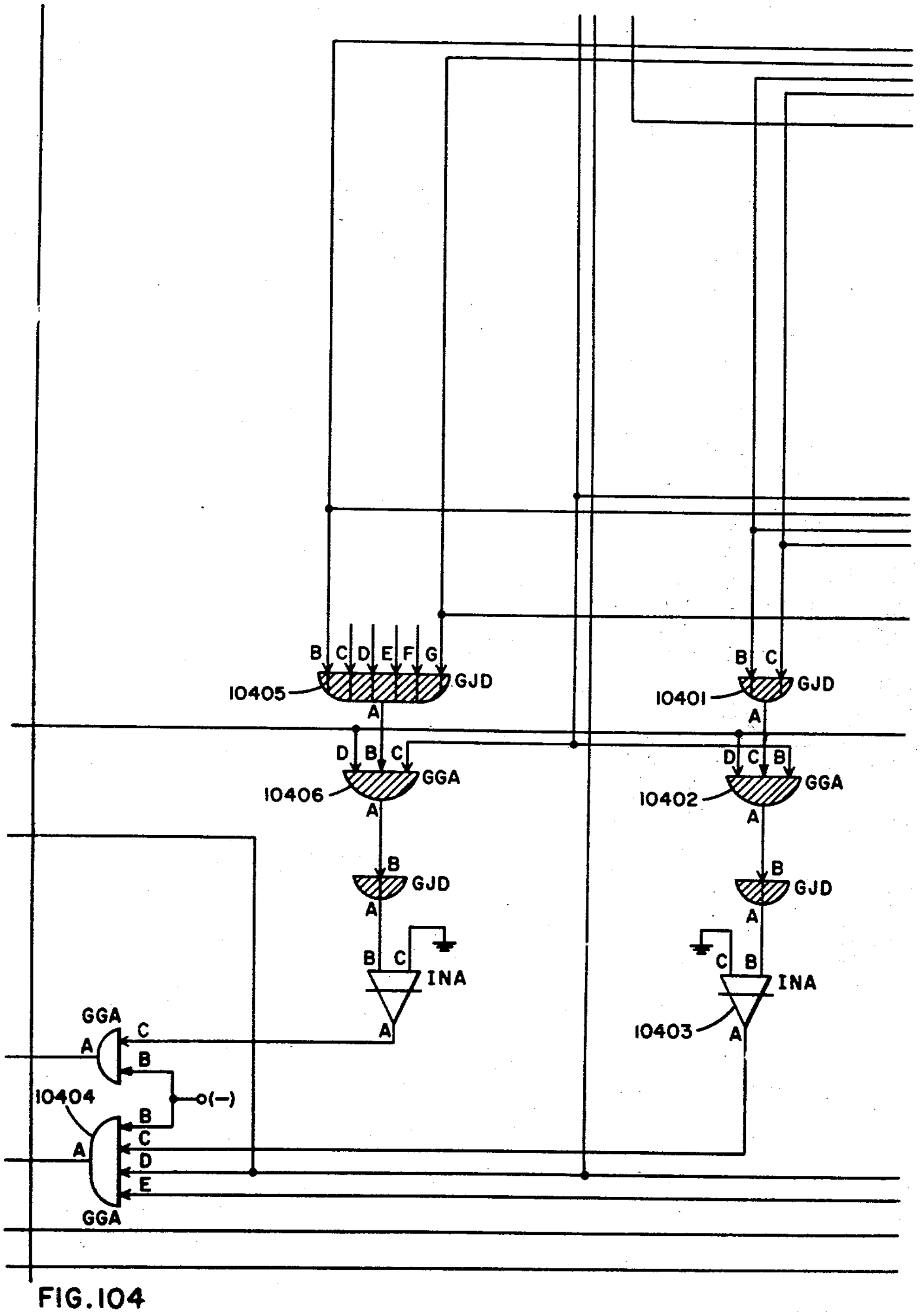
Figure 105:
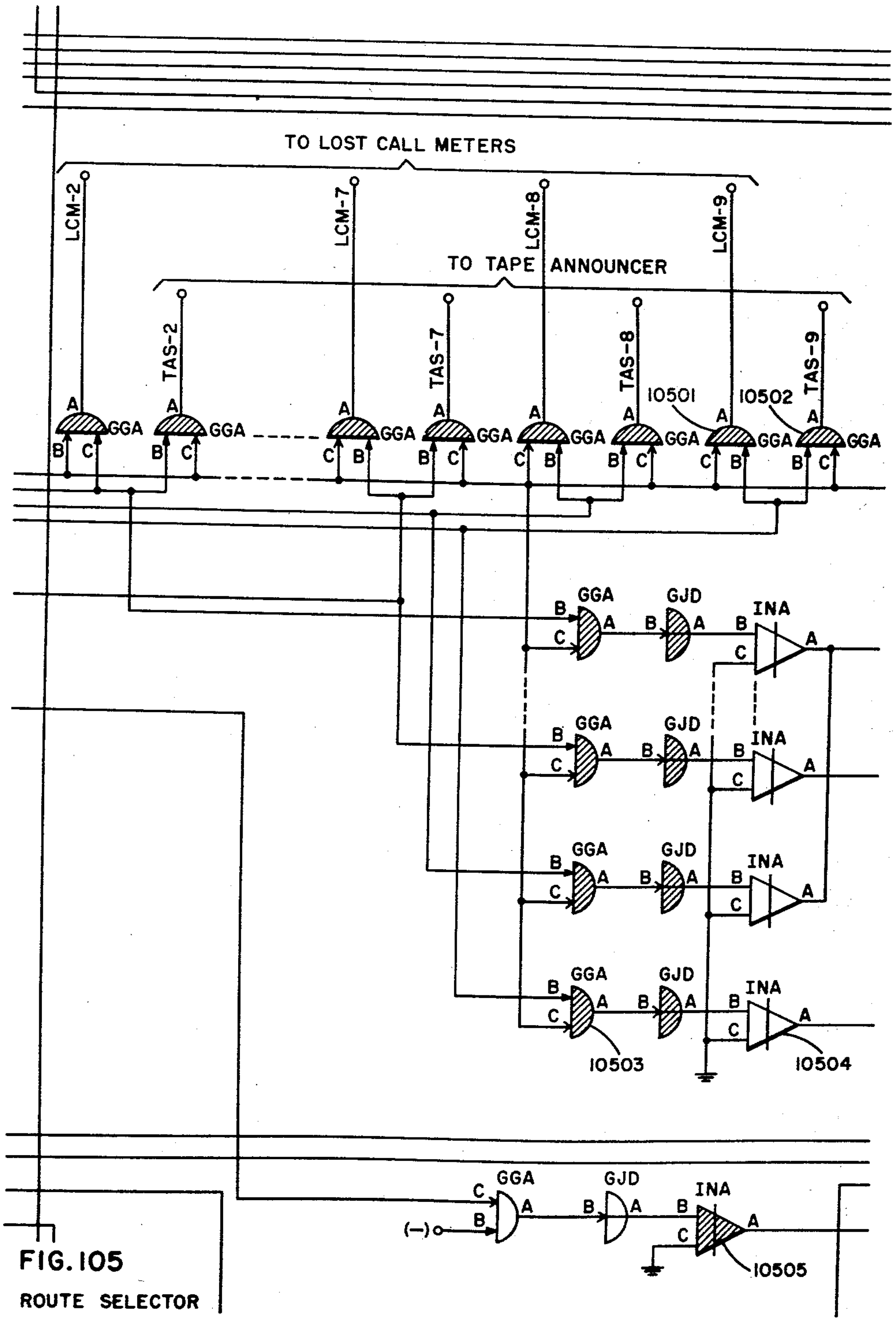
Figure 106:
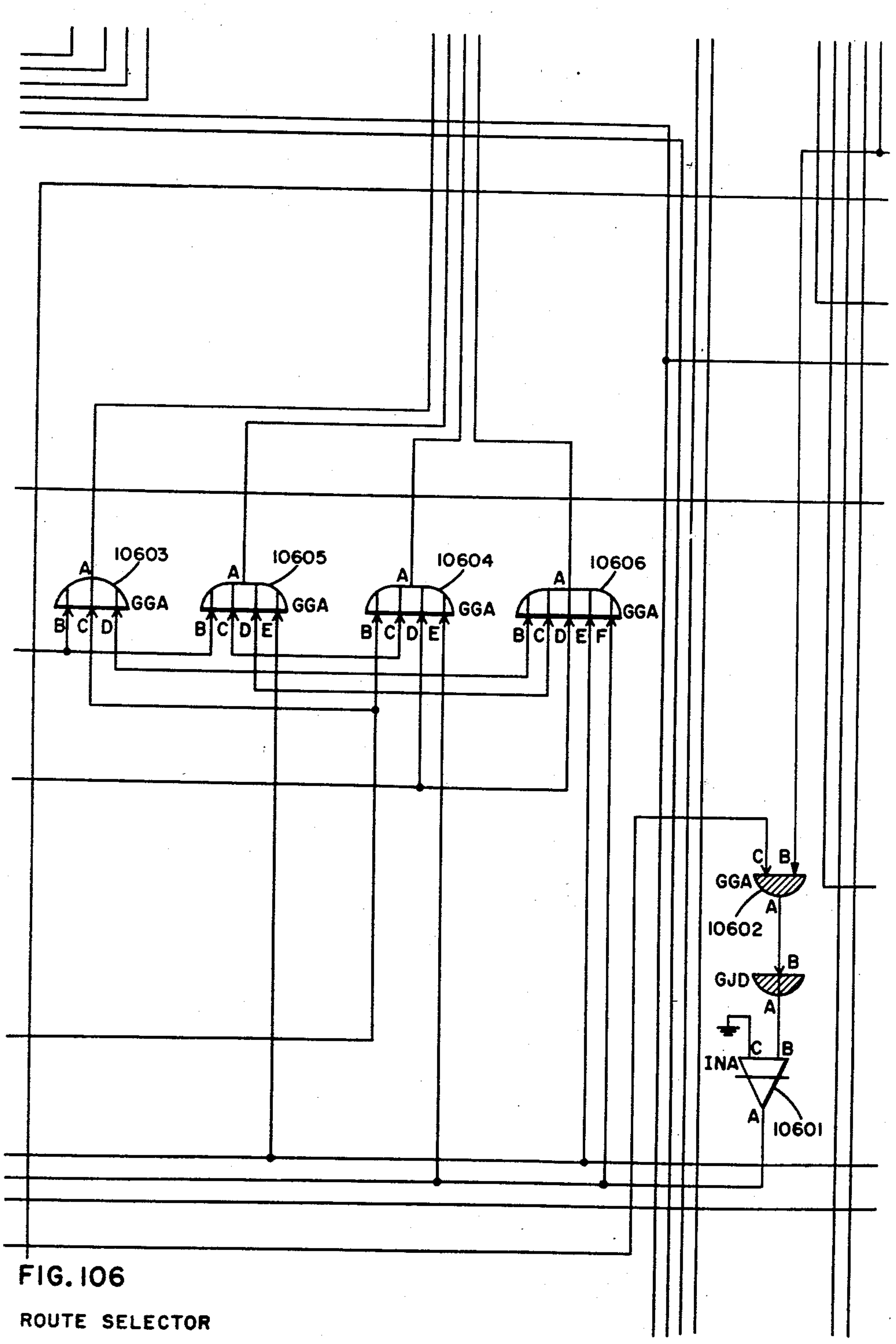
Figure 107:
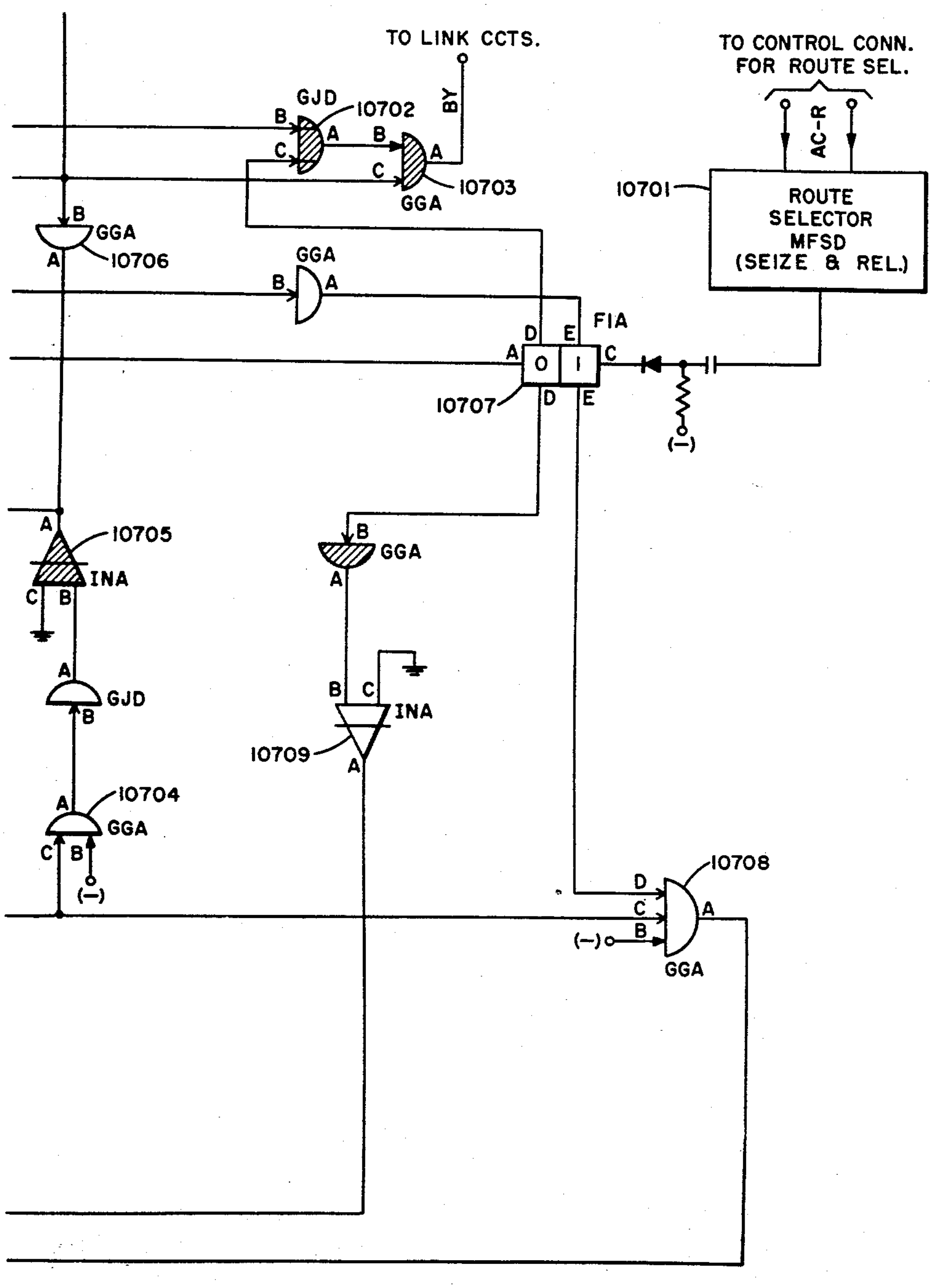
Figure 108:
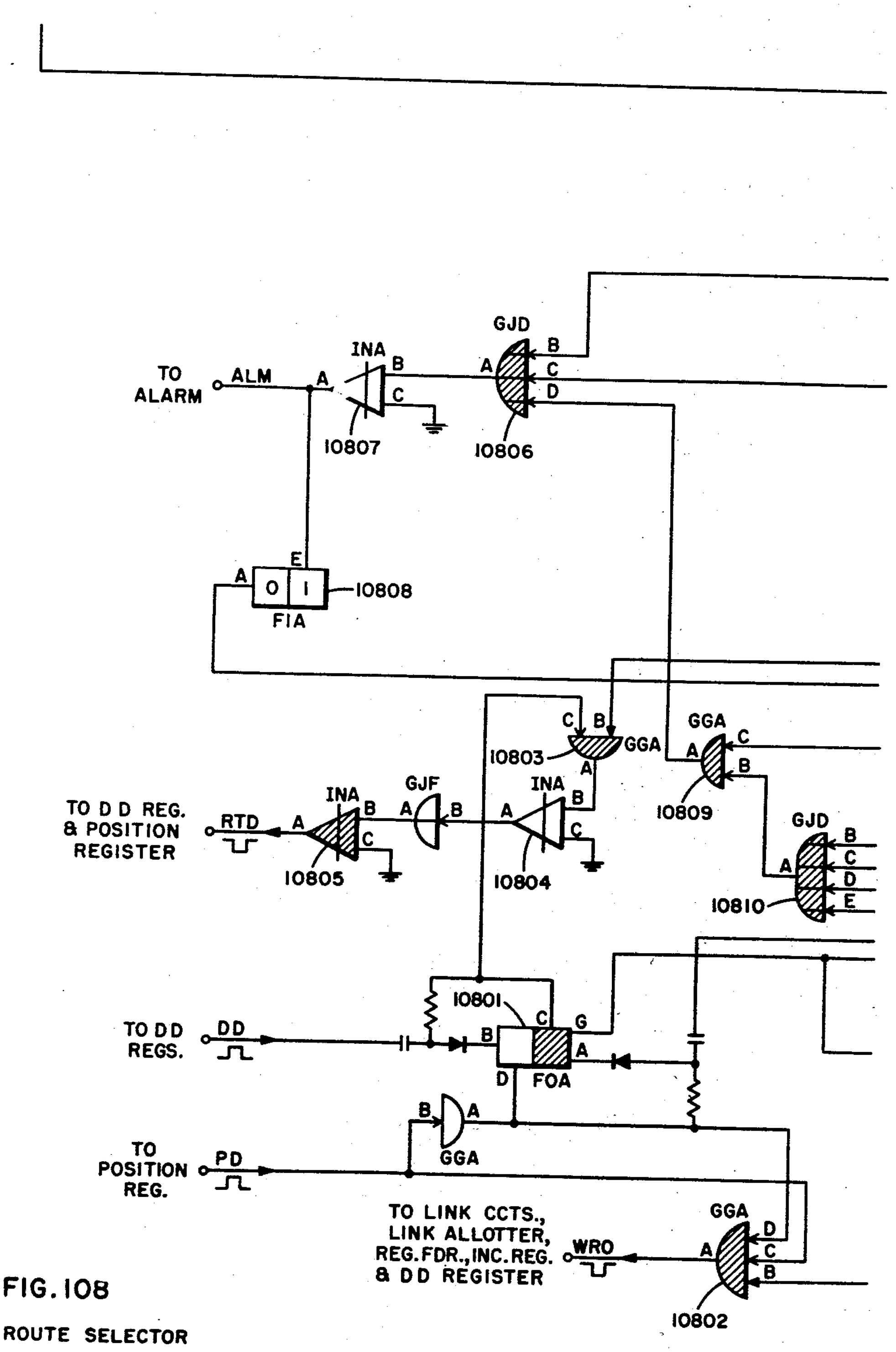
Figure 109:
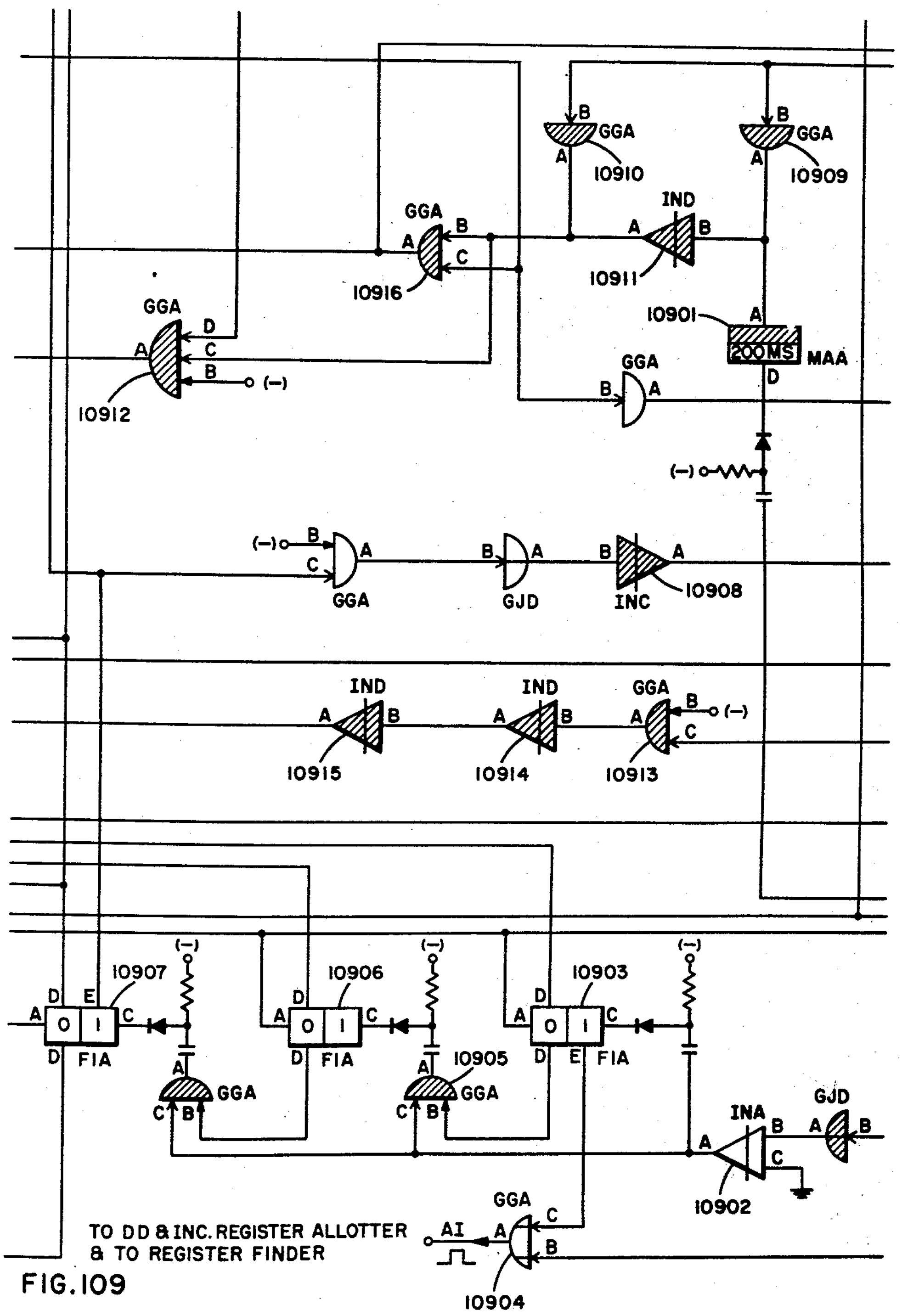
Figure 110:
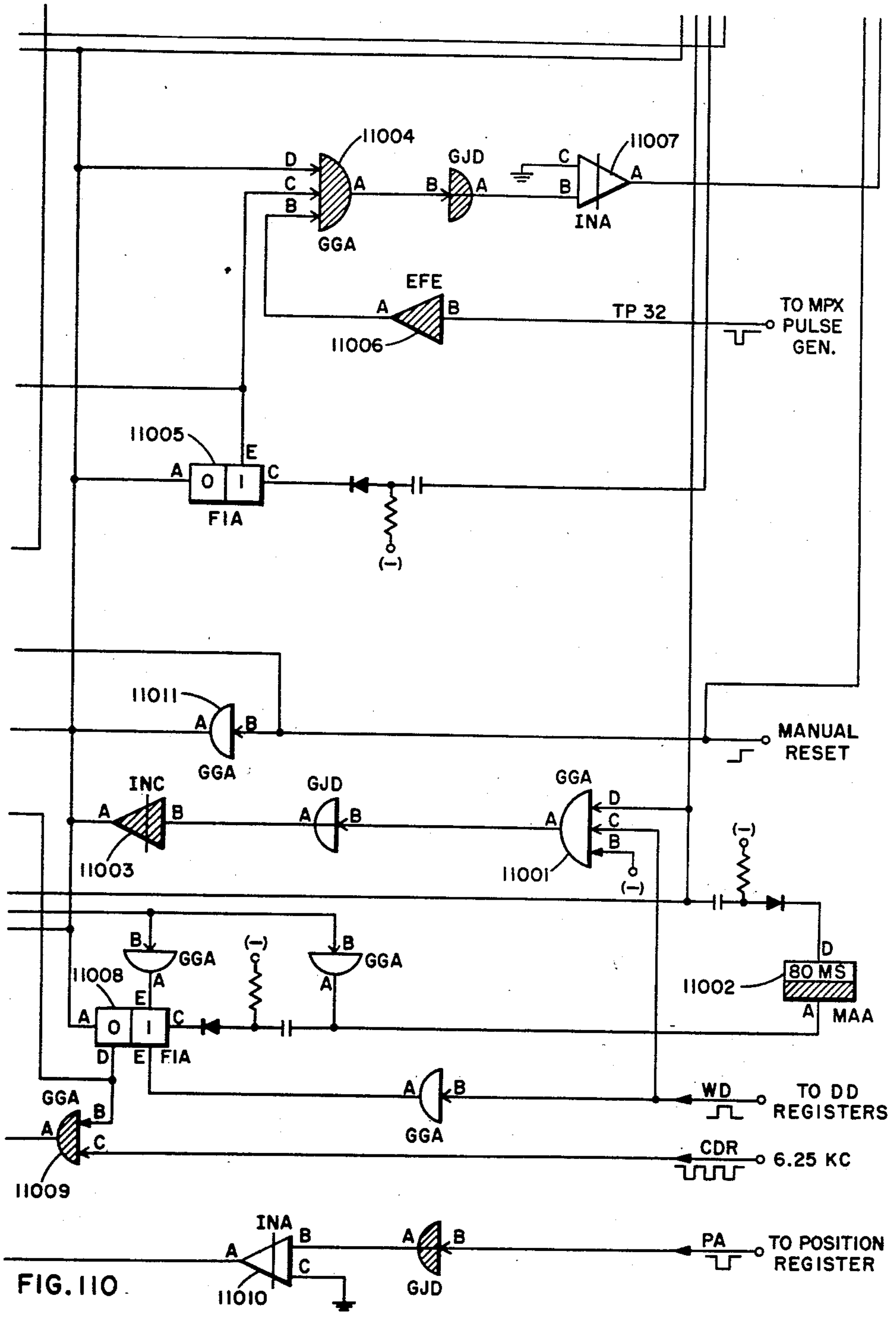

Figs. 80–82, when arranged with Fig. 81 to the right of Fig. 80 and below Fig. 82, show a position time store for use in a long distance switching center.

Figure 131:
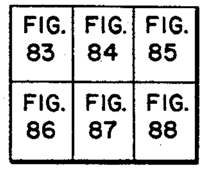

Figs. 83–88, when arranged as shown in Fig. 131, show a two digit store for use in a long distance switching center.

Figure 132:
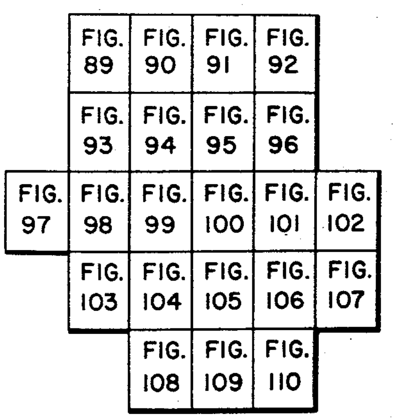

Figs. 89–110, when arranged as shown in Fig. 132, show a route selector for use in a long distance switching center.

Figure 111:
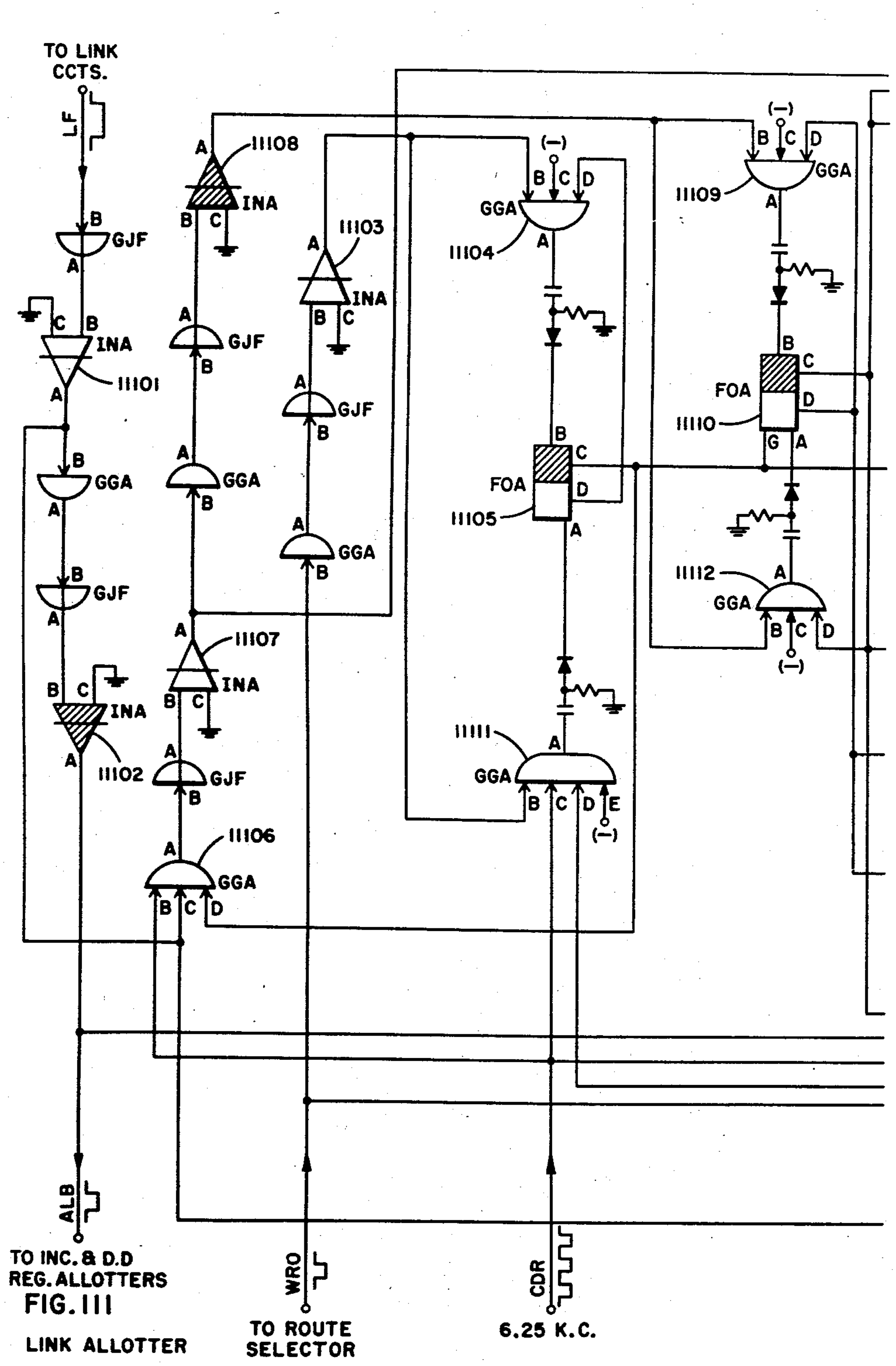
Figure 112:
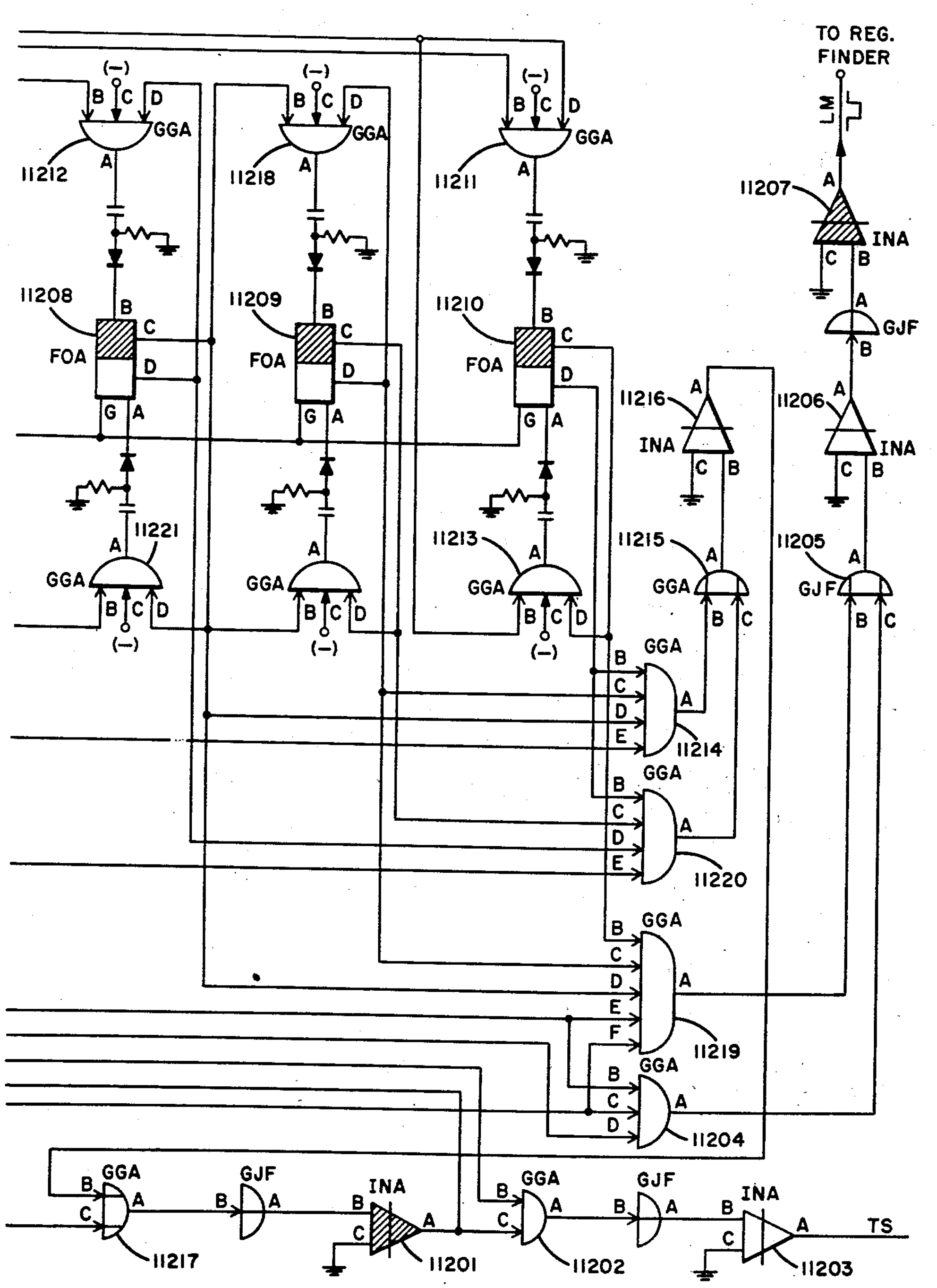
Figure 113:
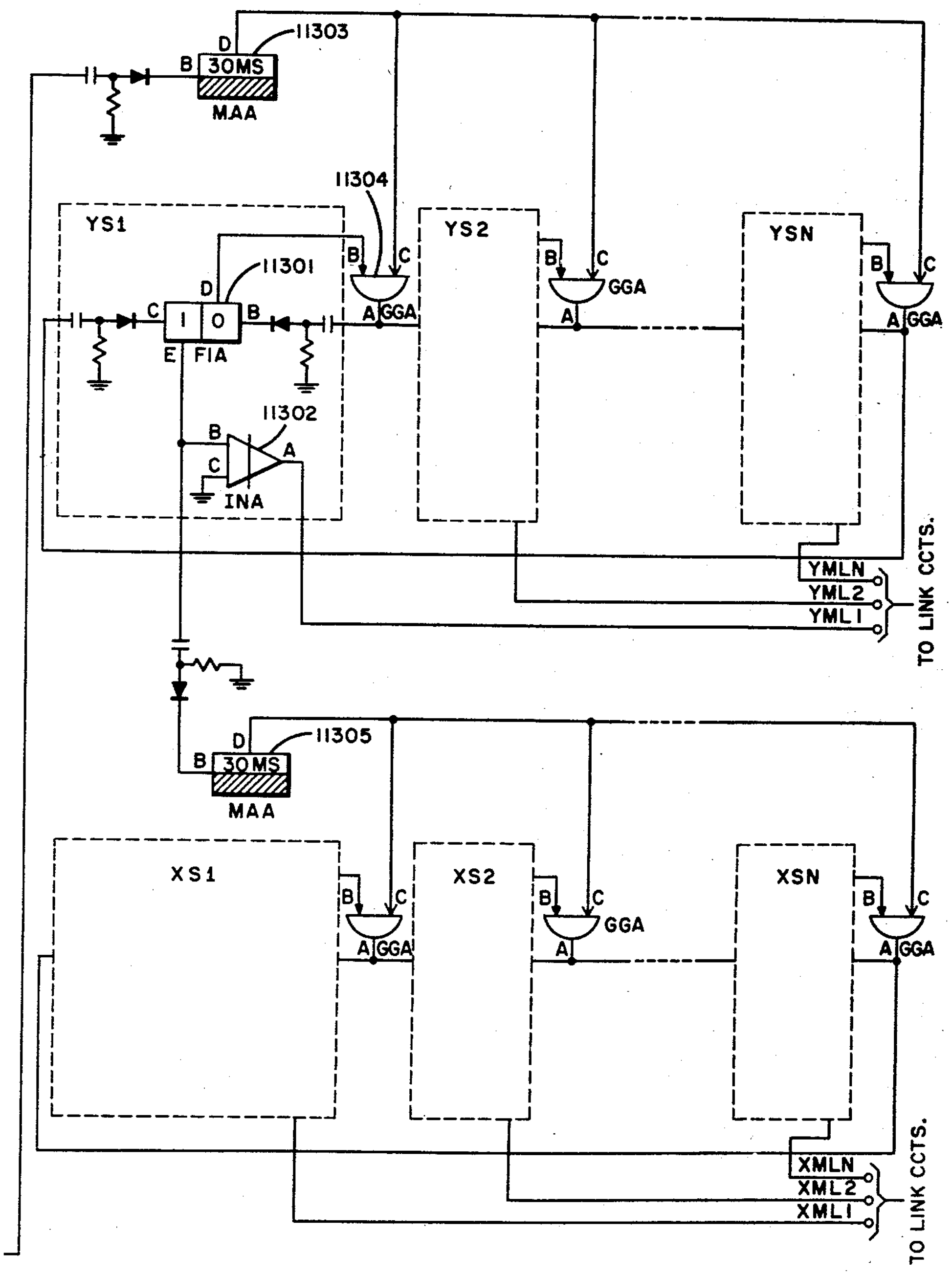

Figs. 111–113, when arranged in order from left to right, show a link allotter for use in a long distance switching center.

Figure 114:
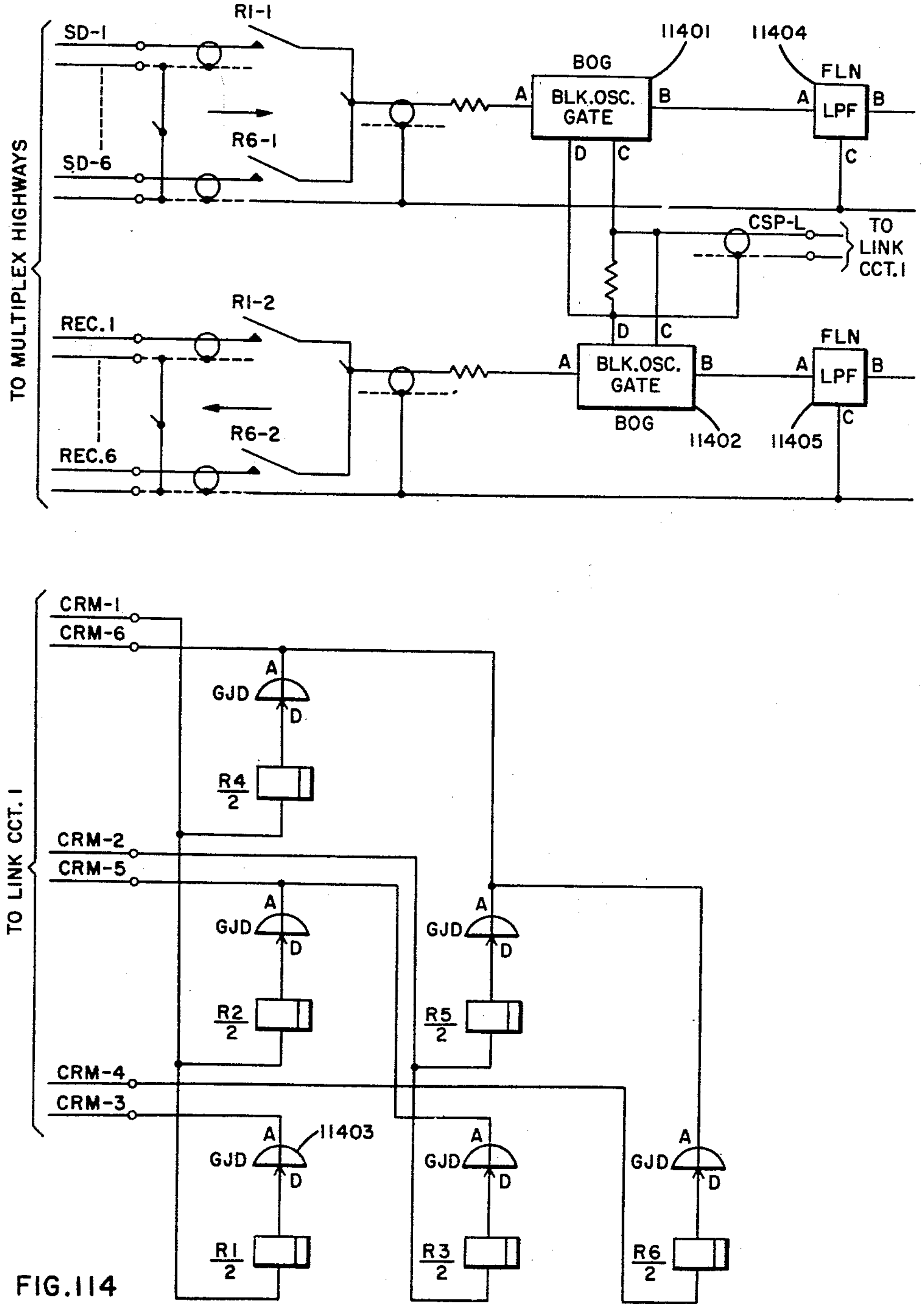
Figure 115:
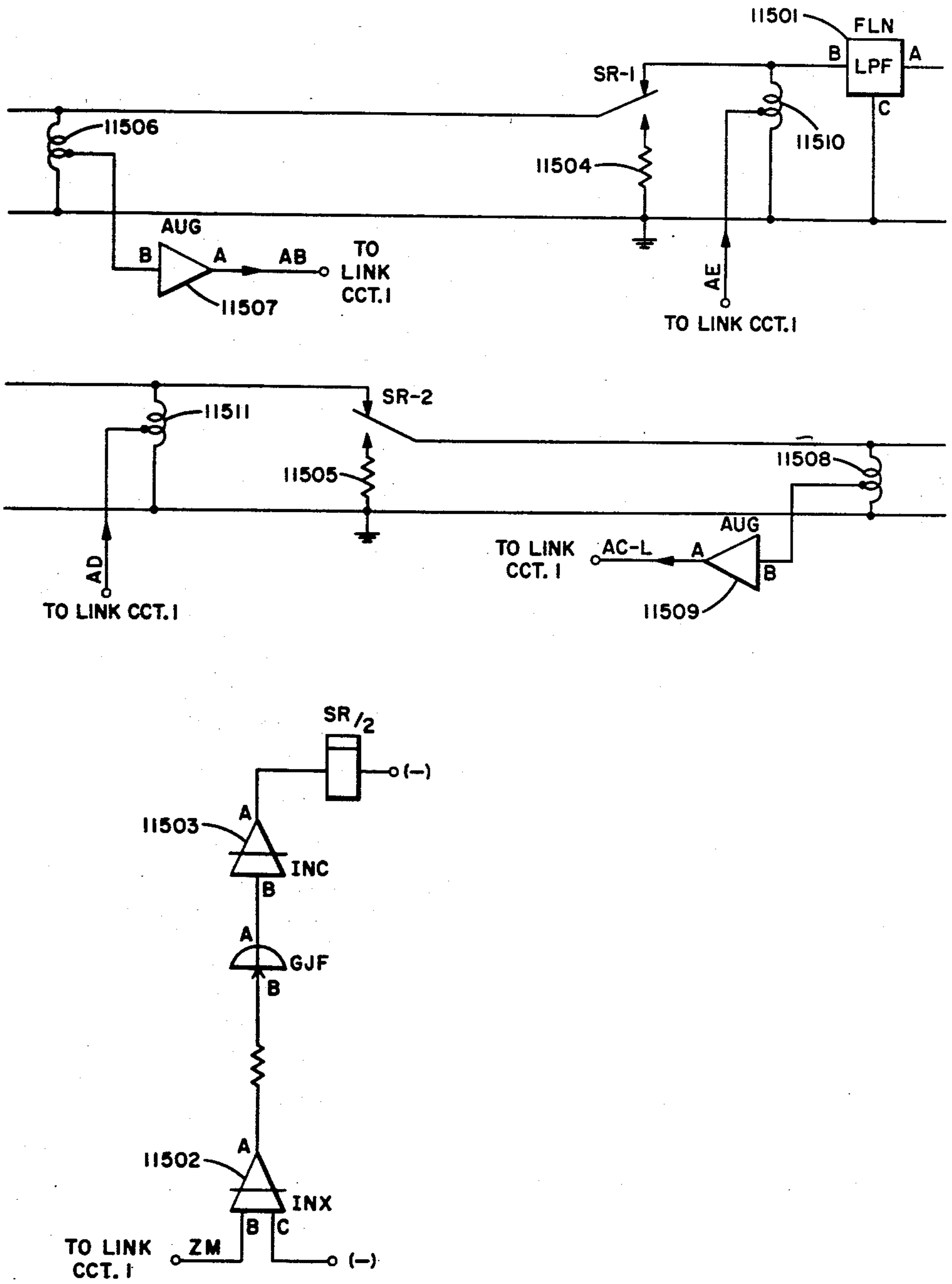
Figure 116:
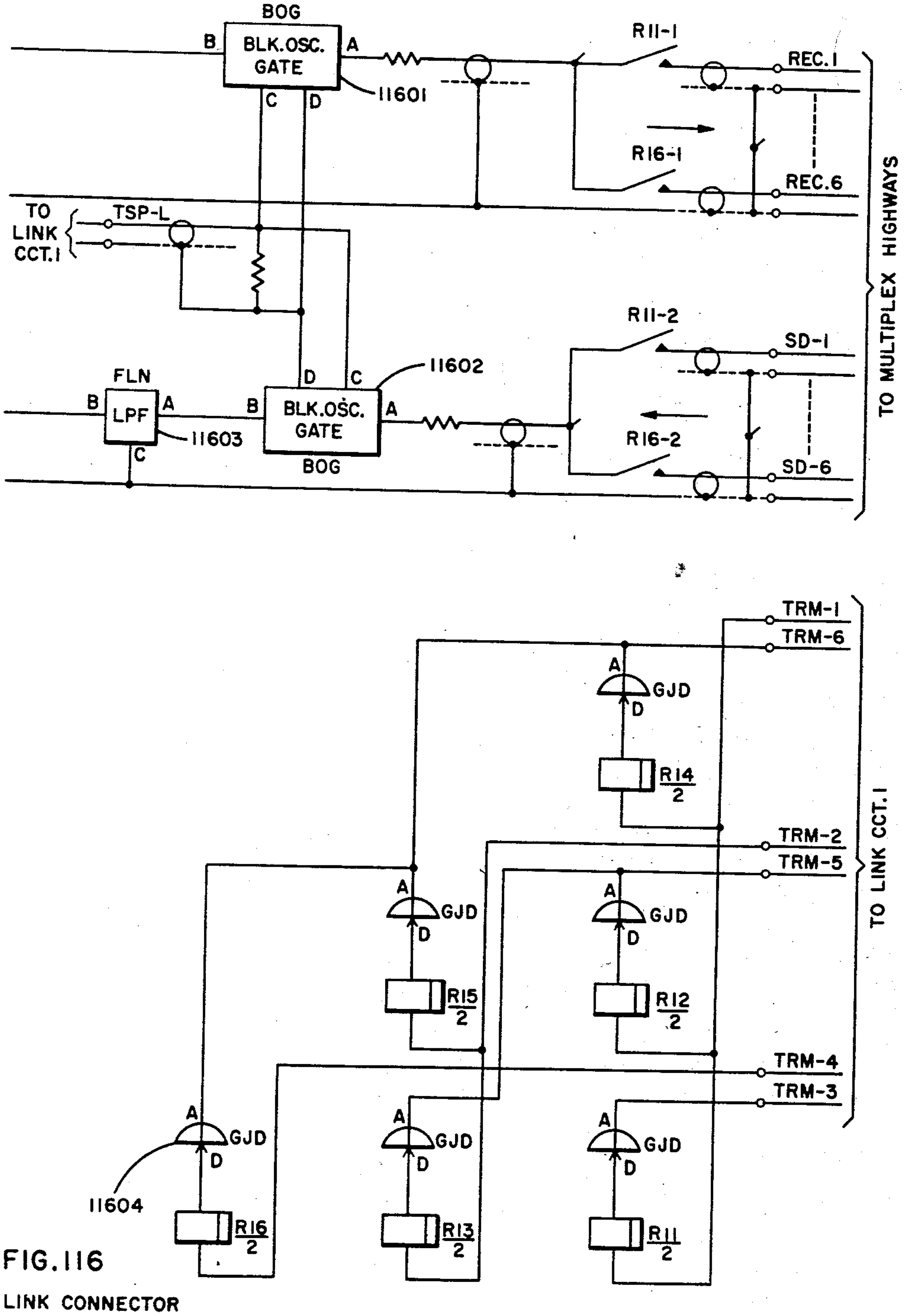

Figs. 114–116, when arranged in order from left to right, show a link connector for use in a long distance switching center.

Figure 133:
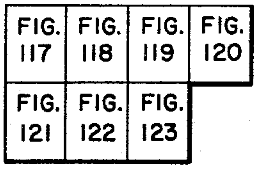

Figs. 117–123, when arranged as shown in Fig. 133, show a link circuit for use in a long distance switching center.

Figure 124:
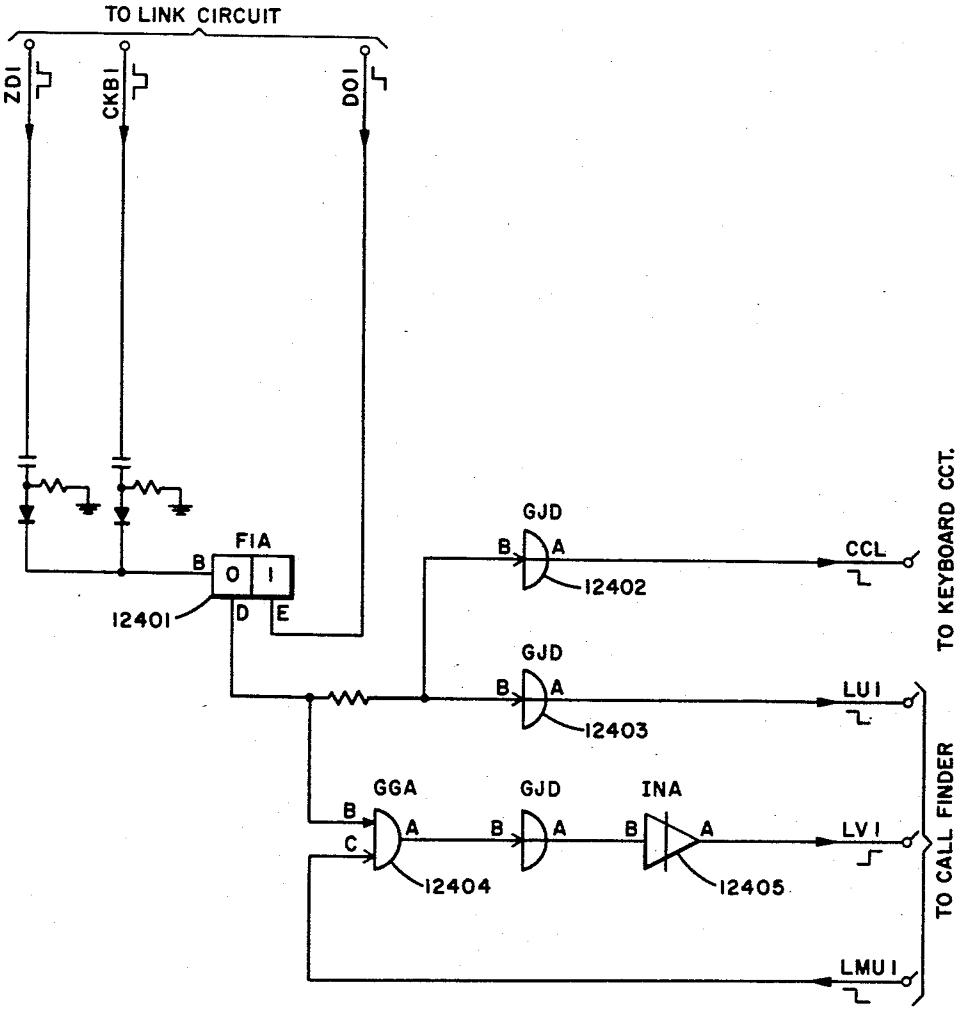

Fig. 124 shows a position coupling circuit for use in a long distance switching center.

Figure 125:
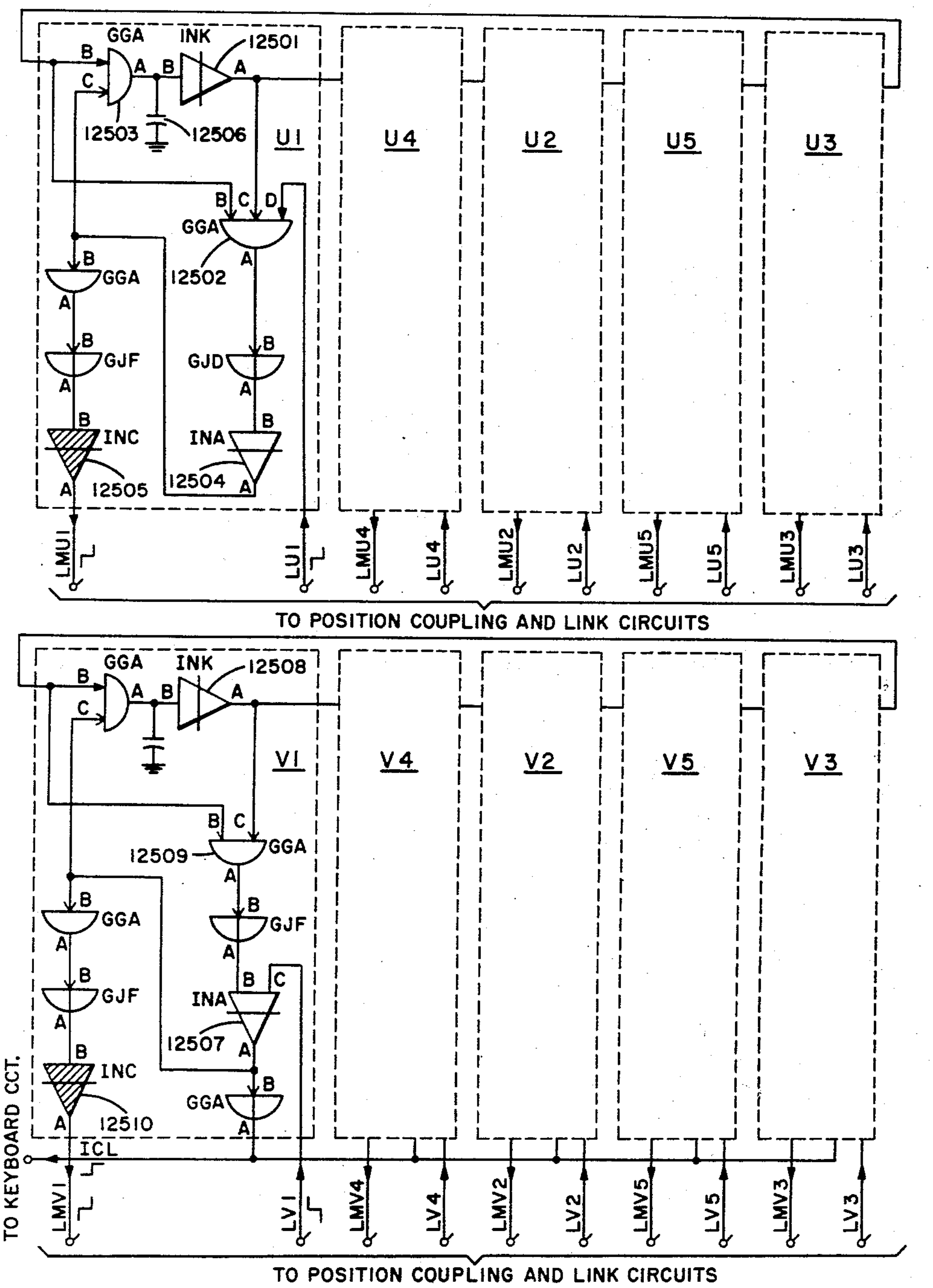

Fig. 125 shows a call finder for use in a long distance switching center.

Figure 126:
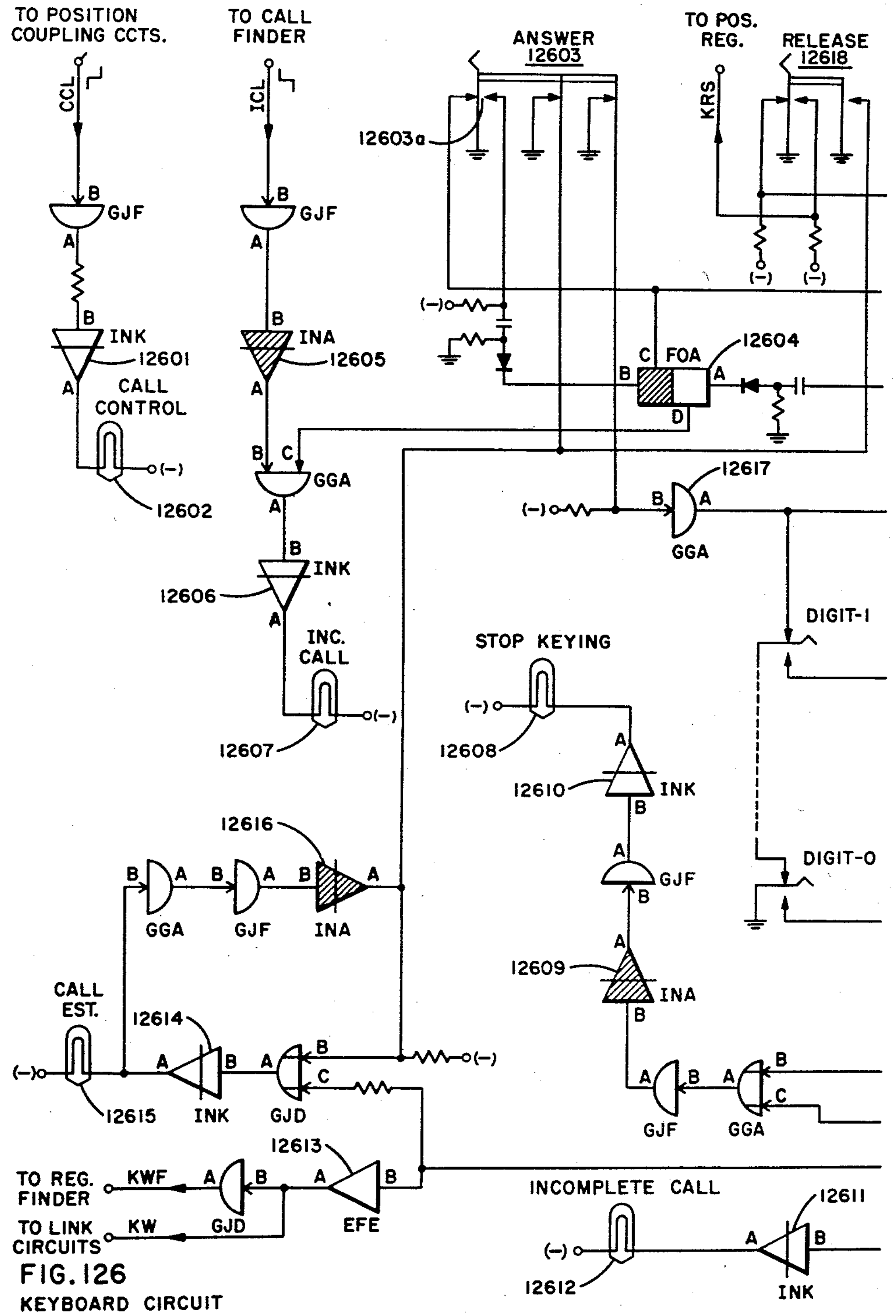
Figure 127:
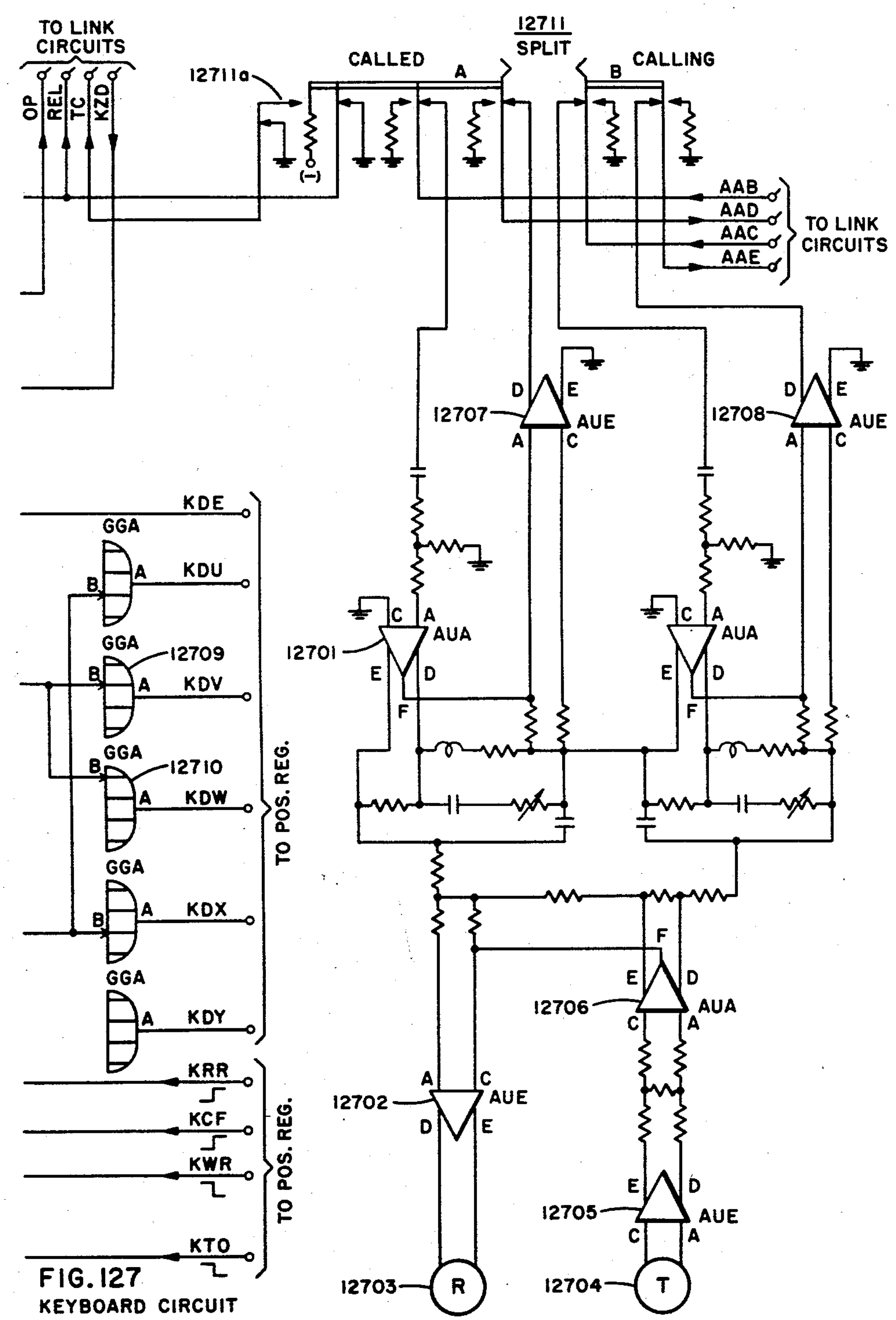

Figs. 126 and 127, when arranged with Fig. 127 to the right of Fig. 126 show a keyboard circuit for use in a long distance switching center.

Figure 1:
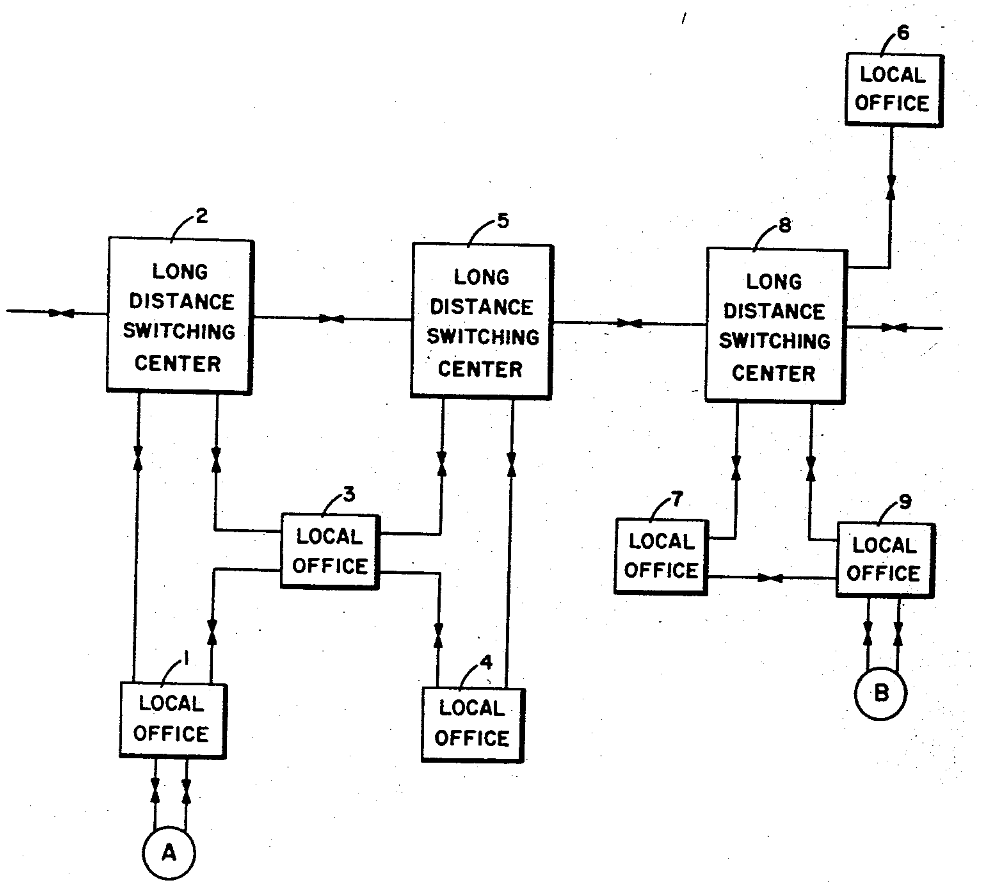
Figure 2A:
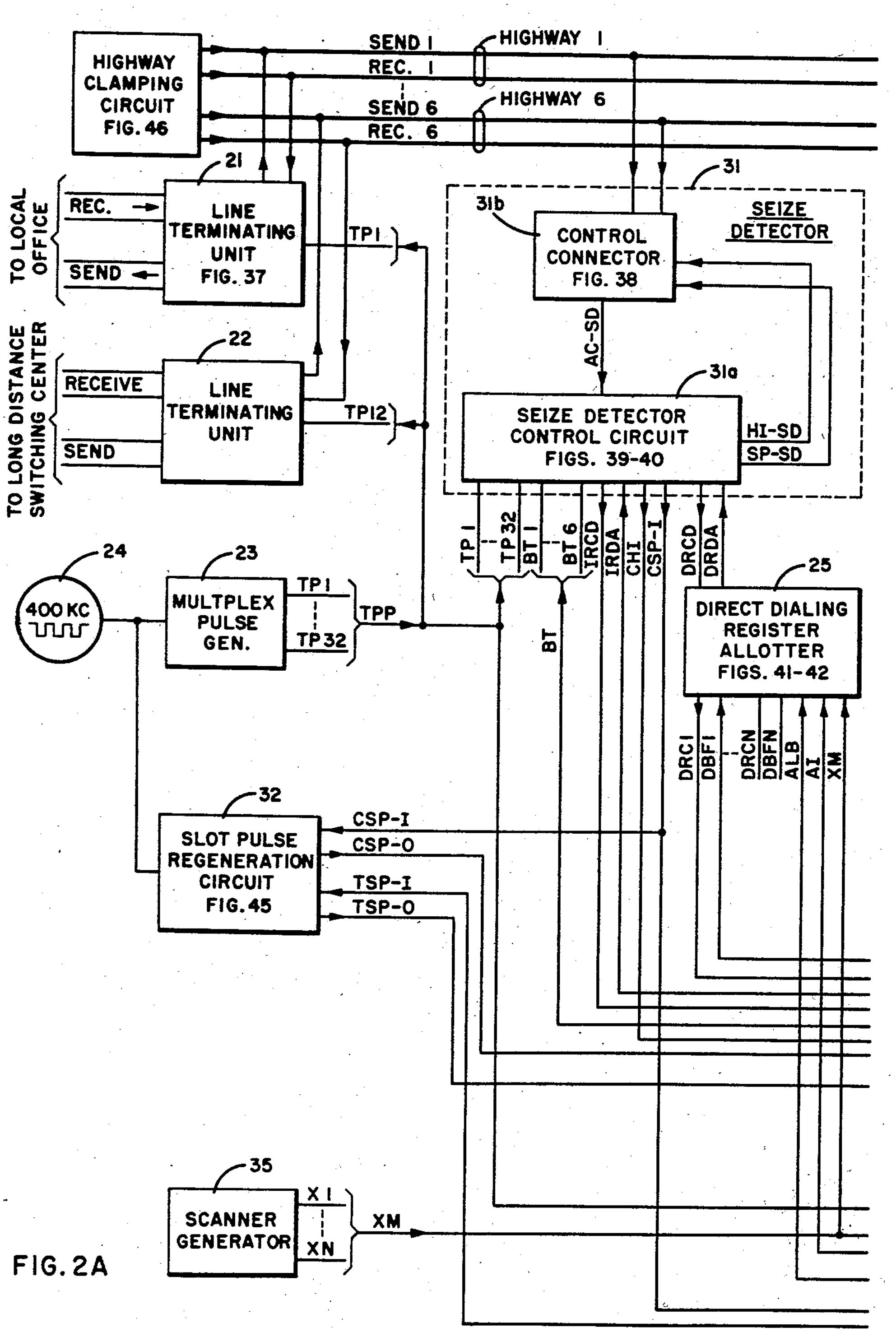
Figure 2B:
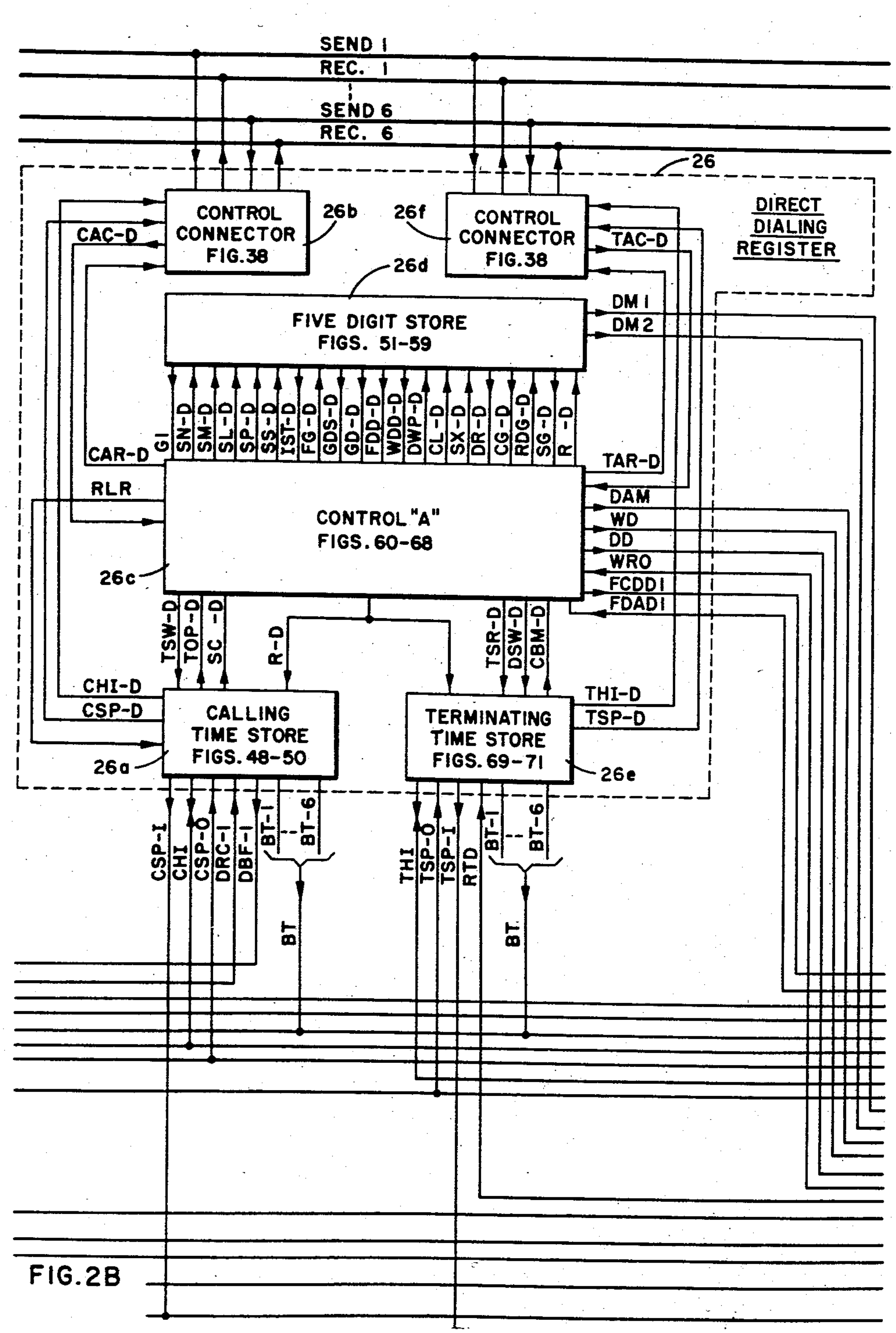
Figure 2C:
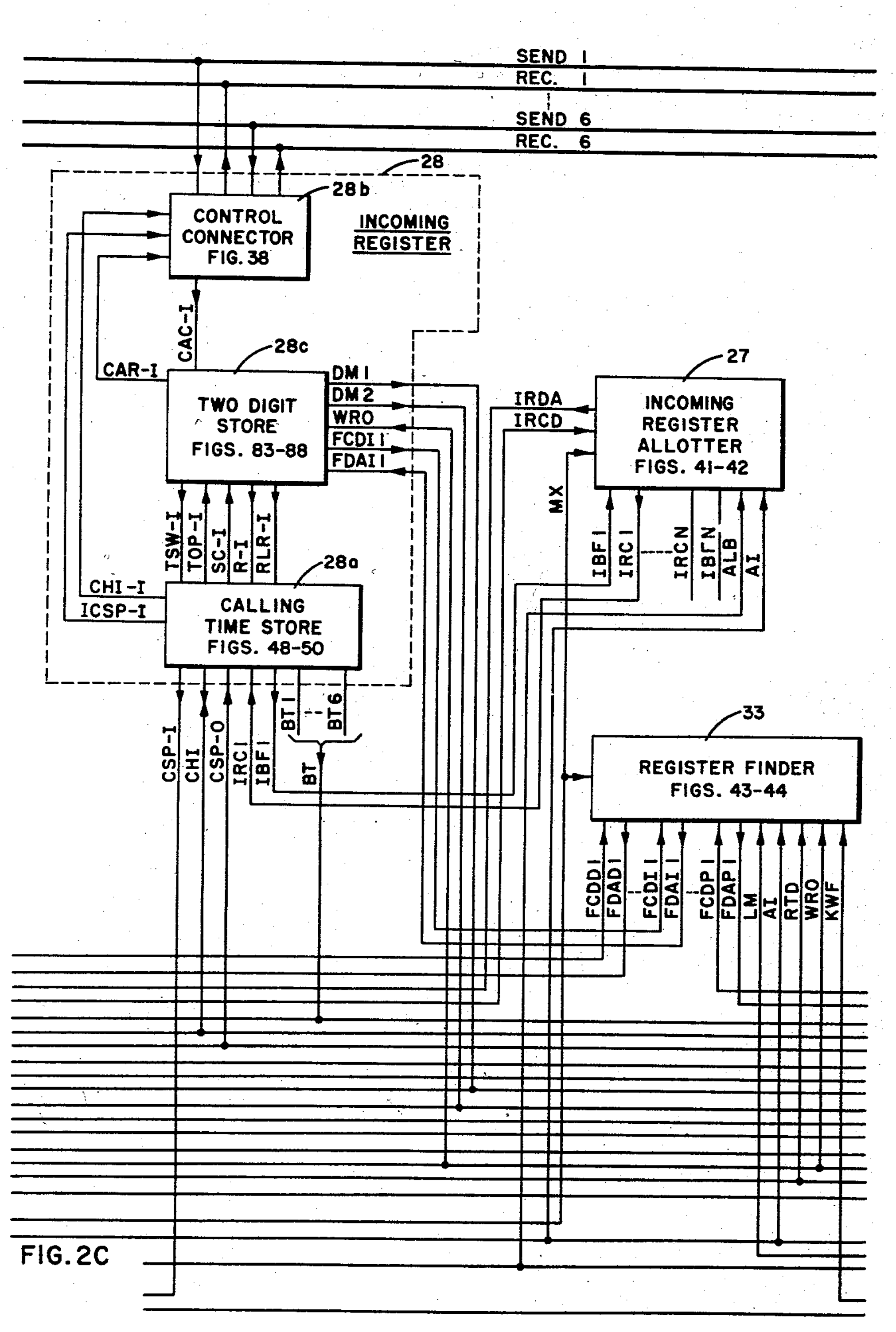
Figure 2D:
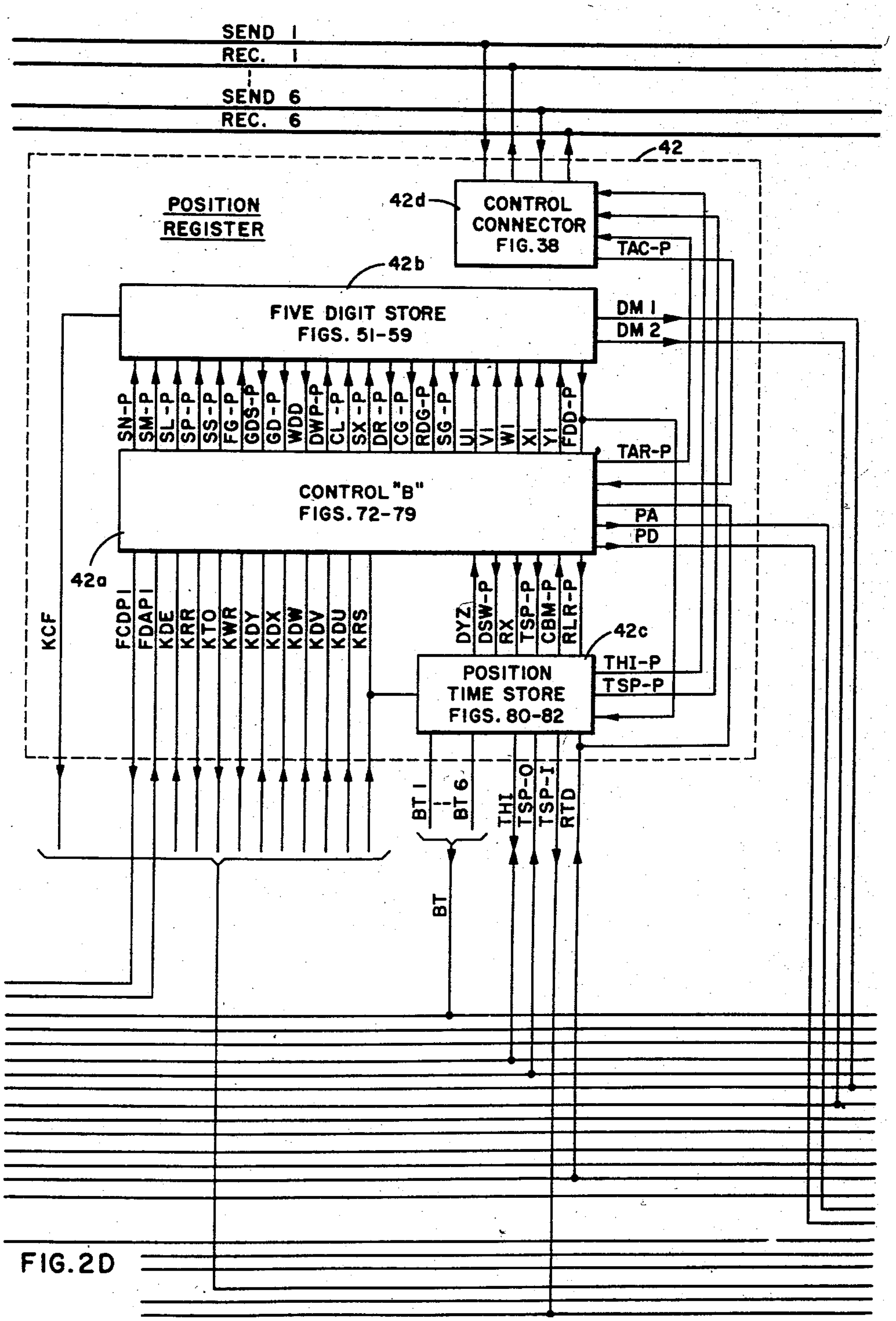
Figure 2E:
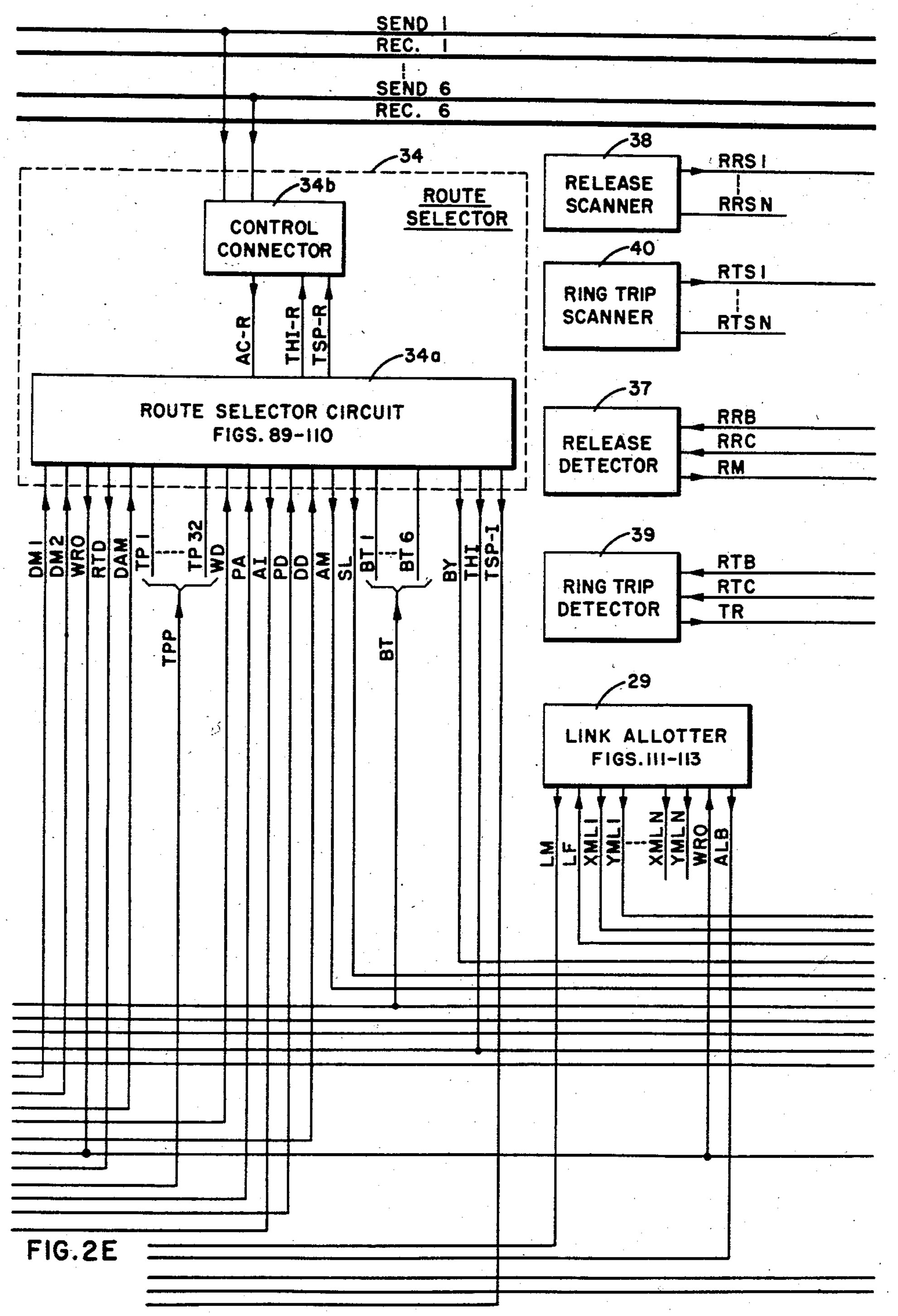
Figure 2F:
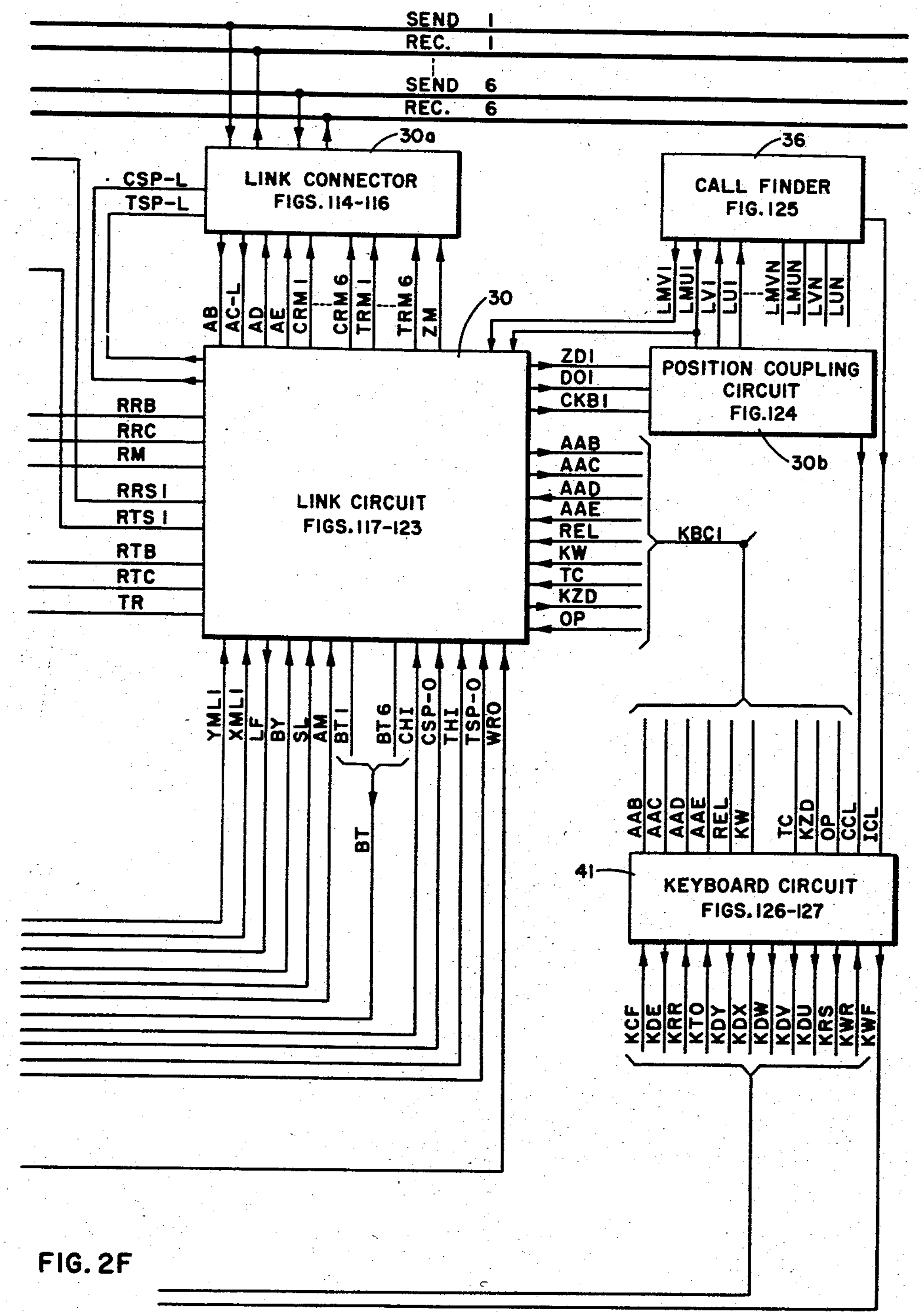

The general operation of the system in which the invention has been disclosed can best be understood by reference to Figs. 2A–2F, inclusive, in conjunction with reference to the trunking diagram shown in Fig. 1. The block diagram of Figs. 2A–2F represents the equipment comprising each of the long distance switching centers 2, 5, and 8 of Fig. 1. Details of the equipment comprising each of the local offices of Fig. 1 are disclosed in copending application Serial Number 814,922, filed May 21, 1959, and assigned to the same assignee as the present invention. The lines interconnecting the subscriber stations and the local offices and the lines interconnecting the various offices are four-wire and may be either physical wire or radio links. Further, all signaling in the system is of the voice frequency type.

As shown in Fig. 1, calls between subscribers in different local offices may be routed through one or more long distance switching centers. For example, a call from subscriber station A in local office 1 to subscriber station B in local office 9 is routed through long distance switching centers 2, 5, and 8. The call is initiated by the transmission of a seize signal from station A when the handset at that station is removed from its cradle. Upon receipt of dial tone from local office 1, the transmission of a seize signal by station A is terminated and the subscriber at station A then proceeds to key the routing digits required to select subscriber station B. The keyed number comprises routing digits corresponding to long distance switching centers 2, 5, and 8, an arbitrary digit, which may be the digit "1," identifying local, the digit corresponding to local office 9, and the three-digit directory number of station B in local office 9. The first keyed digit controls the equipment in local office 1 to select an idle trunk line to long distance switching center 2 and to transmit a seize signal over the selected trunk line. In switching center 2, the receipt of a seize signal over a trunk line from a local office controls an idle direct dialing register in that center to connect to the trunk line over which the seize signal is received and the second and all succeeding digits received from station A are stored in the direct dialing register taken into use. The second digit is utilized to control common equipment in switching center 2 to select an idle trunk line to switching center 5, the direct dialing register taken into use is then controlled to connect to the selected trunk line and to transmit a seize signal over that trunk line to switching center 5.

In switching center 5, the receipt of a seize signal over a trunk line from another long distance switching center controls an idle incoming register in that switching center to connect to the trunk line over which the seize signal is received and to transmit a seize acknowledge signal back over that trunk line to the controlling direct dialing register in switching center 2. Upon receipt of the seize acknowledge signal, the controlling direct dialing register terminates the transmission of a seize signal and then transmits the third digit, which corresponds to switching center 8, to the incoming register in switching center 5. The third digit is stored in the incoming register in switching center 5 and an acknowledge signal representing that digit is returned to the controlling direct dialing register. If the digit acknowledge signal received corresponds to the digit sent, the direct dialing register transmits a second seize signal, the incoming register in switching center 5 then controls the common equipment in that office to select an idle trunk line to switching center 8, a connection is established between the calling and called trunk lines in switching center 5, and the incoming register in switching center 5 is then released for use on another call. The seize signal transmitted by the controlling direct dialing register, and which controlled the equipment in switching center 5 to route the call through that center, is then detected in switching center 8 and an idle incoming register in that switching center is connected to the calling trunk line in that switching center. The action in switching center 8 is identical to that just described in switching center 5 with the exception that the first digit "1" transmitted to center 8 controls the incoming register to delay until two digits have been received before switching the call through to an idle trunk line extending to local office 9. Thus, it can be seen that the extension of a call is controlled by the direct dialing register in the first switching center encountered, the intermediate switching centers are each controlled by a single digit to select an idle trunk line to the next switching center, and the final long distance switching center is controlled by two digits to select the desired local office. When the seize signal which controls the equipment in switching center 8 to route the call through that center to local office 9 is detected in local office 9 and a subscriber register is connected to the trunk line over which the seize signal is received, dial tone is returned over the extended connection to the controlling direct dialing register to indicate to said register that the call has progressed to a local office. The controlling direct dialing register is responsive to the receipt of dial tone to transmit an interlock request signal to local office 9 over the extended connection.

It is to be noted that acknowledgment signals are not transmitted by a local office unless an interlock request signal is received. Since it is contemplated that the local offices surrounding a particular long distance switching center will be relatively closely spaced to each other and to the long distance switching center for that area and will thus be interconnected by physical wire or short-span radio links, the acknowledgment of all signals received by a local office is not necessary. However, on long distance calls wherein the transmitters and receivers of the radio links between the long distance switching centers are widely spaced and wherein fading problems become appreciable, signal interlocking is used.

Returning to the call under consideration, the subscriber register in local office 9 is responsive to the receipt of an interlock request signal to transmit a seize acknowledge signal to the controlling direct dialing register and the three digits of the directory number of station B are then transmitted and acknowledged in turn. At the completion of the transmission of the directory number to local office 9, an end of call signal is transmitted from office 9 to the controlling direct dialing register regardless of the idle or busy condition of the selected called line. The end of call signal controls are equipment in long distance switching center 2 to connect the calling and called trunk lines in that office together and the direct dialing register used on the call is then released from the connection and freed for use on another call. A connection is now completed between station A and local office 9 so that the ringback tone or busy tone transmitted from office 9 may be heard by the calling subscriber at station A. An end of call signal is utilized in the system since the number of digits required to set up a particular call depends upon the number of long distance switching centers and local offices through which the call must be routed.

If an all trunks busy condition is encountered in any one of the switching centers 2, 5, or 8, an end of call signal is transmitted back over the extended connection to the controlling direct dialing register to control the equipment in switching center 2 to connect the calling and called trunk lines in that switching center together, as previously described, and either busy tone or a tape announcement is transmitted from the busy office to the calling subscriber. Also, if the controlling direct dialing register in the first encountered switching center should transmit a seize signal or a digit signal for more than one second without receiving a correct acknowledgment, the call is automatically routed to the operator position in that switching center.

A calling subscriber may reach the operator position at the nearest long distance switching center by keying the digit corresponding to that switching center followed by the digits "00" for the purpose of having the operator at that position extend the call or for the purpose of obtaining routing information from the operator. Calls extended by an operator in any one of the switching centers are handled by a position register associated with the operator position and the position register functions to transmit signals in the same sequence as described above in conjunction with a call through a direct dialing register.

Each of the long distance switching centers is also equipped with one or more service lines which may be reached through either the direct dialing registers or the incoming registers provided in that switching center.

The block diagram of a long distance switching center, which is shown in Figs. 2A–2F, will now be described in more detail. Although just two line terminating units, namely units 21 and 22, have been shown, it is to be understood that there is provided a line terminating unit for each trunk line terminating in the exchange, a line terminating unit for the tape busy announcement for each group of trunk lines to other long distance switching centers, a line terminating unit for providing local office trunk group 120 I.P.M. busy tone, a line terminating unit for each service line in the exchange, and a line terminating unit for providing service line 60 I.P.M. busy tone.

As illustrated, the line terminating units, the direct dialing registers, the incoming registers, the position register, the route selector, and the link circuits are interconnected by six highway transmission networks of the four-wire type and which each comprise thirty-two time division channels. As shown in the time position and highway assignment chart of Fig. 36, sixty line terminating units are provided for terminating trunk lines to local offices and these terminating units are individually assigned time positions 1–10 on the six highways. The sixty units terminating local office trunk lines may be divided into as many as ten groups, with the number of units in each group being determined by traffic requirements, since in the system herein described the digits "11–10" are available to identify local office trunk groups. Also as shown in Fig. 36, one hundred line terminating units are provided for terminating trunk lines to other long distance switching centers and these units are individually assigned time positions 12–28 on highways 1–5 and time positions 12–26 on highway 6. The one hundred line terminating units terminating long distance switching center trunk lines may be divided into as many as eight groups since in the system herein described the digits "2–9" are available to identify long distance switching center trunk groups. Also as shown in the assignment chart, time position 29 on highways 1–6 and time position 30 on highways 1 and 2 are assigned to the line terminating units which terminate the tape busy announcement circuits for each of the long distance trunk groups, time position 30 on highway 5 is assigned to the line terminating unit which couples 60 I.P.M. service line busy tone to the system, and time position 30 on highway 6 is assigned to the line terminating unit which couples 120 I.P.M. local trunk group busy tone to the system.

The time position defining pulses are supplied by multiplex pulse generator 23 which is controlled by master pulse source 24. As illustrated, the square wave generator or master pulse source 24 operates at 400 kc. and the output waveform from said generator is applied to multiplex pulse generator 23. Multiplex pulse generator 23 functions to commutate the pulses received from generator 24 to thirty-two output conductors, TP1–TP32, in turn, so that a time position defining pulse appears on each of said conductors at a 12.5 kc. rate. Since the output of generator 24 is a square waveform, each pulse appearing on each of the conductors TP1–TP32 is 1.25 microseconds in duration, there is a guard time of 1.25 microseconds between pulses on successive conductors, and each frame of pulses is eighty microseconds in duration. Generators 24 and 23 may be of any well known type but are preferably of the type shown and described in copending application Serial Number 585,184, filed May 16, 1956, and assigned to the same assignee as the present invention. The pulses applied to conductors TP1–TP32 are routed over cable TPP to the line terminating units, the seize detector, and the route selector, as illustrated.

To illustrate the operation of the system, first assume that direct dialing register allotter 25 has assigned an idle direct dialing register, such as 26, for use, that incoming register allotter 27 has assigned an idle incoming register, such as 28, for use, and that link allotter 29 has assigned an idle link circuit, such as 30, for use. The number of direct dialing registers, incoming registers, and link circuits provided in the long distance switching center is, of course, determined by traffic conditions. Next assume that a voice frequency seize signal appears on the trunk line receive conductors terminated by line terminating unit 21 and that samples of said seize signal therefore appear on send conductor SD1 of highway 1 in time position 1, the highway and time position permanently assigned to unit 21. Seize detector 31 is provided in the system for the purpose of continuously scanning each idle one of the time position channels of each highway in turn for seize signals. The highway and time position channel to be connected to is marked to the control connector 31*b* by the seize detector control circuit 31*a* by the application of a potential to one of the six highway identification conductors, labeled HI–SD, and by the application of a pulse in a particular time position to slot pulse identification conductor SP–SD. Seize detector control circuit 31*a* comprises a slip counter which functions to gate out a particular time position pulse for forty consecutive frames and to then gate out the next succeeding time position pulse. After all of the time position channels on a particular highway have been scanned, a highway counter in circuit 31*a* is advanced to mark the next succeeding highway identification conductor. A pulse is applied to conductor SP–SD only if the particular time position is not marked busy within the illustrated center by a pulse in that time position on the busy test conductor BT1–BT6 corresponding to the highway being scanned. Thus, control connector 31*b* functions to connect to each idle time position channel in turn for a period of forty times the frame rate or 3.2 milliseconds, and any signals appearing on the channel connected to are coupled over conductor AC–SD to seize detector control circuit 31*a*.

If a seize signal is detected by circuit 31*a*, the scanning operation is arrested and a connect demand signal is applied to either incoming register connect demand conductor IRCD or direct dialing register connect demand conductor DRCD depending upon whether the call is from a long distance switching center or from a local office, respectively, as determined by the time position of the channel on which the seize signal is detected. In the assumed call, the seize signal is detected by circuit 31*a* on conductor SD1 in time position 1, thus indicating that the call is from a local office since line terminating units terminating trunk lines from local offices are assigned time positions 1–10 as previously explained, and the seize detector control circuit 31*a* therefore functions to apply a connect demand signal to conductor DRCD, which extends to the direct dialing register allotter 25.

Direct dialing register allotter 25 is responsive to the receipt of a connect demand signal to apply a demand answer signal to conductor DRDA, which extends to seize detector control circuit 31*a*, and to apply a read control signal to conductor DRC1, which extends to calling time store 26*a* of the allotted direct dialing register 26. The seize detector control circuit 31*a* is responsive to the receipt of a demand answer signal on conductor DRDA to apply calling highway identification marking to the conductors of cable CHI. Cable CHI comprises four conductors and highway marking is accomplished by grounding two out of four of the conductors to mark the particular one of the highways with which the calling line terminating unit is associated. Simultaneously therewith, a pulse in the time position of the calling line terminating unit is applied to calling slot pulse identification in conductor CSP–I, which extends to the slot pulse regeneration circuit 32. The pulse is inverted and regenerated in circuit 32 and routed over the calling slot pulse out conductor CSP–O to the direct dialing and incoming registers and to the link circuits. Only direct dialing register 26 is enabled to read in the highway and channel information applied to the calling identification bus bars at this time since a read control signal is applied to conductor DRC1 by allotter 25, as stated above.

When the highway and channel pulse identification has been read into calling time store 26*a* of direct dialing register 26, a busy signal is applied to busy free conductor DBF1 for the purpose of controlling allotter 25 to remove the demand answer signal from conductor DRDA and the read in control signal from conductor DRC1. When the signal is removed from conductor DRDA, seize detector control circuit 31*a* removes the connect demand signal from conductor DRCD and then resumes its scanning operation. Direct dialing register allotter 25 then advances under control of the scanner generator 35, which may be any well known commutator which serves to energize conductors X1–XN one at a time and in turn, to preallot the next idle direct dialing register for use on the next call.

Calling time store 26*a* now serves to transmit calling highway and channel identification information over conductors CHI–D and CSP–D to control connector 26*b* of direct dialing register 26 for the purpose of controlling connector 26*b* to establish a connection between direct dialing register 26 and the time position channel of the calling line terminating unit. Calling time store 26*a* also serves to apply a pulse in the time position of the calling line terminating unit to busy conductor BT1 to thereby mark time position 1 on highway 1 as busy to the seize detector 31 and to the route selector 34. The operation of control A circuit 26*c* is initiated by the application of potential to conductor SC–D by the calling time store 26*a* when calling identification information is read in by calling time store 26*a*. Control A, which comprises a multifrequency signal detector connected to conductor CAC–D from control connector 26*b*, first checks to see if a seize signal is present on the channel to which it is connected. If no seize signal is present, control A and calling time store 26*a* are automatically released. If a seize signal is present, control A functions to return a burst of seize tone followed by dial tone over conductor CAR–D and through control connector 26*b* to receive conductor REC1 in time position channel 1. The signals applied to conductor REC1 in time position 1 are demodulated in line terminating unit 21 and the resulting demodulated signals are transmitted over the send conductors terminated by unit 21 to the originating local office. In the originating local office, the received seize signal is utilized to terminate the transmission of a seize signal by that office and the connection is extended through that office so that dial tone may be heard by the originating party.

The compound voice frequency signals representing the digits of the called subscriber station number are now received over the calling trunk line, detected by the multifrequency signal detector in control A circuit 26*c*, and the digits corresponding to the received signals are registered in the five digit store circuit 26*d*. Under normal operating conditions, the digits will be transmitted out of the register as fast as they are received from the calling party, but five storage stages are provided so that a call will not be lost in the event that there is some delay in the system.

There are four possible call situations which may occur. That is, the call may be extended through the illustrated long distance switching center to another long distance switching center, it may be extended through the illustrated center to a local office, it may be extended to the operator position in the illustrated center, or the call may be extended to a service line in the illustrated center. First assume that the call is to be routed through the illustrated long distance switching center to another long distance switching center, as signified by the receipt of a compound voice frequency signal which corresponds to one of the digits "2–9." At the termination of the first digit, under these conditions, control A circuit 26*c* functions to apply a connect demand signal to conductor FCDD1, which extends to register finder 33. When register finder 33 has found register 26, a demand answer signal is applied to conductor FDAD1 and direct dialing register 26 is thereby controlled to apply digit marking information representing the first digit stored in said register to the digit marking cable DM1 and to apply marking potential to conductor DD to identify the calling register as a direct dialing register to the route selector. Cable DM1 comprises five conductors and ground potential is applied to a unique combination of two out of five of said conductors for each digit. Route selector 34 is responsive to the receipt of marking on two out of the five conductors of cable DM1 to search for an idle line terminating unit in the group of terminating units corresponding to the digit represented by said two out of five marking. Also, after a slight delay following the receipt of digit marking, the route selector 34 functions to apply an allotter inhibit signal to conductor AI which extend to the direct dialing register allotter 25, the incoming register 27, and to the register finder 33 for a purpose which will be explained later. The route selector finds the first idle terminating unit in the designated group of terminating units by comparing the time positions of the terminating units of the group in turn with the busy pulses appearing on conductors BT1–BT6. The identity of the terminating unit selected is then passed over conductors THI–R and TSP–R to control connector 34*b* and control connector 34*b* then couples any signals appearing in the selected time position channel to a release and seize detector circuit in route selector circuit 34*a* over conductor AC–R. If a release or seize signal is detected in the time position of the selected unit, indicative that the unit is either originating or terminating a call but is not marked busy on conductors BT1–BT6, a secondary busy test circuit in route selector 34*a* is operated.

Assuming that an idle unit is found in the designated group of units, route selector 34 functions to apply a read in signal to conductor RTD and to apply highway and time position marking signals to the terminating identification busbars THI and TSP–I, respectively. Terminating highway identification is marked on two out of four conductors of cable THI and terminating time position identification is marked in the form of a pulse in the time position of the selected unit on conductor TSP–I, which extends to slot pulse regeneration circuit 32. The time position pulse is inverted and regenerated in circuit 32 and applied over conductor TSP–O to the direct dialing registers, the position register, and the link circuits. Since direct dialing register 26 is enabled at this time by register finder 33 over conductor FDAD1, only terminating time store 26*e* of register 26 is enabled by potential on conductor RTD to read in the terminating highway and time position identification signals. When the terminating highway and time position identification has been read into terminating time store 26*e*, the register connect demand signal is removed from conductor FCDD1, register finder 33 is released, and digit marking information is removed from conductor DM1 to release the route selector.

Terminating time store 26*e* thereafter functions to apply a pulse in the time position of the selected or called unit to the one of the busy test conductors BT1–BT6 which corresponds to the highway with which the selected unit is associated. The highway and time position identification of the selected unit is also routed to control connector 26*f* over conductors THI–D and TSP–D for controlling that connector to associate direct dialing register 26 with the time position channel assigned to the selected unit. The direct dialing register now functions to transmit seize and digit signals alternately over conductor TAR–D to control connector 26*f* and thus to and through the selected unit to the next succeeding office. Acknowledgement signals received over the extended connection are routed over conductor TAC–D to a second multifrequency signal detector in control A circuit 26*c*. Thus, it can be seen that direct dialing register 26 is controlled by the calling subscriber station over the connection through control connector 26*b* and controls the further extension of the connection through control connector 26*f*. The connection is split in direct dialing register 26. That is, no talking path exists between the calling and called ends of the connection.

The sequence of signaling continues as described in conjunction with the description of Fig. 1 until an end of call signal, which indicates that the call has been extended to the called subscriber station or that a busy condition has been encountered in the extended connection, is detected by the second multifrequency signal detector in control A circuit 26*c*. When an end of call signal is received, control A circuit 26*c* functions to transmit a connect demand signal to the register finder 33 over conductor FODD1. When register 26 is found by register finder 33, a demand answer signal is applied to conductor FDAD1, as previously described. Control A circuit 26*c* is responsive to the receipt of a demand answer signal under these conditions to apply a write direct signal to conductor WD which extends to the route selector 34. When a write direct signal is received by the route selector, the route selector does not search for an idle terminating unit but, rather, applies an allotter inhibit signal to conductor AI, to prevent the establishment of new connections by the incoming register and direct dialing register allotters while the identification busbars are being used to route information from the direct dialing register to the link circuit, and, after a slight delay, applies a write-read signal to conductor WRO. The signal applied to conductor WRO is effective to control the direct dialing register calling time store 26*a* and terminating time store 26*e* to apply highway and time position identifying information to calling busbars CHI and CSP–I and to terminating busbars THI and TSP–I, respectively.

The calling and terminating highway and time position identifying information applied to the busbars by direct dialing register 26 is read into the link circuit which is allotted for use at this time by link allotter 29. That is, if marking potential is applied to conductors XML1 and YML1 by link allotter 29, link circuit 30 is enabled by the signal on conductor WRO to read in any information appearing on the busbars. When the calling and terminating identification has been read into the storage circuits in link circuit 30, a link busy signal is applied to conductor LF which extends to link allotter 29. Link allotter 29 then functions to apply a signal to conductor LM which controls register finder 33 to discontinue the transmission of the demand answer signal over conductor FDAD1 to direct dialing register 26. When the demand answer signal is removed from conductor FDAD1, direct dialing register 26 removes the write direct signal from conductor WD to release the route selector, discontinues the transmission of highway and time position identification information, and then releases from the connection.

When the calling and terminating identifying information is read into the link circuit 30, the link circuit thereafter functions to mark the calling and called units busy on conductors BT1–BT6 and also functions to identify the calling and called units to the link connector 30*a*, which is individually associated with link circuit 30. The calling highway is identified to the link connector 30*a* over conductors CRM1–CRM6 while the time position of the calling unit is identified over conductor CSP–L. The called highway is identified to link connector 30*a* over conductors TRM1–TRM6 while the time position of the called unit is identified over conductor TSP–L. Link connector 30*a* thereafter functions to demodulate any signals appearing in the calling and called time position channels and to apply the demodulated signals to the called and calling time position channels, respectively. Thus, the connection is completed in the illustrated long distance switching center between the calling subscriber station in the originating local office and the called subscriber station, or a busy tone or tape announcement unit in a succeeding office.

Link circuit 30 remains engaged until a voice frequency release signal is received from either the calling subscriber station or the called subscriber station and coupled over either conductor AB or conductor ACL, respectively, from link connector 30*a* to link circuit 30. In this connection, it might be well to mention at this time that a single release detector 37 and a single release scanner 38 are provided for servicing the link circuits of the system. Release scanner 38, which may be any well known commutator or distributor, serves to apply potential to conductors RRS1–RRSN one at a time and in turn for the purpose of controlling each link circuit in turn to couple any A.C. signals received by that link circuit to conductors RRB and RRC. If a release signal is detected by release detector 37, a signal is applied to conductor RM and is gated with the RRS signal to control the enabled link circuit to transmit a timed VF release signal to conductors AD and AE, and through the link connector 30a in the calling and called directions, respectively. After the timed period, which may be from two to four seconds, link circuit 30 and link connector 30a are released. Thus, it can be seen that a release signal will be detected and retransmitted in each office or long distance switching center involved in the extended connection.

Returning to the consideration of the route selector 34, it will be recalled that the route selector is controlled to search for an idle terminating unit in accordance with digit marking corresponding to the first digit stored in direct dialing register 26 and that it was assumed that the route selector was successful in finding an idle unit. When all of the units in the desired group are busy or if a seize or release signal is detected on the secondary busy test of the selected unit, the route selector functions to apply a signal to conductor WRO rather than to conductor RTD. The effect of this operation is that the calling unit highway and time position identification information is read out of the calling time store 26a and into link circuit 30 and the highway and time position identification information corresponding to the tape announcement line terminating unit corresponding to the desired group of units is read out of the route selector and into link circuit 30. Simultaneously therewith, potential is applied to busy marking conductor BY by route selector 34 to prevent link circuit 30 from applying a ringing signal to the called unit. Thus, when a busy condition is encountered in the group of terminating units terminating trunk lines to the desired long distance switching center, the calling subscriber station is connected to a line terminating unit which has any well known tape announcement machine connected to its receive conductors and the recorded message is transmitted to the calling subscriber.

The operation is slightly different from the above when the call is to be routed to a local office as signified by the receipt of the compound voice frequency signal corresponding to the digit "1" as a first digit by direct dialing register 26. Under these conditions, direct dialing register 26 does not transmit a connect demand signal to register finder 33 at the completion of the first digit but, rather, delays until the second digit, which actually identifies the desired local office, has been registered before demanding connection. When a demand answer signal is received, the digit "1" is marked on the conductors of cable DM1 and the second digit is marked on the conductors of cable DM2 which also extends to route selector 34. Subsequent operation is identical to that described above for routing a call to another long distance switching center with the single exception that if all trunks in the desired group are busy, the route selector 34 reads out the identification of the 120 I.P.M. busy tone coupling terminating unit to the link circuit rather than the identity of a tape announcement terminating unit.

Next assume that the first two digits registered in direct dialing register 26 are the digits corresponding to one of the four service lines provided in the illustrated system. The four service lines are assigned the digits "01–04," respectively. Whenever the compound voice frequency signal corresponding to the digit "0" is received as the first digit, the register does not transmit digit information to the route selector until a second digit has been received. Upon completion of the second digit and when the register has been found by the register finder, direct dialing register 26 reads out the digit information over cables DM1 and DM2 to the route selector and the route selector tests the idle or busy condition of the desired line. Since the service line is located within the illustrated long distance switching center and it is therefore not desirable to read the identification of the called unit back into the terminating time store 26e, a signal is not applied to conductor DD when a service line is being called. Therefore, at the completion of its busy test, route selector 34 applies a write-read signal to conductor WRO and the calling and called unit identification information is read out of the calling time store 26a and route selector 34, respectively, and into the allotted link circuit. Under these conditions, a service line signal is also applied to conductor SL by the route selector for the purpose of controlling the link circuit to apply a ringing tone over conductors AD and AE to link connector 30a. The ringing tone on conductors AD and AE is coupled through the link connector to the calling and called subscriber stations and serves as a ringback tone signal and a ringing signal, respectively. When the called station goes off-hook, a seize signal is generated by said station and is utilized as a ring trip signal in the illustrated long distance switching center. The ring trip signal is detected by ring trip detector 39 when detector 39 is connected to the link circuit under control of ring trip scanner 40, the operation of which is identical to that described for release scanner 38, and a trip ring signal is applied to conductor TR. The signal on conductor TR is gated with the signal on conductor RTS1 to control link circuit 30 to terminate the transmission of a ring signal and to then transmit a short burst of dial tone for the purpose of terminating the transmission of a seize signal by the answering station. Subsequent operation is identical to that described above.

Next assume that the first two digits received by direct dialing register 26 are the digits "00" which indicates that the call is to be routed to the operator's position at the illustrated long distance switching center. As previously stated, when the first digit registered is the digit "0," the register delays until the second digit has been registered before transmitting a connect demand to the register finder. When a demand answer signal is received from the register finder, direct dialing register 26 applies zero marking cables DM1 and DM2 and no signal is applied to conductor DD. Route selector 34 is responsive to the receipt of zero-zero marking to apply a write-read signal to conductor WRO to control calling time store 26a to read out and link circuit 30 to read in the calling unit identification information. Also, route selector 34 functions to apply a signal to conductor AM, which extends to the link circuits, to mark the call as an operator call to the allotted link circuit.

A call being handled by the direct dialing register 26 is automatically routed to the operator position in the same long distance switching center if a correct acknowledgement signal is not received from the called direction for a period of more than one second. Under these conditions, control A circuit 26c functions to apply release tone to conductor TAR–D and thus through control connector 26f to release the circuits in the forward direction. After a slight delay, a register connect demand is transmitted and when a demand answer signal is received from register finder 33, direct dialing register 26 functions to apply a write direct signal to conductor WD and a signal to conductor DAM. Route selector 34 is responsive to the receipt of a signal on conductor WD to apply a signal to conductor WRO after a slight delay, as previously described. The signal on conductor WRO controls the read out of calling unit identification from calling time store 26a to the allotted link circuit and since a signal is applied to conductor DAM, route selector 34 forwards a signal over conductor AM to mark the call as an operator call to the allotted link circuit.

Before proceeding to describe the operation of the link circuit on a call to the operator position, the operation of the incoming register will first be described. It will be recalled that the seize detector discriminates between calls from local offices and calls from other long distance switching centers by the time position channel on which the seize signal is detected and serves to route a call from a local office to an idle direct dialing register, and to route a call from another long distance switching center to an idle incoming register. Thus, when a seize signal is detected in the time position channel of a line terminating unit terminating a trunk line from another long distance switching center, such as time position 12 on highway 6 which corresponds to line terminating unit 22, seize detector 31 serves to apply a connect demand signal to conductor IRCD which extends to incoming register allotter 27. In the exact same manner as described for the direct dialing register allotter 25, incoming register allotter 27 is responsive to the receipt of a connect demand signal to apply a demand answer signal to conductor IRDA and a read in signal to conductor IRC–1, which extends to the allotted incoming register 28, to control the seize detector to read out highway and channel identification information to the busbars CHI and CSP–I and calling time store 28*a* to read in the highway and channel identification information appearing on the calling busbars CHI and CSP–O, respectively. When the identification information is read into calling time store 28*a*, busy potential is applied to conductor IBF–1, incoming register allotter 27 removes the demand answer signal from conductor IRDA, seize detector 31 resumes its scanning operation, and allotter 27 allots the next idle incoming register for use.

Calling time store 28*a* now functions to apply busy pulses in time position 12 to busy marking conductor BT6 to mark unit 22 busy to the seize detector and route selector. Calling time store 28*a* also functions to mark the identity of the calling unit over conductors CHI–I and ICSP–I to control connector 28*b* so that a connection is established to time position channel 12 on highway 6 through control connector 28*b*. The seize signal appearing on the calling channel is demodulated in control connector 28*b* and the demodulated signal is coupled over conductor CAC–I to a multifrequency signal detector in two digit store circuit 28*c*. Two digit store 28*c* is responsive to the detection of a seize signal to forward a seize acknowledge over conductor CAR–I to control connector 28*b* and thus back over the calling trunk line to the controlling direct dialing register in the originating long distance switching center. Digit information received over the calling trunk line is then stored in two digit store 28*c* and at the termination of the first received digit, a digit acknowledge signal corresponding to the received digit is returned to the originating direct dialing register. If the digit acknowledge signal is correct for the digit transmitted, the direct dialing register then forwards a second seize signal to two digit store 28*c*.

The operation in two digit store 28*c* depends upon the digital value of the first digit registered. If the first digit registered is one of the digits "2–9," two digit store immediately transmits a connect demand signal upon receipt of the second seize signal. However, if the first digit stored is either a "1" or a "0," the two digit store delays until a second digit is registered before transmitting a connect demand signal. Assuming that one or two digits have been stored as described above, two digit store 28*c* transmits a connect demand signal over conductor FCD1–1 to register finder 33. When incoming register 28 is found by register finder 33, as signified by the application of a demand answer signal to conductor FDAI–1, two digit store 28*c* functions to apply single digit marking information to the conductors of cable DM1 or, if two digits are stored, to apply digit marking information to the conductors of both cables DM1 and DM2.

Route selector 34 now searches for an idle terminating unit in the desired group of long distance trunk line terminating units if a single digit is transmitted over the digit marking busbars, searches for an idle terminating unit in the desired group of local trunk line terminating units if a two-digit number, the first digit of which is "1," is received over the digit marking busbars, or tests the busy condition of the desired service line if one of the numbers "01–04" is marked on the busbars. Upon receipt of digit marking information, route selector 34 applies an allotter inhibit signal to conductor AI for the purpose of preventing new calls from being set up at this time, as previously explained. After a short delay, route selector 34 applies a signal to conductor WRO and the calling unit highway and time position identification information is read out of calling time store 28*a* and into link circuit 30, assuming that said link circuit is allotted for use. As previously described, the route selector 34 reads out the identification of the terminating unit selected if said unit terminates either a long distance or local office trunk line, reads out the identity of the busy announcement terminating unit if all units in the desired group of long distance switching center units are busy, reads out the identity of the 120 I.P.M. busy tone unit if all units in a desired group of local office units are busy, reads out the identity of the desired service line and applies potential to conductor SL if the service line is idle, reads out identification of the 60 I.P.M. busy tone unit if the desired service line is busy, or applies potential to conductor AM if the call is to be routed to the operator position. The reading in and subsequent operation of link circuit 30 is identical to the operation described above in conjunction with the description of the system when the route selector is controlled by direct dialing register 26.

When the identification information is read into link circuit 30, a busy signal is applied to conductor LF in link circuit 30 to control link allotter 29 to apply a signal to conductor LM which, in turn, controls register finder 33 to terminate the transmission of a demand answer signal on conductor FDAD–1. When the signal is removed from conductor FDAD–1, incoming register 28 is released and freed for use on another call.

It will be recalled that when a call is to be routed to an operator position, route selector 34, regardless of whether it is controlled by a direct dialing register or by an incoming register, forwards a signal over conductor AM to the link circuit simultaneously with the application of calling unit identification information to the busbars CHI and CSP–O by the calling register. When the calling unit identification is read into the link circuit storage circuits and the link connector 30*a* has established connection with the time position channel of the calling unit, ringing tone is transmitted over conductors AD and AE from link circuit 30 to link connector 30*a*. The tone on conductor AD is coupled through link connector 30*a* to the calling party as a ringback signal while the tone on conductor AE is without effect since the link connector has not established a connection in the called direction. The signal on conductor AM from the route selector controls the link circuit to apply a demand operator signal to conductor DO–1 which extends to position coupling circuit 30*b*. Position coupling circuit 30*b*, which is individually associated with link circuit 30, then functions to mark conductor LU–1 as an indication to call finder 36 that link circuit 30 is demanding connection to the operator position.

Call finder 36 is provided in the system for the purpose of controlling the establishment of calls to the operator keyboard circuit in the same order in which the calls are initiated. Since the link circuits are allotted in turn by link allotter 29 and since the call finder scans the link circuit position coupling circuits in the same order that the link circuits are assigned, calls are extended to the keyboard circuit in the same order that they are initiated. Call finder 36 comprises two free running ring counters. When the first counter has advanced to the position corresponding to position coupling circuit **30*b*, it is stopped on said position by the signal on conductor LU-1 and serves to apply a signal to conductor LMU-1. When a signal is received on conductor LMU-1, position coupling circuit 30*b* functions to apply a signal to conductor LV-1 for the purpose of stopping the second counter on the position corresponding to position coupling circuit 30*b*. When the second counter stops on the position corresponding to position coupling circuit 30*b*, a signal is applied to conductor LMV-1. Now, since signals are applied to both conductors LMU-1 and LMV-1, link circuit 30 is enabled for connection to the keyboard circuit. When the operator at keyboard circuit 41 operates the single answer key provided at the keyboard, a signal is applied to conductor OP and, since conductors LMU-1 and LMV-1 have signals applied thereto, link circuit 30 is seized by keyboard circuit 41**. When the link circuit is seized, the transmission of the ringback tone signal is terminated and the operator can converse with the calling party over conductors AAB and AAD.

If the call extended to the operator position is to be further extended, the operator keys the digits of the called number in accordance with oral instructions received over the calling trunk line from the calling subscriber. The depression of any one of the ten digit keys in keyboard circuit 41 results in the application of potential to a unique combination of two out of the five conductors KDU, KDV, KDW, KDX and KDY, and the end of each keyed digit is signified by the application of potential to conductor KDE. The digit information received over conductors KDU-KDY is stored in five digit store **42*b* of position register 42, which register is individually associated with keyboard circuit 41. The operation of the position register is similar to the operation of the previously described direct dialing register 26. If the first digit registered in position register 42 is one of the digits "2-9," a connect demand signal is transmitted to register finder 33** at the completion of that digit. However, if the first registered digit is a "1" or a "0," a connect demand signal is not transmitted until the completion of the second digit.

When the position register is ready to read out digit information at the completion of the registration of either the first or second digit, as explained above, a connect demand signal is applied to conductor FCDP1. When a demand answer signal is received over conductor FDAP1 from register finder 33, position register 42 serves to apply digit marking information to the conductors of cable DM1 if only one digit is registered or to the conductors of both cables DM1 and DM2 if two digits are registered, and to apply a signal to conductor PD to mark the calling register as a position register to route selector 34 so that route selector 45 will apply a signal to conductor RTD rather than to conductor WRO when the write and read function is to be performed. In accordance with the digit information received over the conductors of cables DM1 and DM2, the route selector searches for an idle terminating unit in the group of units represented by said digit marking. After a slight delay, route selector 34 functions to apply a signal to conductor RTD and to apply the selected unit identification information to terminating busbars THI and TSP-I. The selected unit identification information appearing on busbars THI and TSP-O is, of course, read in by position time store **42*c* of position register 42 upon receipt of a signal on conductor RTD since position register 42 is the only register enabled at this time by register finder 33. When the terminating highway and time position identity has been read into position time store 42*c*, the connect demand signal is removed from conductor FCDP1, register finder 33** is released, and digit marking information is removed from conductors DM1 and DM2 to release the route selector.

Position time store **42*c* thereafter functions to apply a pulse in the time position of the selected or called unit to the one of the busy test conductors BT1-BT6 which corresponds to the highway with which the selected unit is associated. The highway and time position identity of the selected unit is also routed to control connector 42*d* for controlling that connector to connect position register 42 with the time position channel assigned to the selected unit. The position register control B circuit 42*a* now functions to transmit seize and digit signals alternately over conductor TAR-P to control connector 42*d* and thus to and through the selected unit to the next succeeding office. Acknowledgment signals received back over the extended connection are coupled over conductor TAC-P to a multifrequency signal detector in control B circuit 42*a***.

The sequence of signaling continues as described in conjunction with the description of Fig. 1 until an end of call signal, which indicates that the call has been extended to the called subscriber station or that a busy condition has been encountered in the extended connection, is detected by the multifrequency signal detector in control B circuit **42*a*. When an end of call signal is detected, control B circuit 42*a* functions to transmit a connect demand signal to register finder 33 over conductor FCDP1. When position register 42 is found by the register finder and a demand answer signal is applied to conductor FDAP1, a signal is applied by control B circuit 42*a* to conductor PA for the purpose of controlling route selector 34 to apply an allotter inhibit signal to conductor AI. After a slight delay, control B circuit 42*a* applies a signal to conductor KWR, which extends to the keyboard circuit, and controls position time store 42*c* over conductor DSW-P to read out the highway and time position identity of the selected unit to the terminating busbars THI and TSP-I. The signal applied to conductor KWR is coupled through keyboard circuit 41 to conductor KW, which extends to the link circuits, and the answered link circuit is controlled by the signal on conductor KW to read in the highway and time position identity marking appearing on the terminating busbars THI and TSP-O. After another slight delay, position register 42 and register finder 33** are released.

When the identity of the selected unit is stored in link circuit 30, the unit is marked busy on the appropriate one of the busy conductors BT1-BT6 and link connector **30*a* is controlled over conductors TRM1-TRM6 and TSP-L to establish connection to the time position channel corresponding to the selected unit. Although the connection between the calling and called units is split in link connector 30*a* as long as link circuit 30 is in an operator answered condition and potential is therefore applied to conductor ZM, a three-way talking connection now exists between the calling party, the called party or tape announcement circuit, and the operator. Signals received over the calling trunk line are coupled over conductor AB from link connector 30*a* to link circuit 30 and over conductor AAB from link circuit 30 to keyboard circuit 41. Similarly, signals received over the called trunk line are coupled over conductor AC-L and AAC to the keyboard circuit, signals to be transmitted to the calling party are coupled over conductors AAD and AD to the link connector, and signals to be transmitted to the called party are coupled over conductors AAE and AE to the link connector. A split key is provided at the keyboard circuit so that the operator can split the connection and talk in privacy to either party. Under normal conditions, the operator will retire from the completed connection by restoring the answer key provided in keyboard circuit 41. When the answer key is restored, link circuit 30 is effectively disconnected from keyboard circuit 41**, potential is removed from conductor ZM so that the calling and called units are coupled together through link connector 30*a*, and the call finder is allowed to advance to enable the next link circuit awaiting answer by the operator. As previously described, when a release signal is received from either the calling or called subscriber station, the link circuit serves to regenerate the release signal and to then release from the connection.

If while setting up the call the operator should wish to release the circuits in the forward direction because of an error in keying or for any other reason, a release key in keyboard circuit 41 is momentarily operated to forward potential over conductor KRS to the position register 42. Under these conditions, control B circuit 42*a* is controlled by position time store 42*c* to forward a timed release signal over conductor TAR–P to control connector 42*d* and thus to the circuits in the forwad direction and the position register is then restored to its unoperated condition. The operator then rekeys the desired number in the exact same manner as previously described.

Similarly, if the operator should wish to release the circuits in the forward direction after the call has been transferred to the link circuit and the position register is released, because a busy condition has been encountered or if a different called party is desired, the split key and the release key in keyboard circuit 41 are operated in that order and potential is applied over conductors TC and REL to the answered link circuit 30. Link circuit 30 is responsive to the receipt of potential over conductors TC and REL to transmit a timed release signal in the called direction and to reset its called unit identification storage stages. In other words, the identity of the original selected unit is erased from the storage circuits in the link circuit while the identity of the calling unit is maintained. The operator then rekeys the desired number into position register 42.

Another condition which may be encountered while the operator is extending a connection is that the calling party may hang up and the calling subscriber station thus automatically transmit a release signal. Under these conditions, the release signal is detected by release detector 37, link circuit 30 transmits a release signal in the calling direction and in the called direction if the call has been transferred from the position register to the link circuit, potential is applied to conductor ZD1 to reset the position coupling circuit 30*b*, and potential is applied to conductor KZD to effectively disconnect the link circuit from keyboard circuit 41. The operator then operates the release key to apply potential to conductor KRS for the purpose of controlling the position register to transmit a release signal in the forward or called direction and to then restore to its normal unoperated condition, as previously described.

It will be recalled that it was assumed that route selector 34 was successful in finding an idle terminating unit in the group of units represented by the digit marking forwarded over cables DM1 and DM2 from position register 42. In the event that all units in the desired group are busy, the identity of the tape announcement terminating unit or the identity of the 120 I.P.M. busy tone coupling unit is read back into position time store 42*c* and control connector 42*d* establishes connection to that unit. Since the tape announcement machine is arranged to momentarily transmit an end of call signal at the beginning of each cycle of the recorded message, and an end of call signal is intermittently transmitted along with the 120 I.P.M. busy tone, an end of call signal is detected by the multifrequency signal detector in control B circuit 42*a*. As previously described, when an end of call signal is detected, position register 42 transmits a connect demand to register finder 33 and upon receipt of a demand answer signal, the identity of the selected unit is transferred from position time store 42*c* to the link circuit. Thus, link circuit 30 controls link connector 30*a* to establish connection to the tape announcement unit or the 120 I.P.M. busy tone unit, as the case may be, and the recorded announcement or busy tone is heard by the operator and the calling party.

The individual circuits, which comprise the long distance switching center shown in block diagram form in Figs. 2A–2F, inclusive, have been illustrated in logic schematic form. That is, each circuit component such as an amplifier, a gate, etc., is represented by a particular logic symbol. The logic symbols, together with a typical circuit component represented by each symbol, are shown in Figs. 3A–35B, inclusive, of the drawings. Although most of the illustrated circuit components are entirely conventional in design and are well known in the art, it is believed expedient to a more complete understanding of the invention to briefly describe, where necessary, the operation of the various circuit components before proceeding to describe in detail the operation of the various circuits.

Figure 3A:
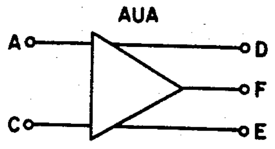
Figure 3B:
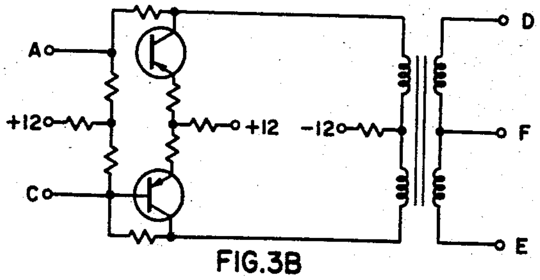

*Audio amplifier AUA*.—The logic symbol for amplifier AUA is shown in Fig. 3A and a typical circuit represented by said symbol is shown in Fig. 3B. The illustrated circuit is a balanced amplifier in which the transistors are biased for class A operation. The signal to be amplified is applied across input terminals A and C and the amplified signal appears across output terminals D and E. A center-tap terminal F is also provided on the output transformer. The amplifier can be used as a single-ended amplifier by grounding input terminal C.

Figure 4A:
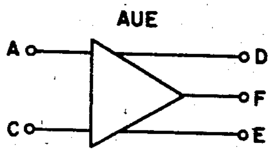
Figure 4B:
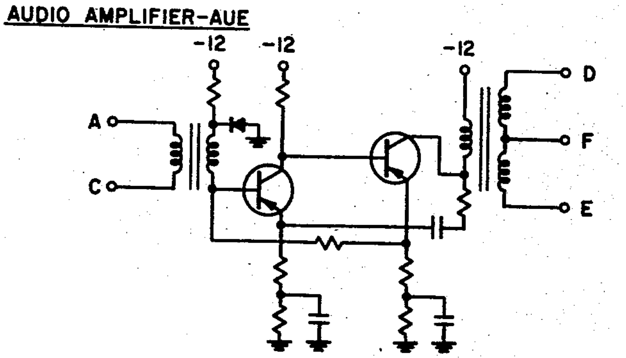

*Audio amplifier AUE*.—The logic symbol for amplifier AUE is shown in Fig. 4A and a typical circuit represented by said symbol is shown in Fig. 4B. The illustrated circuit is an unbalanced two-stage amplifier having both shunt and series negative feedback stabilization.

Figure 5A:
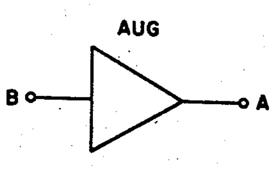
Figure 5B:
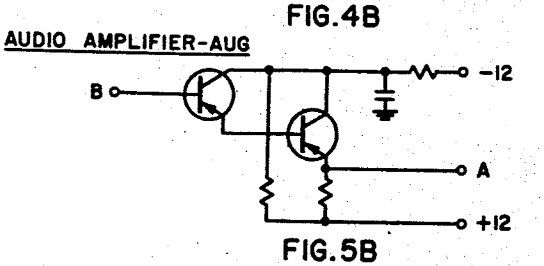

*Audio amplifier AUG*.—The logic symbol for amplifier AUG is shown in Fig. 5A and a typical circuit represented by said symbol is shown in Fig. 5B. Amplifier AUG is a high input impedance amplifier and comprises two emitter follower transistors connected in cascade.

Figure 6A:
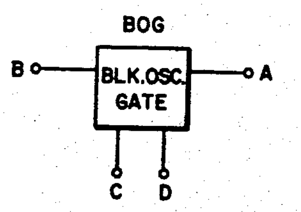
Figure 6B:
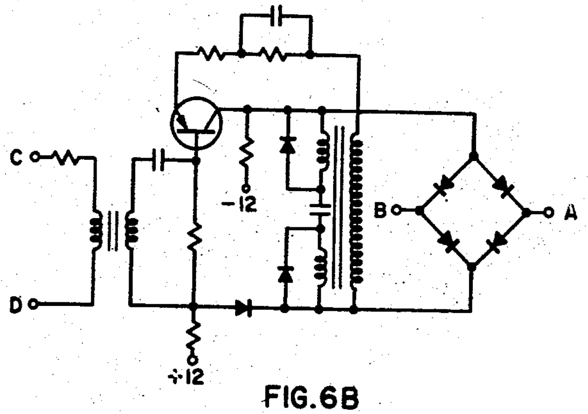

*Blocking oscillator gate BOG*.—The logic symbol for blocking oscillator gate BOG is shown in Fig. 6A and a typical circuit represented by said symbol is shown in Fig. 6B. The illustrated circuit comprises a diode bridge in which the individual diodes of the bridge are normally biased in the reverse direction so as to present a very high impedance and thus prevent the transfer of energy between terminals B and A. The bridge diodes are biased in the forward direction to present a very low impedance and thus permit the transfer of energy between terminals B and A only when the blocking oscillator transistor is conductive. As used in the line circuits, the control connectors, and the link connectors of the illustrated telephone system, the blocking oscillator transistor is triggered into conduction by the leading edge of a time position defining input pulse applied across terminals C and D and the time constant of the blocking oscillator is such that the transistor is conductive and the bridge diodes are biased in the forward direction for a period of 1.25 microseconds regardless of the duration of the input pulse. As used in the highway clamping circuit of the illustrated telephone system, the blocking oscillator transistor is triggered into conduction by the trailing edge of each time position defining pulse applied across terminals C and D and the time constant of the blocking oscillator is such that the transistor is conductive and the bridge diodes are biased in the forward direction to apply ground potential to the highway for a period of .6 of a microsecond.

Figure 7A:
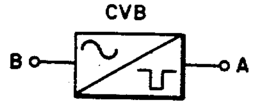
Figure 7B:
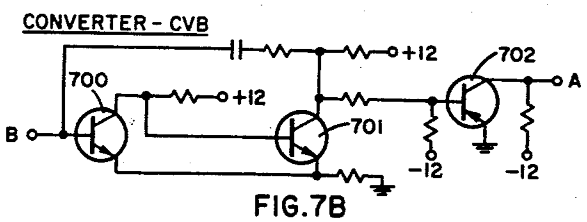

*Converter CVB*.—The logic symbol for converter CVB is shown in Fig. 7A and a typical circuit represented by said symbol is shown in Fig. 7B. The illustrated circuit comprises a trigger circuit followed by an inverter amplifier. Transistors 700 and 701 form an emitter coupled trigger circuit in which transistor 701 is normally conductive and transistor 700 is normally non-conductive. Transistor 700 is rendered conductive to trigger the circuit to its "on" condition only when its base electrode becomes positive with respect to its emitter, which is held at a positive potential by the conduction of transistor 701. When transistor 700 becomes conductive, transistor 701 is rendered nonconductive and the emitter potentials of transistors 700 and 701 drop toward ground potential to thereby lock the circuit in its "on" condition. Thus, the trigger circuit is triggered to its "on" condition during each positive half-cycle of an A.-C. signal coupled to input terminal B and a series of positive-going pulses appear at the collector of transistor 701. The positive pulses are, of course, inverted by transistor 702 and appear as negative pulses at output terminal A.

Figure 8A:
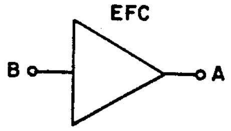
Figure 8B:
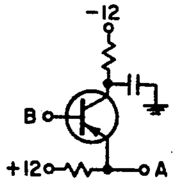

*Emitter follower EFC.*—The logic symbol for emitter EFC is shown in Fig. 8A and a typical circuit represented by said symbol is shown in Fig. 8B.

Figure 9A:
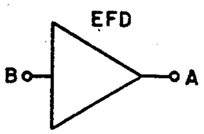
Figure 9B:
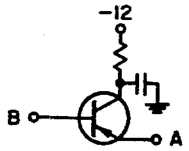

*Emitter follower EFD.*—The logic symbol for emitter follower EFD is shown in Fig. 9A and a typical circuit represented by said symbol is shown in Fig. 9B.

Figure 10A:
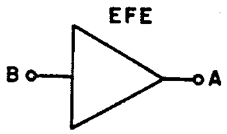
Figure 10B:
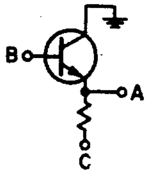

*Emitter follower EFE.*—The logic symbol for emitter follower EFE is shown in Fig. 10A and a typical circuit represented by said symbol is shown in Fig. 10B.

Figure 11A:
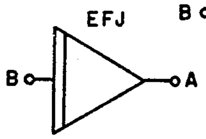
Figure 11B:
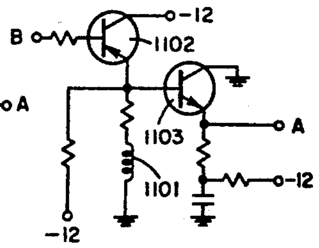

*Emitter follower EFJ.*—The logic symbol for emitter follower EFJ is shown in Fig. 11A and a typical circuit represented by said symbol is shown in Fig. 11B. Emitter follower EFJ is a high speed emitter follower as denoted by the vertical line within the triangle of the logic symbol. Inductance element 1101 is included in the emitter circuit of transistor 1102 for the purpose of quickly bringing the transistors 1102 and 1103 out of saturation at the termination of a pulse applied to input terminal B.

Figure 12A:
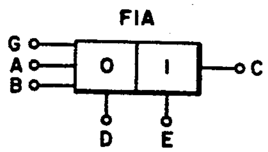
Figure 12B:
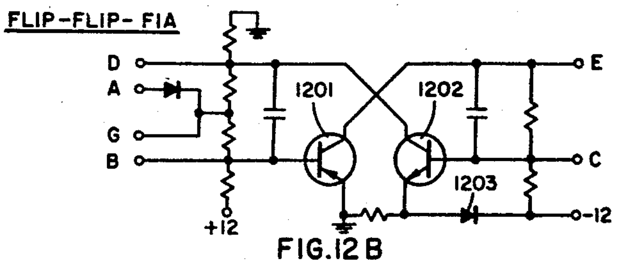

*Flip-flip F1A.*—The logic symbol for flip-flip F1A is shown in Fig. 12A and a typical circuit represented by said symbol is shown in Fig. 12B. In the reset condition of the circuit, both transistors 1201 and 1202 are nonconductive, ground potential appears on output conductor D, and negative potential appears on output conductor E. It should be noted that these conditions are denoted in the logic symbol by the connection of terminal D to the half of the flip-flip circuit marked zero and the connection of terminal E to the half of the flip-flip circuit marked 1. The flip-flip circuit is triggered to the condition in which both transistors 1201 and 1202 are conductive by the application of either a negative pulse to input terminal B or a positive pulse to input terminal C. The circuit is restored to its reset condition by the application of a positive pulse to either terminals A or G. Silicon diode 1203 is included in the circuit for the purpose of assuring the reverse biasing of the base emitter junction of transistor 1202 when the circuit is in its reset condition. Since the voltage drop across a silicon diode is approximately .6 volt for all values of forward current exceeding a certain minimum value, the emitter of transistor 1202 is biased .6 volt positive with respect to its base whenever transistor 1201 is non-conductive.

Figure 13A:
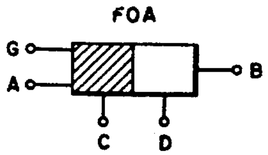
Figure 13B:
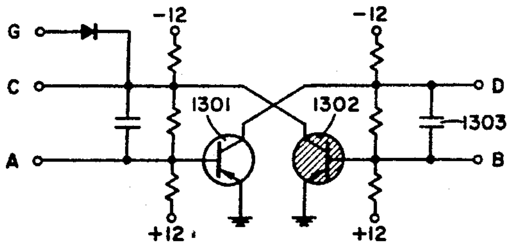

*Flip-flop F0A.*—The logic symbol for flip-flop F0A is shown in Fig. 13A and a typical circuit represented by said symbol is shown in Fig. 13B. In the reset condition of the flip-flop circuit, transistor 1302 is conductive as denoted by the shaded lines within the symbol representing said transistor and by the shaded lines within the left-half of the logic symbol. Under these conditions, ground potential is applied to output conductor C and negative potential is applied to output conductor D. The circuit may be triggered to its operated condition in which transistor 1301 is conductive and transistor 1302 is nonconductive by the application of either a negative pulse to input conductor A or a positive pulse to input conductor B. The circuit is restored to its reset condition by the application of a positive pulse to terminal G. In some applications of the illustrated circuit, terminal D is used as both an input and an output terminal. It can be seen that if a positive-going pulse is applied to terminal D, it is coupled through capacitor 1303 to trigger transistor 1302 non-conductive and transistor 1301 conductive. When transistor 1301 becomes conductive, terminal D, of course, rises to ground potential.

Figure 14A:
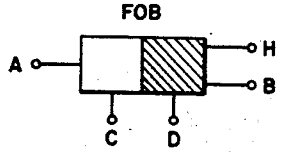
Figure 14B:
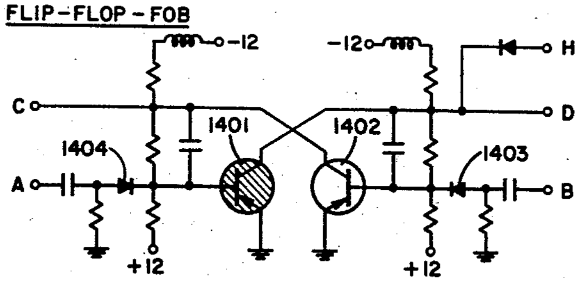

*Flip-flop F0B.*—The logic symbol for flip-flop F0B is shown in Fig. 14A and a typical circuit represented by said symbol is shown in Fig. 14B. Flip-flop F0B is a high speed circuit which is normally used as a binary counting stage. Terminals A and B are strapped together and a positive-going pulse is applied to the strapped terminals to trigger the circuit. It can be seen that when transistor 1401 is conductive, the cathode terminal of steering diode 1403 is positive with respect to the anode of said diode while the cathode terminal of steering diode 1404 is negative with respect to the anode terminal of that diode. Therefore, a positive-going pulse applied to terminals A and B is coupled through diode 1404 to trigger transistor 1401 non-conductive and transistor 1402 conductive. Conversely, when transistor 1402 is conductive, the positive pulse applied to terminals A and B is coupled through diode 1403 to trigger the circuit. At the termination of the operation of a particular circuit when it is desired to return all of the stages of a binary counting chain to their reset condition, a positive-going pulse is applied to terminal H of each counting stage. A positive pulse applied to terminal H serves to render transistor 1402 nonconductive if that transistor is conductive.

Figure 15A:
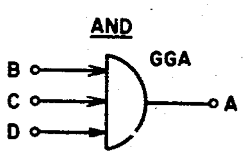
Figure 15B:
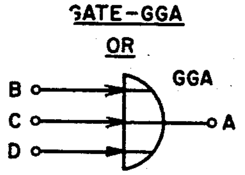
Figure 15C:
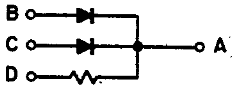

*Gate GGA.*—The logic symbols for gate GGA are shown in Figs. 15A and 15B and a typical circuit represented by said symbols is shown in Fig. 15C. Gate GGA may be used as either an AND gate for negative signals or an OR gate for positive signals. That is, output terminal A will be at negative potential only when all of the input terminals B, C, and D are returned to a negative potential and will rise to ground potential when any one or more of the terminals B, C, and D is returned to ground potential. It can be seen in Fig. 15A that an AND gate is indicated by lines from terminals B, C, and D which do not extend through the symbol while an OR gate, as shown in Fig.15B, is indicated by lines from terminals B, C, and D which extend through the symbol. The resistor input in both cases, and in all of the other gates disclosed, is denoted by a closed arrow.

Figure 16A:
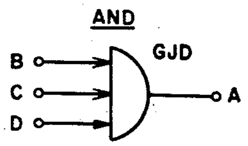
Figure 16B:
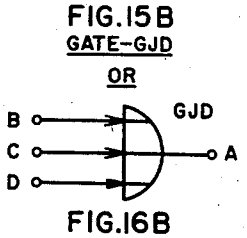
Figure 16C:
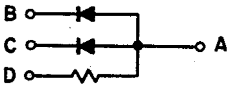

*Gate GJD.*—The logic symbols for gate GJD are shown in Figs. 16A and 16B and a typical circuit represented by said symbols is shown in Fig. 16C. Gate GJD may be used as either an AND gate for positive signals or an OR gate for negative signals. That is, output terminal A will be at ground potential only when all of the input terminals B, C, and D are returned to ground potential and will drop to a negative potential when any one or more of terminals B, C, and D is returned to a negative potential.

Figure 17A:
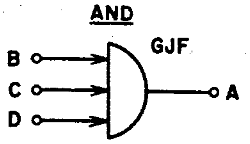
Figure 17B:
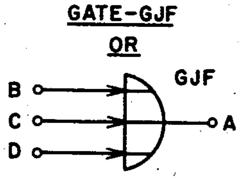
Figure 17C:
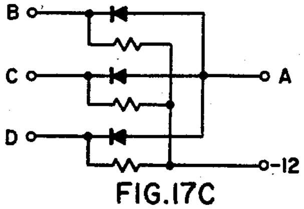

*Gate GJF.*—The logic symbols for gate GJF are shown in Figs. 17A and 17B and a typical circuit represented by said symbols is shown in Fig. 17C. This gate may also be used as either an AND gate for positive signals or an OR gate for negative signals. As illustrated, each of the input terminals B, C, and D is returned to −12 volt potential through a resistor.

Figures 18A, 18B:
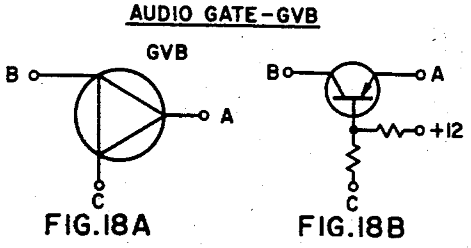

*Audio gate GVD.*—The logic symbol for gate GVD is shown in Fig. 18A and a typical circuit represented by said symbol is shown in Fig. 18B. The illustrated gate is conventionally used for gating the output of an A.-C. signal generator to a load circuit. As used in the disclosed system, terminal B is returned to ground potential through the signal generator and terminal A is returned to ground potential through the load circuit. Thus, when ground potential is applied to terminal C, the base of the bilateral switching transistor is held positive with respect to both its so-called emitter collector electrodes and the transistor remains non-conductive. However, when negative potential is applied to terminal C, both junctions of the transistor are biased in the forward direction in the absence of signals, and the transistor is rendered fully conductive to effectively couple terminal B to terminal A.

Figures 19A, 19B:
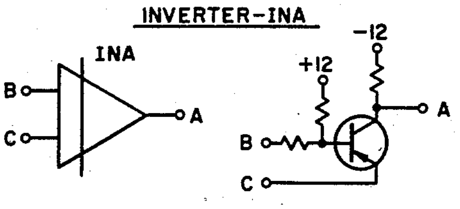

*Inverter amplifier INA.*—The logic symbol for amplifier INA is shown in Fig. 19A and a typical circuit represented by said symbol is shown in Fig. 19B. It is to be noted that an inverter is indicated by a vertical line extending through the conventional triangular symbol for an amplifier as shown in Fig. 19A. As illustrated in Fig. 19B, the inverter may be used as an AND gate or as a gated amplifier since a negative signal must be applied to base input terminal B and a positive or ground potential signal must be applied to emitter input terminal C for the amplifier to be biased for conduction. If terminal C is permanently returned to ground potential, terminal C is eliminated from the logic symbol.

Figures 20A, 20B:
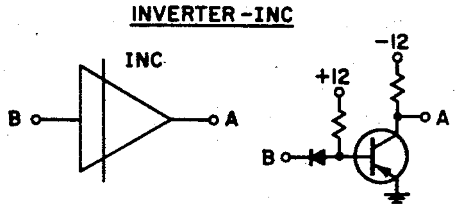

*Inverter amplifier INC.*—The logic symbol for amplifier INC is shown in Fig. 20A and a typical circuit represented by said symbol is shown in Fig. 20B. Inverter amplifier INC differs from inverter amplifier INA only in that the emitter is permanently returned to ground potential and a diode rather than a resistor is included in series between terminal B and the base electrode of the transistor for the purpose of providing a low base input impedance.

Figures 21A, 21B:
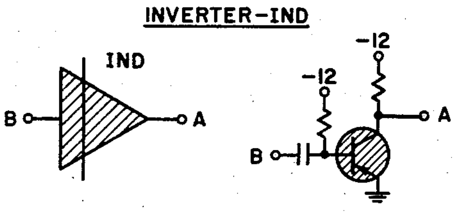

*Inverter amplifier IND.*—The logic symbol for amplifier IND is shown in Fig. 21A and a typical circuit represented by said symbol is shown in Fig. 21B. As shown in Fig. 21B, the transistor is normally conductive and is triggered non-conductive by either the leading edge of a positive-going waveform or by the trailing edge of a negative-going waveform. As used in the illustrated system, amplifier IND is designed to remain non-conductive for approximately fifty microseconds when triggered by a pulse produced by a delay multi-vibrator and to remain non-conductive for appoximately one hundred micro-seconds when triggered by a full twelve volt pulse appearing at the output of an amplifier. An amplifier having an output signal which normally stands at ground potential is represented by a shaded logic symbol as shown in Fig. 21A.

Figure 22A:
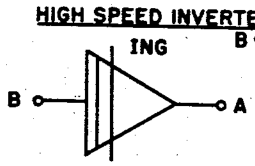
Figure 22B:
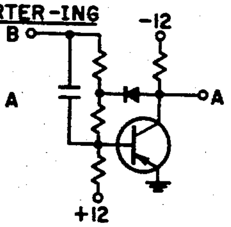

*High speed inverter amplifier ING.*—The logic symbol for amplifier ING is shown in Fig. 22A and a typical circuit represented by said symbol is shown in Fig. 22B. Amplifier ING is high speed by virtue of the fact that the base circuit of the transistor is clamped to the collector circuit of the transistor by a back-clamping diode. This back-clamping arrangement prevents the transistor from going into saturation so that its recovery time is of extremely short duration.

Figure 23A:
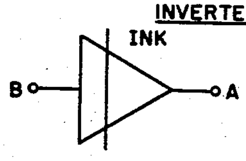
Figure 23B:
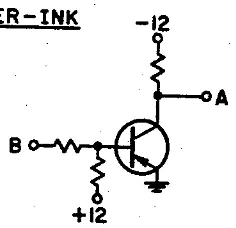

*Inverter amplifier INK.*—The logic symbol for amplifier INK is shown in Fig. 23A and a typical circuit represented by said symbol is shown in Fig. 23B. Amplifier INK differs from amplifier INA only in that the emitter electrode of the transistor is permanently returned to ground potential.

Figure 24A:
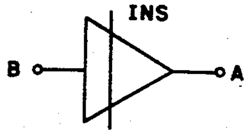
Figure 24B:
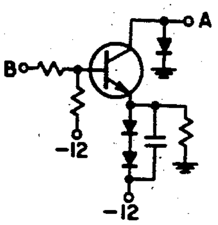

*Inverter amplifier INS.*—The logic symbol for amplifier INS is shown in Fig. 24A and a typical circuit represented by said symbol is shown in Fig. 24B. The transistor is normally biased for non-conduction since its emitter is held approximately 1.2 volts positive with respect to its base because of the voltage drop across the emitter circuit silicon diodes. It is to be noted that the biasing diodes are poled in the forward direction. Each of these diodes has a voltage drop of approximately .6 volt for all values of forward current above a minimum value and, of course, the diodes have a very low dynamic impedance when the transistor is rendered conductive.

Figure 25A:
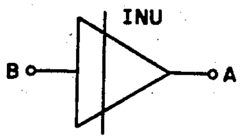
Figure 25B:
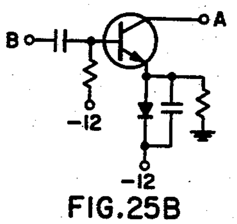

*Inverter amplifier INU.*—The logic symbol for amplifier INU is shown in Fig. 25A and a typical circuit represented by said symbol is shown in Fig. 25B. The transistor is normally non-conductive and is triggered conductive by the leading edge of a positive-going pulse or the trailing edge of a negative-going pulse.

Figure 26A:
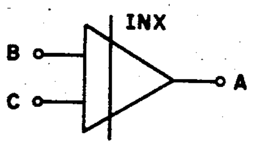
Figure 26B:
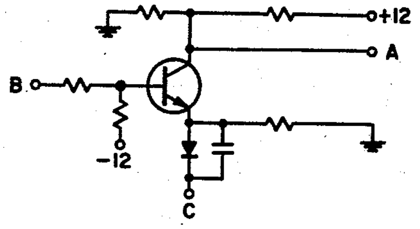

*Inverter amplifier INX.*—The logic symbol for amplifier INX is shown in Fig. 26A and a typical circuit represented by said symbol is shown in Fig. 26B.

Figure 27A:
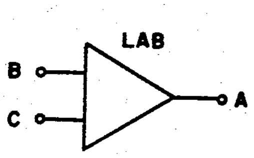
Figure 27B:
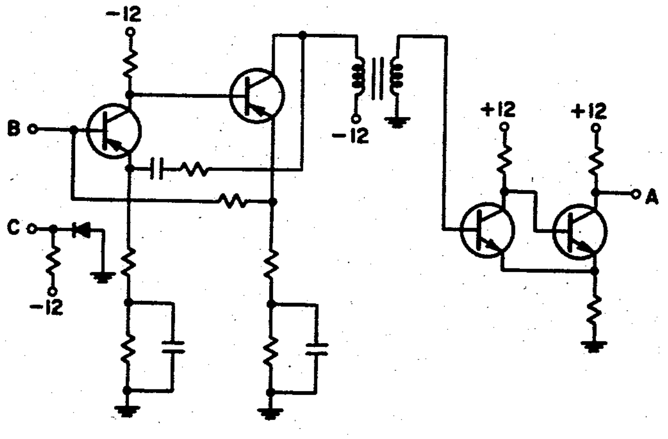

*Equalizer LAB.*—The logic symbol for equalizer LAB is shown in Fig. 27A and a typical circuit represented by said symbol is shown in Fig. 27B. The circuit comprises an amplifier, which is identical to previously described amplifier AUE, followed by an emitter coupled trigger circuit identical to the trigger circuit described in conjunction with converter CVB. The amplifier serves to amplify the signals applied across its input terminals B and C and the resulting amplified signals are applied to the input of the trigger circuit. The trigger circuit is triggered "on" during each positive half-cycle of the waveform applied thereto and serves to produce a series of positive-going square wave pulses at output terminal A.

Figure 28A:
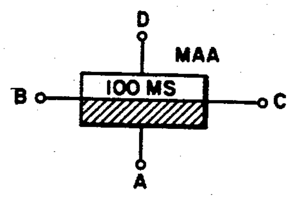
Figure 28B:
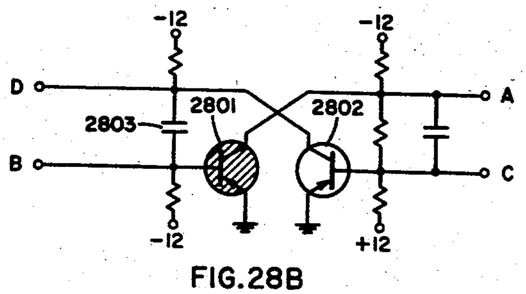

*Monostable multivibrator MAA.*—The logic symbol for multivibrator MAA is shown in Fig. 28A and a typical circuit represented by said symbol is shown in Fig. 28B. In the normal condition of the circuit, transistor 2801 is conductive, transistor 2802 is non-conductive, ground potential is applied to output terminal A, and negative potential is applied to output terminal D. The circuit is triggered into the condition in which transistor 2801 is non-conductive and transistor 2802 is conductive by the application of a positive pulse to either of the terminals B or D or by the application of a negative pulse to either of the terminals C or A. The circuit reverts to its normal condition only after cross-coupling capacitor 2803 has discharged to the point where the base of transistor 2801 again becomes negative. The duration of the positive-going pulse and the negative-going pulse at terminals D and A, respectively, is indicated in the upper portion of the logic symbol for each monostable circuit.

Figure 29A:
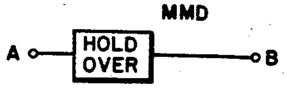
Figure 29B:
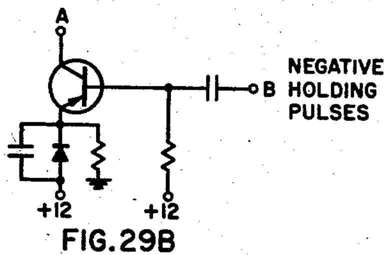

*Holdover circuit MMD.*—The logic symbol for holdover circuit MMD is shown in Fig. 29A and a typical circuit represented by said symbol is shown in Fig. 29B. Circuit MMD is designed to produce a substantially constant positive voltage at terminal A as long as recurring negative pulses, which may be of very short duration, are applied to terminal B. Circuit MMD is conventionally used with the monostable multivibrator MAA with terminal A of MMD being connected to terminal B of MAA. When used in this manner, transistor 2801 is held non-conductive as long as negative pulses are applied to terminal B of MMD and the monostable circuit MAA reverts to its normal condition after a period of time equal to its normal delay interval after positive potential is removed from terminal A of circuit MMD.

Figure 30A:
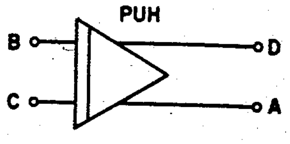
Figure 30B:
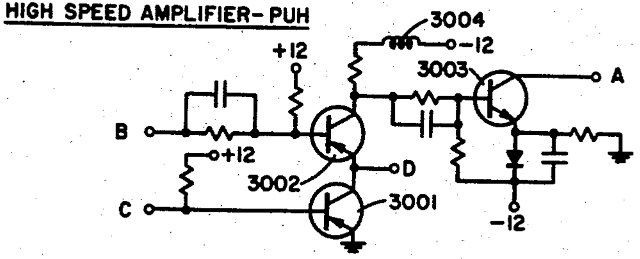

*High speed amplifier PUH.*—The logic symbol for amplifier PUH is shown in Fig. 30A and a typical circuit represented by said symbol is shown in Fig. 30B. Amplifier PUH is a high speed gated pulse amplifier which functions to amplify a negative-going pulse applied to terminal B only if a negative-going pulse is simultaneously applied to input terminal C. It can be seen that negative pulses applied to input terminal C are amplified and inverted by transistor 3001 and the resulting positive-going pulses are applied to output terminal D and to the emitter of transistor 3002. Positive-going pulses appearing at the collector of transistor 3002 are amplified and inverted by transistor 3003 and appear as negative-going pulses at the collector of transistor 3003 and output terminal A. Inductance element 3004 is included in the circuit for the purpose of quickly bringing transistors 3002 and 3003 out of saturation at the termination of each pulse.

Figure 31A:
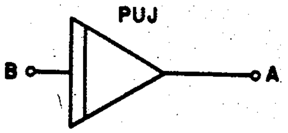
Figure 31B:
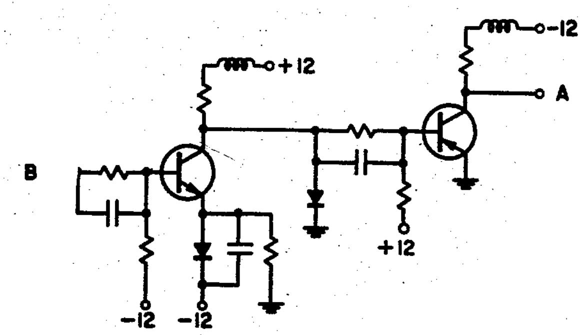

*High speed amplifier PUJ.*—The logic symbol for amplifier PUJ is shown in Fig. 31A and a typical circuit represented by said symbol is shown in Fig. 31B. Amplifier PUJ is a high speed amplifier which functions to amplify positive-going pulses applied to input terminal B. The input pulses are inverted twice and thus appear at output terminal A as amplified positive-going pulses.

Figure 32A:
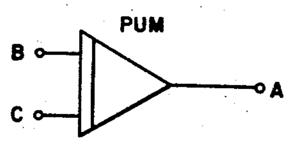
Figure 32B:
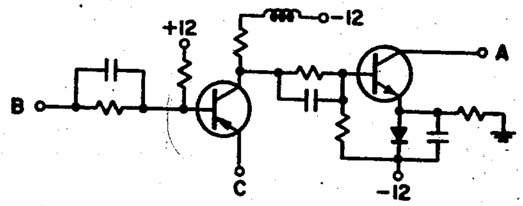

*High speed amplifier PUM.*—The logic symbol for amplifier PUM is shown in Fig. 32A and a typical circuit represented by said symbol is shown in Fig. 32B. Amplifier PUM is identical to amplifier PUH with the exception that PUM does not include a gating transistor corresponding to transistor 3001 in amplifier PUH.

Figure 33A:
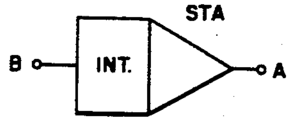
Figure 33B:
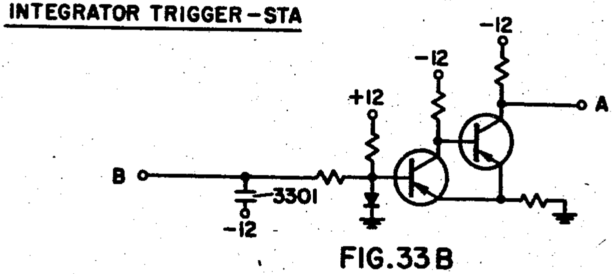

*Integrator trigger STA.*—The logic symbol for integrator trigger STA is shown in Fig. 33A and a typical circuit represented by said symbol is shown in Fig. 33B. The circuit comprises an integrator capacitor 3301 followed by an emitter coupled trigger circuit identical to the trigger circuit described in conjunction with converter CVB.

Figure 34A:
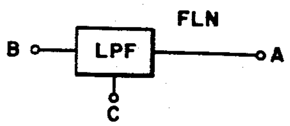
Figure 34B:
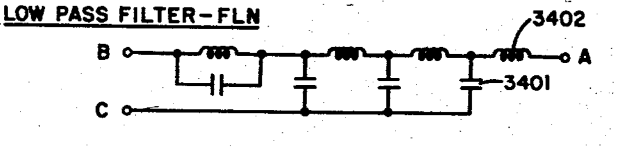

*Low pass filter FLN.*—The logic symbol for low pass filter FLN is shown in Fig. 34A and a typical circuit represented by said symbol is shown in Fig. 34B. As will be described in conjunction with the detailed description of the system circuits, capacitor 3401 and inductor 3402 are used in a series resonant circuit for the resonant transfer of speech and signaling information in the system.

Figures 35A, 35B:
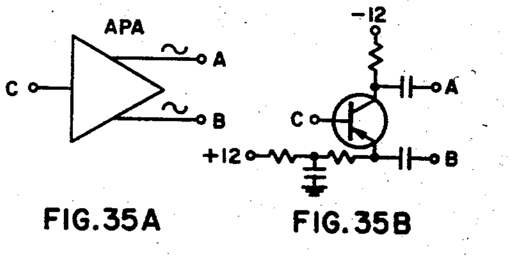

*Phase splitter APA.*—The logic symbol for phase splitter APA is shown in Fig. 35A and a typical circuit represented by said symbol is shown in Fig. 35B.

*Detailed description*

In the detailed drawings of the circuits comprising the long distance switching center of Figs. 2A–2F, the direct current potentials used in the system are shown as (+), (−), and a ground symbol, and in the detailed description of said circuits which follows, the direct current potentials are referred to as "positive," "negative," and "ground," respectively. In a tested embodiment of the discolsed system, the (+) terminal was a nominal twelve volts positive with respect to ground, and the (—) terminal was a nominal twelve volts negative with respect to ground.

Before proceeding to describe the operation of the circuits in detail, it is believed expedient to the understanding of the operation of the system to tabulate the various frequencies used for the transmission of supervisory and digit information in the illustrated system. The frequencies assigned for the various purposes are as follows:

| Digit | Transmitted Code | Acknowledge Code |
|---|---|---|
| 1 | VW | VW. |
| 2 | XW | XW. |
| 3 | UY | UY. |
| 4 | UV | UV. |
| 5 | XY | XY. |
| 6 | WY | WY. |
| 7 | VX | VX. |
| 8 | UW | UW. |
| 9 | VY | VY. |
| 0 | UX | UX. |

| | Supervisory Code | Acknowledge Code |
|---|---|---|
| Seize | S | Z. |
| Release | YZ | None. |
| Cancel | UZ | None. |
| Acknowledge Request | VZ | Z (From Local Office). |
| End of Call | VZ | None. |

In the tested embodiment of the system, the various letter designated frequencies had the following values: S=1700 c.p.s., U=1900 c.p.s., V=2100 c.p.s., W=2300 c.p.s., X=2500 c.p.s., Y=2700 c.p.s., and Z=2900 c.p.s. In addition to the above, the dial tone signal was a steady 600 c.p.s., the ring signal was a one second on-two seconds off 600 c.p.s., the line busy signal was one-half second on-one-half second off 600 c.p.s., and the local trunk busy signal was one-quarter second on-one-quarter second off 600 c.p.s.

Figure 37:
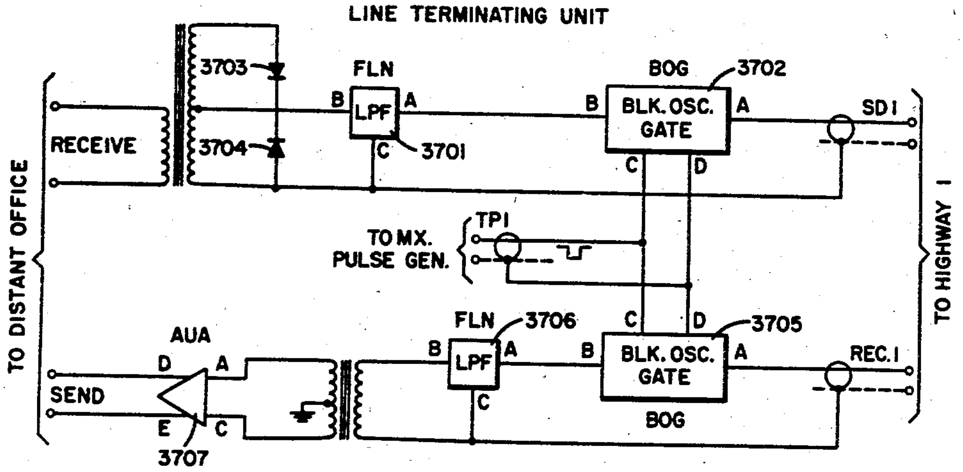
Fig. 37 shows a line terminating unit for use in a long distance switching center.

*Line terminating unit.*—A line terminating unit, identical to the line terminating unit shown in detail in Fig. 37, is used to terminate each trunk line from another long distance switching center, each trunk line from a local office, each service line, and to couple each long distance trunk line group tape announcement machine, the 120 I.P.M. busy tone generator, and the 60 I.P.M. tone generator to the transmission highway network of the illustrated telephone system. As illustrated, signals received over the receive conductors from a distant office, a service line subscriber station, a tape announcement machine, or from a busy tone generator are coupled to terminal B of low-pass filter 3701. The maximum voltage swing of the received signals is limited by back-to-back connected Zener diodes 3703 and 3704 so as to prevent false operation of blocking oscillator gate 3702.

As explained in the general description, each line terminating unit is permanently assigned a particular one of the thirty-two time division channels on a particular one of the six highway transmission networks provided in the system. The illustrated line terminating unit has been shown as permanently assigned time position channel 1 on highway 1. That is, blocking oscillator gates 3702 and 3705 are closed only during time position 1 in each frame of the recurring pulse frames generated by multiplex pulse generator 23, as determined by the connection of conductor TP1 to the C terminals of said gates, and the A terminals of gates 3702 and 3705 are connected to conductors SD1 and REC1, respectively, of highway 1.

In order to reduce the time division sampling loss to an absolute minimum, the disclosed system utilizes resonant transfer for the transmission of information between the various circuits of the system. It will be recalled from the general description that the signal samples transmitted over a highway conductor by a calling unit are received and demodulated in a control connector associated with the seize detector, a register, or the route selector, or are received and demodulated in a link connector depending upon how far the call has progressed. It will also be recalled from the description of low-pass filter FLN of Fig. 34B that the end elements of that conventional low-pass filter are used in a series resonant circuit for resonant transfer operation. When gate 3702 is closed in synchronism with the calling gate in a control connector or a link connector, a series resonant circuit is completed between the end elements of low-pass filter 3701 and the end elements of a duplicate low-pass filter in the receiving circuit over conductor SD1. If the period of time the gates remain closed is selected to be half the natural resonant period of oscillation of the end elements of said two above-mentioned filters, the energy in the storage capacitor in filter 3701, shown as capacitor 3401 in Fig. 34B, decreases to zero and the total charge now appears on the corresponding capacitor in the receiving low-pass filter. Thus, an energy transfer is completed between the storage capacitors with no loss, assuming, of course, ideal components and zero gate resistance. Thus, it can be seen that the storage capacitor in the transmitting low-pass filter must completely transfer its charge to the storage capacitor in the receiving low-pass filter during the sampling time and the capacitor in the receiving low-pass filter must completely distribute the received charge to the load during the remainder of the frame period so that its net charge is zero at the beginning of the next sampling period. As previously mentioned, the sampling time in the illustrated system is 1.25 microseconds and each frame is eighty microseconds in duration.

To further illustrate the operation of the resonant transfer system, assume that a connection has been extended from the illustrated line terminating unit to a selected line terminating unit through a link connector. It will be recalled from the general description that the link connector comprises a gate closed in synchronism with the gate associated with the calling unit and a gate closed in synchronism with the gate associated with the called unit. During time position 1 of each time position frame, gates 3702 and 3705 in the illustrated unit and the calling gate in the link connector are closed to transfer energy from the storage capacitor in low-pass filter 3701 to conductor SD1 and through the calling gate in the link connector to a storage capacitor in the link connector calling low-pass filter. Simultaneously therewith, energy is transferred from the storage capacitor in the link connector called low-pass filter through the link connector calling gate to conductor REC1 and through gate 3705 to the storage capacitor in low-pass filter 3706. Similarly, during the time position assigned to the called unit, energy is transferred from the called unit to the link connector called low-pass filter and from the link connector calling low-pass filter to the called unit.

The demodulated signal appearing at output terminal B of low-pass filter 3706 is thus a replica of the signal transmitted over the receive conductors of the called trunk line to the called unit. The demodulated signal appearing at terminal B of filter 3706 is amplified by amplifier 3707 and applied to the send conductors which extend either to a distant office or to a service line.

It is to be noted that the highway conductors, such as SD1 and REC1, and the multiplex carrying conductors are of the coaxial type. Shield ground for the highway conductors is derived from the highway clamping circuit of Fig. 46 and shield ground for the multiplex pulse carrying conductors is derived from the multiplex generator.

Figure 38:
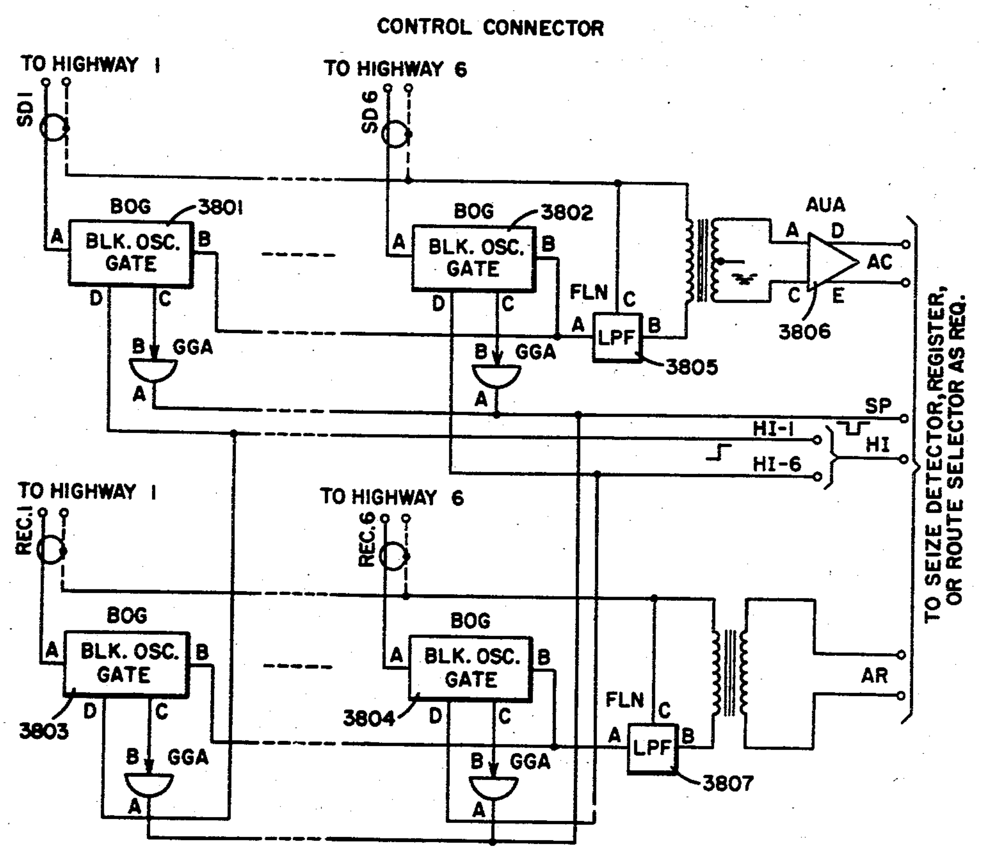
Fig. 38 shows a control connector for use in a long distance switching center.

*Control connector.*—The control connector, shown in Fig. 38 of the drawings, is used to connect the seize detector, a register, or the route selector to a selected time position channel on any one of the highway transmission networks. The illustrated control connector comprises six blocking oscillator gates, such as 3801 and 3802, for making connection to the send conductors and six blocking oscillator gates, such as 3803 and 3804, for making connection to the receive conductors of the six highway transmission networks provided in the illustrated system. The controlling circuit serves to apply ground potential to one of the highway identification conductors HI–1 to HI–6 to identify the highway to be connected to and the desired time position channel on that highway is identified by a negative-going time position pulse on conductor SP in each time position frame. Thus, the negative pulse on conductor SP is applied to terminal C of each of the blocking oscillator gates but effectively controls only the blocking oscillator gate which has its D terminal connected to the grounded highway identification conductor.

As used in the seize detector, only the six blocking oscillator gates corresponding to 3801 and 3802 are provided since it is necessary only to connect to the send conductors of the highways for the purpose of detecting a seize signal which marks the initiation of a call. Similarly, as used in the route selector, only the six gates corresponding to 3801 and 3802 are provided since it is necessary only to connect to the send conductors of the highways for the purpose of detecting a seize or release signal generated by a calling or called subscriber station and appearing in the time position channel assigned to the selected or called unit. In either case, the one of the gates corresponding to the highway permanently assigned to the desired unit is operated by each time position pulse applied to conductor SP. The energy transferred over the send conductor of the selected highway is passed through the operated gate and stored in the storage capacitor in low-pass filter 3805. The demodulated signal appearing at the output of low-pass filter 3805 is amplified by amplifier 3806 and coupled over conductors AC to either the seize detector control circuit or to the route selector circuit.

Both the send and receive blocking oscillator gates are provided in the control connectors associated with the registers of the system. A control connector for establishing connection to the calling unit and a control connector for establishing connection to the called unit are provided for each direct dialing register, a control connector for establishing connection to the calling unit is provided for each incoming register, and a control connector for establishing connection to the called unit is provided for the position register, as explained in the general description. Thus, in the register associated control connectors, both the send and receive gates corresponding to the highway permanently assigned to the desired unit are operated by each time position pulse applied to conductor SP. For example, if it is assumed that channel 24 on highway 1 is to be connected to, as signified by the application of a pulse in time position 24 to conductor SP and the application of ground potential to conductor HI–1, gates 3801 and 3803 are closed during time position 24 in each frame of pulses. As previously explained, signals appearing on conductor SD1 in time position 24 are passed by gate 3801, demodulated in low-pass filter 3805, amplified, and applied to conductor SC. Similarly, signals received over conductors AR from the controlling circuit are stored on the storage capacitor in low-pass filter 3807 and the energy stored in said capacitor is transmitted through gate 3803 to conductor REC1 in time position 24.

As previously stated, shield ground for the highway send and receive coaxial cables is derived from the highway clamping circuit.

*Seize detector control circuit.*—The seize detector control circuit, which is shown in Figs. 39 and 40 of the drawings, is provided in the system for the purpose of controlling the scanning of each idle one of the time position channels on each of the highway transmission networks in turn for seize signals and to transfer the identity of the channel on which a signal is detected to either an incoming register or to a direct dialing register depending upon whether the unit originating the call terminates a trunk line from another long distance switching center or a trunk line from a local office, respectively. As described in the general description, the seize detector control circuit comprises a slip counter which functions to gate out a particular time position pulse to the control connector associated with the seize detector for forty consecutive frames and to then gate out the next succeeding time position pulse and after all of the time position channels on a particular highway have been scanned, a highway counter in the circuit is advanced to mark the next succeeding highway to the control connector.

To illustrate the operation of the circuit, assume that the individual stages of the highway counter comprising flip-flops 3901, 3902, and 3903 are in the reset condition, as shown. Flip-flops 3901–3903 comprise a three-stage binary counter which serves to enable each of the six highway AND gates for negative signals, such as gates 3904 and 3905, in turn to pass a negative signal. The highway counter is returned to its reset condition when the seventh setting of the three-stage counter is reached since all inputs to gate 3906 are negative at that time and delay multivibrator 3907 is triggered to apply a one hundred microsecond ground potential pulse to terminal G of each of the flip-flops 3901–3903 and thus restore said flip-flops to their reset condition. When the counter is in its illustrated setting, all inputs to highway gate 3904 are negative and amplifier 3908 is conductive, ground potential appears at terminal A of amplifier 3908, as denoted by the fact that the symbol representing amplifier 3908 is shaded, and is applied to highway identification conductor HI–1 and to the B terminal of gate 3909. As previously described, ground potential applied to conductor HI–1 serves to identify highway 1 as the highway to be connected to by the control connector associated with the seize detector.

The ground potential applied to terminal B of gate 3909 is coupled through said gate and serves to hold amplifier 3910 non-conductive so that its output signal is negative and clamping diode 3911 is, therefore, biased in the reverse direction. It is to be noted that the other five highway amplifiers, such as 3912, are non-conductive at this time so that the corresponding highway identification conductor is negative, the amplifier corresponding to 3913 is conductive, and ground potential is coupled through the clamping diode corresponding to 3914 to clamp the output of the corresponding busy test amplifier 3916 to ground potential regardless of the condition of the corresponding busy test conductor.

The busy test conductors BT1–BT6 carry pulses in the time position of all busy units in the switching center That is, all busy units associated with highway 1 are identified by negative-going pulses in their respective time positions on conductor BT1 while all busy units associated with highway 6 are identified by negative-going pulses in their respective time positions on conductor BT6. As explained in the general description, the pulses on conductors BT1–BT6 are applied by either a register or a link circuit. In the assumed case, where highway 1 is being scanned, all inputs to the OR gate for negative signals 3917 except input B are at ground potential and amplifier 3918 is held conductive by the negative signal appearing at terminal A of amplifier 3915 except during the receipt of a busy pulse over conductor BT1. Each negative busy pulse received on conductor BT1 is inverted by amplifier 3915 and amplifier 3918 is thereby rendered non-conductive to apply a negative pulse to input terminal C of the gated pulse amplifier 4001. Thus, pulse amplifier 4001 is gated to amplify all negative-going pulses applied to its input terminal B except when a negative pulse corresponding to a busy pulse is applied to its input terminal C. The pulses applied to terminal B of amplifier 4001 are generated by the slip pulse counter provided in the circuit, as will be explained below. Highway marking is not applied to the conductors of the calling highway identification busbars at this time since the C terminal input of the six AND gates for negative signals, such as 3919 and 3920, are held at ground potential by normally conductive amplifier 4002.

The slip counter includes a five-stage closed ring binary counter comprising flip-flops 4003–4007, inclusive, which counter, of course, has thirty-two settings. The binary counter is advanced by the trailing edge of each negative-going 400 kc. pulse received from the master pulse source and amplified by amplifier 4015 except when a blanking pulse is received from amplifier 4008, as will be explained below. Since the 400 kc. pulse source also drives the multiplex pulse generator of the system, each negative-going 400 kc. pulse corresponds to a particular time position pulse.

The output signals from the stages of the binary counter are combined in gate 4009, which is an AND gate for negative signals, so that a negative signal is applied to input terminal C of amplifier 4010 only when the binary counter is in a particular one of its thirty-two settings. To further illustrate the operation of the slip counter, assume that the previous operation is such that the gate 4009 is now negative during time position 20. That is, the binary counter is advanced to its particular one setting by the trailing edge of the 400 kc. pulse corresponding to time position 19 so that all inputs to gate 4009 are negative. When the next negative-going 400 kc. pulse, which corresponds to time position 20, is received, the pulse is amplified by enabled amplifier 4010 and applied to the B terminal of amplifier 4001. If time position 20 on highway 1 is not busy, as denoted by the application of ground potential to terminal C of amplifier 4001 as previously described, the negative pulse is amplified by amplifier 4001 and coupled over conductor SP–SD to the control connector associated with the seize detector. At the termination of the negative-going pulse in time position 20 from the 400 kc. generator, the binary counter is advanced to its next setting, the output of gate 4009 goes to ground, and amplifier 4010 is blocked. The binary counter then counts thirty-one more of the 400 kc. pulses before again arriving at its particular one setting which causes the output of gate 4009 to go negative so as to enable amplifier 4010 to again amplify the receive pulse in time position 20. The described operation continues until a blanking pulse appears at the output of amplifier 4008.

It can be seen that time position pulse 32 from the multiplex pulse generator is amplified by amplifier 4011 and applied to frequency divider circuit 4012, which may be of any well known type but is preferably a six-stage binary counter with its count reduced to forty. Thus, circuit 4012 serves to count the pulses in time position 32 and at the termination of each fortieth frame of pulses, a negative pulse in time position 32 is applied to terminal C of gate 4013, which is an AND gate for negative signals. Since all inputs to gate 4013 are negative, if flip-flop 3921 is in its reset condition as shown, the negative pulse in time position 32 is inverted and amplified by amplifier 4014 and a positive-going pulse in time position 32 appears at the output of amplifier 4008. Thus, terminal A of amplifier 4015 is clamped at ground potential so that no pulse appears at that terminal in time position 32 and the binary counter is thereby prevented from stepping at the termination of the thirty-second time position pulse. The operation now continues as previously described except that the particular one setting of the binary counter now corresponds to time position 21 and the negative pulse appearing at the output of amplifier 4010 is now in time position 21. Thus, it can be seen that the slip counter serves to generate a pulse in a particular time position for forty consecutive frames and then slips one step so that a pulse in the next succeeding time position is generated during the next forty pulse frames.

The pulses produced at the output of amplifier 4010 advance in order through time position 32 and then return to time position 1. The first pulse in time position 32 appearing at the output of amplifier 4010 is gated through gate 4016, which is an AND gate for negative signals, since conductor TP32 from the multiplex pulse generator and terminal D of flip-flop 3921 are also negative at this time. Amplifier 4017 is rendered conductive by the negative pulse coupled through gate 4016 and the resulting positive-going potential swing at the output of said amplifier is coupled through gate 4018 to set the highway counter control flip-flop 4019. When flip-flop 4019 is set, terminal D of that flip-flop goes to ground and the highway counter comprising flip-flops 3901–3903 is advanced to mark highway 2. The positive-going potential at the output of amplifier 4017 is also applied to terminal G of flip-flop 4020 to reset that flip-flop, the operation of which will be described below. Thirty-nine more pulses in time position 32 appear at the output of amplifier 4010 and amplifier 4017 is rendered conductive by each of said pulses but without effect since flip-flop 4019 is already in its set condition. When the time position of the sampling pulse produced at the output of amplifier 4010 has advanced to time position 15, all inputs to gate 4021 are negative and amplifier 4022 is rendered conductive to reset the highway counter control flip-flop 4019. Amplifier 4022 is, of course, rendered conductive by each of the pulses in time position 15 but has no effect after flip-flop 4019 has been reset by the first pulse in time position 15.

To briefly review the operation up to this point, a pulse in a particular time position appears at the output of amplifier 4010 for forty consecutive frames, the pulse is applied to conductor SP–SD only if that particular time position on the highway being scanned is not marked busy by a pulse in that time position on the corresponding one of the busy test conductors BT1–BT6, and each time that the slip counter advances to time position 32, the highway counter is advanced to mark the next succeeding highway to the control connector. If there are no calls being initiated at this time, the control connector associated with the seize detector is controlled to connect to time position channels 1–32 on highway 1 in order, to then connect to time position channels 1–32 on highway 2 in order, and after the channels on highway 6 have been scanned, to return to highway 1.

Any signals appearing on the channel being scanned by the control connector are demodulated by the low-pass filter in the control connector, as previously described, and coupled over conductors AC–SD to seize signal detector 3922, which may be of any well known type and which is designed to produce a positive-going output signal only if a seize signal of a particular frequency is detected. When a seize signal, which may be a 1,700 c.p.s. tone for example, is detected by seize detector 3922 and the output signal from said detector goes from negative to ground, flip-flop 3921 is set and ground potential appears at terminal D of flip-flop 3921. When terminal D of flip-flop 3921 goes to ground, gate 4013 is immediately blocked so that slip pulses cannot be coupled to the slip counter and the slip counter therefore continues to generate the time position pulse corresponding to the channel on which the seize signal was detected. Also when terminal D of flip-flop 3921 goes to ground, a negative connect demand signal is applied to either conductor IRCD, which extends to the incoming register allotter, or to conductor DRCD, which extends to the direct dialing register allotter, depending upon whether the channel on which a seize signal was detected is the channel assigned to a unit terminating a trunk line from another long distance switching center or is the channel assigned to a unit terminating a trunk line from a local office or a service line, respectively.

It will be recalled from the general description that the line terminating units terminating trunk lines from local offices are assigned time positions 1–10 on highways 1–6, service lines are assigned time position 11 on highways 1–4, and that terminating units terminating trunk lines from other long distance switching centers are assigned time positions 12–28 on the highways. It will also be recalled that amplifier 4017 is rendered conductive when a pulse in time position 32 appears at the output of amplifier 4010 to operate flip-flop 4020 to its reset condition. With flip-flop 4020 in its reset condition, amplifier 4023 is held conductive and conductor IRCD is held at ground potential regardless of the operated condition of flip-flop 3921. When a seize signal is detected and flip-flop 3921 is set so that its D terminal goes to ground, both of the amplifiers 4025 and 4026 become non-conductive. A negative connect demand signal is now applied to conductor DRCD since amplifier 4024 is non-conductive but conductor IRCD remains at ground potential because of the conductive condition of amplifier 4023, as previously explained. Thus, the calling unit is identified within the seize detector control circuit as either a unit terminating a trunk line from a local office or a service line and connection to a direct dialing register is therefore demanded.

It can be seen that the first pulse in time position 12 appearing at the output of amplifier 4010 is coupled through gate 4027 to render amplifier 4028 conductive and thus set flip-flop 4020. Thus, amplifier 4023 becomes non-conductive and amplifier 4024 becomes conductive so that if a seize signal is detected on any one of the channels 12–32, a negative connect demand signal is applied to conductor IRCD rather than to conductor DRCD. Under these conditions, the calling unit is identified within the seize detector control circuit as a unit terminating a trunk line from another long distance switching center and connection to an incoming register is therefore demanded.

When a positive-going demand answer signal is received on either conductor IRDA from the incoming register allotter or on conductor DRDA from the direct dialing register allotter, the output of gate 4029, which is an OR gate for positive signals, goes to ground and amplifier 4002 is rendered non-conductive. When amplifier 4002 becomes non-conductive, amplifier 4030 become conductive to apply ground potential to the C terminal of pulse amplifier 4031. The pulses in the time position of the calling line appearing at the output of amplifier 4010 and applied to terminal B of amplifier 4031 are now amplified by amplifier 4031 and applied to calling slot pulse identification conductor CSP–I. As described in the general description, pulses applied to conductor CSP–I are inverted and regenerated by the slot pulse regeneration circuit and routed to the various circuits of the system. Also when amplifier 4002 becomes non-conductive, the six highway readout gates corresponding to 3919 and 3920 are enabled and the output of the gate corresponding to the highway to which the calling unit is assigned goes negative to render a unique combination of two out of four of the amplifiers 3923–3926 conductive and thus mark two out of the four conductors of the calling highway identification busbars CHI with ground potential. For example, if it is assumed that the calling unit is assigned a time position channel on highway 1, a negative potential appears at the output of gate 3919 when amplifier 4002 becomes non-conductive and amplifiers 3923 and 3924 are thereby rendered conductive.

When the time position and highway identification of the calling unit has been read into storage circuits in either the direct dialing register or the incoming register allotted to handle the call, the time position of the calling unit is marked by a busy pulse on the appropriate one of the conductors BT1–BT6 by the register and amplifier 4001 is thereafter blocked during that time position. The control connector is therefore no longer connected to the time position channel of the calling unit and the output signal from seize detector 3922 decays to zero. After a short delay, the demand answer signal is removed from either conductor DRDA or IRDA, as the case may be, and when negative potential is reapplied to said conductor, amplifier 4002 is rendered conductive to block pulse amplifier 4031 and highway readout gates 3919–3920. The time position and highway identification marking is thereby removed from the calling identification busbar conductors CSP–I and CHI. Also, when amplifier 4002 again becomes conductive, a positive-going pulse is coupled to terminal A of flip-flop 3921 to reset that flip-flop. When terminal D of flip-flop 3921 goes negative, the connect demand signal is removed from either conductor IRCD or conductor DRCD and gate 4013 is unblocked so that the next succeeding slip pulse appearing at the output of frequency divider 4012 controls the binary counter to skip a pulse so that the scanning operation is resumed.

*Register allotter.*—The register allotter shown in Figs. 41 and 42 is used as either the incoming register allotter or the direct dialing register allotter in the illustrated system. The allotter comprises a stage of equipment individual to each of the registers, such as the equipment labeled stage 1–stage N in Fig. 41 and the equipment of Fig. 42 which is common to all of the registers. The purpose of the register allotter is to assign each of its associated registers for use in turn, to control the assigned register to read in calling unit identification information applied to the calling identification busbars by the seize detector, and to then assign the next idle register for use on the next initiated call.

To illustrate the operation of the register allotter, assume that the register allotter has just completed a cycle of operation in which an assigned register was controlled to read in calling unit identification information and is now searching for an idle register for the purpose of preallotting that register for use on the next call. The register allotter is controlled to search for an idle register under control of a common scanner generator, as explained in the general description. The scanner generator serves to apply a negative signal to each of the conductors X1–XN one at a time and in turn. The scanner generator is stepped by the positive-going portion of a 6.25 kc. square wave and a negative potential appears on the X1–XN conductors in turn in synchronism with the positive-going portion of the 6.25 kc. square waveform received over conductor CDR. The 6.25 kc. pulses on conductors CDR and ICDR, which may be generated by any well known square wave generator, are used as timing pulses throughout the system. The pulses appearing on conductor ICDR are the inverse of the pulses appearing on conductor CDR.

Referring to stage 1 of Fig. 41, it can be seen that the AND gate for negative signals 4101 has four inputs which are respectively connected to conductor X1, busy-free conductor BF1, which extends to register 1, the E terminal of alarm flip-flip 4102, and the A terminal of input blocking amplifier 4201. If when negative potential is applied to conductor X1 by the scanner generator, the first register is marked as idle by negative potential on conductor BF1, the alarm flip-flip 4102 is in its reset condition, and input blocking amplifier 4201 is non-conductive, amplifier 4103 becomes conductive, and flip-flip 4104 is triggered to its set condition. If, on the other hand, the first register is busy as denoted by ground on conductor BF1, flip-flip 4104 is not triggered and the allotter is advanced to check the busy condition of the second register when a negative signal is applied to conductor X2 by the scanner generator.

Assuming that the first register is idle and that flip-flip circuit 4104 is therefore set, ground potential at terminal E of flip-flip 4104 is coupled through diode 4105, which forms one input of an N input OR gate for positive signals with one input of said gate in each of the stages 1–N, and amplifier 4202 in the input block circuit is rendered non-conductive. With amplifier 4202 non-conductive, all inputs to gate 4203, which is an AND gate for negative signals, are negative during the next occurring negative portion of the waveform on conductor CDR. When the waveform on conductor CDR again goes to ground, a positive-going pulse is applied to terminal C of flip-flip 4204 and flip-flip 4204 is thereby triggered to its set condition. When terminal D of flip-flip 4204 goes negative, amplifier 4201 becomes conductive and ground potential is applied to terminal E of the gate corresponding to 4101 in each of the register allotter stages. Thus, the assignment of a single register is assured since when a register is assigned, the input gates to all of the register allotter stages are blocked. the register allotter remains in the just described condition until such time as a connect demand signal is received over conductor RCD from the seize detector control circuit.

When a negative-going connect demand signal is applied to conductor RCD by the seize detector control circuit, a negative output is obtained from gate 4205 during the next occurring negative portion of the square waveform on conductor ICDR if ground potential is not applied to allotter inhibit conductor AI by the route selector or negative potential is not applied to all links busy conductor ALB by the link allotter. It will be recalled from the general description that the route selector applied ground to conductor AI whenever the route selector is controlling one of the registers to read in or controlling one of the registers to read out and one of the links to read in unit identification information over the common busbars and that the link allotter functions to apply negative potential to conductor ALB for the purpose of preventing the further storage of calls when all links in the system are busy. Negative potential applied to conductor ALB, of course, renders amplifier 4206 conductive and ground potential is applied to terminal E of gate 4205 to block said gate.

Assuming that all inputs to gate 4205 are negative, a negative output is obtained from the gate and coupling capacitor 4207 is thereby discharged. Now, when the waveform on conductor ICDR returns to ground, a positive-going pulse is coupled to terminal C of flip-flip 4208 and flip-flip 4208 is triggered to its set condition. When terminal E of flip-flip 4208 goes to ground, gate 4205 is blocked at input G, amplifier 4209 is rendered non-conductive, and negative potential is thereby applied to terminal B of gate 4106. Since both inputs to gate 4106, which is an AND gate for negative signals, are negative, amplifier 4107 is rendered conductive to apply ground potential to conductors RC1 and RDA. Ground potential applied to conductor RDA, which extends to the seize detector control circuit, controls the seize detector control circuit to read out the calling unit identification information to the calling identification busbars and ground potential applied to conductor RC1, which extends to register 1, controls register 1 to read in said identification information.

It will be recalled that flip-flip 4208 is triggered to its set condition by the leading edge of a positive-going signal on conductor ICDR. Eighty microseconds later when the waveform on conductor ICDR goes negative, all inputs to gate 4210 are negative, and after another eighty microsecond period, the waveform on conductor ICDR goes to ground, a positive-going pulse is applied to terminal C of flip-flip 4211, and flip-flip 4211 is triggered to its set condition. When flip-flip 4211 is set, terminal E of that flip-flip goes to ground to block gate 4210 and lead D of that flip-flip goes negative to enable gates 4212 and 4213, which are both AND gates for negative signals. Also when flip-flip 4208 is triggered to its set condition, gate 4214 is enabled by the negative potential at the D terminal of that flip-flip. Thus when conductor ICDR goes negative and then returns to ground potential, a positive-going pulse is applied to terminal B of flip-flip 4208 to trigger said flip-flip to its reset condition. When flip-flip 4208 is reset, amplifier 4209 becomes non-conductive, gate 4106 is blocked, amplifier 4107 becomes non-conductive, and ground potential is removed from conductors RC1 and RDA. Thus, it can be seen that a demand answer signal is applied to conductor RDA and a read in signal is applied to conductor RC1 for a period of one hundred and sixty microseconds. The connect demand signal is removed from conductor RCD by the seize detector control circuit in response to the removal of the demand answer signal from conductor RDA and gate 4205 is thereby blocked from further operation.

When negative potential again appears on conductor IRCD, eighty microseconds after flip-flips 4211 and 4208 are set and reset, respectively, amplifier 4215 becomes conductive through gate 4212, amplifier 4216 becomes non-conductive, and negative potential is applied to terminal B of gate 4217 and to terminal C of gate 4108. Gate 4108 is provided in the circuit for the purpose of ascertaining whether or not the register goes busy. In normal operation, the register should go busy when the calling unit identification information is read into its storage circuits and, under these conditions, ground potential is applied to conductor BF1 so that the output of gate 4108 remains at ground when amplifier 4216 becomes non-conductive. If the register should fail to go busy and negative potential therefore appears on conductor BF1 when amplifier 4216 becomes non-conductive, amplifier 4109 becomes conductive and the alarm flip-flip 4102 is triggered to its set condition. When terminal E of flip-flip 4102 goes to ground, any suitable alarm device is energized through gate 4110 and input gate 4101 is blocked at its terminal E to prevent further assignment of register 1. Alarm flip-flip 4102 is triggered to its reset condition only when a positive pulse is applied by a key or any other suitable means to the manual reset conductor.

Regardless of whether the register is marked idle or busy when the above-described test is made, the next occurring positive excursion on conductor ICDR serves to reset flip-flip 4211 through gate 4213, amplifier 4215 is rendered non-conductive by ground potential coupled through gate 4212, amplifier 4216 becomes conductive, and flip-flip 4218 is triggered to its set condition through gate 4217. When terminal D of flip-flip 4218 goes negative, both inputs to gate 4219 are negative since conductor CDR stands at negative potential at this time, so that flip-flip 4219 will be triggered to its reset condition when conductor CDR goes to ground eighty microseconds later. The eighty microsecond negative pulse at terminal D of flip-flip 4218 renders amplifier 4220 conductive for that period of time and a ground potential pulse is applied to terminal A of flip-flip 4204 and to terminal G of flip-flip 4104 to trigger those flip-flips to their reset condition. When flip-flip 4204 is reset and its terminal D goes to ground, amplifier 4201 becomes non-conductive and the input gate in each register allotter stage is enabled so that the allotter can now preallot the next idle register for use on the next initiated call.

*Register finder.*—The register finder shown in Figs. 43 and 44 is provided in the system for the purpose of controlling the one at a time connection of the registers to the single route selector provided in the system. The register finder comprises a stage of equipment individual to each of the direct dialing registers, incoming registers, and position register, such as the equipment labeled stage 1–stage N in Fig. 43, and the equipment of Fig. 44 which is common to all of the registers.

The register finder is controlled to search for a register demanding connection to the route selector under control of a common scanner generator which, as previously described, serves to apply a negative pulse to each of the conductors X1–XN, in turn, in synchronism with the positive-going portion of the 6.25 kc. square waveform appearing on conductor CDR. Referring to stage 1 of Fig. 43, it can be seen that the AND gate for negative signals 4301 has four inputs which are respectively connected to conductor X1, finder connect demand conductor FCD1, which extends to register 1, the E terminal of alarm flip-flip 4302, and the A terminal of the input blocking amplifier 4401. If when negative potential is applied to conductor X1 by the scanner generator, the first register is demanding connection to the route selector as denoted by negative potential on conductor FCD1, the alarm flip-flip 4302 is in its reset condition, and input blocking amplifier 4401 is non-conductive, amplifier 4303 becomes conductive and flip-flip 4304 is triggered to its set condition. If, on the other hand, the first register is not demanding connection to the route selector as denoted by ground potential on conductor FCD1, flip-flip 4304 is not triggered and the register finder is advanced to check the condition of the connect demand conductor individual to the second register when a negative signal is applied to conductor X2 by the scanner generator.

Assuming that the first register is demanding connection at the time it is scanned and flip-flip 4304 is therefor set, ground appearing at terminal E of flip-flip 4304 is coupled through diode 4305, which forms one input of an N-input OR gate for positive signals with one input of said gate in each of the stages 1–N, and amplifier 4402 is rendered non-conductive. With amplifier 4402 non-conductive, all inputs to gate 4403 are negative during the next occurring negative portion of the waveform on conductor CDR. When the waveform on conductor CDR again goes to ground, a positive-going pulse is applied to terminal B of flip-flop 4404 and flip-flop 4404 is thereby triggered to its set condition. When terminal C of flip-flop 4404 goes negative, amplifier 4401 becomes conductive and ground potential is applied to terminal F of the gate corresponding to 4301 in each of the register finder stages. Thus, it can be seen that the register finder scans each of the registers in turn for a connect demand signal and stops on a particular register only if that register is demanding connection to the route selector. The assignment of a single register is assured since when a register is assigned, the input gates of all of the register finder stages are blocked.

When terminal E of flip-flip 4304 goes to ground, amplifier 4306 is rendered non-conductive and negative potential is applied to terminal B of gate 4307. Since flip-flop 4405 is in its reset condition at this time, both inputs to gate 4307 are negative and a negative demand answer signal is applied to conductor FDA1, which extends to the first register. It will be recalled from the general description that there are three general types of operation which may occur as a result of the transmission of a demand answer signal to the register demanding connection. If a direct dialing register or a position register has been assigned by the register finder and digit information is transmitted from the register to the route selector, the route selector will apply a read in signal to conductor RTD so that the selected called unit identification is read back into the register. If digit information is transmitted from an incoming register to the route selector or if a call has been completed by a direct dialing register and it is necessary to transfer the identity of the called unit to a link circuit, the route selector will apply a write-read signal to conductor WRO. And, finally, if the position register has completed a call and it is necessary to transfer the identity of the called unit to the link circuit over which the call was originally extended to the operator, a signal is applied to conductor KWF under control of the position register.

First assume that an incoming register has been assigned by the register finder and is transmitting digit information to the route selector. The route selector selects an idle unit in accordance with the digit marking and approximately eighty milliseconds after a demand answer signal is forwarded to the register, the route selector serves to apply ground to allotter inhibit conductor AI and amplifiers 4406 and 4407 in the illustrated circuit are thereby rendered non-conductive. After a delay of three hundred and twenty microseconds, negative potential is applied to conductor WRO by the route selector and since both inputs to gate 4408 are now negative, amplifier 4409 is rendered conductive. The incoming register and the assigned link circuit are controlled by the negative potential on conductor WRO to read out and read in the calling unit identification information, respectively, and the selected called unit identification information is read out of the route selector and into the link circuit. If the information is read in by the link circuit, negative potential is applied to conductor LM by the link allotter approximately eighty microseconds after potential is applied to conductor WRO by the route selector. When negative potential is applied to conductor LM, amplifier 4410 in the illustrated circuit is rendered conductive since its C terminal is returned to ground. When amplifier 4410 becomes conductive, flip-flip 4405 is triggered to its set condition and gate 4307 is blocked to terminate the transmission of a demand answer signal to register 1. When the demand answer signal is removed from conductor FDA1, potential is removed from conductors AI, WRO, and LM. Since the subsequent operation in the illustrated circuit is identical for all types of calls, it is believed advisable to describe the other types of calls up to the same point before describing the subsequent operation in the illustrated circuit.

The only difference in operation from the above when a direct dialing register has completed a call and it is necessary to transfer the calling and called unit identification information to the assigned link circuit is that ground potential appears on conductor AI immediately after a demand answer signal is transmitted to the register rather than after a delay of eighty milliseconds.

Next assume that a direct dialing register or the position register has been assigned by the register finder and is transmitting digit information to the route selector. The route selector selects an idle unit in accordance with the digit marking and approximately eighty milliseconds after a demand answer signal is forwarded to the register, the route selector applies ground potential to allotter inhibit conductor AI and amplifiers 4406 and 4407 are rendered non-conductive, as described above. After a delay of three hundred and twenty microseconds, negative potential is applied to conductor RTD by the route selector and since both inputs to gate 4411 are now negative, amplifier 4412 becomes conductive, and normally set flip-flip 4413 is triggered to its reset condition. Since negative potential is applied to conductor RTD in synchronism with the leading edge of a negative-going signal on conductor CDR, conductor ICDR and the B terminals of gates 4414 and 4415 are at ground potential and the negative potential at terminal E of flip-flip 4413 has no effect on gates 4414 and 4415 at this time. However, when conductor ICDR goes negative and then returns to ground, a positive-going pulse is coupled through gate 4414 to trigger flip-flip 4405 to its set condition and a positive-going pulse is coupled through gate 4415 to trigger flip-flip 4413 to its normal set condition. Thus, one hundred and sixty microseconds after potential is applied to conductor RTD, flip-flip 4405 is triggered to its set condition and the transmission of a demand answer signal is terminated in the same manner as described above.

The only difference in operation from that just described when the position register is assigned by the register finder and called unit identification information is to be transferred to the link circuit over which the call to the operator was established is that a negative signal is applied to conductor KWF rather than to conductor RTD. Under these conditions, amplifier 4412 is rendered conductive through gate 4424 and in the same manner as described above, flip-flip 4413 is triggered to its reset condition, and one hundred and sixty microseconds later, flip-flip 4405 is triggered to its set condition.

It will be recalled that when flip-flip 4405 is triggered to its set condition, the ground at terminal E of that flip-flip blocks gate 4307 so as to terminate the transmission of a demand answer signal. In addition, the negative potential at terminal D of flip-flip 4405 is applied to terminal C of gate 4425. Since the leading edge of the positive-going portion of the waveform on conductor ICDR triggered flip-flip 4405, conductor CDR is negative at this time. Therefore, eighty microseconds later when conductor CDR goes to ground, flip-flip 4416 is triggered to its set condition through gate 4425 to apply negative potential to terminal C of gate 4417. When conductor CDR goes negative, after another delay of eighty microseconds, amplifier 4418 becomes conductive and amplifier 4419 is rendered non-conductive.

When amplifier 4419 becomes non-conductive, negative potential is applied to terminal B of gate 4420 and to terminal D of gate 4308. Gate 4308 is provided in the circuit for the purpose of ascertaining whether or not the connect demand signal is removed from conductor FCD1 by the register following the removal of the demand answer signal from conductor FDA1. Under normal operating conditions, conductor FCD1 will be at ground potential so that the output of gate 4308 remains at ground when amplifier 4419 becomes non-conductive. If the register should fail to remove the negative connect demand signal from conductor FCD1 before amplifier 4419 becomes non-conductive, amplifier 4309 becomes conductive and the alarm flip-flip 4302 is triggered to its set condition. When terminal E of flip-flip 4302 goes to ground, any suitable alarm device is energized through gate 4310 and input gate 4301 is blocked at its terminal E to prevent further assignment of register 1. Alarm flip-flip 4302 is triggered to its reset condition only when a positive pulse is applied by a key or any other suitable means to the manual reset conductor.

Regardless of whether or not the connect demand signal is present when the above-described test is made, the next occurring positive excursion on conductor CDR serves to render amplifier 4418 non-conductive and amplifier 4419 conductive. When terminal A of amplifier 4419 returns to ground, a positive-going pulse is coupled through gate 4420 to trigger flip-flop 4421 to its set condition. When flip-flop 4421 is set and negative potential appears at its terminal C, amplifier 4422 becomes conductive to reset flip-flop 4404, flip-flip 4405, flip-flip 4416, and flip-flip 4304. When flip-flip 4405 is reset, negative potential is applied to terminal C of gate 4423 so that the next occurring positive-going excursion on conductor ICDR triggers flip-flop 4421 to its reset condition. When flip-flop 4404 is reset and its terminal C goes to ground, amplifier 4401 becomes non-conductive and the input gate in each register finder stage is enabled so that the finder resumes its searching operation.

*Slot pulse regeneration circuit.*—The slot pulse regeneration circuit, which is shown in Fig. 45, is provided in the system for the purpose of regenerating the calling and called unit time position identifying pulses received over the input conductors CSP–I and TSP–I, respectively. It will be recalled from the general description that the registers and the link circuits each comprise a time slot storage counter for storing the time position identity of the calling unit and/or the called unit. Each time slot storage counter is arranged to be triggered by a single set pulse, to thereafter count the pulses received from the master 400 kc. pulse generator, and to gate out each succeeding thirty-second pulse received from said master pulse generator. Since the time slot storage counters each comprise a counter having thirty-two settings and since there are thirty-two time position channels, the pulses gated out by each time slot storage counter will correspond in time position to the particular pulse which was used to set that circuit. Since the pulses appearing on the input conductors CSP–I and TSP–I are only 1.25 microseconds in duration, it is not desirable to utilize those pulses directly to set the appropriate time slot storage counters. Rather, the time slot storage counters are preset to their first step and the trailing edge of the input pulse is utilized to set a particular counter. Thus, the counter serves to gate out the thirty-first pulse occurring after the set pulse on its first cycle of operation and thereafter functions to gate out each succeeding thirty-second pulse.

It can be seen that the 400 kc. square waveform from the master pulse generator is applied to the input terminals of emitter followers 4501 and 4502 and that input leads CSP–I and TSP–I are connected through resistors 4503 and 4504 to the A terminals of amplifiers 4501 and 4502, respectively. As long as there is no negative pulse applied to either of the conductors CSP–I and TSP–I, the outputs of amplifiers 4501 and 4502 are clamped to a positive potential. When a negative pulse is received on conductor CSP–I in the time position of the calling unit, the identity of which is to be transferred to another circuit, the A terminal of amplifier 4501 and thus the A terminal of delay multivibrator 4506 go negative. On the trailing edge of the negative pulse from the 400 kc. generator or the trailing edge of the negative pulse on conductor CSP–I, whichever occurs first, multivibrator 4506 is triggered to produce a fifteen microsecond positive-going pulse at its terminal D. The fifteen microsecond pulse is amplified by emitter follower 4507 and coupled to output conductor CSP–O to set the calling time slot storage counter in the appropriate register or link circuit. Similarly, the trailing edge of a negative pulse appearing at the output of amplifier 4502 is used to trigger multivibrator 4508 to produce a fifteen microsecond positive-going pulse for setting a terminating time slot storage counter in the appropriate register or link circuit.

*Highway clamp circuit.*—The purpose of the highway clamp circuit, which is shown in Fig. 46, is to discharge the stray capacitance on the transmission highway networks during the guard time betweeen time position channels so as to reduce crosstalk between adjacent channels. The circuit comprises six blocking oscillator gates corresponding to the six highway send conductors and six blocking oscillator gates corresponding to the six highway receive conductors. As illustrated, the 400 kc. waveform from the master pulse generator is amplified by emitter follower 4601 and coupled through a delay network comprising inductor 4602 to the D terminals of the twelve blocking oscillator gates corresponding to 4603. Ground potential is applied to the B and C terminals of said gates and to the shields of the coaxial cables corresponding to the highway send and receive conductors. The delay circuit serves to delay the 400 kc. pulses appearing at the output of amplifier 4601 by .3 microsecond and the blocking oscillator gates corresponding to 4603 are each operated by the leading edge of the delayed positive-going waveform to couple the ground potential on its terminal B to its terminal A for a period of .6 microsecond. It will be recalled that the blocking oscillator gates associated with the line terminating units, the control connectors, and the link connectors and which are used to couple their associated circuits to the transmission highway networks are operated on the negative-going portion of the 400 kc. waveform. Therefore, each time position channel on each highway is activated in turn by the negative-going portion of the 400 kc. waveform and .3 microsecond following each time position channel, ground potential is applied to the send and receive conductors of each highway for a period of .6 microsecond to discharge any stray capacitance on those conductors.

*Time slot storage counter.*—The time slot storage counter, which is shown in Fig. 47, is used in the calling time store and terminating time store of each direct dialing register, the calling time store of each incoming register, and in the position time store of the position register. In addition, each link circuit of the system comprises a time slot storage counter for registering the time position of the calling unit and a time slot store counter for registering the time position of the called unit. In accordance with whether it is used to register the time position identification of the calling unit or the called unit in a particular circuit, the set terminal of the illustrated circuit is connected to either calling slot pulse identification busbar conductor CSP–O or to the terminating slot pulse identification conductor TSP–O.

In the reset condition of the illustrated circuit, the C terminal of start flip-flop 4701 is negative and amplifier 4702 is therefore held conductive to clamp terminal A of the 400 kc. pulse amplifier 4710 at ground potential. Also, the five-stage binary counter comprising flip-flops 4703–4707, inclusive, is in the condition shown so that the output of the AND gate for negative signals 4708 is at ground potential. It will be recalled from the description of the slot pulse regeneration circuit that a fifteen microsecond negative-to-ground pulse is applied to the slot pulse identification conductor and thus to the set terminal of the illustrated circuit coincident with the trailing edge of the negative pulse on conductor 400 kc. which corresponds to the slot pulse to be memorized.

Asume that a negative signal is applied to terminal clamp B of the illustrated circuit by the circuit with which the illustrated circuit is associated and that a positive-going fifteen microsecond pulse appears on the slot pulse identification busbar conductor connected to the set terminal of the illustrated circuit. If a negative signal is applied to terminal clamp B, thus signifying that the illustrated circuit is the one counter of all of the counters connected to the slot pulse identification busbars which is to read in the identifying information applied thereto, the fifteen microsecond positive-going pulse applied to the set terminal is amplified by isolating emitter follower 4709 and flip-flop 4701 is triggered to its set condition. When terminal D of flip-flop 4701 goes negative, the test busy terminal goes negative as an indication to the circuit with which the illustrated circuit is associated that the illustrated circuit is being utilized to store a time position pulse.

When terminal C of flip-flop 4701 goes to ground, amplifier 4702 is rendered non-conductive and the clamping ground is thereby removed from the output terminal A of amplifier 4710 but since the 400 kc. waveform from the master pulse generator is at ground potential at this time, the output of amplifier 4710 remains at ground. When the waveform on conductor 400 kc. and thus the output of amplifier 4710 goes negative and then returns to ground, flip-flop 4703 of the binary counter is triggered to its set condition. From this point on, flip-flop 4703 is either set or reset on each positive-going portion of the waveform on conductor 400 kc., flip-flop 4704 is triggered each time that 4703 is reset, flip-flop 4705 is triggered each time that 4704 is set, flip-flop 4706 is triggered each time that 4705 is reset, and flip-flop 4707 is triggered each time that 4706 is reset.

At the termination of the thirty-first negative-going 400 kc. pulse received after the set terminal goes to ground, the binary counter is in the condition in which flip-flops 4703 and 4704 are in the set condition and flip-flops 4705, 4706, and 4707 are in the reset condition, all inputs to gate 4708 are negative, and negative potential is applied to terminal C of pulse amplifier 4711. Under these conditions, output terminal D of amplifier 4711 goes to ground but a negative pulse is not produced at output terminal A of said amplifier until the 400 kc. waveform goes negative 1.25 microseconds later. At the termination of the 400 kc. negative pulse, flip-flop 4703 is again set, the output of gate 4708 goes to ground, and amplifier 4711 is once again blocked. The 2.5 microsecond positive-going pulse appearing at terminal D of amplifier 4711 is amplified and inverted by amplifier 4712 and the resulting negative-going 2.5 microsecond pulse is applied to terminal busy pulse out. The 1.25 microsecond negative pulse, which corresponds in time position to the time position of the calling or called unit, as the case may be, and which appears at terminal A of amplifier 4711 is applied to terminal time pulse out.

The binary counter continues to count the 400 kc. pulses and each time that the counter returns to the setting in which flip-flops 4703 and 4704 are set and flip-flops 4705, 4706, and 4707 are reset, a negative pulse is gated to terminals busy pulse out and time pulse out. Since the five-stage binary counter has thirty-two settings and since there are thirty-two time division channels in the system, the circuit continues to generate a pulse in the memorized time position in each frame of the time position pulse frames until such time as a reset pulse is received from the circuit with which the illustrated circuit is associated. When a positive-going signal is applied to the reset terminal and is amplified by emitter follower 4713, flip-flops 4701 and 4703–4707 are all restored to their reset condition, amplifier 4702 becomes conductive, and the output terminal A of amplifier 4710 is again clamped to ground potential.

The monitor terminal is provided in the illustrated circuit for the purpose of providing an indication to the controlling circuit that the illustrated circuit is functioning. As illustrated, the waveform appearing at terminal C of flip-flop 4707 is applied to the monitor terminal. The terminal clamp A is used only in the time slot storage counters used to store the terminating or called unit time position identity in the link circuits. Ground potential is applied to terminal clamp A by the controlling link circuit when the call is to be extended to the operator and prevents terminal A of emitter follower 4709 from going negative when negative potential is applied to terminal clamp B by the controlling link circuit. Since the input to flip-flop 4701 at terminal A includes a capacitor, terminal A must go negative and then return to ground to trigger said flip-flop to its set condition. As will be fully described in the description of the link circuit, negative potential is applied to terminal clamp B of both the calling and terminating time slot counters while ground potential is applied only to the clamp A terminal of the terminating time slot counter so as to enable only the calling time slot counter to read in unit identifying information.

*Calling time store.*—A calling time store, identical to the one shown in Figs. 48, 49, and 50, is used in each direct dialing and incoming register. The calling time store comprises a time slot storage counter for storing the time position identity of the calling unit and four static storage stages G1A–G1D for storing the identity of the highway to which the calling unit is assigned. The two out of four notation stored in stages G1A–G1D is converted to one out of six notation by stages G1–G6 of Fig. 50 for the purpose of identifying the calling highway to the control connector associated with the register and for the purpose of selecting the one of the busy test conductors BT1–BT6 to which busy pulses in the time position of the calling unit are applied. In the reset condition of the calling time store, flip-flip 4801 is in its set condition and the negative potetnial appearing at its terminal D is applied to conductor BF to mark the register with which the illustrated circuit is associated as idle to the register allotter. The negative potential appearing at terminal D of flip-flip 4801 is also applied to terminal B of gated amplifier 4802.

It will be recalled that when a connect demand signal is received by the register allotter from the seize detector control circuit, the register allotter functions to transmit a demand answer signal to the seize detector control circuit and to transmit a read in control signal to the assigned register to control those circuits to read out and read in, respectively, calling unit identification information. It will also be recalled that the calling unit is identified by two out of four ground marking on the conductors of the calling highway identification cable CHI and by a fifteen microsecond negative-to-ground pulse on calling slot pulse conductor CSP–O. When a read in control ground signal is applied to conductor RC, which is an individual conductor extending between the illustrated circuit and the register allotter, amplifier 4802 is rendered conductive. When amplifier 4802 becomes conductive, amplifier 4803 becomes non-conductive, and a negative signal is thereby applied to the B terminal of the amplifier corresponding to 4804 in each of the stages G1A–G1D. Each of the amplifiers corresponding to 4804 has its C terminal connected to an individual one of the four highway marking conductors so that only the two amplifiers corresponding to the marked highway conductors will be rendered conductive. For example, assuming that highway 1 is marked on the calling highway identification busbars by ground potential on the conductors identified as 0 and 1, amplifier 4804 and the amplifier corresponding to 4804 in stage G1B are rendered conductive and flip-flip 4805 and the flip-flip in stage G1B corresponding to 4805 are triggered to their set conditions. Thus, the calling unit highway identification is registered in the calling time store.

Also, when amplifier 4803 becomes non-conductive, negative potential is applied to terminal clamp B of the time slot storage counter of the calling time store. As described in the description of the time slot storage counter, the application of negative potential to terminal clamp B enables the counter to read in the positive-going pulse appearing on conductor CSP–O and which identifies the time position of the calling unit. Also as previously described, the time slot storage counter thereafter functions to produce a 1.25 microsecond negative pulse in the memorized time position at terminal time pulse out and to produce a 2.5 microsecond negative pulse, the trailing edge of which is coincident with the trailing edge of the time position pulse, at terminal busy pulse out. The waveform appearing at the output of the last stage of the five-stage binary counter in the time slot storage counter appears at terminal monitor, as previously described. When the waveform at terminal monitor goes to ground, thus indicating that the storage counter is functioning, flip-flip 4801 is triggered to its reset condition, and ground potential appearing at terminal D of flip-flip 4801 marks the register as busy to the register allotter and renders amplifier 4802 non-conductive to terminate the read in operation.

It can be seen that when amplifier 4802 is first rendered conductive upon receipt of a ground signal on conductor RC, flip-flip 4806 is triggered to its set condition and ground potential appearing at terminal E of flip-flip 4806 is coupled over conductor SC to initiate the operation of control A or two digit store depending upon whether the calling time store is incorporated in a direct dialing or an incoming register, respectively. The negative potential at terminal D of flip-flip 4806 is applied to terminal B of timing control gate 4812 and since flip-flip 4801 is now in the reset condition, negative potential is also applied to terminal C of that gate. The operation of the timing circuitry will be described later.

It will be recalled that it was assumed that highway 1 was marked as the calling highway and that flip-flip 4805 and the flip-flip corresponding to 4805 in stage G1B were, therefore, triggered to their set conditions. The amplifier corresponding to 5001 in each of the stages G1–G6 is gated by a unique combination of two out of the four stages G1A–G1D so that when two of the flip-flips corresponding to 4805 are set, only one of the amplifiers 5001 will be conductive. In the assumed case, amplifier 5001 in stage G1 is rendered conductive since its B terminal is returned to negative at terminal D of flip-flip 4805 in stage G1B and its C terminal is returned to ground at terminal E of flip-flip 4805 in stage G1A. When amplifier 5001 in stage G1 becomes conductive, ground potential is applied to conductor CHI–1 to mark highway 1 to the calling control connector of the register. The time position of the calling unit is, of course, marked to the calling control connector of the register by the negative pulse appearing at terminal time pulse out of the time slot storage counter over conductor CSP. Also, each negative-going busy pulse appearing at terminal busy pulse out of the time slot storage counter is coupled through gate 5002, since amplifier 5001 is conductive, to render amplifier 5003 conductive. The 2.5 microsecond positive-going pulses appearing at the output of amplifier 5003 are inverted by amplifier 5004 and the resulting negative pulses are applied to conductor BT1 for the purpose of marking the calling unit as busy to the seize detector and the route selector.

The calling time store remains in the just described condition until such time as the identity of the calling unit is to be transferred to a link circuit. At that time, a write-read WRO signal is transmitted by the route selector to control A or two digit store, as the case may be, and control A or two digit store is responsive thereto to transmit ground potential over conductor TSW to the calling time store. When ground potential is received over conductor TSW, amplifier 4807 becomes non-conductive, negative potential is applied to the B terminal of the amplifier corresponding to 4808 in each of the stages G1A–G1D, amplifier 4901 becomes conductive, and ground potential is applied to terminal C of gated pulse amplifier 4902.

It can be seen that terminal C of the amplifier corresponding to 4808 in each of the stages G1A–G1D is connected to the E terminal of the flip-flip corresponding to 4805 in that stage. Thus, when negative potential is applied to the B terminal of each of said amplifiers, only the amplifiers in the stages in which flip-flip 4805 is set are rendered conductive. In the assumed case, amplifier 4808 in stage G1A and the amplifier corresponding to 4808 in stage G1B are rendered conductive and ground potential is thereby applied to the 0 and 1 conductors of the calling highway identification busbars CHI to mark highway 1 as the calling highway to the allotted link circuit. Also, since terminal C of amplifier 4902 is now at ground, the negative-going pulses in the time position of the calling unit appearing at terminal time pulse out of the time slot counter are amplified by amplifier 4902 and applied to conductor CSP–I, which extends to the slot pulse regeneration circuit.

When the time position and highway identification of the calling unit has been read into the allotted link circuit, control A or two digit store functions to apply ground potential to conductors R and RLR. When ground potential is applied to conductor R, the set flip-flips corresponding to 4805 are reset, ground is applied to terminal reset of the time slot storage counter to terminate the operation of and restore said counter to its reset condition, and flip-flip 4806 is reset to remove ground from conductor SC and to block the timing control gate 4812. When ground potential is applied to conductor RLR, flip-flip 4801 is triggered to its set condition to again mark the register as idle to the register allotter and timing flip-flip 4809 is reset, if set. Thus, the calling time store is completely reset and in readiness to handle another call.

Timing means is provided in the calling time store for releasing the register and activating an alarm if a call is not completed by an incoming register within a period of one minute or by a direct dialing register within a period of three minutes. When the calling time store is used as a part of an incoming register, a five millisecond negative pulse is applied to conductor start and a five millisecond pulse is applied to conductor stop once every minute with the pulse on conductor stop preceding the pulse on conductor start by a period of several milliseconds. When the calling time store is used as a part of a direct dialing register, the pulses on conductors start and stop occur once every three minutes. The pulses on conductors start and stop may be generated by any well known timing device.

It will be recalled that terminals B and C of gate 4812 are negative when flip-flips 4806 and 4801 are set and reset, respectively, which condition obtains when calling unit identification information has been stored. Under these conditions, the negative pulse on conductor start is coupled through gate 4812, amplifier 4810 becomes conductive, and flip-flip 4809 is triggered to its set condition. When flip-flip 4809 is set and its E terminal goes negative, gate 4811 is enabled to pass the next occurring pulse on conductor stop, which pulse occurs approximately one minute or three minutes after the occurrence of the pulse on conductor start, as explained above. With gate 4811 enabled, the negative pulse on conductor stop renders amplifier 4903 conductive and alarm flip-flip 4904 is triggered to its set condition. When terminal D of flip-flip 4904 goes negative, amplifier 4905 becomes conductive and ground potential is applied to the alarm conductor to activate any suitable alarm device. Also when flip-flip 4904 is set and ground potential appears at its terminal E, ground potential is coupled over conductor TOP to initiate the release of control A or two digit store, and terminal G of flip-flip 4801 is clamped to ground to hold flip-flip 4801 in the reset condition and thus mark the register as busy to the register allotter as long as alarm flip-flip 4904 is in the set condition. Control A or two digit store is responsive to the receipt of ground potential on conductor TOP to apply ground to conductors R and RLR to reset the calling time store in the same manner as described above. Alarm flip-flip 4904 can be reset only by the application of a ground pulse to the manual reset conductor by a key or any other suitable device. When flip-flip 4904 is reset, ground clamping is removed from terminal G of flip-flip 4801, and the ground on the manual reset conductor and which is applied to terminal E of flip-flip 4801, triggers that flip-flip to its normal set condition. Thus, the register is again marked as idle to the register allotter and the calling time store is completely reset and in readiness to handle another call.

Figure 51:
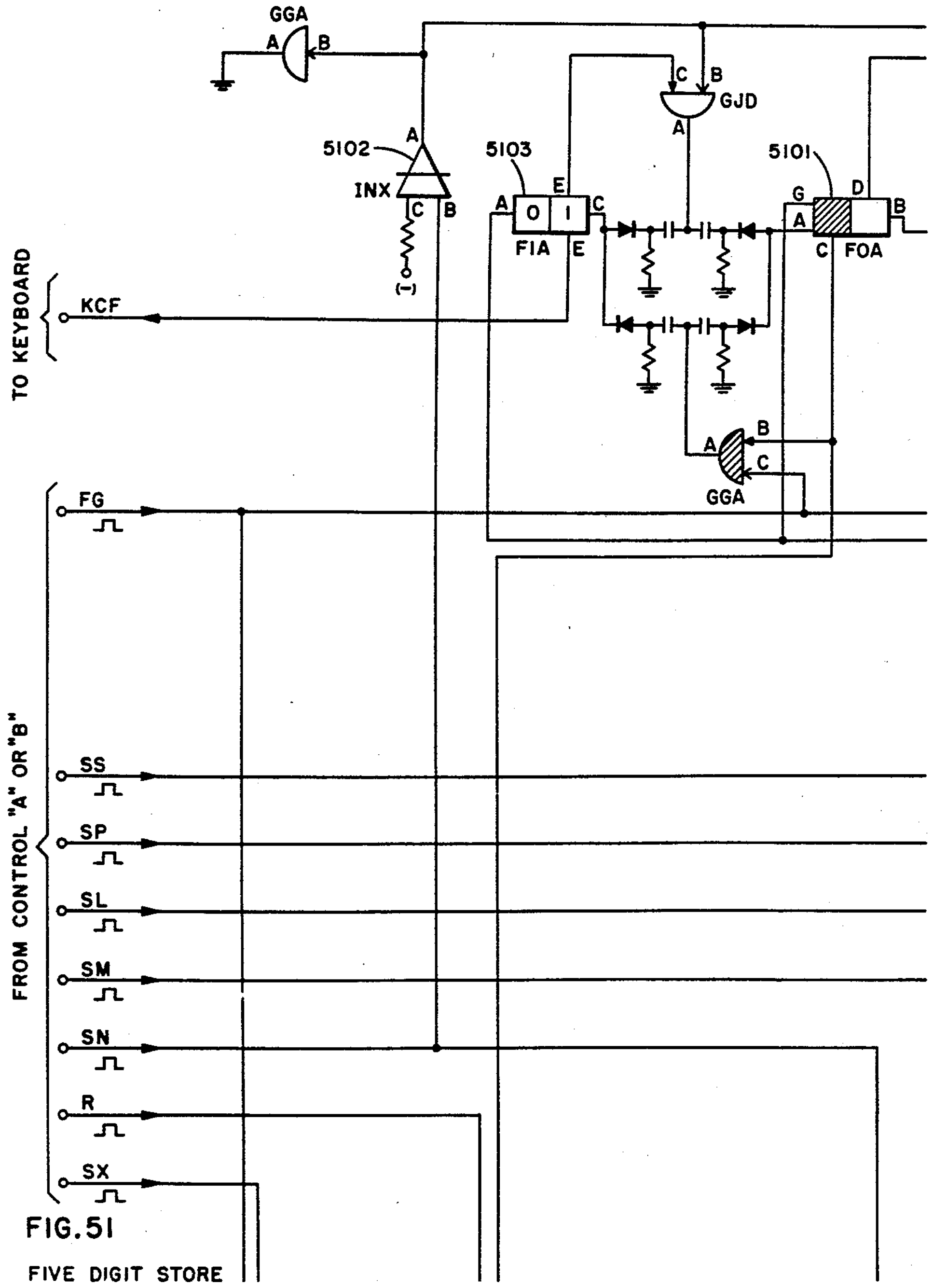
Figure 52:
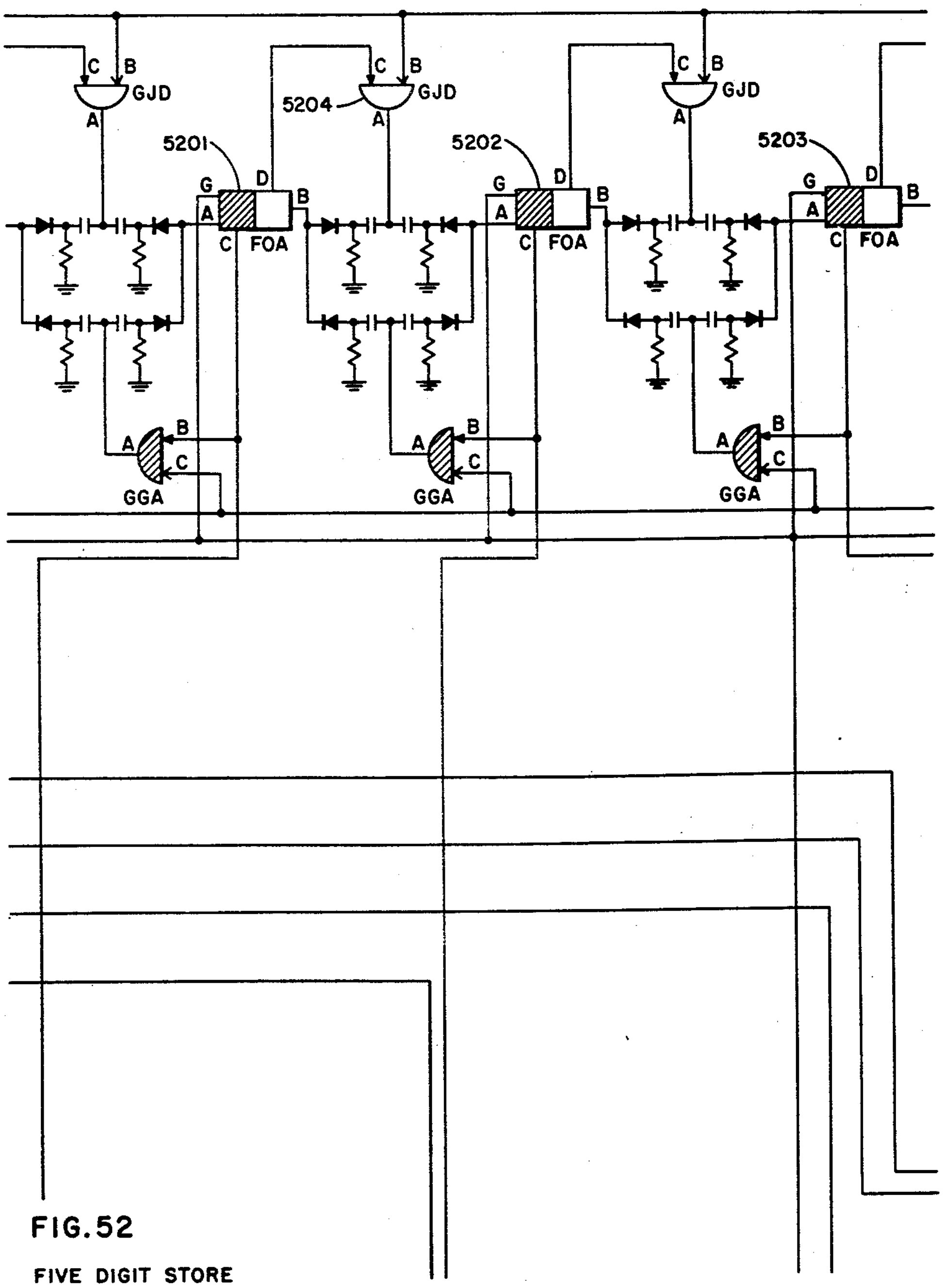
Figure 53:
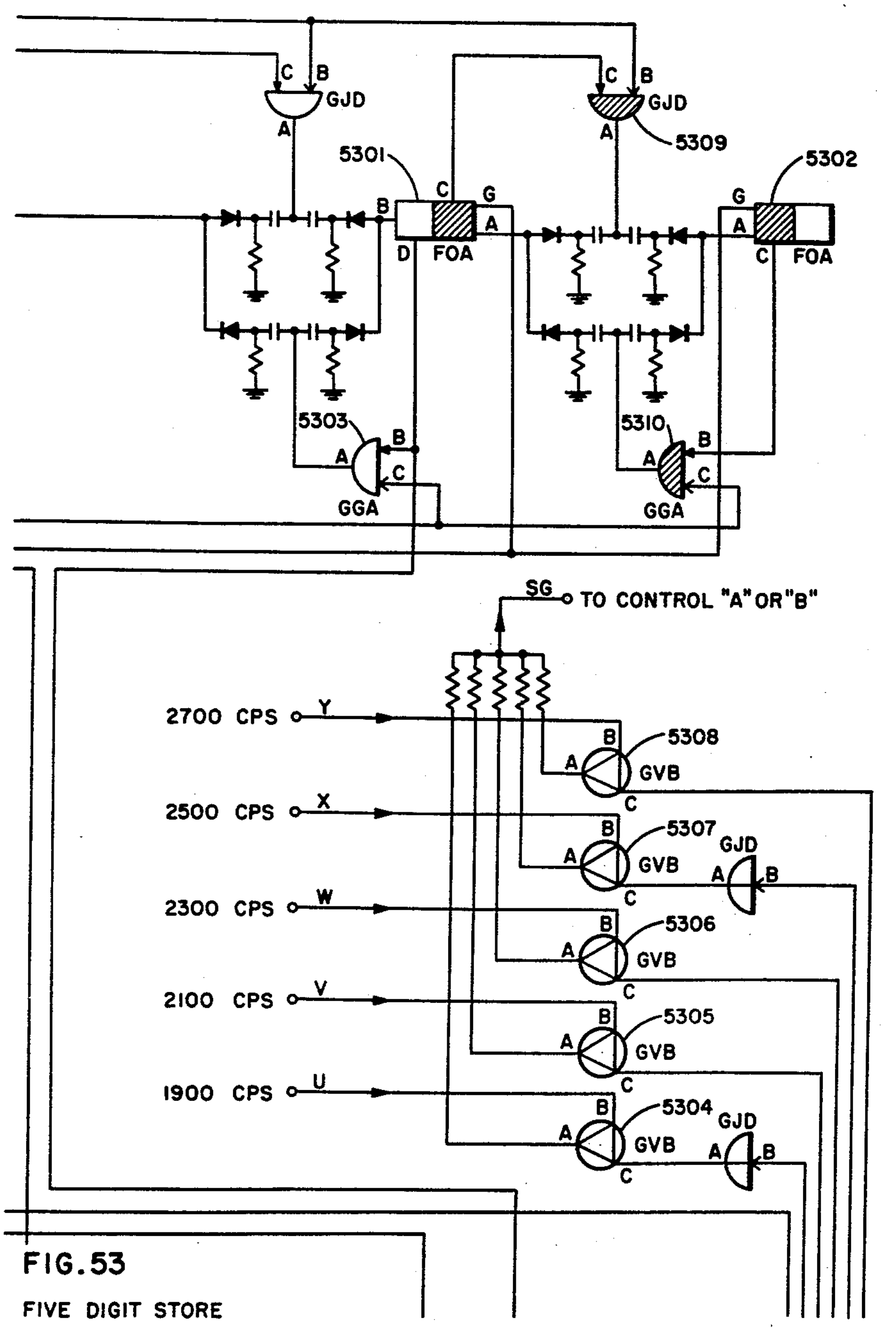
Figure 54:
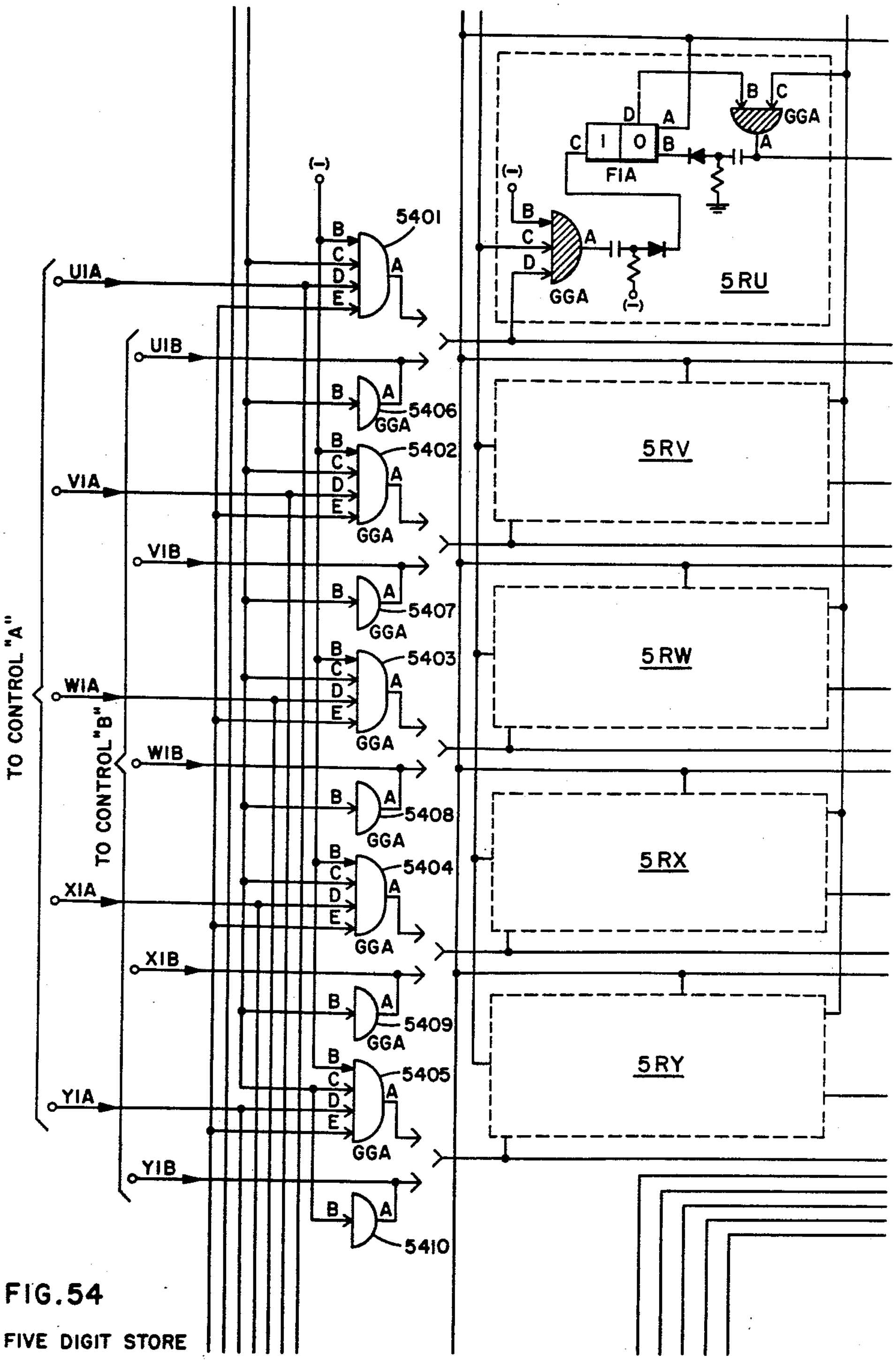
Figure 55:
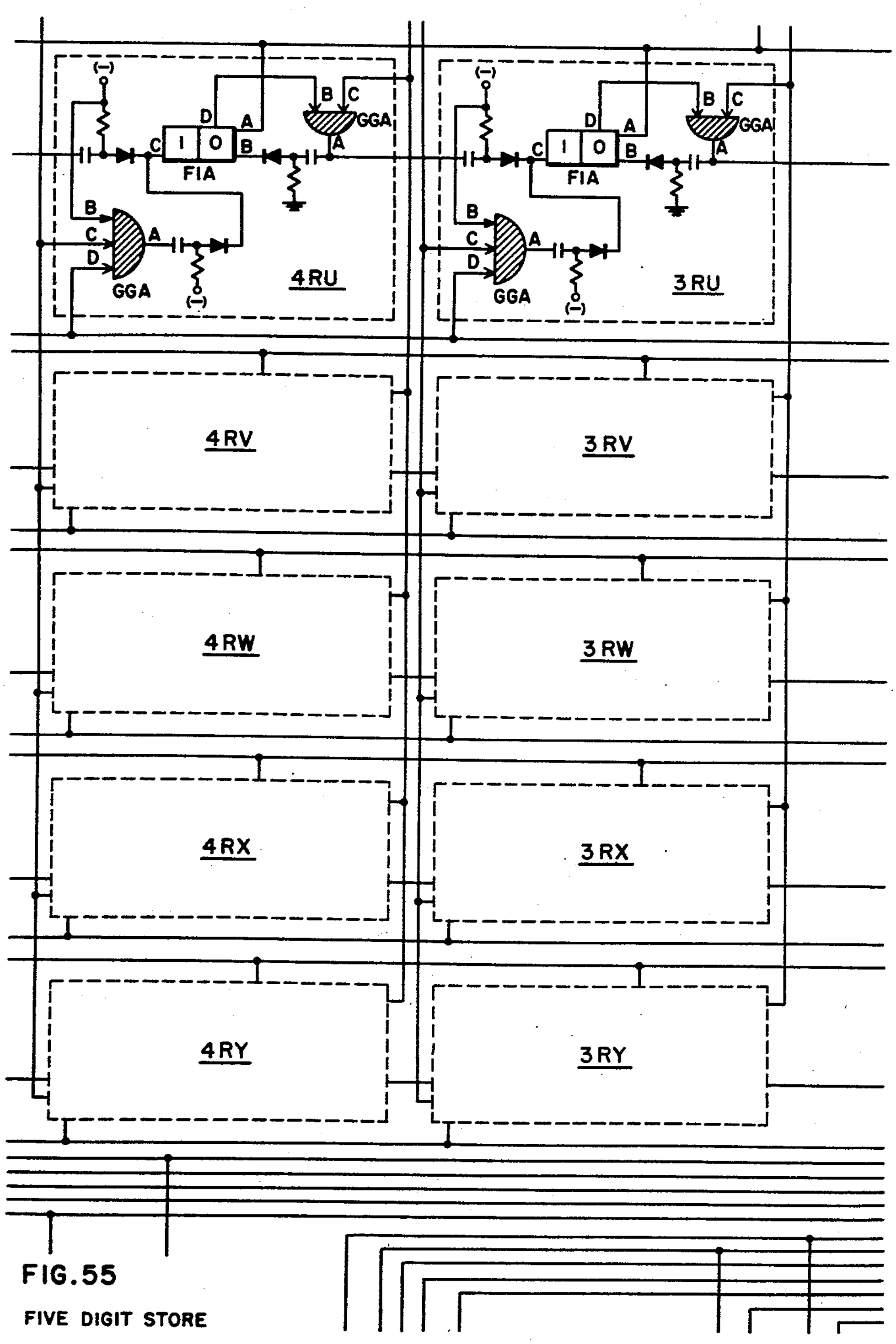
Figure 56:
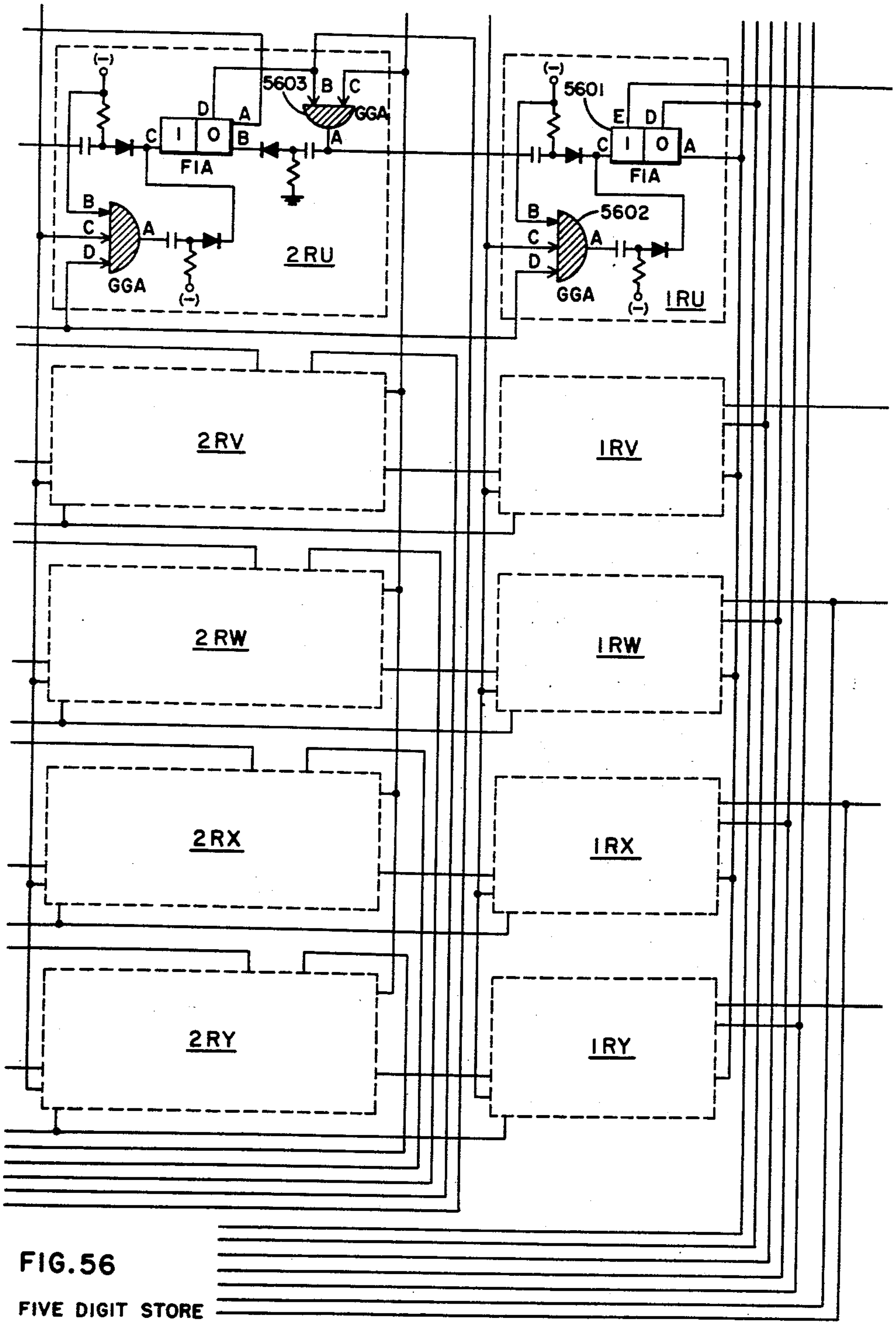
Figure 57:
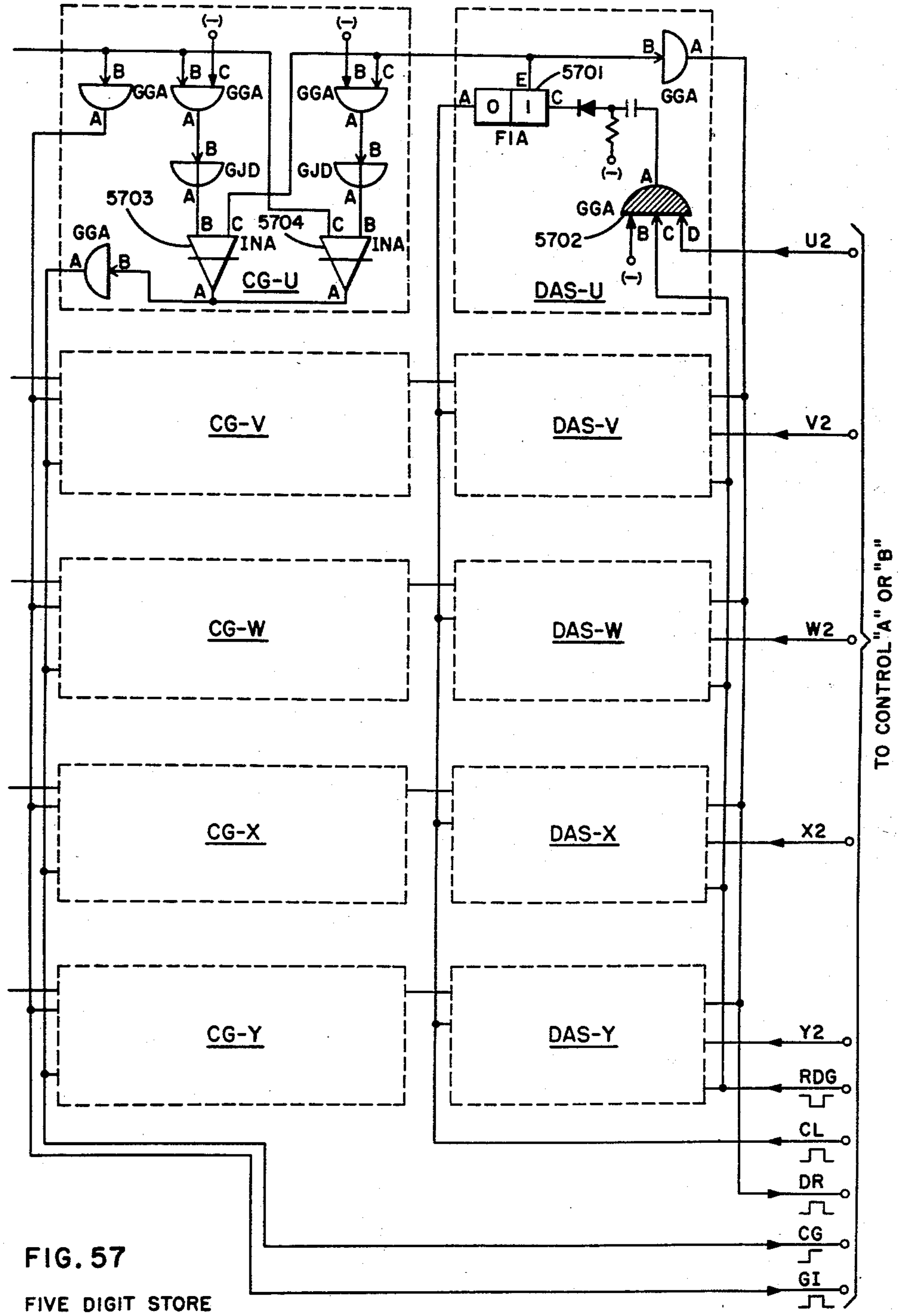
Figure 58:
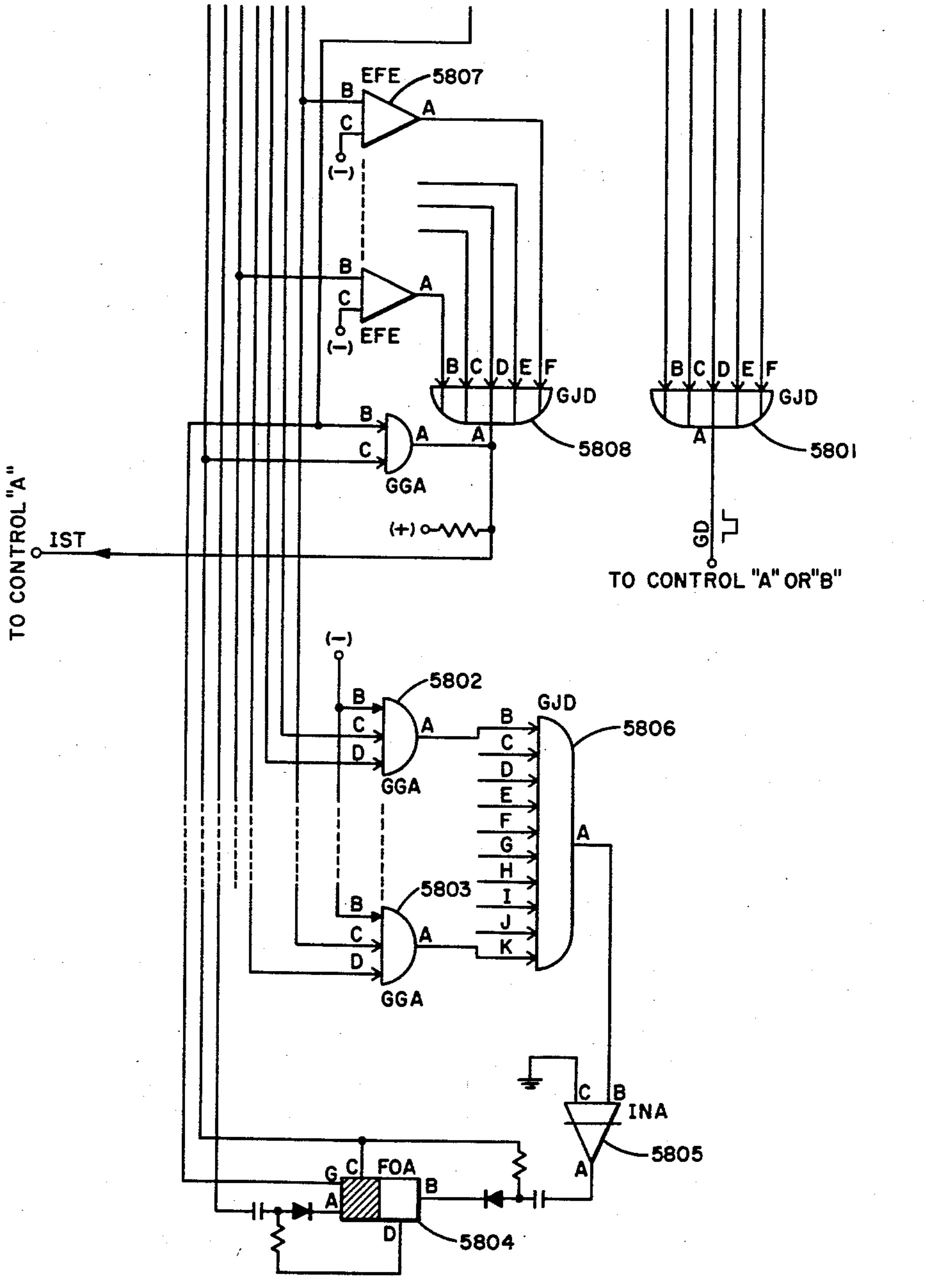
Figure 59:
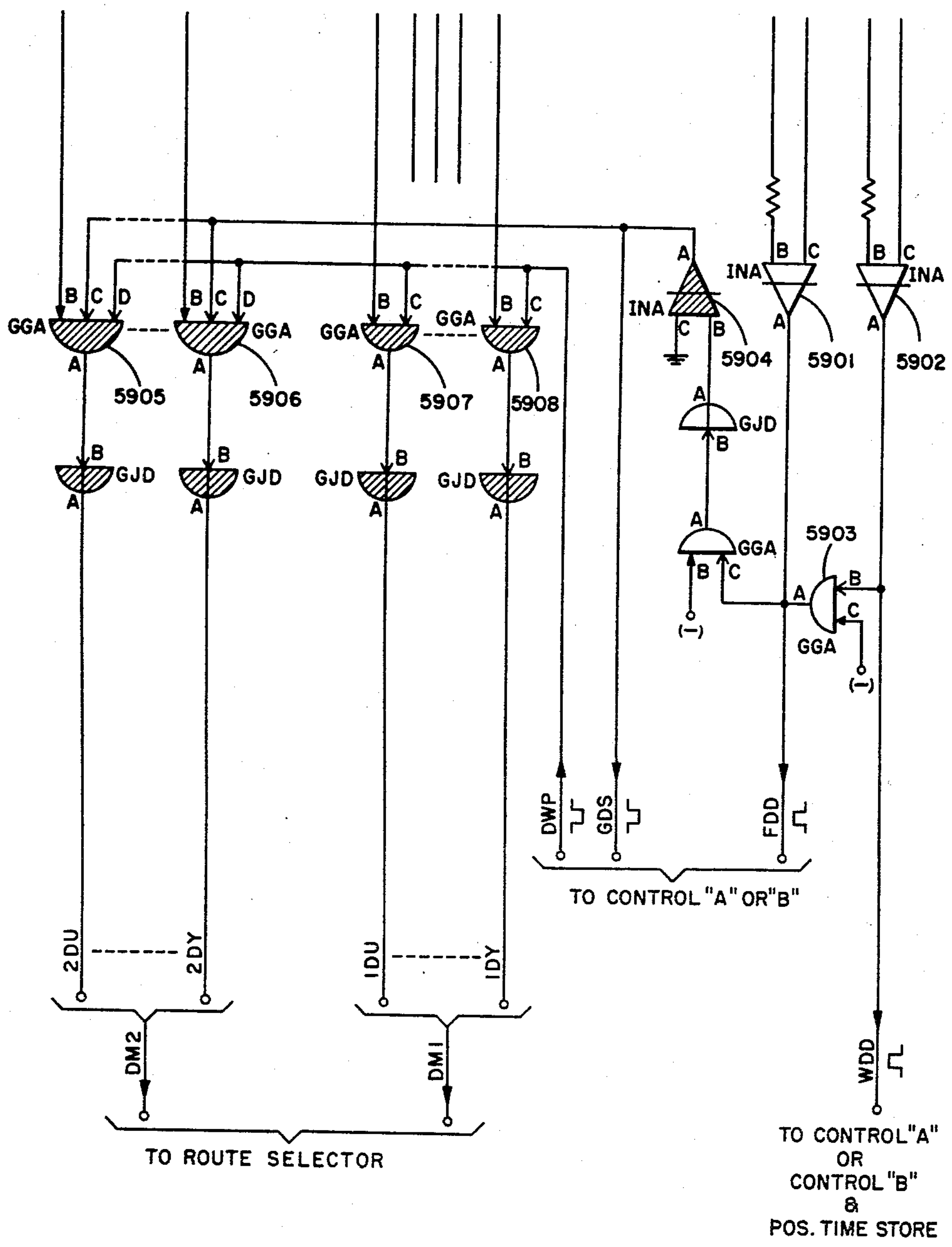
Figure 60:
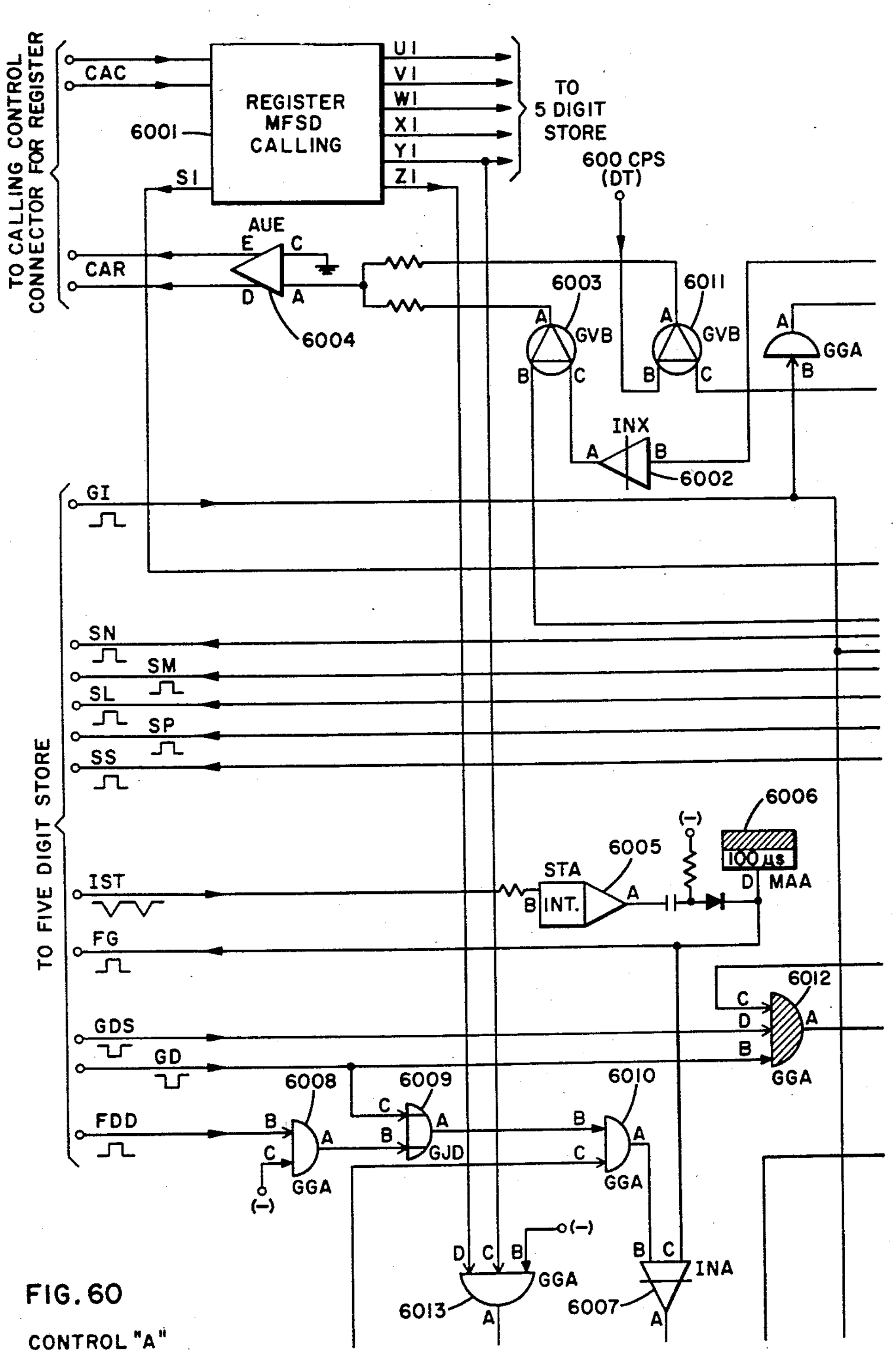
Figure 61:
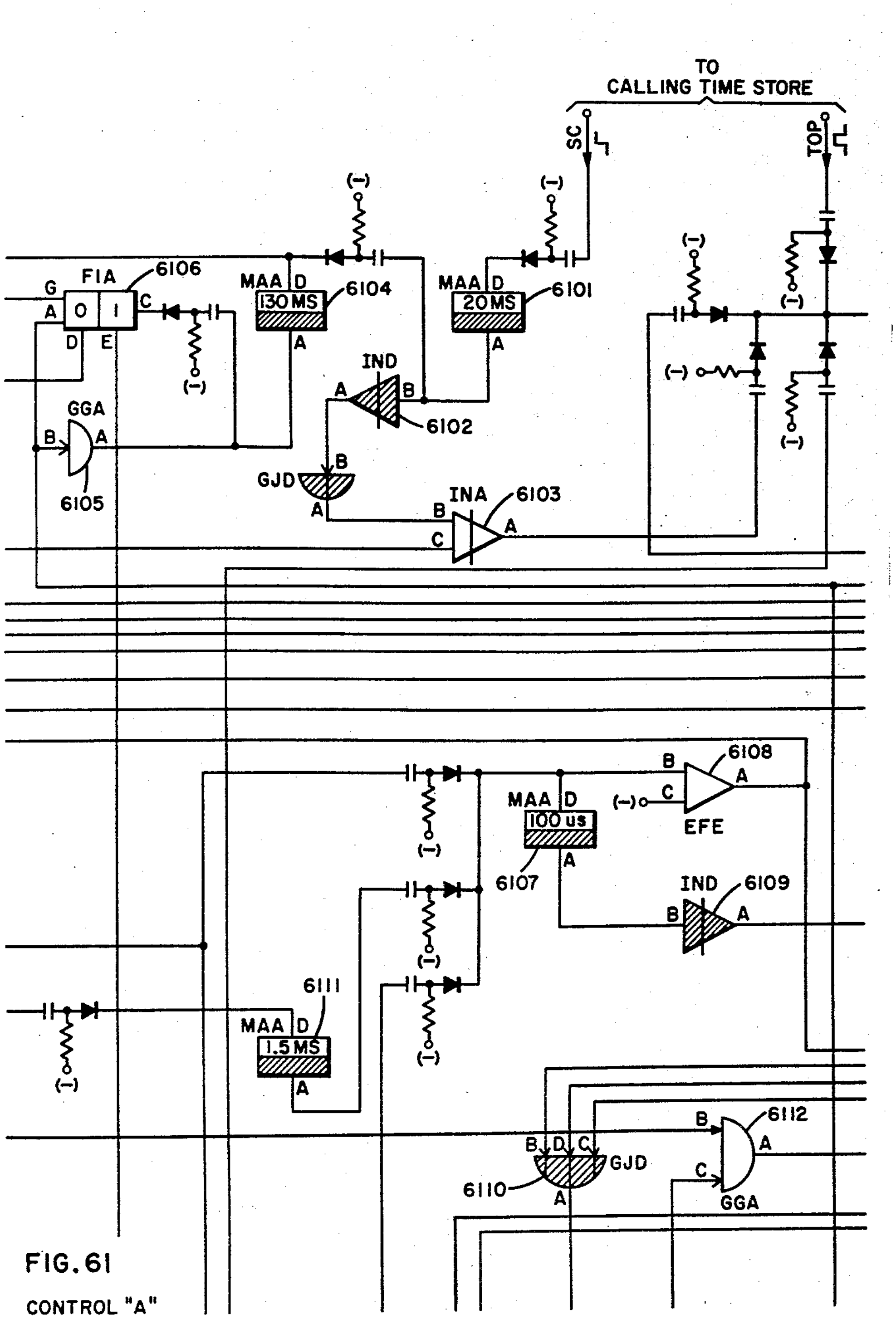
Figure 62:
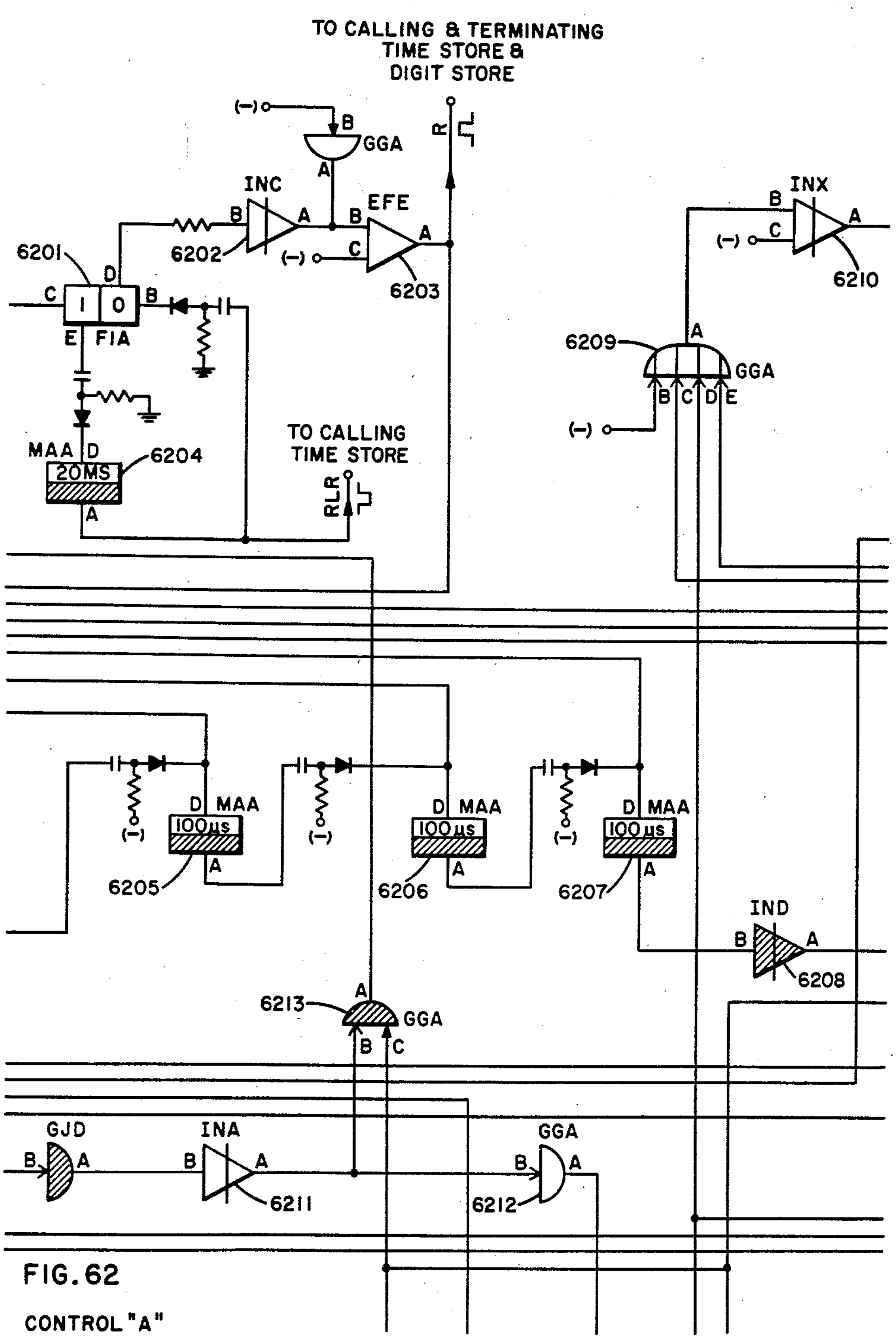
Figure 63:
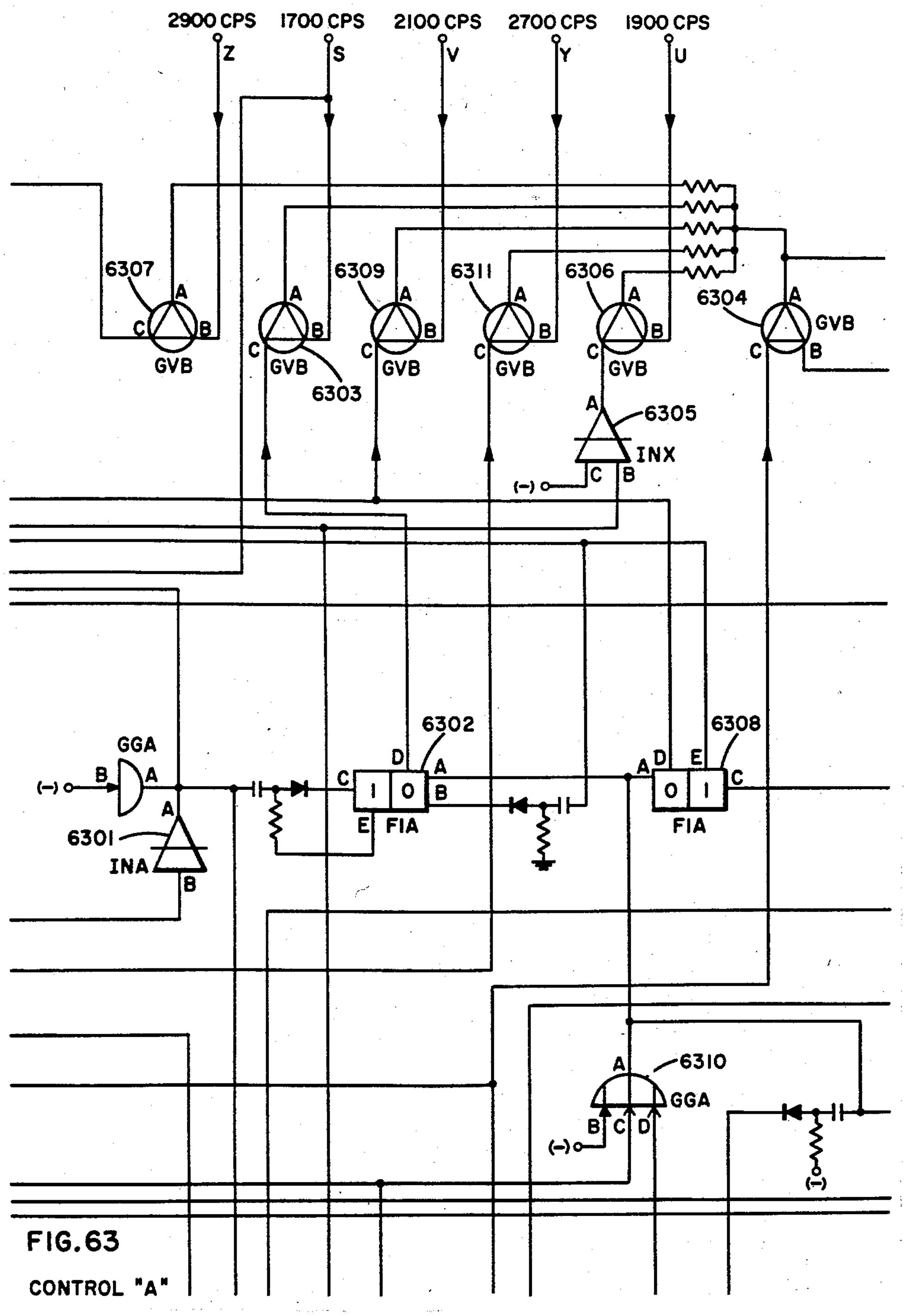
Figure 64:
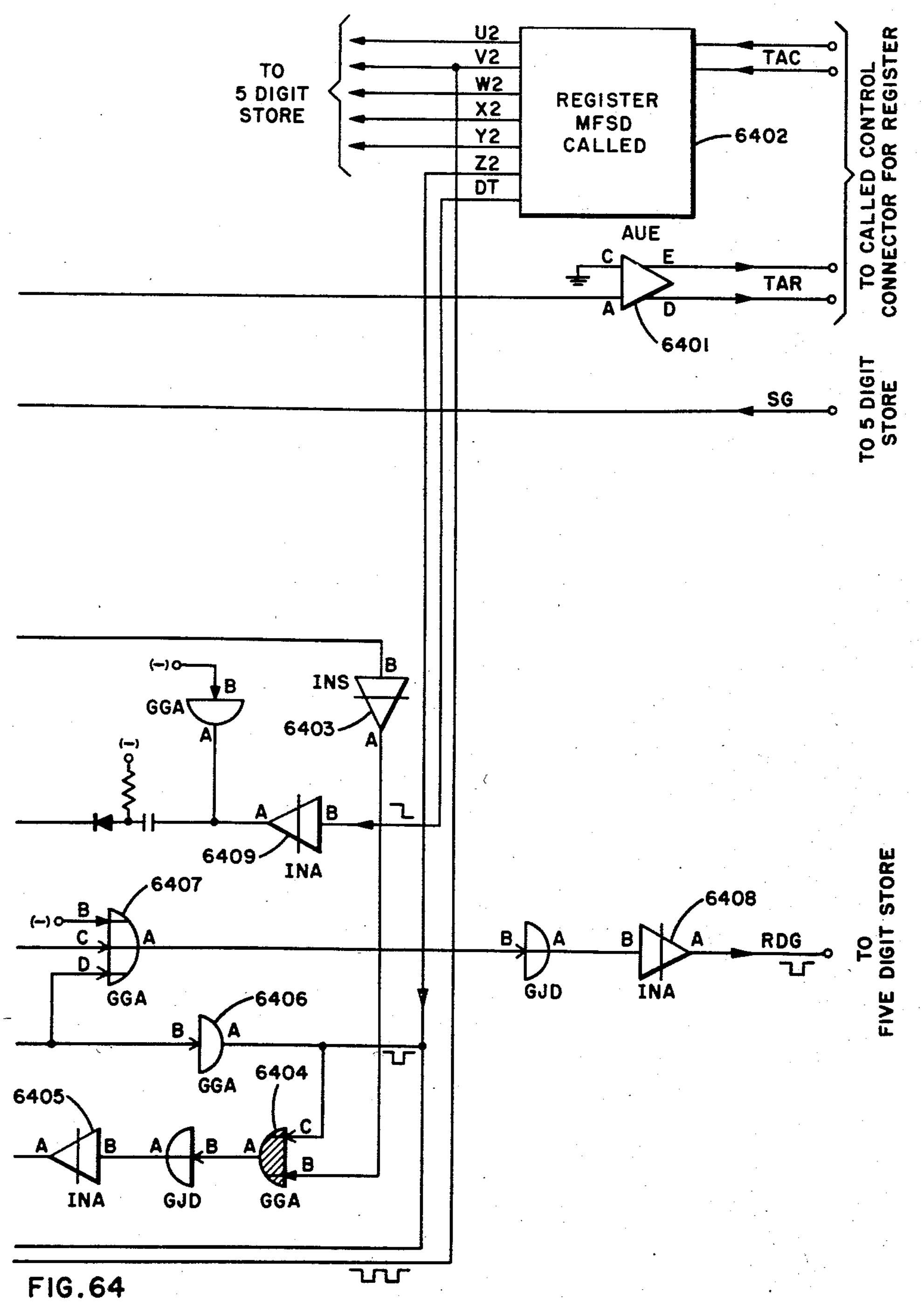
Figure 65:
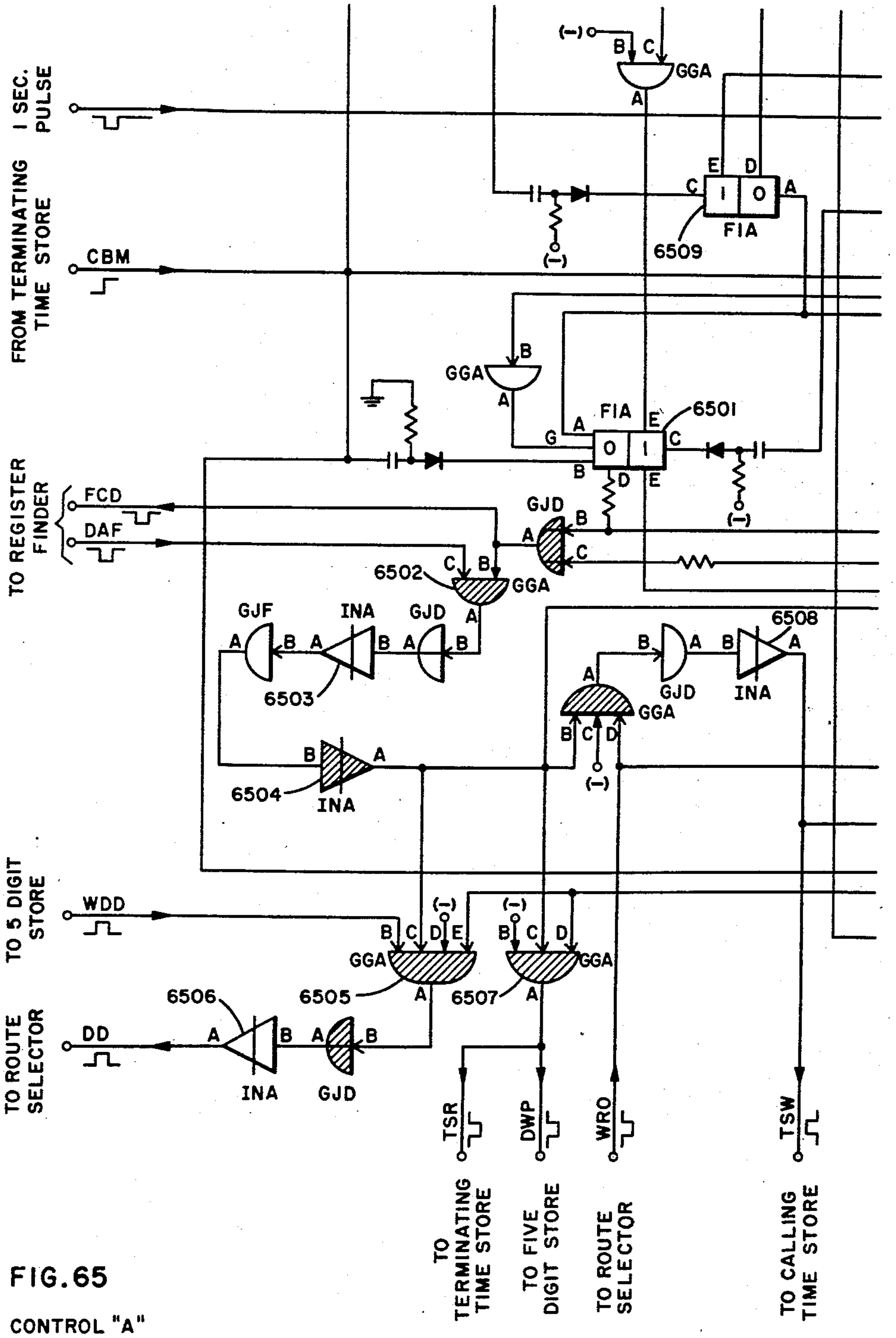
Figure 66:
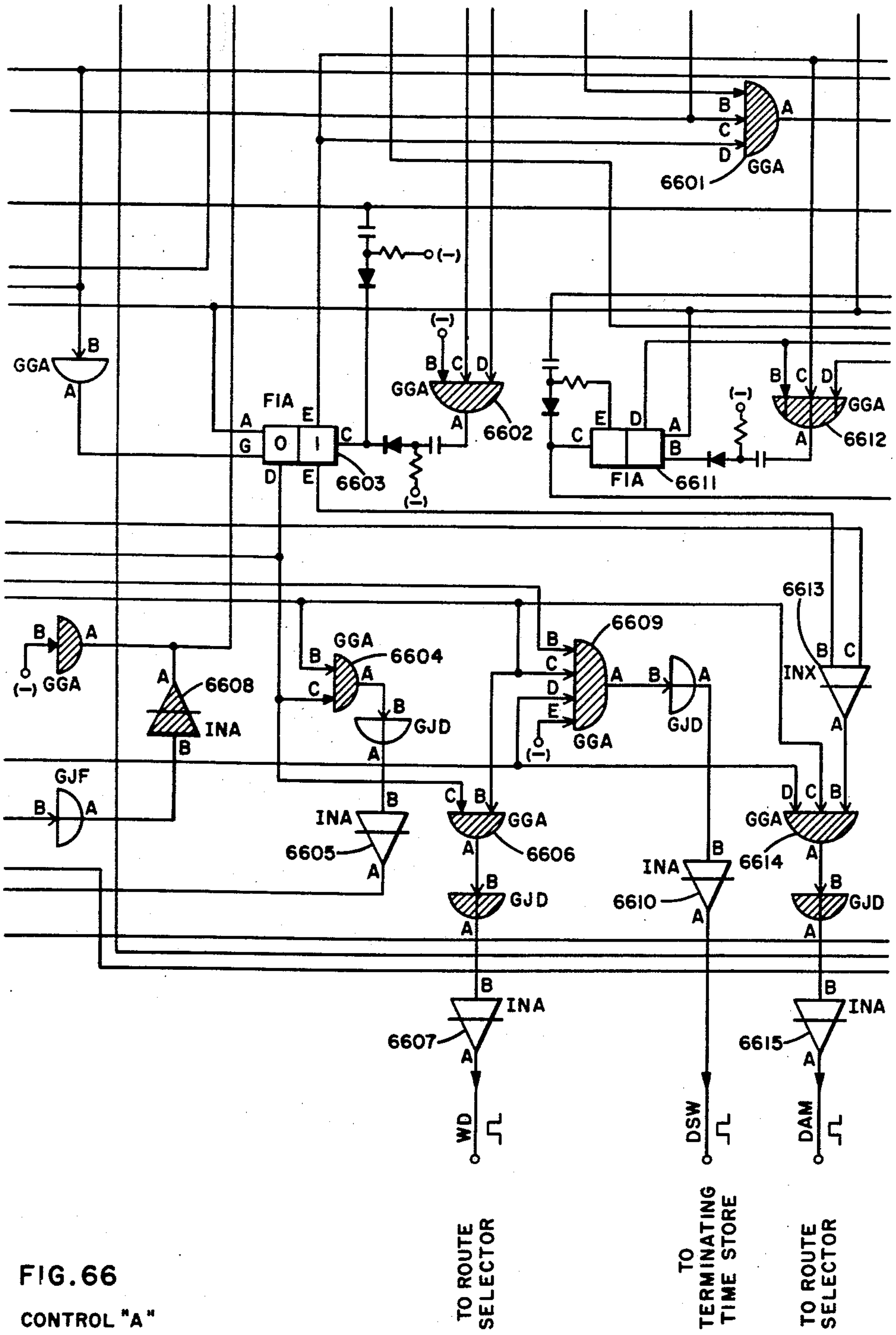
Figure 67:
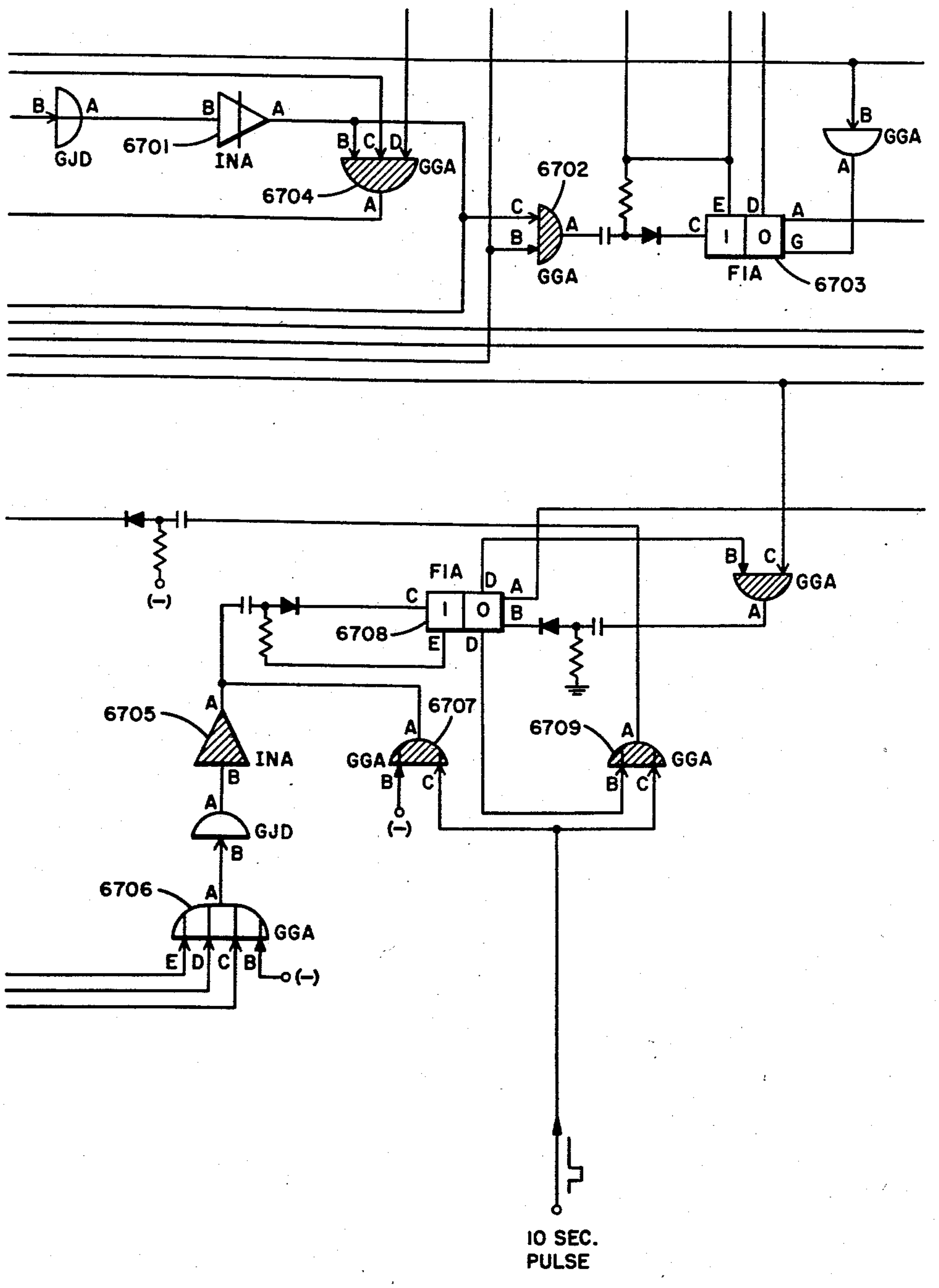
Figure 68:
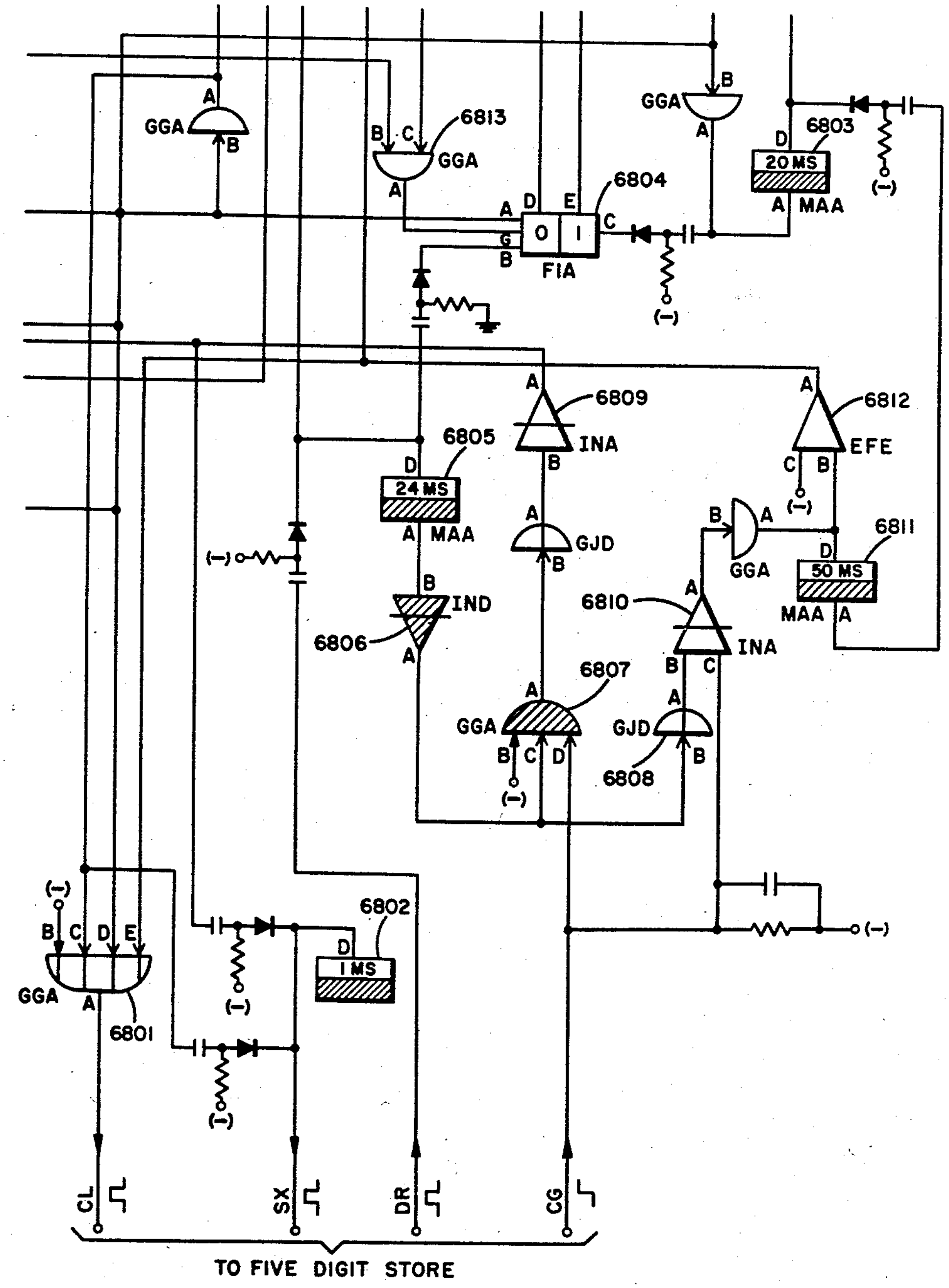

*Five digit store.*—A five digit store, identical to the one shown in Figs. 51–59, inclusive, of the drawings, is used in each direct dialing register and position register of the system. As shown in the block diagram and as described in the general description, each direct dialing register includes a control A circuit while the position register includes a control B circuit. When the illustrated five digit store is used in a direct dialing register and is thus controlled by a control A, conductors U1A–Y1A and gates 5401–5405 of Fig. 54 and all of the equipment of Figure 58 are provided in the circuit while gates 5406–5410 of Fig. 54 and conductor KCF of Fig. 51 are omitted. When the illustrated five digit store is used in the position register and is thus controlled by control B, conductors U1B–Y1B and gates 5406–5410 of Fig. 54 are provided in the circuit while gates 5401–5405 and all of the equipment of Fig. 58 exclusive of gate 5801 are omitted from the circuit. The above is denoted by optional wiring symbols in Fig. 54.

The principal components of the five digit store are a reversible distributor, which comprises flip-flops 5101, 5201, 5202, 5203, 5301, 5302, and flip-flop 5103, five digit register stages, which each comprise five flip-flips corresponding to 5601 for registering the two out of five notation corresponding to a received digit, a digit acknowledgment register comprising five flip-flips corresponding to 5701 for registering the two out of five notation corresponding to a received digit acknowledgment signal, and a comparator circuit for comparing the setting of the first digit register with the setting of the digit acknowledgment register. The reversible distributor and the five digit registers form a shift register in which digit information is stored in said digit registers in sequence and after a digit has been transmitted out of the first digit register, the information stored in each succeeding register is shifted to the preceding digit register. Under normal operating conditions, digits will be sent out as fast as they are received but five digit registers are provided so that a call will not be lost in the event that there is some delay in the system.

At the termination of each call, control A or control B, as the case may be, functions to apply a ground pulse to reset conductor R to reset all of the flip-flops and flip-flips of the five digit store to the reset condition. When the five digit store is in its reset condition, the negative potential at terminal D of flip-flop 5301 of the reversible distributor is applied to terminal C of the gate corresponding to 5602 in each of the first digit register stages 1RU–1RY. Since terminal C of each of the remaining reversible distributor flip-flops is at ground potential, the gate corresponding to 5602 in each stage of each of the remaining digit registers is blocked. Thus, in the reset condition of the five digit store, only the first digit register is enabled to read in digit information received over either conductors U1A–Y1A from control A or conductors U1B–Y1B from control B, respectively.

To illustrate the operation of the digit storing function of the five digit store, assume that the illustrated circuit is used in a direct dialing register and thus receives digit information over conductors U1A–Y1A from control A. Conductors U1A–Y1A normally stand at ground potential and a series of negative pulses are received over the two out of the five conductors corresponding to a particular digit only as long as the voice frequency signals corresponding to that digit are detected by the calling multifrequency signal detector in control A. It can be seen that each of the conductors U1A–Y1A is individually connected to the D terminal of one of the gates 5401–5405, respectively, the B terminal of each of said gates is returned to negative potential, the C terminal of each of said gates is returned to the negative potential normally appearing on conductor SX, and that the gates have ground potential applied to their E terminals since flip-flop 5804 is in its reset condition at this time. Ten gates corresponding to gates 5802 and 5803 are provided in the circuit when the circuit is used in a direct dialing register for the purpose of verifying that a legitimate two-frequency digit has been received before the gates 5401–5405 are enabled to pass digit information to the digit registers. Gate 5802 corresponds to the digit "1" since its C and D terminals are connected to conductors V1A and W1A, respectively, while gate 5803 corresponds to the digit "0" since its C and D terminals are connected to conductors U1A and X1A, respectively. Similarly, the other eight gates of the group are connected to the conductors which identify their corresponding digits.

When negative pulses simultaneously appear on two of the conductors U1A–Y1A, thus signifying that a digit is being identified over said conductors, the one of the gates 5802–5803 corresponding to that digit passes a negative signal, amplifier 5805 is rendered conductive through gate 5806, which is an OR gate for negative signals, and flip-flop 5804 is triggered to its set condition. When flip-flop 5804 is set and its C terminal goes negative, gates 5401–5405 are enabled to pass the negative pulses appearing on two of the conductors U1A–Y1A. Thus, the output signals from two of the gates 5401–5405 go negative and then return to ground to set two of the stages in the first digit register, as will be subsequently described. The pulses appearing on conductors U1A–Y1A are also amplified by an individual emitter follower, such as 5807 for conductor U1A, and passed through OR gate for negative signals 5808 and applied to conductor IST, which extends to control A.

When the illustrated five digit store is used in a position register, digit information is received over conductors U1B–Y1B from control B, as previously described. Conductors U1B–Y1B normally stand at ground potential and two of said conductors go negative as long as the corresponding one of the operator's digit keys is depressed and then return to ground when the digit key is released. Thus, it can be seen that regardless of whether the illustrated circuit is controlled by control A or control B, terminal D of two of the gates corresponding to 5602 in the first digit register stages 1RU–1RY go negative and then return to ground potential to trigger the flip-flip corresponding to 5601 in each of those two stages to its set condition. For example, if the digit "4" is transmitted from the calling subscriber station or from the keyboard as indicated by a negative pulse on conductors U1A and V1A or on conductors U1B and V1B, respectively, flip-flip 5601 in stage 1RU and the flip-flip corresponding to 5601 in stage IRV of the first digit register are triggered to their set condition. The flip-flips in stages 2RU–5RU and 2RV–5RV are not triggered to their set conditions since the C terminal of the gate corresponding to 5602 in each of those stages is returned to ground potential at the C terminal of one of the reversible distributor flip-flops, as previously described.

At the termination of the first digit, as signified either by an end of digit signal from the keyboard to control B or by the termination of the transmission of negative pulses over conductor IST from the five digit store to control A, control B or control A functions to apply a ground pulse to conductor FG. The ground pulse on conductor FG is coupled through gate 5303, since terminal B of that gate is returned to negative potential at terminal D of flip-flop 5301, and flip-flops 5301 and 5203 are thereby triggered to their set condition. When flip-flop 5203 is set and its C terminal goes negative, the gate corresponding to 5602 in each of the second digit register stages 2RU–2RY is enabled so that the second received digit may be stored in the second digit register. The gate corresponding to 5602 in each of the first digit register stages is, of course, blocked when flip-flop 5301 is set and its D terminal goes to ground. The ground pulse on conductor FG is also used to reset flip-flop 5804 if said flip-flop is used in the illustrated circuit. The operation continues as just described. That is, at the end of each digit a ground pulse is applied to conductor FG and the reversible distributor is shifted one step to the left to enable the next succeeding digit register.

It will be recalled from the general description that control A or control B functions to transmit a connect demand signal to the register finder at the completion of the first digit if the route selector is to select a unit terminating a trunk line to another long distance switching center, as denoted by a first digit of any one of the digits "2–9," but delays transmitting a connect demand signal until after the second digit has been received if the route selector is to select a unit terminating a trunk line to a local office, as denoted by a first digit "1," or the call is to an operator, as denoted by the digits "00," or to a service line, as denoted by the digits "01–04." If, as was assumed, the first digit is the digit "4," the one and zero discriminator amplifiers 5901 and 5902, the function of which will be described below, remain nonconductive and control A or B is thereby controlled to transmit a connect demand signal to the register finder at the termination of the first digit.

When the identity of the line terminating unit selected by the route selector is read back into the terminating time store or the position time store of the direct dialing register or the position register, respectively, control A or control B, respectively, functions to initiate a shift cycle. The shift cycle comprises the one at a time application of a ground pulse to conductors SS, SP, SL, SM, and SN, in turn. Also, a ground pulse is applied to conductor SX by control A or control B, which pulse overlaps the pulses on conductors SS–SN. The pulse on conductor SS is applied to the A terminal of the flip-flip corresponding to 5601 in each of the stages 1RU–1RY of the first digit register and serves to trigger the set flip-flips in that digit register to their reset condition. Thus, the first digit is removed from the first digit register. The pulse on conductor SP is applied to terminal C of the gate corresponding to 5603 in each of the stages 2RU–2RY of the second digit register. It can be seen that if a digit is registered in the second digit register at this time, terminal D of the flip-flip corresponding to 5601 in two of the stages of the second digit register will be negative and a ground pulse is therefore coupled through the gate corresponding to 5603 in those two stages to reset the flip-flip corresponding to 5601 in those two stages and to set the flip-flip corresponding to 5601 in the corresponding stages of the first digit register. Thus, the digit register in the second digit register is transferred to the first digit register responsive to the receipt of a ground pulse on conductor SP. Similarly, if digits are stored in the remaining digit registers, the ground pulse on conductor SL transfers the digit stored in the third digit register to the second digit register, the pulse on conductor SM transfers the digit stored in the fourth digit register to the third digit register, and the pulse on conductor SN transfers the digit stored in the fifth digit register to the fourth digit register. The pulse on conductor SN is also inverted by amplifier 5102 and the inverted pulse is used to drive the reversible distributor one step to the right. To illustrate the above, assume that three digits were loaded in the digit register at the time that the shift cycle was initiated so that at the beginning of the shaft cycle the reversible distributor was in the condition in which flip-flop 5201 was set to thereby enable the fourth digit register to read in the next received digit. Under these conditions, both inputs to gate 5204 were at ground potential prior to the receipt of a pulse on conductor SN so that the negative pulse appearing at terminal A of amplifier 5102 when a pulse is received on conductor SN is coupled through gate 5204 to reset flip-flop 5201 and set flip-flop 5202. Thus, it can be seen that the reversible distributor is stepped one step to the right at the termination of each shift cycle.

The pulse applied to conductor SX, and which overlaps the pulses applied to conductors SS–SN, assures that the same digit will not be loaded in two of the digit registers if a digit is being received at the time that a shift cycle is initiated. To illustrate this feature, assume that a digit is being received and that the third digit register is enabled to read in this digit at the time that a shift cycle is initiated. If the digit is received from control A, it may already be loaded in the third digit register but if it is received from control B, two of the conductors U1B–Y1B are negative at the time that ground potential is applied to conductor SX. If the five digit store is part of a direct dialing register, ground on conductor SX serves to block the gates 5401–5405 while if the five digit store is part of a position register, ground on conductor SX serves to clamp conductors U1B–Y1B to ground through gates 5406–5410, respectively, and thus load the received digit into the third digit register. The digit stored in the third digit register is then transferred to the second digit register when a pulse is applied to conductor SL and at the completion of the shift cycle, the reversible distributor is stepped one step to the right to thus enable the second digit register to read in the received digit. Since the digit being received is already loaded in the second digit register, the received digit has no further effect on the circuit. At the completion of the digit, as marked by the disappearance of pulses from conductor IST or an end of digit signal from the keyboard, control A or control B, respectively, serves to apply a ground pulse to conductor FG to advance the reversible distributor one step to the left and thus enable the third digit register to read in the next received digit.

Flip-flop 5302 is provided in the reversible distributor for the purpose of preventing the loading of the same digit twice in the first digit register under the conditions in which a single digit is registered in the digit registers and is continuously received while control A or B transmits a seize signal to the distant office, receives a seize acknowledge signal, transmits the compound voice frequency signal corresponding to the registered digit, and receives the correct digit acknowledgment signal. When the correct acknowledgment signal is received, control A or B initiates a shift cycle to erase the information stored in the first digit register. At the completion of the shift cycle when a ground pulse appears on conductor SN, amplifier 5102 becomes conductive and a negative pulse is coupled through gate 5309 to set flip-flops 5301 and 5302. When flip-flop 5301 is set, the first digit register is, of course, inhibited so that when the inhibit ground is removed from conductor SX, the same digit is not again loaded in the first digit register. At the end of the digit, a ground pulse appears on conductor FG, flip-flops 5301 and 5302 are triggered to their reset condition through gate 5310, and the first digit register is thereby enabled to register the next received digit.

Flip-flip 5103 is provided as an overthrow stage in the reversible distributor and is triggered to its set condition only when all five of the digit registers have digit information stored therein. When flip-flip 5103 is set, ground potential is applied to conductor KCF as a stop keying signal to the keyboard circuit. The next occurring ground pulse on conductor SN at the termination of a shift cycle will, of course, serve to trigger flip-flip 5103 to its reset condition and to trigger flip-flop 5101 to its set condition so that the next received digit can be stored in the fifth digit register.

Returning to the consideration of the one and zero discriminating amplifiers 5901 and 5902, it will be recalled that control A or B must delay until a second digit is received before transmitting a connect demand signal to the register finder for the purpose of transferring the digit information to the route selector if the first digit is either a "1" or a "0." Furthermore, if the call is for an operator, as signified by the digits "00," or is for a service line, as signified by the digits "01–04," the identity of a selected called terminating unit is not read back into the terminating time store or time position store associated with the direct dialing register or the position register, respectively. It can be seen that if the digit "0," which corresponds to frequencies UX, is stored in the first digit register, negative potential is coupled to terminal B of amplifier 5902 and ground potential is coupled to terminal C of amplifier 5902. Under these conditions, amplifier 5902 becomes conductive to apply ground potential to conductor WDD and through gate 5903 to conductor FDD. Similarly, when the digit "1," which corresponds to frequencies VW, is stored in the first digit register, amplifier 5901 becomes conductive to apply ground potential to conductor FDD. Ground potential applied to conductor FDD prevents control A or B from transmitting a connect demand signal to the register finder until two digits have been stored in the five digit store. Ground potential applied to conductor WDD causes control A or B to transmit a signal to the route selector which prevents the route selector from reading back the identity of the called unit to the register.

When either of the amplifiers 5901 or 5902 becomes conductive, amplifier 5904 is rendered non-conductive and negative potential is applied to the C terminal of each of the second digit read out gates 5905—5906 and to conductor GDS. If the first digit is one of the digits "2–9," control A or B transmits a connect demand to the register finder at the termination of the first digit and when a demand answer signal is received from the register finder, control A or B functions to apply negative potential to conductor DWP. Since amplifier 5904 is conductive under these conditions, only the first digit read out gates 5907—5908 are enabled when negative potential is applied to conductor DWP and a negative signal is applied to the two of the digit marking conductors 1DU—1DY which correspond to the first register stages in which the flip-flip is set. When the identity of the terminating unit selected by the route selector in response to the marking on conductors 1DU—1DY is read back into the register, control A or B initiates a shift cycle, as previously described.

On the other hand, if the first digit is a "1" or a "0," control A or B serves to apply negative potential to conductor DWP only after two digits have been stored and since amplifier 5904 is non-conductive, both the first digit read out gates 5907—5908 and the second digit read out gates 5905—5906 are enabled and negative signals are applied to two of the conductors 1DU—1DY and to two of the conductors 2DU—2DY to mark the first and second digits to the route selector. When the identity of the selected terminating unit is read back into the register, control A or B initiates a first shift cycle to clear the first digit register and advance the information in each succeeding digit register to the preceding digit register. The negative potential on conductor GDS, which occurs since amplifier 5904 is non-conductive, and the negative potential appearing at the output of gate 5801 whenever a digit is stored in the second digit register are utilized in control A or B to initiate a second shift cycle a predetermined time after the first shift cycle is completed. Obviously, two shift cycles are required since two digits were required to identify the desired line terminating unit.

It can be seen that terminal D of each of the flip-flips corresponding to 5601 in the first digit register is connected to the C terminal of an individual one of the voice gates 5304—5308. Thus, when a particular flip-flip, such as 5601 in stage 1RU, is set, its individually associated voice gate, such as 5304, is operated and the frequency corresponding to its letter designation is transmitted through the gate to conductor SG. For example, if the digit "4" is stored in digit register 1, gates 5304 and 5305 are operated and the compound frequency UV is transmitted over conductor SG to control A or B. The digit identifying compound frequency is transmitted through control A or B and the called control connector associated with the register to the next succeeding office. Since the called control connector is not connected to the time slot of the called unit until the identity of that unit has been read back into the register from the route selector, the compound voice frequency signals corresponding to the first or first and second digits, depending upon whether the call is to another long distance switching center or a local office, respectively, are, of course, not coupled through the called control connector to a called unit and are thus without effect. Obviously when the call is to an operator or a service line and ground potential is therefore applied to conductor WDD by the illustrated circuit, the called control connector is not taken into use and the signals coupled through gates 5304—5308 have no function. When the call is to an operator or a service line, control A or B serves to apply a ground pulse to reset conductor R when the calling unit identification has been read in by a link circuit and the five digit store is immediately returned to its reset condition.

After the called control connector of the register has engaged the time position channel of the selected unit, the compound voice frequency signal representing the setting of the first digit register at that time is transmitted through control A or B and the called control connector to the distant office until the transmitted digit is acknowledged by the distant office. The digit acknowledgment signal received from the distant office is detected by the called multifrequency signal detector in control A or B and negative pulses appear on the two of the conductors U2—Y2 of Fig. 57 which correspond to the digit represented by the compound voice frequency acknowledgement signal. Since conductor RDG stands at negative potential when acknowledgement signals are to be read in, all inputs to two of the gates corresponding to 5702 go negative during the first negative pulse received over two of the conductors U2—Y2 and at the trailing edge of said pulse, two of the flip-flips corresponding to 5701 are triggered to their set condition. When one or more of the flip-flips corresponding to 5701 are set, ground potential is applied to conductor DR for the purpose of enabling control A or B to test the condition of conductor CG from the five digit store.

The setting of the digit acknowledgement register is compared to the setting of the first digit register by the comparator circuit, which comprises stages CGU—CGY, for the purpose of determining whether or not the transmitted digit is correctly acknowledged. Each stage of the comparator circuit comprises a pair of amplifiers, such as 5703 and 5704 in stage CGU, which are cross-connected to corresponding stages of the first digit register and the digit acknowledgement register in such a way that one of the amplifiers will become conductive if the flip-flips in the corresponding stages of the first digit register and of the digit acknowledgement register are not in the same operated condition. For example, the potential at terminal E of flip-flip 5601 in the first digit register stage 1RU controls the B terminal of amplifier 5703 and the C terminal of amplifier 5704, while the potential at terminal E of flip-flip 5701 in digit acknowledgement register stage DAS–U controls the B terminal of amplifier 5704 and the C terminal of amplifier 5703. If both flip-flips 5601 and 5701 are reset, negative potential is applied to both terminals B and C of amplifiers 5703 and 5704 and the amplifiers remain non-conductive. Similarly, if both flip-flips are set, ground potential is applied to both terminals B and C of amplifiers 5703 and 5704 and the amplifiers remain non-conductive. However, if one of the flip-flips is set and the other flip-flip is reset, negative potential is applied to the B terminal and ground is applied to the C terminal of one of the amplifiers 5703 and 5704 and that amplifier is thereby rendered conductive to apply ground potential to conductor CG. Thus, it can be seen that if the corresponding flip-flips in the first digit register and the digit acknowledgement register are operated, signifying that the digit acknowledgement signal is identical to the transmitted digit signal, conductor CG remains at negative potential when ground potential is applied to conductor DR while if there is a discrepancy in the setting of the two registers, conductor CG goes to ground when conductor DR goes to ground. Control A or B is responsive to the receipt of negative potential on conductor CG and ground on conductor DR to transmit a seize signal to the distant office and is responsive to the receipt of ground on conductors CG and DR to transmit a cancel signal to the distant office. Control A or B then functions to apply ground to conductor CL to reset the set flip-flips in the digit acknowledgement register. If the transmitted digit was correctly acknowledged, control A or B also serves to initiate a shift cycle so that the next stored digit can be transmitted to the distant office. If the transmitted digit was not correctly acknowledged, a shift cycle is not initiated and the same digit is retransmitted to the distant office.

As explained in the general description, the register continues to transmit digit signals to the distant office until an end of call signal is received from the distant office indicating that the desired subscriber line has been selected or that a busy condition has been encountered. Control A or B then transmits a connect demand signal to the register finder and when a demand answer signal is received from the register finder, the identity of the calling and called units is transferred to a link circuit. When the identification information has been transferred to a link circuit, control A or B serves to apply a ground pulse to reset conductor R and any set flip-flops or flip-flips in the five digit store are triggered to their reset condition.

*Control A.*—Control A is shown in Figs. 60–68, inclusive. As described in the general description, each direct dialing register comprises a control A, a five digit store, a calling time store, a terminating time store, and two control connectors for making connections to the calling and called units, respectively. It will be recalled from the general description that the identity of the calling line terminating unit is transferred from the seize detector control circuit to the calling time store associated with the allotted direct dialing register when the calling line terminating unit is a unit which terminates a trunk line from a local office. Also as described in the general description, when the identity of the calling unit is read in by the calling time store, the calling control connector of the direct dialing register is controlled to connect to the time division channel on the highway assigned to the calling unit and any signals thereafter appearing on that channel are demodulated in the calling control connector and the demodulated signals are coupled over conductors CAC to the calling multifrequency signal detector 6001 in control A. The multifrequency signal detectors, such as 6001 and 6402, associated with the various registers of the system may be of any well known type but are preferably of the type shown and described in copending application Serial Number 814,845, filed May 21, 1959, and assigned to the same assignee as the present invention. Simultaneously with the initiation of the transmission of unit time position channel and highway identification information to the calling control connector, the calling time store functions to apply ground potential to conductor SC to initiate the operation of control A.

When the potential on conductor SC goes from negative to ground, delay multivibrator 6101 is triggered to produce a twenty millisecond negative-going pulse at its output terminal A and the trailing edge of said pulse triggers amplifier 6102 to produce a fifty microsecond negative pulse which is applied to terminal B of gated amplifier 6103. Amplifier 6103 is provided in the circuit for the purpose of determining whether or not a seize signal is actually being received over the channel to which the calling control connector of the direct dialing register is connected. It is to be noted that amplifier 6103 is not enabled until a period of twenty milliseconds has elapsed after seizure of the calling control connector so that multifrequency seize detector 6001 has ample time to detect a seize signal. If a seize signal is being received over the calling channel, it is detected in multifrequency signal detector 6001 and negative potenial is applied to conductor S1. Under these conditions, amplifier 6103 remains non-conductive and the call is accepted and processed by the direct dialing register. However, if conductor S1 is at ground potential at the time that negative potential is applied to terminal B of amplifier 6103, thus indicating that a seize signal is not being received, amplifier 6103 becomes conductive and reset control flip-flip 6201 is triggered to its set condition to completely reset the circuits of the direct dialing register.

When flip-flip 6201 is set and its terminal D goes negative, amplifier 6202 becomes conductive and ground potential is coupled through emitter follower 6203 to conductor R to release the calling time store and thus the calling control connector. The ground on conductor R is also applied to the A terminals of the various flip-flips in control A but since none of said flip-flips are operated at this time, is without effect. The ground on conductor R is also coupled through diode 6105 to immediately reset delay multivibrator 6104 which was triggered to produce a one hundred and thirty millisecond negative pulse at its terminal A by the trailing edge of the pulse produced by delay multivibrator 6101. Flip-flip 6106 is not triggered to its set condition by the ground coupled through diode 6105 since ground potential on conductor R is simultaneously applied to terminal A of flip-flip 6106. When reset control flip-flip 6201 is triggered to its set condition to initiate the above-described operation, delay multivibrator 6204 is triggered to produce a twenty millisecond negative pulse at its terminal A and at the trailing edge of said pulse, flip-flip 6201 is reset and the calling time store is controlled over conductor RLR to again mark the direct dialing register as idle to the direct dialing register allotter.

Assume that a seize signal is detected and that amplifier 6103 therefore remains non-conductive. As mentioned above, the trailing edge of the negative pulse at terminal A of delay multivibrator 6101 triggers delay multivibrator 6104 to produce a one hundred and thirty millisecond negative pulse at its terminal A and a one hundred and thirty millisecond negative-to-ground pulse at its terminal D. When terminal D of delay multivibrator 6104 goes to ground, amplifier 6002 is rendered conductive and negative potential is thereby applied to terminal C of voice gate 6003 to enable said gate to pass the voice frequency seize signal S to the input of audio amplifier 6004. The amplified seize signal appearing at the output of amplifier 6004 is coupled to the calling control connector over conductors CAR for the purpose of controlling the switch-through of the link circuit in the originating local office so that a signaling connection is completed between the calling subscriber station and the direct dialing register. At the termination of the one hundred and thirty millisecond period, terminal D of delay multivibrator 6104 goes negative and amplifier 6002 is rendered non-conductive to terminate the transmission of a seize signal. The trailing edge of the negative pulse at terminal A of delay multivibrator 6104 triggers flip-flip 6106 to its set condition and when terminal D of flip-flip 6106 goes negative, voice gate 6011 is enabled to pass dial tone to amplifier 6004 and thus over conductors CAR to the originating subscriber station.

In response to the receipt of the dial tone signal, the calling subscriber keys the digits corresponding to the desired called subscriber station or to the operator position in the long distance switching center. When a digit is loaded in the first digit register of the five digit store, conductor G1 goes to ground and flip-flip 6106 is triggered to its reset condition to thereby terminate the transmission of dial tone to the calling subscriber station. It will be recalled that there are four possible types of calls which may be processed by the direct dialing register. That is, the call may be routed through one or more succeeding long distance switching centers before being routed to a local office, the call may be routed directly to another local office served by the illustrated long distance switching center, the call may be routed to the operator position in the illustrated long distance switching center, or the call may be routed to a service line in the illustrated long distance switching center. The various types of calls will be described below in turn.

Assume that the call is to be routed through one or more long distance switching centers before being routed to a local office, as denoted by a first digit of one of the digits "2–9," so that conductor FDD from the five digit store remains at a negative potential. At the termination of the first digit, as determined by the disappearance of negative pulses from conductor IST, the output of integrator 6005 goes to ground and delay multivibrator 6006 is triggered to produce a one hundred microsecond negative-to-ground pulse at its output terminal D. The positive-going pulse at terminal D of delay multivibrator 6006 is coupled over conductor FG to the five digit store and is utilized in that circuit to advance the shift register therein so that the next received digit is loaded in the second digit register. The positive-going pulse applied to conductor FG is also applied to terminal C of gated amplifier 6007 and, since terminal B of amplifier 6007 is negative at this time, amplifier 6007 is rendered conductive. Negative potential is applied to terminal B of amplifier 6007 at this time since both inputs to gate 6008 are negative, the negative signal appearing at the output of gate 6008 is coupled through gate 6009 to terminal B of gate 6010, and terminal C of gate 6010 is returned to negative potential appearing on conductor CBM. When amplifier 6007 becomes conductive, a positive-going pulse is applied to terminal E of connect demand flip-flip 6501 and that flip-flip is thereby triggered to its set condition. When flip-flip 6501 is set, the negative potential at its terminal D is applied to conductor FCD as a connect demand signal to the register finder.

When a negative demand answer signal is received over conductor DAF from the register finder, both inputs to gate 6502 are negative, amplifier 6503 is rendered conductive, and amplifier 6504 is rendered non-conductive. When amplifier 6504 becomes non-conductive, negative potential is applied to terminal C of gate 6505, and since conductor WDD is negative, all inputs to gate 6505 are negative, and amplifier 6506 is rendered conductive to apply ground potential to conductor DD for the purpose of marking the calling register as a direct dialing register to the route selector. Also when amplifier 6504 becomes non-conductive, all inputs to gate 6507 are negative and a negative signal is applied to conductors DWP and TSR. The negative potential applied to conductor DWP controls the five digit store to forward digit marking information identifying the desired group of trunk line terminating units to the route selector and the negative potential applied to conductor TSR enables the terminating time store to read in the identity of the selected terminating unit when an idle unit has been selected by the route selector and a read in signal is applied to conductor RTD by the route selector.

When the identity of the unit selected by the route selector is read into the terminating time store, conductor CBM goes to ground, gate 6010 is blocked so that amplifier 6007 cannot again be rendered conductive for the duration of the call, connect demand flip-flip 6501 is reset to terminate the transmission of a connect demand signal to the register finder, and to terminate the transmission of signals over conductors DD, TSR, and DWP, and delay multivibrator 6107 is triggered to initiate a so-called shift cycle. The one hundred microsecond ground pulse appearing at terminal D of delay multivibrator 6107 is amplified by emitter follower 6108 and applied to conductor SS for the purpose of resetting the first digit register in the five digit store. The one hundred microsecond ground pulse appearing at the output of emitter follower 6108 is also applied to conductor CL through gate 6801 but serves no purpose at this time since the digit acknowledgment register in the five digit store is not operated at this time. The ground pulse appearing at the output of emitter follower 6108 also triggers delay multivibrator 6802 to apply a one millisecond ground pulse to conductor SX for the purpose of blocking the digit input gates of the five digit store while information is being shifted in the five digit store shift register, as fully described in the description of the five digit store.

The trailing edge of the one hundred microsecond negative pulse at terminal A of delay multivibrator 6107 triggers amplifier 6109 non-conductive for a period of approximately fifty microseconds and the trailing edge of the resulting negative pulse at terminal A of amplifier 6109 is utilized to trigger delay multivibrator 6205. The one hundred microsecond ground pulse appearing at terminal D of delay multivibrator 6205 is applied to conductor SP for the purpose of shifting digit information from the second digit register to the first digit register of the five digit store, and the trailing edge of the negative pulse at terminal A of delay multivibrator 6205 is utilized to trigger delay multivibrator 6206. The one hundred microsecond ground pulse appearing at terminal D of delay multivibrator 6206 is applied to conductor SL for the purpose of shifting digit information from the third digit register to the second digit register of the five digit store and the trailing edge of the negative pulse at terminal A of delay multivibrator 6206 is utilized to trigger delay multivibrator 6207. The one hundred microsecond ground pulse appearing at terminal D of delay multivibrator 6207 is applied to conductor SM for the purpose of shifting digit information from the fourth digit register to the third digit register of the five digit store, and the trailing edge of the negative pulse at terminal A of delay multivibrator 6207 is used to trigger amplifier 6208 non-conductive for a period of approximately fifty microseconds. The negative pulse appearing at terminal A of amplifier 6208 is inverted by amplifier 6301 and the resulting ground pulse is applied to conductor SN for the purpose of shifting digit information from the fifth digit register to the fourth digit register of the five digit store and for the purpose of stepping the control counter of the five digit store one step to the right, as fully described in the description of the five digit store. The ground pulse appearing at terminal A of amplifier 6301 is also utilized to trigger flip-flip 6302 to its set condition.

When flip-flip 6302 is set and its terminal D therefore goes negative, voice gate 6303 is enabled to pass voice frequency seize signal S to the input of audio amplifier 6401, and thus over conductors TAR to and through the called control connector to the time division channel of the called line terminating unit. The seize signal transmitted to the called line terminating unit is detected by a seize detector in the selector long distance switching center and when an incoming register is connected to the time division channel of the calling unit in that center, a seize acknowledge signal is returned over the connection and appears on conductors TAC from the called control connector. When a seize acknowledge signal is detected on conductors TAC by multifrequency signal detector 6402, conductor Z2 goes negative and if a digit is loaded in the first digit register of the five digit store and amplifier 6403 is therefore conductive, the output of gate 6404 goes negative and amplifier 6405 is rendered conductive. The signal on conductor Z2 is gated with the output of amplifier 6403 so as to prevent the initiation of a one second time-out period if a digit is not stored in the first digit register of the five digit store. The timing features of control A will be described in detail later.

When amplifier 6405 becomes conductive, flip-flip 6302 is immediately reset and the transmission of seize signal S is thereby terminated. Also when amplifier 6205 becomes conductive, delay multivibrator 6803 is triggered to produce a twenty millisecond negative pulse at its terminal A and digit send flip-flip 6804 is triggered to its set condition by the trailing edge of said pulse. When flip-flip 6804 is set and its terminal E goes to ground, ground potential is coupled through diode 6406 to block gate 6404, ground potential is coupled through gate 6407 to render amplifier 6408 non-conductive, and negative potential is thereby applied to conductor RDG to enable the digit acknowledgment gates of the five digit store. When flip-flip 6804 is set and its D terminal goes negative, voice gate 6304 is enabled to pass the voice frequency digit signals appearing on conductor SG from the five digit store to amplifier 6401 and thus to the circuits in the called direction. Also when terminal D of flip-flip 6804 goes negative, a negative signal is coupled through OR gate for negative signals 6110 to enable the one second time-out gate 6601.

The digit signals transmitted over conductors TAR are detected and registered in the distance office, and digit acknowledgment signals corresponding to the registered digits are returned through the called control connector and over conductors TAC to multifrequency detector 6402. The compound voice frequency signals corresponding to the acknowledged digit are detected in multifrequency detector 6402 and the two of the conductors U2—Y2 which correspond to that digit have negative pulses applied thereto. The pulses on conductors U2—Y2 are used to trigger individual flip-flips in the digit acknowledgment register of the five digit store, as described in the description of the five digit store. When the digit acknowledgment register in the five digit store is set, ground potential appears on conductor DR and delay multivibrator 6805 is triggered to its operated condition. The ground pulse appearing at terminal D of delay multivibrator 6805 is used to trigger flip-flip 6804 to its reset condition and thereby terminate the transmission of digit signals to the distant office. Ground at terminal D of multivibrator 6805 is also coupled through gate 6407 to hold negative potential on conductor RDG after flip-flip 6804 is reset. The trailing edge of the twenty-four millisecond negative pulse at terminal A of multivibrator 6805 triggers amplifier 6806 to produce a fifty microsecond negative pulse which is applied to terminal C of gate 6807 and to terminal B of diode 6808.

If the transmitted digit signals are correctly acknowledged, conductor CG from five digit store is negative at the time that amplifier 6806 becomes non-conductive, a negative signal is passed by gate 6807 and amplifier 6809 is rendered conductive. When amplifier 6809 becomes conductive, delay multivibrator 6107 is triggered to its operated condition to initiate a shift cycle, delay multivibrator 6802 is triggered to its operated condition to apply a one millisecond ground pulse to conductor SX, and ground potential at terminal D of multivibrator 6107 is applied to conductor CL to reset the digit acknowledgment register of the five digit store all in the same manner as previously described. At the end of the shift cycle when ground potential is applied to conductor SN, flip-flip 6302 is triggered to its set condition so that a seize signal S is again transmitted to the distant office. When a seize acknowledgment signal is returned, the signals on conductor SG from five digit store, which signals correspond to the next registered digit, are coupled to conductors TAR in the exact same manner as previously described.

If the transmitted digit signals are incorrectly acknowledged, conductor CG from five digit store is at ground potential at the time that amplifier 6806 becomes non-conductive, and amplifier 6810 rather than amplifier 6809 is rendered conductive. When amplifier 6810 becomes conductive, delay multivibrator 6811 is triggered to its operated condition and the resulting fifty millisecond ground pulse at its terminal D is amplified by emitter follower 6812 and applied to terminal B of amplifier 6305, to terminal E of gate 6209, and to conductor CL through gate 6801. When ground potential is applied to its B terminal, amplifier 6305 is rendered conductive to apply negative potential to terminal C of voice gate 6306 and thus enable that gate to pass frequency U to the input of audio amplifier 6401. When ground potential is applied to terminal E of gate 6209, amplifier 6210 is rendered conductive and voice gate 6307 is enabled to pass frequency Z to the input of audio amplifier 6401. Thus, the cancel tone comprising frequencies UZ is amplified by audio amplifier 6401 and coupled to the circuits in the called direction for the purpose of controlling the register in the distant office to cancel the last received digit. Ground potential applied to conductor CL, of course, serves to reset the digit acknowledgment register of the five digit store, as previously described. Delay multivibrator 6803 is triggered to its operated condition by the trailing edge of the fifty millisecond negative pulse produced at terminal A of multivibrator 6811 to produce a twenty millisecond negative pulse at its terminal A. It can be seen that amplifiers 6305 and 6210 are rendered non-conductive to discontinue the transmission of a cancel signal at the same time that multivibrator 6803 is triggered to its operated condition. Flip-flip 6804 is triggered to its set condition by the trailing edge of the twenty millisecond negative pulse at terminal A of multivibrator 6803 and when flip-flip 6804 is set, voice gate 6304 is enabled to pass the signals on conductor SG to conductors TAR. Thus, since a shift cycle is not produced when the digit is incorrectly acknowledged, the same digit is retransmitted to the register in the distant office.

The succeeding digits of the called subscriber station number are sent and acknowledged in the same manner as just described until the connection is finally extended to a local office and dial tone rather than a seize acknowledgment signal Z is returned over the extended connection to multifrequency signal detector 6402. When dial tone is detected by multifrequency signal detector 6402, conductor DT goes negative and amplifier 6409 is rendered conductive to trigger flip-flip 6308 to its set condition. When terminal D of flip-flip 6308 goes negative, voice gate 6309 is enabled to pass frequency V and when terminal E of flip-flip 6308 goes to ground, amplifier 6210 becomes conductive and voice gate 6307 is enabled to pass frequency Z. Thus, a signal interlock request signal comprising frequencies V and Z is transmitted over conductors TAR to the register in the called local office. Also when terminal E of flip-flip 6308 goes to ground, flip-flip 6302 is reset to terminate the transmission of a seize signal to the local office.

When an interlock request acknowledgment signal Z is returned from the local office, conductor Z2 from multifrequency signal detector 6402 goes negative, amplifier 6405 becomes conductive, flip-flip 6308 is reset to terminate the transmission of the VZ signal, and the twenty millisecond delay multivibrator 6803 is triggered to its operated condition. The operation of the circuit then continues in the same manner as previously described. That is, after twenty milliseconds, flip-flip 6804 is triggered to its set condition so that the digit signals appearing on conductor SG are transmitted to the local office, the digit is acknowledged, a seize signal is transmitted, a seize acknowledgment is received, and the process is then repeated for each of the remaining digits.

When the desired subscriber station in the called local office is finally selected, or if a busy condition is encountered in one of the offices in setting up the connection, an end of call signal comprising frequencies V and Z is returned over the connection to multifrequency signal detector 6402. When both of the conductors V2 and Z2 from multifrequency signal detector 6402 go negative, a negative signal is passed by gate 6602 so that the next occurring positive-going excursion on conductor V2 triggers connect demand flip-flip 6603 to its set condition. When terminal D of flip-flip 6603 goes negative, a negative finder connect demand signal is applied to conductor FCD. When a negative demand answer signal is received over conductor DAF from the register finder, amplifier 6503 becomes conductive and amplifier 6504 becomes non-conductive. When amplifier 6504 becomes non-conductive, both inputs to gate 6604 are negative and amplifier 6605 becomes conductive to block gates 6505 and 6507 so that signals are not applied to conductors DD, TSR, and DWP. Simultaneously therewith, both inputs to gate 6606 go negative and amplifier 6607 becomes conductive to apply ground potential to write-direct conductor WD, which extends to the route selector. When ground potential is received over conductor WD by the route selector, the route selector functions to apply a write-read signal to conductor WRO after a slight delay.

When a negative signal is received on conductor WRO by the illustrated circuit, amplifier 6508 is rendered conductive to apply ground potential to conductor TSW for the purpose of controlling the calling time store to read out the identification information corresponding to the calling line terminating unit. The ground potential applied to conductor TSW also serves to render amplifier 6608 non-conductive. Also when negative potential is received on conductor WRO, all inputs to gate 6609 go negative, amplifier 6610 is rendered conductive, and ground potential is applied to conductor DSW for the purpose of controlling the terminating time store to read out the identification information corresponding to the called line terminating unit. The calling and called line terminating unit identification information is, of course, read into the allotted link circuit and a talking connection is completed therebetween so that the originating subscriber may hear either ringback tone or busy tone depending upon whether the called subscriber station in the distant office is idle or busy, respectively.

When the identification information is read into the allotted link circuit, conductor WRO goes to ground, amplifier 6508 becomes non-conductive, amplifier 6608 becomes conductive, and the reset control flip-flip 6201 is thereby triggered to its set condition. As previously described, when flip-flip 6201 is set, ground potential is applied to conductor R to reset any operated flip-flips in the illustrated circuit and after a delay of twenty milliseconds, flip-flip 6201 is reset and the calling time store is controlled over conductor RLR to mark the direct dialing register as idle to the direct dialing register allotter.

In the above description it was assumed that the route selector was successful in selecting an idle line terminating unit in the group of units identified by the digit marking forwarded by the direct dialing register in response to the operation of connect demand flip-flip 6501 and the resulting receipt of a demand answer signal from the register finder. It will be recalled that since conductor DD was marked with ground potential, the route selector functioned to return a signal on conductor RTD so that the identity of the selected unit was read into the terminating time store of the direct dialing register. In the event that all of the line terminating units in the desired group are busy, the route selector functions to apply a write-read signal to conductor WRO rather than to conductor RTD and also functions to read out the identification of the tape announcement line terminating unit corresponding to the desired group to the allotted link circuit. When a negative signal is received on conductor WRO by the illustrated circuit, amplifier 6508 is rendered conductive, and ground potential is applied to conductor TSW for the purpose of controlling the calling time store to read out the identification of the calling line terminating unit to the allotted link circuit. Ground potential is not applied to conductor DSW under these conditions since gate 6609 is blocked by ground potential appearing at terminal E of the set connect demand flip-flip 6501. Thus, the calling subscriber station is connected through the allotted link circuit to the tape announcement unit corresponding to the desired group and a busy announcement is thereby coupled to the calling line. When the link circuit has read in, conductor WRO returns to ground, amplifier 6608 becomes conductive, reset control flip-flip 6201 is set, and the direct dialing register is completely reset, all as previously described.

Next assume that the call is to be routed to a local office served by the illustrated long distance switching center as denoted by the receipt of a first digit "1." As explained in the description of the five digit store, when the digit "1" is stored in the first digit register of the five digit store, ground potential is applied to conductor FDD and negative potential is applied to conductor GDS. At the termination of the first digit, negative pulses disappear from conductor IST and delay multivibrator 6006 is controlled to generate a one hundred microsecond pulse which is applied to conductor FG to shift the control counter of the shift register one step to the left, as previously described. Amplifier 6007 is not rendered conductive when ground potential is applied to conductor FG since its B terminal is held at ground potential because of the fact that both conductors FDD and GD are at ground potential and ground potential therefore appears at the output of OR gate for negative signals 6009. Thus, a register finder connect demand signal is not transmitted at the end of the first digit when the call is to a local office served by the illustrated long distance switching center since two digits are required to identify the particular local office to which the call is to be extended.

When a digit is stored in the second digit register of the five digit store, conductor GD goes negative so that all inputs to gate 6012 are negative and so that negative potential is applied to terminal B of amplifier 6007. At the termination of the second digit, ground potential is again applied to conductor FG and to the C terminal of amplifier 6007 so that amplifier 6007 becomes conductive to trigger the connect demand flip-flip 6501 to its set condition. When a demand answer signal is received from the register finder responsive to the connect demand signal transmitted when flip-flip 6501 is set, ground potential is applied to conductor DD to mark the register as a direct dialing register to the route selector, negative potential is applied to conductor TSR to enable the terminating time store to read in the identity of the selected line terminating unit when an RTD signal is received by that circuit from the route selector, and negative potential is applied to conductor DWP to enable the five digit store to read out first and second digit identifying information to the route selector, all as previously described.

When the identity of the selected unit in the group of units which terminate trunk lines to the desired local office is read into the terminating time store, conductor CBM goes to ground and delay multivibrator 6107 is triggered to its operated condition to initiate a shift cycle. Also when conductor CBM goes to ground, delay multivibrator 6111 is triggered through gate 6012 to produce a 1.5 millisecond negative pulse at its terminal A. As previously described, each shift cycle is approximately five hundred microseconds in duration. Therefore, approximately one millisecond after the first shift cycle is completed, delay multivibrator 6107 is again triggered by the trailing edge of the negative pulse at terminal A of multivibrator 6111 and a second shift cycle is initiated. Obviously, two shift cycles are required since two digits were required to identify the desired local office. At the end of the first shift cycle, the transmission of a seize signal to the selected local office is initiated and the seize signal is, of course, acknowledged by dial tone when an idle register in the called local office is connected to the calling unit in that office. Therefore, a digit interlock request VZ signal is transmitted to the called local office and is acknowledged by frequency Z in the exact same manner as described above. The digits corresponding to the subscriber station are then each sent and acknowledged in turn and eventually an end of call VZ signal is received by the direct dialing register. When the end of call signal is received, a second connect demand signal is transmitted to the register finder, the identities of the calling and called units in the long distance switching center are transferred to the allotted link circuit, and the direct dialing register is released, all as previously described.

Also, in the same manner as previously described, if all line terminating units in the selected group are busy, the route selector functions to apply negative potential to conductor WRO, the identity of the calling unit is transferred from the calling time store, and the identity of the 120 I.P.M. busy tone unit is transferred from the route selector to the allotted link circuit. When conductor WRO returns to ground, the direct dialing register is released and marked as idle to the direct dialing register allotter, as previously described.

Next assume that the call is to be extended to the operator position, as denoted by the digits "00," or is to be extended to a service line in the long distance switching center, as denoted by any of the digits "01–04." As explained in the description of the five digit store, when the digit "0" is stored in the first digit register of the five digit store, ground potential is applied to conductors FDD and WDD, and negative potential is applied to conductor GDS. Thus in the same manner as described for a call to a local office, control A is prevented from transmitting a register finder connect demand signal until the termination of the second digit. Since ground potential is applied to conductor WDD, ground potential is not applied to conductor DD when a demand answer signal is received from the register finder and the route selector is thereby controlled to transmit a negative signal over conductor WRO rather than conductor RTD. Thus, the identity of the calling unit is read out of the calling time store and into the allotted link circuit and the direct dialing register is released and reset when conductor WRO returns to ground potential.

A one second time-out circuit is provided in control A for the purpose of automatically routing a given call to the operator position in the illustrated long distance switching center if a digit transmitted to an office in the called direction is not correctly acknowledged or if a transmitted interlock request signal is not acknowledged within a period of one to two seconds. It can be seen that terminals B and C of OR gate for negative signals 6110 are connected to terminal D of VZ tone control flip-flip 6308 and to terminal D of the digit send control flip-flip 6804, respectively. Thus when either of the flip-flips 6308 or 6804 is set, the output of gate 6110 is negative and if the second connect demand flip-flip 6603 is in its reset condition, gate 6601 is enabled to pass the 1.5 millisecond negative pulse which appears on conductor 1 Sec. Pulse and which may be generated by any well known timing device. When a negative pulse is coupled through gate 6601, amplifier 6701 is rendered conductive, and flip-flip 6611 is triggered to its set condition.

When flip-flip 6611 is set, negative potential is applied to terminal B of gate 6702 but without effect at this time since terminal C of that gate is held at ground because of the conduction of amplifier 6701. The negative potential at terminal D of flip-flip 6611 is also applied to terminal D of gate 6110 to clamp the output of that gate negative regardless of the further operation of flip-flips 6308 and 6804. Flip-flip 6611 will remain in its set condition unless a shift cycle is produced, thus indicating that the transmitted digit was correctly acknowledged, or unless the second connect demand flip-flip 6603 is triggered to its set condition. If a shift cycle is produced, the ground potential applied to conductor SN is coupled through gate 6612 to reset flip-flip 6611 while if flip-flip 6603 is set, the ground appearing at terminal E of that flip-flip is coupled through gate 6612 to reset flip-flip 6611.

If flip-flip 6611 remains set for a period of one second, a negative pulse is again passed by gate 6601, amplifier 6701 again becomes conductive, and flip-flip 6703 is triggered to its set condition through gate 6702. When flip-flip 6703 is set and its E terminal goes to ground, either flip-flip 6308 is reset through gate 6310 or flip-flip 6804 is reset through gate 6813 depending upon which of said flip-flips is set, and amplifier 6210 is rendered conductive through gate 6209 to enable voice gate 6307 to pass Z-tone to conductors TAR. Simultaneously therewith, the negative potential at terminal D of flip-flip 6703 enables voice gate 6311 to pass Y-tone to conductors TAR so that the compound voice frequency release signal YZ is transmitted to the circuits in the called direction.

The next occurring pulse on conductor 1 Sec. Pulse renders amplifier 6701 conductive and a ground pulse is coupled through gate 6704, since terminal D of that gate is returned to negative potential at terminal D of set flip-flip 6703, both of the connect demand flip-flips 6501 and 6603 are triggered to their set conditions, and a finder connect demand signal is applied to conductor FCD. Also when flip-flip 6603 is set and ground potential appears at its terminal E, flip-flips 6611 and 6703 are reset, and gate 6601 is blocked. When a negative demand answer signal is received from the register finder, amplifier 6504 becomes non-conductive, and amplifier 6607 is rendered conductive through gate 6606 to apply ground potential to write-direct conductor WD. Also when amplifier 6504 becomes non-conductive, amplifier 6605 is rendered conductive through gate 6604 to block gates 6505 and 6507. Amplifier 6613 is rendered conductive when flip-flips 6501 and 6603 are set and serves to apply negative potential to terminal B of gate 6614. As previously explained, the route selector is controlled by the ground signal on conductor WD to apply negative potential to conductor WRO.

When negative potential is received on conductor WRO by the illustrated circuit, amplifier 6508 is rendered conductive to apply ground potential to conductor TSW for the purpose of enabling the calling time store to read out, and amplifier 6615 is rendered conductive through gate 6614 to apply ground potential to conductor DAM for the purpose of identifying the call as an operator position call to the route selector. It is to be noted that gate 6609 is blocked by ground potential appearing at terminal E of flip-flip 6501 so that the terminating time store is prevented from reading out under these conditions. When conductor WRO returns to ground potential, amplifier 6608 becomes conductive and flip-flip 6201 is triggered to its set condition to initiate the complete release of the direct dialing register.

A ten second time-out circuit is provided in control A for the purpose of automatically routing a given call to the operator position if no digit is received within ten to twenty seconds after seizure of the direct dialing register or if more than a period of ten to twenty seconds elapses between the receipt of successive digits, or if a seize signal is not asknowledged within a period of ten to twenty seconds. It can be seen that amplifier 6705 is held conductive to clamp the output of gate 6707 to ground as long as control A is idle since all inputs to gate 6706 are negative when control A is in its reset condition. When control A is first taken into use, dial tone control flip-flip 6106 is triggered to its set condition and from that time until the direct dialing register is released from the call, at least one of the inputs to gate 6706 is at ground potential to hold amplifier 6705 non-conductive and thus allow gate 6707 to control flip-flip 6708. That is, dial tone control flip-flip 6106 is not reset until ground potential is applied to conductor G1, ground potential is not removed from conductor G1 until a shift cycle is initiated by ground on conductor CBM, and ground then remains on conductor CBM until the direct dialing register is released.

If control A is in use and amplifier 6705 is therefore non-conductive, the first occurring negative pulse on conductor 10 Sec. Pulse, which pulse is preferably approximately 1.5 milliseconds in duration, occurs once every ten seconds, and may be generated by any well known timing device, is coupled through gate 6707 and the trailing edge of said pulse triggers flip-flip 6708 to its set condition. Flip-flip 6708 is triggered to its reset condition at its terminal B if a shift cycle is produced and ground potential is therefore applied to conductor SN by amplifier 6301 or at its terminal A if control A is released and ground potential therefore appears on conductor R. If it is assumed that a shift cycle is not produced within a period of ten seconds after flip-flip 6708 is set, the next occurring pulse on conductor 10 Sec. Pulse is coupled through gate 6709 and the trailing edge of said pulse triggers flip-flip 6611 to its set condition. The operation from this point on is exactly the same as that previously described for the one second timeout circuit. That is, the next occurring one second pulse triggers flip-flip 6703 for the purpose of transmitting YZ release tone in the called direction, and the following one second pulse triggers connect demand flip-flips 6501 and 6603 for the purpose of routing the call to the operator position. When the call has been transferred and conductor WRO returns to ground potential, the direct dialing register is, of course, reset, as previously described.

It will be recalled from the description of the calling time store that a three minute timed interval is initiated in that circuit when the direct dialing register is first taken into use and if the register is not released within that period of time, ground potential is applied to conductor TOP. When ground potential is received on conductor TOP by the illustrated circuit, reset control flip-flip 6201 is triggered to its set condition and the direct dialing register is reset, as previously described.

Means is also provided in control A for resetting the direct dialing register if the calling subscriber should abandon the call at any time while the direct dialing register is servicing the call. If the calling subscriber should abandon the call, a YZ release signal is detected by multi-frequency signal detector 6001, a negative potential appears on conductor Z1, and negative pulses appear on conductor Y1. All inputs to gate 6013 go negative during the first occurring negative pulse on conductor Y1 and the trailing edge of that pulse triggers subscriber release flip-flip 6509 to its set condition. When flip-flip 6509 is set and its terminal E goes to ground, the first and second connect demand flip-flips 6501 and 6603 are reset, if set, and gate 6704 is blocked. Also when flip-flip 6509 is set and its D terminal goes negative, gate 6112 is enabled to pass the next occurring one second pulse. When a negative pulse is received over conductor 1 Sec. Pulse, amplifier 6211 becomes conductive, and flip-flip 6703 is triggered to its set condition by the ground pulse coupled through diode 6212 to its E terminal. When flip-flip 6703 is set, release tone is transmitted to the circuits in the called direction, as previously described, and gate 6213 is enabled. When amplifier 6211 is again rendered conductive by the next occurring pulse on conductor 1 Sec. Pulse, reset control flip-flip 6201 is triggered to its set condition through gate 6213 and the direct dialing register is thereby reset.

*Terminating time store.*—A terminating time store, identical to the one shown in Figs. 69, 70, and 71, is used in each direct dialing register provided in the illustrated long distance switching center. The terminating time store comprises a time slot storage counter for storing the time position identity and four static storage stages G1A–G1D for storing the highway identity of the called unit selected by the route selector in response to digit marking forwarded by the direct dialing register, The two out of four notation stored in stages G1A–G1D is converted to one out of six notation by stages G1–G6 of Fig. 71 for the purpose of identifying the called highway to the called control connector associated with the direct dialing register and for the purpose of selecting the one of the busy test conductors BT1–BT6 to which pulses in the time position of the called unit are applied.

It will be recalled from the general description and from the description of control A that when the single digit corresponding to a group of line terminating units terminating trunk lines to another long distance switching center or the two digits corresponding to a group of line terminating units terminating trunk lines to a local office served by the illustrated long distance switching center have been stored in the five digit store, control A functions to transmit a connect demand signal to the register finder, and that when a demand answer signal is returned to control A, control A functions to apply negative potential to conductor TSR. It will also be recalled that the route selector functions to select an idle unit in the group of units identified by the digit marking forwarded by the direct dialing register and then applies a negative potential to conductor RTD. The selected unit is identified by two out of four ground marking on the conductors of the terminating highway identification busbars THI and by a fifteen microsecond negative-to-ground pulse on terminating slot pulse conductor TSP–O. In the illustrated circuit, ground clamping is removed from terminal A of diode 6901 when conductor TSR goes negative so that when conductor RTD goes negative, amplifier 6902 is rendered conductive and amplifier 6903 is rendererd non-conductive. When amplifier 6903 becomes non-conductive, negative potential is applied to the B terminal of the amplifier corresponding to 6904 in each of the stages G1A–G1D. Each of the amplifiers corresponding to 6904 has its C terminal connected to an individual one of the four highway marking conductors so that the two amplifiers corresponding to the marked highway are rendered conductive. For example, assuming that highway 1 is marked on the terminating highway identification busbars by ground potential on the conductors identified as 0 and 1, amplifier 6904 and the amplifier corresponding to 6904 in stage G1B become conductive and flip-flip 6905 and the flip-flip in stage G1B corresponding to 6905 are triggered to their set conditions. Thus, the called unit highway identification is registered in the terminating time store.

Also when amplifier 6903 becomes non-conductive, negative potential is applied to terminal clamp B of the time slot storage counter of the terminating time store. As described in the description of the time slot storage counter, the application of negative potential to terminal clamp B enables the counter to read in the positive-going pulse appearing on conductor TSP–O and which identifies the time position of the called unit. Also as previously described, the time slot storage counter thereafter functions to produce a 1.25 microsecond negative pulse in the memorized time position at terminal time pulse out and to produce a 2.5 microsecond negative pulse, the trailing edge of which is coincident with the trailing edge of the time position pulse, at terminal busy pulse out. The waveform appearing at the output of the last stage of the five-stage binary counter in the time slot storage counter appears at terminal monitor, as previously described. When the waveform at terminal monitor goes to ground, thus indicating that the storage counter is functioning, flip-flip 7001 is triggered to its set condition. When flip-flop 7001 is set and its E terminal is at ground potential, conductor CBM goes to ground and control A is thereby controlled to terminate the transmission of a connect demand signal to the register finder, negative potential is removed from conductors TSR and RTD, and the register finder and the route selector are released for use on another call.

The amplifier corresponding to 7101 in each of the stages G1–G6 is gated by a unique combination of two out of the four stages of G1I–G1D so that when the two of the flip-flips corresponding to 6905 are set, only one of the amplifiers 7101 is conductor. In the assumed case, amplifier 7101 in stage G1 is rendered conductive since its B terminal is returned to negative potential at terminal D of flip-flip 6905 in stage G1B and its C terminal is returned to ground at terminal E of flip-flip 6905 in stage G1A. When amplifier 7101 in stage G1 becomes conductive, ground potential is applied to conductor THI–1 to mark highway 1 to the called control connector of the direct dialing register. The time position of the called unit is, of course, marked to the called control connector of the direct dialing register by the negative pulse appearing at terminal time pulse out of the time slot storage counter over conductor TSP. Also, each negative-going busy pulse appearing at terminal busy pulse out of the time slot storage counter is coupled through gate 7102, since amplifier 7101 is conductive, to render amplifier 7103 conductive. The 2.5 microsecond positive-going pulses appearing at the output of amplifier 7103 are inverted by amplifier 7104 and the resulting negative pulses are applied to conductor BT1 for the purpose of marking the called unit as busy to the seize detector and the route selector.

The terminating time store remains in the just described condition until such time as the identity of the called unit is to be transferred to a link circuit. At that time, a write-read WRO signal is transmitted by the route selector to control A and control A is responsive thereto to transmit ground potential over conductor DSW to the illustrated circuit. When ground potential is received over conductor DSW, amplifier 6906 becomes non-conductive, negative potential is applied to the B terminal of the amplifier corresponding to 6907 in each of the stages G1A–G1D, amplifier 7002 becomes conductive, and ground potential is applied to terminal C of gated pulse amplifier 7003.

It can be seen that terminal C of the amplifier corresponding to 6907 in each of the stages G1A–G1D is connected to the E terminal of the flip-flip corresponding to 6905 in that stage. Thus when a negative potential is applied to the B terminal of each of said amplifiers, only the amplifiers in the stages in which flip-flip 6905 is set are rendered conductive. In the assumed case, amplifier 6907 in stage G1A and the amplifier corresponding to 6907 in stage G1B are rendered conductive and ground potential is thereby applied to the zero and one conductors of the terminating highway identification busbars THI to mark highway 1 as the called highway to the allotted link circuit. Also since terminal C of amplifier 7003 is now at ground potential, the negative-going pulses in the time position of the called unit appearing at terminal time pulse out of the time slot storage counter are amplified by amplifier 7003 and applied to conductor TSP–I, which extends to the slot pulse regeneration circuit.

When the time position and highway identification of the called unit has been read in by the allotted link circuit, control A functions to apply a ground pulse to conductor R. When ground potential is applied to conductor R, the set flip-flips corresponding to 6905 are reset, ground is applied to terminal reset of the time slot storage counter to terminate the operation of and restore said counter to its reset condition, and flip-flip 7001 is reset to remove ground potential from conductor CBM. Thus, the terminating time store is completely reset and in readiness to handle another call.

*Control B.*—Control B is shown in Figs. 72–79, inclusive. As described in the general description, the position register, which is directly associated with the operator position, comprises a control B, a five digit store, a position time store, and a control connector for making connection to the selected called unit. It will also be recalled from the general description that on a call to the operator position, a talking path is established between the calling subscriber station and the operator position through a link circuit. If further extension of the call is required, the operator proceeds to key the digits corresponding to the desired subscriber station into the position register.

Digit identifying conductors KDU–KDY from the keyboard circuit are normally open so that the amplifiers 7901–7905 are conductive to apply ground potential to conductors U1–Y1, which extend to the five digit store, and end of digit marking conductor KDE from the keyboard circuit is normally at ground potential so that capacitor 7201 in control B is charged. The depression of any one of the digit keys in the keyboard circuit results in the application of ground potential to the two of the conductors KDU–KDY which correspond to that digit and the removal of ground potential from conductor KDE. When two of the conductors KDU–KDY go to ground, the corresponding two of the amplifiers 7901–7905 are rendered non-conductive and negative potential is thereby applied to the corresponding two of the conductors U1–Y1. It will be recalled from the description of the five digit store that the digit register flip-flip stages are triggered only when their corresponding digit marking conductors go negative and then return to ground potential. Thus, if there is no digit key contact bounce, the flip-flips in the first digit register of the five digit store are triggered to their set condition at the end of the first keyed digit when the two of the conductors U1–Y1 corresponding to the keyed digit return to ground potential. In the event that there is digit key contact bounce, the register stage will, of course, load in the digit information on the first bounce of the key contacts. Also if there is digit key contact bounce, end of digit conductor KDE is momentarily returned to ground potential on each bounce but the time constant of the circuit comprising capacitor 7201 and resistors 7202 and 7203 is such that the momentary spurts of ground potential are absorbed.

At the termination of the first digit, conductor KDE returns to ground potential and delay multivibrator 7204 is triggered to its operated condition. The twenty millisecond ground pulse appearing at terminal D of multivibrator 7204 is amplified by emitter follower 7205 and applied to conductor FG to step the control counter of the five digit store one step to the left, as previously described, and to conductor SX through gate 7801 to clamp conductors U1–Y1 to ground potential in the five digit store. It will be recalled that there are three possible types of calls which may be processed by the position register. That is, the call may be routed through one or more succeeding long distance switching centers before being routed to a local office, the call may be routed directly to another local office served by the illustrated long distance switching center, or the call may be routed to a service line in the illustrated long distance switching center. The various types of calls will be described below in turn.

Assume that the call is to be routed through one or more long distance switching centers before being routed to a local office, as denoted by a first digit of one of the digits "2–9," so that conductor FDD from the five digit store remains at a negative potential. Under these conditions, the output of gate 7206 is negative, a negative signal is passed by gate 7207 and is applied to terminal D of gate 7208. The trailing edge of the twenty millisecond negative pulse at teminal A of multivibrator 7204 triggers amplifier 7209 non-conductive to produce a fifty microsecond negative pulse, which is applied to terminal C of gate 7208. Since conductor CBM is negative at this time, all inputs to gate 7208 are now negative, amplifier 7210 is therefore rendered conductive, and connect demand flip-flip 7211 is triggered to its set condition. When flip-flip 7211 is set, the negative potential appearing at its terminal D is coupled through gate 7212 and applied to register finder connect demand conductor FCD.

When the position register is found by the register finder, negative potential appears on conductor DAF, amplifier 7213 is rendered conductive, and amplifier 7601 is rendered non-conductive. When amplifier 7601 becomes non-conductive, negative potential is applied to conductor TSR to enable the position time store to read in when a RTD signal is received from the route selector, negative potential is applied to conductor DWP to control the five digit store to read out digit marking information to the route selector, and amplifier 7214 is rendered conductive to apply ground potential to conductor PD to mark the calling register as a position register to the route selector. The route selector now searches for an idle unit in the group of units identified by the digit marking forwarded by the five digit store of the position register and when an idle unit is found, applies a negative signal to conductor RTD, since ground potential is applied to conductor PD, to control the position time store to read in the unit identification information transmitted by the route selector. The negative potential applied to conductor RTD is coupled through gate 7215 to the B terminal of amplifier 7216 but amplifier 7216 remains non-conductive since its C terminal is also returned to negative potential on conductor WDD at this time.

When the identity of the unit selected by the route selector is read in by the position time store, conductor CBM goes to ground, gate 7208 is blocked so that amplifier 7210 cannot again be rendered conductive for the duration of the call, connect demand flip-flip 7211 is reset to terminate the transmission of a connect demand signal to the register finder and to terminate the transmission of signals over conductors PD, TSR, and DWP, and delay multivibrator 7301 is triggered to initiate a shift cycle. The one hundred microsecond ground pulse appearing at terminal D of multivibrator 7301 is amplified by emitter follower 7302 and applied to conductor SS for the purpose of resetting the first digit register in the five digit store. The one hundred microsecond ground pulse appearing at the output of emitter follower 7302 is also applied to conductor CL through gate 7802 but serves no purpose at this time since the digit acknowledgment register in the five digit store is not operated at this time. The ground pulse appearing at the output of emitter follower 7302 also triggers delay multivibrator 7803 to apply a one millisecond ground pulse to conductor SX for the purpose of blocking the digit input gates of the five digit store while information is being shifted in the five digit store shift register, as fully described in the description of the five digit store.

The trailing edge of the one hundred microsecond negative pulse at terminal A of multivibrator 7301 triggers amplifier 7303 non-conductive for a period of fifty microseconds and the trailing edge of the resulting negative pulse at terminal A of amplifier 7303 is utilized to trigger delay multivibrator 7304. The one hundred microsecond ground pulse appearing at terminal D of multivibrator 7304 is applied to conductor SP for the purpose of shifting digit information from the second digit register to the first digit register of the five digit store and the trailing edge of the negative pulse at terminal A of multivibrator 7304 is utilized to trigger multivibrator 7305. The one hundred microsecond ground pulse appearing at terminal D of multivibrator 7305 is applied to conductor SL for the purpose of shifting digit information from the third digit register to the second digit register of the five digit store and the trailing edge of the negative pulse at terminal A of multivibrator 7305 is utilized to trigger delay multivibrator 7306. The one hundred microsecond ground pulse at terminal D of multivibrator 7306 is applied to conductor SM for the purpose of shifting digit information from the fourth digit register to the third digit register of the five digit store and the trailing edge of the negative pulse at terminal A of multivibrator 7306 triggers amplifier 7307 non-conductive for a period of fifty microseconds. The negative pulse appearing at terminal A of amplifier 7307 is inverted by amplifier 7308 and the resulting ground pulse is applied to conductor SN for the purpose of shifting digit information from the fifth digit register to the fourth digit register of the five digit store and for the purpose of stepping the control counter of the five digit store one step to the right, as fully described in the description of the five digit store. The ground pulse appearing at terminal A of amplifier 7308 is also used to trigger flip-flip 7401 to its set condition.

When flip-flip 7401 is set and its terminal D therefore goes negative, voice gate 7402 is enabled to pass voice frequency seize signal S to the input of audio amplifier 7403, and thus over conductors TAR to and through the control connector to the time division channel of the called line terminating unit. The seize signal transmitted to the called line terminating unit is detected by the seize detector in the selected long distance switching center and when an incoming register is connected to the time division channel of the calling unit in that center, a seize acknowledge signal is returned over the extended connection and appears on conductors TAC from the control connector. When a seize acknowledge signal is detected on conductors TAC by multifrequency signal detector 7501, conductor Z2 goes negative and if a digit is loaded in the first digit register of the five digit store and amplifier 7502 is therefore conductive, the output of gate 7503 goes negative and amplifier 7504 is rendered conductive. The signal on conductor Z2 is gated with the output of amplifier 7502 so as to prevent the initiation of a one second time-out period if a digit is not stored in the first digit register of the five digit store. The timing features of control B will be described in detail later.

When amplifier 7504 becomes conductive, flip-flip 7401 is immediately reset and the transmission of seize signal S is thereby terminated. Also when amplifier 7504 becomes conductive, delay multivibrator 7404 is triggered to produce a twenty millisecond negative pulse at its terminal A and digit send flip-flip 7405 is triggered to its set condition by the trailing edge of said pulse. When flip-flip 7405 is set and its terminal E goes to ground, ground potential is coupled through diode 7505 to block gate 7503, ground potential is coupled through gate 7506 to render amplifier 7507 non-conductive, and negative potential is thereby applied to conductor RDG to enable the digit acknowledgement gates of the five digit store. When flip-flip 7405 is set and its D terminal goes negative, voice gate 7508 is enabled to pass the voice frequency digit signals appearing on conductor SG from the five digit store to amplifier 7403 and thus to the circuits in the called direction. Also when terminal D of flip-flip 7405 goes negative, a negative signal is coupled through gate 7309 to enable the one second time-out gate 7310.

The digit signals transmitted over conductors TAR are detected and registered in the distant office, and digit acknowledgment signals corresponding to the registered digits are returned through the control connector and over conductors TAC to multifrequency signal detector 7501. The compound voice frequency signals corresponding to the acknowledged digit are detected in multifrequency signal detector 7501 and the two of the conductors U2–Y2 which correspond to that digit have negative pulses applied thereto. The pulses on conductors U2–Y2 are used to trigger individual flip-flips in the digit acknowledgment register of the five digit store, as described in the description of the five digit store. When the digit acknowledgement register in the five digit store is set, ground potential appears on conductor DR and multivibrator 7906 is triggered to its operated condition. The ground pulse appearing at terminal D of multivibrator 7906 triggers flip-flip 7405 to its reset condition to thereby terminate the transmission of digit signals to the distant office. Ground at terminal D of multivibrator 7906 is also coupled through gate 7506 to hold negative potential on conductor RDG after flip-flip 7405 is reset. The trailing edge of the twenty millisecond negative pulse at terminal A of multivibrator 7906 triggers amplifier 7907 non-conductive to produce a fifty microsecond negative pulse which is applied to terminal B of gate 7908 and to terminal B of diode 7909.

If the transmitted digit signals are correctly acknowledged, conductor CG from the five digit store is negative at the time that amplifier 7907 becomes non-conductive, a negative signal is therefore passed by gate 7908 and amplifier 7910 is rendered conductive. When amplifier 7910 becomes conductive, delay multivibrator 7301 is triggered to its operated condition to initiate a shift cycle, delay multivibrator 7803 is triggered to its operated condition to apply a one millisecond ground pulse to conductor SX and ground potential at terminal A of emitter follower 7302 is applied to conductor CL to reset the digit acknowledgment register of the five digit store, all in the same manner as previously described. At the end of the shift cycle when ground potential is applied to conductor SN, flip-flip 7401 is triggered to its set condition so that a seize signal S is again transmitted to the distant office. When a seize acknowledgement signal is returned, the signals on conductor SG from five digit store, which signals correspond to the next registered digit, are coupled to conductors TAR in the exact same manner as previously described.

If the transmitted digit signals are incorrectly acknowledged, conductor CG from five digit store is at ground potential at the same that amplifier 7907 becomes non-conductive, and amplifier 7911 rather than amplifier 7910 is rendered conductive. When amplifier 7911 becomes conductive, delay multivibrator 7912 is triggered to its operated condition and the resulting fifty millisecond ground pulse at its terminal D is amplified by emitter follower 7913 and applied to terminal B of amplifier 7406, to terminal E of gate 7407, and to conductor CL through gate 7802. When ground potential is applied to its B terminal, amplifier 7406 is rendered conductive to apply negative potential to terminal C of voice gate 7408 and thus enable that gate to pass frequency U to the input of audio amplifier 7403. When ground potential is applied to terminal E of gate 7407, amplifier 7409 is rendered conductive and voice gate 7410 is enabled to pass frequency Z to the input of audio amplifier 7403. Thus, a cancel signal comprising frequencies UZ is amplified by audio amplifier 7403 and coupled to the circuits in the called direction for the purpose of controlling the register in the distant office to cancel the last received digit. Ground potential applied to conductor CL, of course, serves to reset the digit acknowledgment register of the five digit store, as previously described. Delay multivibrator 7404 is triggered to its operated condition by the trailing edge of the fifty millisecond negative pulse produced at terminal A of multivibrator 7912 to produce a twenty millisecond negative pulse at its terminal A. Amplifiers 7406 and 7409 are rendered non-conductive to discontinue the transmission of a cancel signal at the same time that multivibrator 7404 is triggered to its operated condition. Flip-flip 7405 is triggered to its set condition by the trailing edge of the twenty millisecond negative pulse at terminal A of multivibrator 7404 and when flip-flip 7405 is set, voice gate 7508 is enabled to pass the signals on conductor SG to conductors TAR. Thus, since a shift cycle is not produced when the digit is incorrectly acknowledged, the same digit is retransmitted to the register in the distant office. The succeeding digits of the called subscriber station number are sent and acknowledged in the same manner as just described until the connection is finally extended to a local office and dial tone rather than a seize acknowledge signal Z is returned over the extended connection to multifrequency signal detector 7501. When dial tone is detected by multifrequency signal detector 7501, conductor DT goes negative and amplifier 7509 is rendered conductive to trigger flip-flip 7411 to its set condition. When terminal D of flip-flip 7411 goes negative, voice gate 7412 is enabled to pas frequency V and when terminal E of flip-flip 7411 goes to ground, amplifier 7409 becomes conductive and voice gate 7410 is enabled to pass frequency Z. Thus, a signal interlock request signal comprising frequencies V and Z is transmitted over conductors TAR to the register in the called local office. Also when terminal E of flip-flip 7411 goes to ground, flip-flip 7401 is reset to terminate the transmission of the seize signal to the local office.

When an interlock request acknowledgment signal Z is returned from the called local office, conductor Z2 from multifrequency signal detector 7501 goes negative, amplifier 7504 becomes conductive, flip-flip 7411 is reset to terminate the transmission of the VZ signal, and the twenty millisecond delay multivibrator 7404 is triggered to its operated condition. The operation of the circuit then continues in the same manner as previously described. That is, after twenty milliseconds, flip-flip 7405 is triggered to its set condition so that the digit signals appearing on conductor SG are transmitted to the called local office, the digit is acknowledged, a seize signal is transmitted, a seize acknowledgment is received, and the process is then repeated for each of the remaining digits.

When the desired subscriber station in the called local office is finally selected, or if a busy condition is encountered in one of the offices in setting up the connection, an end of call signal comprising frequencies V and Z is returned over the connection to multifrequency signal detector 7501. When both of the conductors V2 and Z2 from multifrequency signal detector 7501 go negative, a negative signal is passed by gate 7914 so that the next occurring positive-going excursion on conductor V2 triggers connect demand flip-flip 7602 to its set condition. When terminal D of flip-flip 7602 goes negative, a negative finder connect demand signal is applied to conductor FCD. When a negative demand answer signal is received over conductor DAF from the register finder, all inputs to gate 7603 are negative during the next occurring negative pulse on conductor CDR, a negative signal is passed by gates 7603 and 7604, and amplifier 7701 is rendered conductive. When amplifier 7701 becomes conductive, flip-flip 7702 is triggered to its set condition and the negative potential appearing at its terminal D is applied through gate 7703 to conductor PA for the purpose of controlling the route selector to inhibit the various allotters of the system so that new calls cannot be established while information is being transmitted over the terminating identification busbars by the position register to the answered link circuit. The negative potential appearing at terminal D of flip-flip 7702 is also applied to terminal B of gate 7704 but without effect at this time since amplifier 7701 is still conductive. At the termination of the eighty microsecond negative pulse on conductor CDR, amplifier 7701 becomes non-conductive and the output of gate 7704 goes negative so that when amplifier 7701 again becomes conductive responsive to the receipt of the next occurring negative pulse on conductor CDR, flip-flip 7705 is triggered to its set condition. When flip-flip 7705 is set, gate 7706 is enabled so that the next occurring negative pulse on conductor CDR results in triggering flip-flip 7707 to its set condition. When flip-flip 7707 is set, ground potential appearing at terminal E of that flip-flip is applied to conductor DSW to control the position time store to read out the time division channel and highway identification of the called unit and the negative pulse at terminal D of that flip-flip is applied to conductor KWR to control the link circuit answered by the operator position to read in the identification of the called unit. Also when flip-flip 7707 is set and its terminal D goes negative, gate 7605 is enabled so that when amplifier 7701 becomes conductive responsive to the receipt of the next occurring negative pulse on conductor CDR, reset control flip-flip 7606 is triggered to its set condition.

When reset control flip-flip 7606 is set, negative potential appearing at its terminal D is applied to conductor RX and to the B terminal of amplifier 7708 to render said amplifier conductive. The ground potential appearing at the output of amplifier 7708 is coupled through emitter follower 7709 to conductor R for the purpose of resetting the five digit store. The ground potential appearing at terminal A of emitter follower 7709 is also applied to the A terminals of the various flip-flips in control B to reset any set flip-flips in control B to their reset condition. When flip-flip 7606 is set and ground potential appears at its terminal E, delay multivibrator 7607 is triggered to its operated condition to produce a twenty millisecond negative pulse at its terminal A. The trailing edge of the twenty millisecond negative pulse resets reset control flip-flip 7606 and is also used in combination with the pulse on conductor RX to control the reset of the time position store over conductor RLR. Thus, the position register is completely released and is in readiness to handle another call.

In the above description it was assumed that the route selector was successful in selecting an idle line terminating unit in the group of units identified by the digit marking forwarded by the position register in response to the operation of connect demand flip-flip 7211 and the resulting receipt of a demand answer signal from the register finder. In the event that all units in the desired group are busy, the identity of the tape announcement unit corresponding to that group of units is read into the position time store and the control connector of the position register is thereby controlled to make connection to the time division channel assigned to that unit. It will be recalled from the general description that the tape announcement machine is arranged to momentarily transmit an end of call VZ signal at the beginning of each cycle of the recorded message. Therefore, when connection is made to the tape announcement unit, a VZ signal is detected by multifrequency signal detector 7501, connect demand flip-flip 7602 is triggered to its set condition, and the identity of the tape announcement unit is read out of the position time store and into the answered link circuit in the exact same manner as described above.

Next assume that the call is to be routed to a local office served by the illustrated long distance switching center as denoted by the registration of a first digit "1" in the first digit register of the five digit store. As explained in the description of the five digit store when the digit "1" is registered in the first digit register, ground potential is applied to conductor FDD and negative potential is applied to conductor GDS. At the termination of the keying of the first digit, end of digit conductor KDE goes to ground, multivibrator 7204 is controlled to generate a twenty millisecond pulse which is applied to conductor FG to shift the control counter of the shift register one step to the left, and amplifier 7209 is triggered non-conductive for fifty microseconds by the trailing edge of the twenty millisecond negative pulse at terminal A of multivibrator 7204. Amplifier 7210 remains non-conductive when amplifier 7209 is triggered non-conductive since both conductors FDD and GD have ground potential applied thereto and ground potential therefore appears at the output of OR gate for negative signals 7207 and thus at the output of AND gate for negative signals 7208. Thus, a register finder connect demand signal is not transmitted at the termination of the first digit when the call is to a local office served by the illustrated long distance switching center since two digits are required to identify the particular local office to which the call is to be extended.

When a digit is stored in the second digit register of the five digit store, conductor GD goes negative so that all inputs to gate 7217 are negative and so that negative potential is coupled through gate 7207 to terminal D of gate 7208. At the termination of the second digit when amplifier 7209 is triggered non-conductive, all inputs to gate 7208 are negative and amplifier 7210 is rendered conductive to trigger connect demand flip-flip 7211 to its set condition. When a demand answer signal is received from the register finder responsive to the connect demand signal transmitted when flip-flip 7211 is set, amplifier 7214 is rendered conductive to apply ground potential to conductor PD to mark the register as a position register to the route selector, negative potential is applied to conductor DWP to enable the five digit store to read out first and second digit identifying information to the route selector, and negative potential is applied to conductor TSR to enable the position time store to read in the identification of the selected line terminating unit when a RTD signal is received by that circuit from the route selector, all as previously described.

When the identity of the selected unit in the group of units which terminate trunk lines to the desired local office is read into the position time store, conductor CBM goes to ground and delay multivibrator 7301 is triggered to its operated condition to initiate a shift cycle. Also when conductor CBM goes to ground, delay multivibrator 7311 is triggered through gate 7217 to produce a 1.5 millisecond negative pulse at its terminal A. As previously described, each shift cycle is approximately five hundred microseconds in duration. Therefore, approximately one millisecond after the first shift cycle is completed, delay multivibrator 7301 is again triggered by the trailing edge of the negative pulse at terminal A of multivibrator 7311 and a second shift cycle is initiated. Obviously, two shift cycles are required since two digits were required to identify the desired local office. At the end of the first shift cycle, the transmission of a seize signal to the selected local office is initiated and the seize signal is, of course, acknowledged by dial tone when an idle register in the called local office is connected to the calling unit in that office. Therefore, a digit interlock request VZ signal is transmitted to the called local office and is acknowledged by frequency Z in the exact same manner as described above. The digits corresponding to the subscriber station are then each sent and acknowledged in turn and, eventually, an end of call VZ signal is received by the position register. When the end of call signal is received, a second connect demand signal is transmitted to the register finder, the identity of the called unit in the long distance switching center is transferred to the answered link circuit, and the position register is released, all as previously described.

Also in the same manner as previously described, if all line terminating units in the selected group are busy, the identity of the 120 I.P.M. busy tone coupling unit is read back into the position time store and when the VZ signal superimposed on said 120 I.P.M. busy tone is detected by multifrequency signal detector 7501, the identity of said unit is transferred from the position time store to the answered link circuit and the position register is reset.

Next assume that the call is to be extended to a service line in the long distance switching center as denoted by the registration of any of the digits "01–04" in the first and second digit registers of the five digit store. As explained in the description of the five digit store, when the digit "0" is stored in the first digit register of the five digit store, ground potential is applied to conductors FDD and WDD and negative potential is applied to conductor GDS. Since ground potential is applied to conductor FDD, control B is prevented from transmitting a register finder connect demand signal until the termination of the second digit, as described above. When a RTD signal is received from the route selector, the output of gate 7215 goes negative, and since conductor WDD and thus terminal C of amplifier 7216 are at ground, amplifier 7216 is rendered conductive. Amplifier 7216 is provided in the circuit for the purpose of controlling read out of the identification information corresponding to the selected service line, or to the 60 I.P.M. busy tone coupling unit if the desired service line is busy, from the route selector directly to the answered link circuit rather than to the position time store. As will be described in the description of the position time store, the application of ground potential to conductor WDD prevents the position time store from reading in the service line identification information even though negative potential is applied to conductor TSR.

When amplifier 7216 becomes conductive, flip-flip 7707 is triggered to its set condition, ground potential is applied to conductor DSW but without effect in the position time store, and negative potential is applied to conductor KWR to enable the answered link circuit to read in the identification information applied to the terminating time slot and highway identification busbars by the route selector. Also when amplifier 7216 becomes conductive, amplifier 7218 is rendered conductive and gate 7608 is thereby enabled to pass the pulses appearing on conductor CDR. Since negative potential is applied to conductor RTD by the route selector coincident with the leading edge of a negative pulse on conductor CDR, conductor CDR is negative at the time that amplifier 7218 becomes conductive and amplifier 7701 is rendered conductive through gate 7604. When amplifier 7701 becomes conductive, flip-flip 7702 is set and negative potential is applied to conductor PA but without effect since the route selector is already transmitting an allotter inhibit signal. One hundred and sixty microseconds after flip-flip 7707 is triggered to its set condition, the potential on conductor CDR again goes negative, amplifier 7701 becomes conductive, and the reset control flip-flip 7606 is triggered through gate 7605 to its set condition to initiate the release of the position register in the exact same manner as previously described. Flip-flip 7707 is triggered immediately upon receipt of the signal on conductor RTD since, as will be recalled from the description of the register finder, the register finder serves to automatically remove the negative demand answer signal from conductor DAF one hundred and sixty microseconds after the signal on conductor RTD is received by that circuit.

A one second time-out circuit is provided in control B for the purpose of automatically transmitting a release signal in the called direction, for transmitting a call incomplete signal and a stop keying signal to the keyboard circuit, and for completely resetting the position register if a digit transmitted to another office is not correctly acknowledged or if a transmitted signal interlock request signal is not acknowledged within a period of one to two seconds. It can be seen that terminals B and C of OR gate for negative signals 7309 are connected to terminal D of VZ tone control flip-flip 7411 and to terminal D of the digit send control flip-flip 7405, respectively. Thus, when either of the flip-flips 7411 or 7405 is set, the output of gate 7309 is negative and if the second connect demand flip-flip 7602 is in its reset condition, gate 7310 is enabled to pass the 1.5 millisecond negative pulse which appears on conductor 1 Sec. Pulse and which may be generated by any well known timing device. When a negative pulse is coupled through gate 7310, amplifier 7312 is rendered conductive and flip-flip 7313 is triggered to its set condition.

When flip-flip 7313 is set, negative potential is applied to terminal B of gate 7314 but without effect at this time since terminal C of that gate is held at ground by conducting amplifier 7312. The negative potential at terminal D of flip-flip 7313 is also applied to terminal D of gate 7309 to clamp the output of that gate negative regardless of the further operation of flip-flips 7411 and 7405. Flip-flip 7313 will remain in its set condition unless a shift cycle is produced, thus indicating that the transmitted digit was correctly acknowledged. If a shift cycle is produced, the ground potential applied to conductor SN is coupled through diode 7315 to the G terminal of flip-flip 7313 to reset said flip-flip.

If flip-flip 7313 remains set for a period of one second, a negative pulse is again passed by gate 7310, amplifier 7312 again becomes conductive, and flip-flip 7316 is triggered to its set condition through gate 7314. When flip-flip 7316 is set and its E terminal goes to ground, either flip-flip 7411 is reset through gate 7415 or flip-flip 7405 is reset through gate 7413 depending upon which of said flip-flips is set, and amplifier 7409 is rendered conductive through gate 7407 to enable voice gate 7410 to pass Z-tone to conductors TAR. Simultaneously therewith, the negative potential at terminal D of flip-flip 7316 enables voice gate 7414 to pass Y-tone to conductors TAR so that the compound voice frequency release signal YZ is transmitted to the circuits in the called direction. Also when flip-flip 7316 is set, negative potential is applied to conductor KTO as a call incomplete signal and ground potential is applied to conductor KRR as a stop keying signal to the keyboard circuit.

The next occurring pulse on conductor 1 Sec. Pulse renders amplifier 7312 conductive and a ground pulse is coupled through gate 7317, since terminal B of that gate is returned to negative potential at terminal D of set flip-flip 7316, to trigger reset control flip-flip 7606 to its set condition. When flip-flip 7606 is set, delay multivibrator 7607 is triggered to its operated condition, the position register is reset, and when multivibrator 7607 restores to its normal condition, flip-flip 7606 is triggered to its reset condition, all as previously described. It is to be noted that flip-flip 7316 can be reset only when ground potential is applied to conductor KRS by the operation of the release key in the keyboard circuit. Thus, the call incomplete and stop keying lamps at the keyboard circuit remain illuminated until the release key is operated.

A ten-second time-out circuit is provided in control B for the purpose of automatically transmitting a release signal in the called direction, for transmitting a call incomplete signal nad a stop keying signal to the keyboard circuit, and for completely resetting the position register if a shift cycle does not occur at least once every ten seconds after the identity of the selected called unit is read in by the position time store. It can be seen that amplifier 7804 is held conductive to clamp the output of gate 7805 to ground as long as conductor CBM is negative, thus indicating that the position time store has not read in unit identifying information.

When unit identifying information has been read in by the position time store, conductor CBM goes to ground, amplifier 7804 becomes non-conductive, and the ground clamp is removed from the output of gate 7805. The first occurring negative pulse on conductor 10 Sec. Pulse is coupled through gate 7805 and the trailing edge of said pulse triggers flip-flip 7806 to its set condition. Flip-flip 7806 is triggered to its reset condition at its terminal G if a shift cycle is produced and ground potential is therefore applied to conductor SN by amplifier 7308 or at its terminal A if reset control flip-flip 7606 is triggered to its set condition. If it is assumed that a shift cycle is not produced or the position register released within a period of ten seconds after flip-flip 7806 is set, the next occurring pulse on conductor 10 Sec. Pulse is coupled through gate 7318 and the trailing edge of said pulse triggers flip-flip 7313 to its set condition. The operation from this point on is exactly the same as that previously described for the one second time-out circuit. That is, the next occurring one second pulse triggers flip-flip 7316 for the purpose of transmitting a YZ release tone in the called direction, and the following one second pulse triggers reset control flip-flip 7606 to reset the position register, as previously described.

If the operator wishes to release the position register at any time while the position register is being used to establish a call, the release key provided at the keyboard circuit is operated and ground potential is thereby applied to conductor KRS, which extends from the keyboard circuit to control B and to the position time store. When ground potential is received over conductor KRS by the position time store, that circuit serves to apply negative potential to conductor DYS for a period of one second and thus enable voice gate 7510 of control B to couple release tone YZ to conductors TAR. When ground potential is received over conductor KRS by control B, flip-flips 7606 and 7316 are reset, if set, and ground potential is coupled through diode 7710 to conductor R and to the A terminals of the remaining flip-flips in control B to reset the five digit store and control B. At the end of the one second timed interval, negative potential is removed from conductor DYS by the position time store to terminate the transmission of the YZ release signal and the position time store is reset to complete the reset of the position register.

*Position time store.*—The position time store, which is shown in Figs. 80, 81, and 82, forms a part of the position register provided in the illustrated long distance switching center. The position time store comprises a time slot storage counter for storing the time position identity and four static storage stages G1A–G1D for storing the highway identity of the called unit selected by the route selector in response to digit marking forwarded by the position register. The two out of four notation stored in stages G1A–G1D is converted to one out of six notation by stages G1–G6 of Fig. 82 for the purpose of identifying the called highway to the control connector associated with the position register and for the purpose of selecting the one of the busy test conductors BT1–BT6 to which pulses in the time position of the called unit are applied.

It will be recalled from the general description and from the description of control B that when the single digit corresponding to a group of line terminating units terminating trunk lines to another long distance switching center, or the two digits corresponding to a group of line terminating units terminating trunk lines to a local office served by the illustrated long distance switching center, have been stored in the five digit store of the position register, control B functions to transmit a connect demand signal to the register finder, and that when a demand answer signal is returned to control B, control B functions to apply negative potential to conductor TSR. It will also be recalled that the route selector functions to select an idle unit in the group of units identified by the digit marking forwarded by the position register and then applies negative potential to conductor RTD. In the illustrated circuit, conductors TSR, WDD, and RTD comprise three inputs to AND gate for negative signals 8001. When the call is to be routed to another long distance switching center or is to be routed to a local office, conductor WDD is negative. It should be noted that when the call is to be routed to a service line in the illustrated long distance switching center, conductor WDD is at ground potential and gate 8001 is permanently blocked. Assuming that conductor WDD is negative, it can be seen that all inputs to gate 8001 are negative when a negative signal is received on conductor RTD, amplifier 8002 becomes conductive, and amplifier 8003 is rendered non-conductive. When amplifier 8003 becomes non-conductive, negative potential is applied to the B terminal of the amplifier corresponding to 8004 in each of the stages G1A–G1D. Each of the amplifiers corresponding to 8004 has its C terminal connected to an individual one of the four terminating highway identification conductors so that the two amplifiers corresponding to the marked highway are rendered conductive. For example, assuming that highway 1 is marked on the terminating highway identification busbars by ground potential on the conductors identified as 0 and 1, amplifier 8004 and the amplifier corresponding to 8004 in stage G1B become conductive and flip-flip 8005 and the flip-flip in stage G1B corresponding to 8005 are triggered to their set conditions. Thus, the called unit highway identification is registered in the position time store.

Also when amplifier 8003 becomes non-conductive, negative potential is applied to terminal clamp B of the time slot storage counter in the position time store. As described in the description of the time slot storage counter, the application of negative potential to terminal clamp B enables the counter to read in the positive-going pulse appearing on conductor TSP–O and which identifies the time position of the called unit. Also as previously described, the time slot storage counter thereafter functions to produce a 1.25 microsecond negative pulse in the memorized time position at terminal time pulse out and to produce a 2.5 microsecond negative pulse, the trailing edge of which is coincident with the trailing edge of the time position pulse, at terminal busy pulse out. The waveform appearing at the output of the last stage of the five-stage binary counter in the time slot storage counter appears at terminal monitor, as previously described. When the waveform at terminal monitor goes to ground, thus indicating that the storage counter is functioning, flip-flip 8101 is triggered to its set condition. When flip-flip 8101 is set and its E terminal is at ground potential, conductor CBM goes to ground and control B is thereby controlled to terminate the transmission of a connect demand signal to the register finder, negative potential is removed from conductors TSR and RTD, and the register finder and the route selector are released for use on another call.

The amplifier corresponding to 8201 in each of the stages G1–G6 is gated by a unique combination of two out of the four stages G1A–G1D so that when two of the flip-flips corresponding to 8005 are set, only one of the amplifiers 8201 is conductive. In the assumed case, amplifier 8201 in stage G1 is rendered conductive since its B terminal is returned to negative potential at terminal D of flip-flip 8005 in stage G1B and its C terminal is returned to ground at terminal E of flip-flip 8005 in stage G1A. When amplifier 8201 in stage G1 becomes conductive, ground potential is applied to conductor THI–1 to mark highway 1 to the control connector of the position register. The time position of the called unit is marked to the control connector of the position register by the negative pulse appearing at terminal time pulse out of the time slot storage counter over conductor TSP. Also, each negative-going busy pulse appearing at the busy pulse out terminal of the time slot storage counter is coupled through gate 8202, since amplifier 8201 is conductive, to render amplifier 8203 conductive. The 2.5 microsecond positive-going pulses appearing at the output of amplifier 8203 are inverted by amplifier 8204 and the resulting negative pulses are applied to conductor BT1 for the purpose of marking the called unit as busy to the seize detector and the route selector.

The position time store remains in the just described condition until such time as the identity of the called unit is to be transferred to the answered link circuit. At that time, control B functions to transmit ground potential over conductor DSW to the position time store. When ground potential is received over conductor DSW, amplifier 8006 becomes non-conductive, negative potential is applied to the B terminal of the amplifier corresponding to 8007 in each of the stages G1A–G1D, amplifier 8102 becomes conductive, ground potential is applied to terminal C of gated pulse amplifier 8103.

It can be seen that terminal C of the amplifier corresponding to 8007 in each of the stages G1A–G1D is connected to the E terminal of the flip-flip corresponding to 8005 in that stage. Thus when a negative potential is applied to the B terminal of each of said amplifiers, only the amplifiers in the stages in which flip-flip 8005 is set are rendered conductive. In the assumed case, amplifier 8007 in stage G1A and the amplifier corresponding to 8007 in stage G1B are rendered conductive and ground potential is thereby applied to conductors 0 and 1 of the terminating highway identification busbars THI to mark highway 1 as the called highway to the answered link circuit. Also since terminal C of amplifier 8103 is now at ground potential, the negative-going pulses in the time position of the called unit appearing at terminal time pulse out of the time slot storage counter are amplified by amplifier 8103 and applied to conductor TSP–I, which extends to the slot pulse regeneration circuit.

When the time position and highway identification of the called unit has been transferred to the answered link circuit, control B functions to apply a negative pulse to conductors RX and RLR and the output of gate 8008 goes negative. The trailing edge of either the pulse on conductor RX or the pulse on conductor RLR, which ever trailing edge occurs first, triggers amplifier 8009 non-conductive and amplifier 8010 conductive for a period of fifty microseconds. The ground pulse appearing at the output of amplifier 8010 is utilized to reset the set flip-flips corresponding to 8005 and is applied to terminal reset of the time slot storage counter to terminate the operation of and reset said counter to its reset condition. The ground pulse appearing at the output of amplifier 8010 also resets flip-flip 8101 so that ground potential is removed from conductor CBM. Thus, the position time store is completely reset and is in readiness to handle another call.

If the answering operator desires to release the connection in the called direction at any time while the position register is attached to the connection and therefore operates the release key in the keyboard circuit to apply ground potential to conductor KRS, flip-flip 8104 is triggered to its set condition. When flip-flip 8104 is set, the negative potential at its terminal D is applied to conductor DYZ for the purpose of controlling a voice gate in control B to couple release tone to the circuits in the called direction, as fully described in the description of control B. With flip-flip 8104 in its set condition, the next occurring negative pulse on conductor 1 Sec. Pulse is coupled through gate 8105 and flip-flip 8011 is triggered to its set condition. With flip-flip 8011 in its set condition, the next occurring pulse on conductor 1 Sec. Pulse is coupled through gate 8012 and amplifier 8013 is triggered non-conductive for fifty microseconds by the trailing edge of said pulse. When amplifier 8013 becomes non-conductive, amplifier 8010 becomes conductive and the position time store is reset in the same manner as previously described. The ground pulse appearing at the output of amplifier 8010 is also applied to the A terminals of flip-flips 8011 and 8104 to reset those flip-flips. Thus, it can be seen that the position time store is responsive to the receipt of ground potential on conductor KRS to transmit a one to two second timed pulse over conductor DYZ to control B and is then completely reset.

*Two digit store.*—The two digit store is shown in Figs. 83–88, inclusive. As described in the general description and as shown in the block diagram of Fig. 2 of the drawings, each incoming register comprises a two digit store, a calling time store, and a control connector for making connection to a calling line terminating unit. It will be recalled from the general description that the identity of the calling line terminating unit is transferred from the seize detector control circuit to the calling time store of the allotted incoming register when the calling line terminating unit is a unit which terminates a trunk line from another long distance switching center. Also as described in the general description, when the identity of the calling unit is read in by the calling time store, the control connector of the incoming register is controlled to connect to the time division channel on the highway assigned to the calling unit and any signals thereafter appearing on that channel are demodulated in the control connector and the demodulated signals are coupled over conductors CAC to multifrequency signal detector 8301 in the two digit store. Simultaneously with the initiation of the transmission of unit time position channel and highway identification information to the control connector, the calling time store functions to apply ground potential to conductor SC to initiate the operation of the two digit store.

When the potential on conductor SC goes from negative to ground, delay multivibrator 8302 is triggered to produce a twenty millisecond negative-going pulse at its output terminal A. The trailing edge of the negative pulse at terminal A of multivibrator 8302 triggers flip-flip 8303 to its set condition and the resulting negative potential at terminal D of flip-flip 8303 enables voice gate 8401 to pass the seize acknowledgment signal Z to the input of audio amplifier 8402. The amplified seize acknowledgment signal appearing at the output of amplifier 8402 is coupled over conductors CAR to the control connector, applied by the control connector to the highway assigned to the calling unit in the time division channel assinged to the calling unit, demodulated in the calling line terminating unit, and transmitted over the trunk line to the controlling direct dialing register or position register in the originating long distance switching center. The trailing edge of the negative pulse appearing at terminal A of delay multivibrator 8302 also triggers amplifier 8304 non-conductive for a period of fifty microseconds and the resulting negative pulse is applied to terminal B of gated amplifier 8305. Amplifier 8305 is provided in the circuit for the purpose of determining whether or not a seize signal is actually being received over the channel to which the control connector of the incoming register is connected. It is to be noted that amplifier 8305 is not enabled until a period of twenty milliseconds has elapsed after seizure of the control connector so that multifrequency signal detector 8301 has ample time to detect a seize signal. If a seize signal is being received over the calling channel, it is detected in multifrequency signal detector 8301 and negative potential appears on conductor S. Under these conditions, amplifier 8305 remains non-conductive and the call is accepted and processed by the incoming register. However, if conductor S is at ground potential at the time that negative potential is applied to terminal B of amplifier 8305, thus indicating that a seize signal is not being received, amplifier 8305 becomes conductive and reset control flip-flip 8601 is triggered to its set condition to completely reset the circuits of the incoming register.

When reset control flip-flip 8601 is set and its D terminal goes negative, amplifier 8602 is rendered conductive to apply ground potential to the A terminals of the various flip-flips in the two digit store and thus immediately reset seize acknowledgment control flip-flip 8303 and to apply ground potential to conductor R to reset the calling time store and thus the control connector of the incoming register. Also when flip-flip 8601 is set, the positive-going potential at its terminal E triggers delay multivibrator 8603 to produce a twenty millisecond negative pulse at its terminal A. The trailing edge of the pulse at terminal A of multivibrator 8603 triggers reset control flip-flip 8601 to its reset condition and controls the calling time store over conductor RLR to mark the incoming register as idle to the incoming register allotter so that the incoming register can be assigned for use on another call.

Assuming that a seize signal is detected and that amplifier 8305 therefore remains non-conductive, the seize acknowledge signal Z is transmitted to the originating direct dialing or position register and controls that register to terminate the transmission of the seize signal. Approximately twenty millisecond after the termination of the transmission of a seize signal, the controlling direct dialing or position register transmits the compound voice frequency signal corresponding to the first digit to be processed by the incoming register. When a compound voice frequency digit signal is received by multifrequency signal detector 8301, negative pulses appear on the two of the conductors U–Y which correspond to that digit, as previously explained, and are coupled through one or more of the gates 8801–8804 and the corresponding capacitors 8805–8808 to terminal C of digit acknowledgement control flip-flop 8306. The trailing edge of the first pulse applied to terminal C of flip-flip 8306 triggers that flip-flip to its set condition.

When flip-flip 8306 is set and its terminal E goes to ground, flip-flip 8303 is triggered to its reset condition to block the voice gate 8401 and thus terminate the transmission of a seize acknowledge signal Z to the originating register, and amplifier 8403 is rendered non-conductive. When amplifier 8403 becomes non-conductive, negative potential is applied to the D terminal of each of the gates 8809–8813 and said gates are thereby enabled to pass the negative pulses appearing on two of the conductors U–Y. The trailing edge of the negative pulse coupled through each of two of the gates 8809–8813 serves to trigger the corresponding one of the flip-flips 8814–8818 to its set condition to register the value of the transmitted digit. For example, if the transmitted digit is the digit "6," negative pulses appear on conductors W and Y, the pulses are coupled through gates 8811 and 8813, and flip-flips 8816 and 8818 are triggered to their set conditions. The negative potential appearing at terminal D of set flip-flip 8816 is applied to terminal C of voice gate 8501 and enables that gate to pass frequency W to terminal B of voice gate 8502. The negative potential at terminal D of set flip-flip 8818 is applied to terminal C of voice gate 8503 and enables that gate to pass frequency Y to terminal B of voice gate 8502. Voice gate 8502 is enabled to pass the compound voice frequency digit acknowledgment signal WY, which corresponds to the digit received and registered, to the input of amplifier 8402 and thus to the controlling register since terminal C of voice gate 8502 is returned to negative potential at terminal D of set flip-flip 8306. Thus, it can be seen that when a digit is registered in the second digit register, the compound voice frequency signal corresponding to that digit is returned to the originating register as a digit acknowledgment signal.

The originating register is responsive to the receipt of a digit acknowledgment signal to either transmit a seize signal S or a cancel signal UZ depending upon whether the acknowledgment signal is correct or incorrect, respectively, for the transmitted digit. If it is assumed that the digit is correctly acknowledged and a seize signal S is therefore transmitted by the originating register, conductor S from multifrequency signal detector 8301 goes negative and since terminal B of gate 8308 is returned to negative potential at terminal D of set flip-flip 8306, a negative signal is passed by gate 8308 and amplifier 8309 is rendered conductive to initiate the shift of the first received digit from the second digit register to the first digit register. When amplifier 8309 becomes conductive, amplifier 8310 is triggered non-conductive for approximately one hundred microseconds and the resulting negative pulse is coupled through gate 8311 to the C terminals of the gates 8701–8705, inclusive. The B terminal of each of the gates 8701–8705 is returned to the D terminal of an individual one of the flip-flips 8814–8818 so that only the gates corresponding to the set flip-flips will pass the negative pulse applied to their C terminals. Since it was assumed that the digit "6" was received, flip-flips 8816 and 8818 are set and a negative pulse is therefore passed by gates 8703 and 8705. Thus, when amplifier 8310 again becomes conductive, the outputs of gates 8703 and 8705 go to ground, flip-flips 8708 and 8710 are triggered to their set conditions, and flip-flips 8816 and 8818 are triggered to their reset conditions. Thus, the digit "6" is effectively shifted from the second digit register to the first digit register. Also when amplifier 8310 returns to its conducting condition, flip-flip 8306 is triggered to its reset condition to thereby terminate the transmission of the digit acknowledgment signal. The trailing edge of the negative pulse at terminal A of amplifier 8310 also triggers amplifier 8312 non-conductive for approximately one hundred microseconds and the trailing edge of the negative pulse produced by amplifier 8312 triggers amplifier 3813 non-conductive for a period of one hundred microseconds. The negative pulse appearing at the output of amplifier 8313 is a sampling pulse which is utilized to check the digital value of the digit now stored in the first digit register so as to determine the type of further operation of the two digit store.

It will be recalled from the general description that there are four types of calls which may be processed by an incoming register. That is, the call may be routed through one or more long distance switching centers succeeding the illustrated long distance switching center before being routed to a local office, the call may be routed directly to a local office served by the illustrated long distance switching center, or the call may be routed to the operator position or to a service line in the illustrated long distance switching center. It will also be recalled that the digits "2–9" identify long distance switching centers accessible to the illustrated long distance switching center, the digits "11–10" identify local offices accessible to the illustrated long distance switching center, the digits "00" identify the operator position in the illustrated long distance switching center, and the digits "01–04" identify the service lines provided in the illustrated long distance switching center. Thus at this point in the operation of the two digit store, a check must be made to determine the digital value of the first digit received by the two digit store. If the registered digit is one of the digits "2–9," sufficient information has been received to identify a group of units terminating trunk lines to another long distance switching center, and the two digit store must immediately call for the register finder so that the route selector may serach for an idle unit in the selected group of units. On the other hand, if the first digit is either a "1" or a "0," the two digit store must receive a second digit before calling for the register finder.

Since it was assumed that the digit "6" was received and registered by the two digit store, the zero and one discriminating amplifiers 8711 and 8712, respectively, the operation of which will be described later, remain non-conductive and a negative signal is coupled through gate 8714 to terminal D of gate 8713. It is to be noted that when a digit is stored in the first digit register and any of the flip-flips 8706–8710 are therefore set, a negative signal is passed by gate 8404 and applied to the C terminal of gate 8604 so as to enable said gate to pass a positive-going pulse when amplifier 8605 becomes conductive. Now, one hundred microseconds after the shift of the received digit to the first digit register is completed, amplifier 8313 is triggered non-conductive for one hundred microseconds, as previously described, and amplifier 8605 is rendered conductive since all inputs to gate 8314 are negative. When amplifier 8605 becomes conductive, a positive-going pulse is coupled through gate 8604 and connect demand flip-flip 8606 is triggered to its set condition. When flip-flip 8606 is set, a negative finder connect demand signal is applied to conductor FCD and gate 8607 is enabled.

When the incoming register has been found by the register finder, negative potential is applied to conductor FDA, the output of gate 8607 goes negative, amplifier 8608 becomes conductive, and amplifier 8609 becomes nonconductive. When amplifier 8609 becomes non-conductive, negative potential is applied to terminal C of gate 8610 but the output of said gate remains at ground potential since conductor WRO is returned to ground potential in the route selector at this time. Also when amplifier 8609 becomes non-conductive, negative potential is applied to the C terminals of the first digit read out gates 8405–8409 and to the C terminals of the second digit read out gates 8504–8508. Since flip-flips 8708 and 8710 of the first digit register are set, negative potential is applied through gates 8407 and 8409 to conductors 1DW and 1DY, respectively, of the first digit marking cable DM1 to identify the digit "6" to the route selector. The output of each of the gates 8405, 8406, 8408, and 8504–8508, of course, remains at ground potential since flip-flips 8706, 8707, 8709, and 8814–8818 are in their reset condition.

The route selector is responsive to the receipt of digit marking information on conductors 1DW and 1DY to search for an idle unit in the group of units identified by the digit "6" and when an idle unit in that group is selected or when it is determined that all units in that group are busy, the route selector functions to apply negative potential to write-read conductor WRO. When negative potential is received on conductor WRO by the illustrated circuit, the output of gate 8610 goes negative, amplifier 8612 is rendered conductive, and ground potential is applied to conductor TSW to control the calling time store to read out the time division channel and highway identification of the calling unit to the allotted link circuit. Simultaneously therewith, the route selector reads out the time division channel and highway identification of the selected called unit or the identity of the tape announcement coupling unit corresponding to the selected group of units depending upon whether an idle unit was selected or all units in the desired group are busy, respectively. When the calling and called unit identification has been read in by the allotted link circuit, negative potential is removed from conductor FDA, amplifier 8608 becomes non-conductive, and amplifier 8609 becomes conductive. When amplifier 8609 becomes conductive, reset control flip-flip 8601 is triggered to its set condition to release the incoming register from the connection in the manner previously described. If an idle unit is selected, the seize signal transmitted by the controlling register and which controlled the two digit store to call for the register finder is now coupled from the calling unit to the called unit in the illustrated long distance switching center through the allotted link circuit and is thus transmitted to the selected long distance switching center. If all units in the desired group are busy, an end of call VZ signal superimposed on the recorded message is coupled from the tape announcement unit through the link circuit to the calling unit and thus to the controlling register. As explained in the descriptions of control A and control B, the originating register is responsive to the receipt of an end of call signal to transfer the identity of the calling and called units in that office to a link circuit in that office so that the recorded message is transmitted through that link circuit to the calling subscriber.

Next assume that the digit received by the two digit store is the digit "1," indicating that the call is to be extended to a local office served by the illustrated long distance switching center, so that negative pulses are received on conductors V and W from multifrequency signal detector 8301, flip-flips 8815 and 8816 of the second digit register are set, voice gates 8509 and 8501 are enabled to couple the digit acknowledgment signal VW to conductors CAR, a seize signal is received from the originating register, and the digit "1" is shifted to the first digit register by setting flip-flips 8707 and 8708 and resetting flip-flips 8815 and 8816, all in the manner previously described. When flip-flips 8707 and 8708 are set, amplifier 8712 is rendered conductive since its terminal C is returned to ground potential at terminal E of flip-flip 8707 and its terminal B is returned to negative potential at terminal D of flip-flip 8708. When amplifier 8712 becomes conductive, ground potential is applied to terminal C of amplifier 8611, ground potential is applied through gate 8714 to the D terminal of gate 8314, and a ground pulse is applied to terminal C of flip-flip 8303 to trigger that flip-flip to its set condition. When flip-flip 8303 is set, a seize acknowledge signal Z is returned to the originating register, as previously described. When amplifier 8313 is triggered non-conductive, one hundred microseconds after the shift of the digit from the second digit register to the first digit register, negative potential is applied to terminal C of gate 8314 and to terminal C of gate 8713. The output of gate 8314 remains at ground potential since terminal D of that gate is returned to ground, as previously described, and the output of gate 8713 remains at ground since terminal B of that gate is returned to ground at terminal A of gate 8510, which ground occurs since a digit is not stored in the second digit register and flip-flips 8814–8818 are all in the reset condition.

As previously described, the originating register is responsive to the receipt of seize acknowledge signal Z to terminate the transmission of a seize signal S and approximately twenty milliseconds later, forwards the compound voice frequency signal corresponding to the next digit to the two digit store. When the next digit is received, flip-flip 8306 is set, flip-flop 8303 is reset, the received digit is registered in the second digit register, and the digit acknowledgment signal corresponding to the received digit is returned to the originating register, all in the same manner as previously described. If the digit is correctly acknowledged, the originating register terminates the transmission of digit information and approximately twenty milliseconds later, transmits a seize signal S to the two digit store. When conductor S from multifrequency signal detector 8301 goes negative, amplifier 8309 becomes conductive and amplifier 8310 is triggered non-conductive for approximately one hundred microseconds, as previously described. The negative pulse appearing at terminal A of amplifier 8310 is not coupled through gate 3811 since a digit is registered in the first digit register, the output of gate 8404 is negative, amplifier 8410 is conductive, and terminal D of gate 8311 is therefore held at ground potential. Thus, no shift of digits occurs responsive to the receipt of a seize signal when a digit is already registered in the first digit register. As previously described, the trailing edge of the negative pulse at terminal A of amplifier 8310 triggers amplifier 8312 non-conductive and the trailing edge of the negative pulse at the output of amplifier 8312 triggers amplifier 8313 non-conductive for a period of one hundred microseconds.

When amplifier 8313 becomes non-conductive, a negative pulse is coupled through gate 8713 since terminal B of that gate is returned to the negative potential appearing at the output of gate 8510 when a digit is registered in the second digit register. The negative pulse coupled through gate 8713 renders amplifier 8611 conductive since terminal C of that amplifier is returned to ground at the output of conducting amplifier 8712 and when amplifier 8611 becomes conductive, connect demand flip-flip 8606 is triggered to its set condition to transmit a finder connect demand signal to the register finder. The operation of the two digit store responsive to the receipt of a demand answer signal from the register finder is identical to the operation described above for a call to another long distance switching center with the exception that two digits rather than one digit are marked to the route selector. The second digit is marked on the two of the conductors 2DU–2DY which correspond to the two set flip-flips of the second digit register flip-flips 8814–8818 when amplifier 8609 becomes non-conductive and negative potential is thereby applied to terminal C of each of the second digit marking gates 8504–8508. When the identity of the calling unit and the identity of the selected called unit or the 120 I.P.M. busy tone coupling unit have been read into the allotted link circuit, conductor FDA returns to ground potential and the incoming register is released from the connection in the same manner as previously described.

Next assume that the first digit received by the two digit store is the digit "0," which indicates that the call is to be routed either to the operator position or to a service line in the illustrated long distance switching center. When the digit "0" is received, negative pulses appear on conductors U and X and flip-flips 8814 and 8817 are triggered to their set conditions. Thus when the first digit is shifted to the first digit register, flip-flips 8706 and 8709 are triggered to their set conditions and amplifier 8711 is rendered conductive since its terminal B is returned to negative potential at terminal D of flip-flip 8706 and its terminal C is returned to ground at terminal E of flip-flip 8709. When amplifier 8711 becomes conductive, ground potential is coupled through gate 8714 to block gate 8314 so as to prevent the transmittal of a connect demand signal after the first digit, and flip-flip 8303 is set to transmit a seize acknowledge signal in the same manner as described for a local office call. When amplifier 8711 becomes conductive, ground potential is also applied to terminal C of amplifier 8411 but amplifier 8411 remains non-conductive since the output of gate 8412 is held at ground potential through gate 8510.

When the second digit is received, flip-flip 8306 is set, flip-flip 8303 is reset, the second digit is registered in the second digit register flip-flip stages, and a digit acknowledgment signal is returned to the originating register, all as previously described. If the digit is correctly acknowledged, a seize signal is transmitted by the originating register and conductor S from multifrequency signal detector 8301 goes negative. Under these conditions, both inputs to gate 8412 and thus terminal B of amplifier 8411 are negative and amplifier 8411 is rendered conductive since its terminal C is returned to ground at the output of conducting amplifier 8711, as previously described. When amplifier 8411 becomes conductive, flip-flip 8303 is triggered to its set condition through diode 8315. When flip-flip 8303 is set, the negative potential at its terminal D enables voice gate 8401 to pass Z-tone to the input of amplifier 8402 and the negative potential is also applied to terminal C of amplifier 8413. Amplifier 8413 now becomes conductive since its terminal C is returned to negative and its terminal B is returned to ground at terminal A of conducting amplifier 8411. When amplifier 8413 becomes conductive, negative potential is applied to terminal C of voice gate 8414 and that gate is thereby enabled to pass V-tone to the input of amplifier 8402. Thus, the compound voice frequency signal VZ, which, as previously explained, is an end of call signal, is transmitted back over the connection to the originating register and the originating register is thereby controlled to transfer the identity of the calling and called units in that office to a link circuit in that office so that a talking connection is now completed between the originating subscriber station and the illustrated long distance switching center. It should be noted that an end of call VZ signal is transmitted by the two digit store at this time since the first digit "0" indicated that the call was to terminate in the illustrated long distance switching center and sufficint digits have been received to identify the final destination of the call.

Also when amplifier 8413 becomes conductive, negative potential is applied to terminal C of gate 8613 so that when the originating register terminates the transmission of a seize signal, responsive to the receipt of the end of call VZ signal, and conductor S returns to ground potential, a positive-going pulse is coupled through gate 8613 and connect demand flip-flip 8606 is triggered to its set condition. When a demand answer signal is received from the register finder, the digit marking information corresponding to the first and second registered digits is transmitted to the route selector, the identity of the calling and called units is then transferred from the incoming register calling time store and the route selector, respectively, to the allotted link circuit in the illustrated long distance switching center, and the incoming register is released from the connection in the same manner as previously described. It should be noted that if the call is for a service line in the illustrated long distance switching center and if that service line is busy, the route selector transfers the identity of the 60 I.P.M. tone coupling unit rather than the identity of the service line to the allotted link circuit.

Up to this point in the descripion it has been assumed that the received digits were correctly acknowledge by the two digit store. It will be recalled that if a digit is incorrectly acknowledge, control A or control B in the originating direct dialing register or position register, respectively, serves to transmit a cancel signal UZ rather than a seize signal S. Under these conditions, a negative potential is applied to conductor Z and negative pulses are applied to conductor U by multifrequency signal detector 8301 so that all inputs to gate 8307 go negative when the first pulse appears on conductor U and delay multivibrator 8316 is triggered to its operated condition by the trailing edge of said first pulse. The cancel signal UZ is transmitted by the originating register for a period of approximately fifty milliseconds so that the negative-to-ground pulse appearing at terminal D of multivibrator 8316 is approximately eighty milliseconds in duration. The pulse at terminal D of multivibrator 8316 serves to reset the digit acknowledgement flip-flip 8306 and is coupled through gate 8819 to reset the set ones of the second digit register flip-flips 8814–8818. When flip-flip 8306 is reset, amplifier 8403, of course, becomes conductive and the digit input gates 8809–8813 are blocked by ground potential applied to their D terminals. It is to be noted that even though frequency U is used in several of the digit identifying compound voice frequency signals, flip-flip 8306 is not triggered to its set condition when frequency U is received since no gate corresponding to gates 8801–8804 is provided between conductor U from multifrequency signal detector 8301 and terminal C of flip-flip 8306.

Approximately twenty milliseconds after the transmission of the cancel signal UZ is terminated, the originating register retransmits the same digit to the two digit store, flip-flip 8306 is triggered to its set condition through one or more of the gates 8801–8804, the received digit is stored in the second digit register, and the corresponding digit acknowledgment signal is transmitted to the originating register. If the acknowledgment signal is correct, the originating register transmits a seize signal S and the operation proceeds in a normal manner. If the digit is incorrectly acknowledged, another cancel signal is transmitted to the two digit store and the above-described operation is repeated. It will be recalled that control A and control B are each arranged to time out a call if a correct digit acknowledgement signal is not received from the controlled register within a period of one to two seconds. Thus if the transmitted digit is incorrectly acknowledged repeatedly, the controlling register times out and a release signal YZ is transmitted to the controlled register. When a release signal is received by the two digit store, negative potential is applied to conductor Z and negative pulses are applied to conductor V by multifrequency signal detector 8301. All inputs to gate 8614 go negative during the occurrence of the first negative pulse on conductor V and the trailing edge of said first pulse triggers reset control flip-flip 8601 to its set condition to initiate the release of the incoming register from the connection in the manner previously described. It is to be noted that when flip-flip 8601 is set and amplifier 8602 becomes conductive, ground potential is applied to terminal D of gate 8614 to block further operation of said gate.

If the calling subscriber should abandon the call or if the originating operator should initiate the release of the equipment in the forward direction, control A or control B, respectively, serves to transmit a release signal YZ and the two digit store is released from the connection in the exact same manner as described above. The incoming register is also released if the incoming register has not completed its operation within a period of one to two minutes after the identity of the calling unit is read in by the calling time store of the incoming register. The timing function is performed in the calling time store and, as described in the description of that circuit, ground potential is applied to conductor TOP at the termination of the timed interval. The negative to ground transition on conductor TOP triggers reset control flip-flip 8601 to its set condition and the incoming register is thereby released from the connection.

*Route selector.*—The single route selector provided in the illustrated long distance switching center is shown in detail in Figs. 89–110, inclusive, of the drawings. It will be recalled that when an incoming register or a direct dialing register has registered sufficient digits to identify the desired long distance or local trunk group, the operator position, or a service line in the long distance switching center, or the position register has registered sufficient digits to identify the desired long distance or local trunk group, or a service line, that register transmits a connect demand signal to the register finder and when a demand answer signal is received from the register finder, that register serves to apply digit marking either to the conductors of digit marking cable DM1 or to the conductors of digit marking cable DM1 and to the conductors of digit marking cable DM2. It will also be recalled that the eight groups of line terminating units which terminate trunk lines to other long distance switching centers are identified by digits "2–9," the ten groups of line terminating units which terminate trunk lines to local offices served by the illustrated long distance switching center are identified by the digits "11–10," the operator position in the illustrated long distance switching center is identified by the digits "00," and the service lines in the illustrated long distance switching center are identified by the digits "01–04."

To illustrate the operation of the route selector, first assume that a calling register applies negative potential to conductors 1VF and 1YF of cable DM1, thus identifying the group of units terminating trunk lines to the long distance switching center identified by the digit "9." When conductors 1VF and 1YF go negative, all inputs to gate 10001 are negative and the digit "9" amplifier 10002 becomes conductive. When amplifier 10002 becomes conductive, amplifier 10003 becomes non-conductive and the C terminal of the ninth group pulse amplifier 10004 is returned to ground potential without effect at this time. When a negative signal is received over any of the conductors 1UF–1YF, the output of gate 9901 goes negative and amplifier 9902 is rendered conductive to apply ground potential to terminal D of gate 11001 and delay multivibrators 11002 and 10901 are triggered to their operated condition. When ground potential is applied to terminal D of gate 11001, amplifier 11003 becomes non-conductive and ground potential is thereby removed from the master reset conductor, which extends from terminal A of amplifier 11003, allowing the subsequent operation of the various flip-flip circuits which have their A terminals connected to that conductor. Delay multivibrator 11002 serves to produce an eighty millisecond negative pulse at its terminal A during which time the route selector must find an idle line terminating unit in the marked group or determine that all units in the group are busy. Delay multivibrator 10901 serves to produce a two hundred millisecond negative pulse at its terminal A, which pulse is used to measure a period of time before certain alarm tests are made, as will be described later.

When amplifier 11003 becomes non-conductive, terminal D of gate 11004 is returned to negative potential and, since flip-flip 11005 is in its reset condition, the negative pulses in time position 32 thereafter appearing at the output of emitter follower 11006 are coupled through gate 11004 to the input of amplifier 11007. The positive-going pulses in time position 32 appearing at the output of amplifier 11007 are applied through steering diodes to either terminal B or terminal A of flip-flop 9101 depending upon whether flip-flop 9101 is in its reset or set condition, respectively. Flip-flop 9101 is provided in the circuit for the purpose of controlling the stepping operation of the two nine-stage counters which jointly control the time position selection of the trunk finding operation. The first counter, which comprises flip-flips 8901–8903, and the second counter, which comprises flip-flips 9001–9003 and 9104, are alternately stepped each time that flip-flop 9101 is triggered to either its set or reset condition and the outputs from the individual stages of the two counters are used to control the enablement of the ten local trunk finder gates, represented in the drawings by gates 8904–8908, and the seventeen long distance trunk finder gates, represented in the drawings by gates 9004–9009. Ten local and seventeen long distance trunk finder gates are provided in the illustrated system since, as was described in the general description and as shown in the time position and highway assignment chart of Fig. 36, line terminating units which terminate trunk lines extending to local offices are individually assigned time positions 1–10 on each of the six highway transmission networks and line terminating units which terminate trunk lines extending to other long distance switching centers are individually assigned time positions 12–28 on each of the six highway transmission networks.

Since it was assumed that the digit "9" was received by the route selector, the digit "1" amplifier 10005 is non-conductive and negative potential is applied to terminal D of each of the gates 9004–9009 to enable those gates for operation. The negative potential appearing at the output of amplifier 10005 is also coupled through gates 8914 and 8915 to hold amplifier 8916 conductive and thus block local gates 8904–8908 by applying ground potential to their D terminals. To illustrate the operation of the trunk finding circuitry, assume that flip-flop 9101 is reset and that flip-flips 8901 and 9001 are in their set conditions. The negative potential appearing at terminal D of flip-flip 8901 is applied to terminal B of gates 8904 and 9004 and a negative signal is passed by gate 9004 since its terminal C is also returned to negative potential at the output of non-conducting amplifier 9102. It is to be noted that the negative potential appearing at terminal D of flip-flip 9001 is applied to terminal B of gates 8905 and 9005 but a negative signal is not passed by gate 9005 since its terminal C in returned to ground potential at the output of conducting amplifier 9103. When the output of gate 9004 is negative, amplifier 9010 is conductive and ground potential is applied to terminal C of gated pulse amplifier 9011 so that the negative pulse in time position 12 passed by emitter follower 9012 is amplified by amplifier 9011 and applied to the B terminal of each of the six cross-point gates corresponding to gates 9401 and 9402 in the time position and highway matrix shown in Figs. 93 and 94.

It can be seen that each cross-point gate, such as 9401, has its B terminal connected to the output of a time position pulse amplifier, such as 9011, and its C terminal connected to the conductor extending between the output of a highway identification amplifier, such as 9501, and the output of a busy pulse amplifier, such as 9301. If it is assumed that the dual highway counter which comprises flip-flips 9201–9203 and 9601–9603 is in the condition in which flip-flips 9201 and 9601 are set, all inputs to gate 9204 are negative, amplifier 9111 is conductive, and amplifier 9501 is non-conductive to apply negative potential to the C terminals of the cross-point gates associates with highway 1. Under these conditions, a negative pulse in time position 12 is passed by cross-point gate 9401 if a negative pulse in time position 12 is not applied to busy test conductor BT1 by one of the registers or link circuits of the system. If a negative pulse in time position 12 is present on conductor BT1, the pulse is amplified and inverted by amplifier 9301 and terminal C of gate 9401 is thereby held at ground potential to prevent the output of gate 9401 from going negative responsive to the receipt of a pulse in time position 12 from amplifier 9011. It will be recalled that the busy pulses are 2.5 microseconds in duration and the trailing edge of each busy pulse is coincident with the trailing edge of the corresponding 1.25 microsecond time position pulse so that sufficient overlap is provided to prevent the coupling of a partial pulse through a cross-point gate when the corresponding time position is busy. Obviously, the other four time position 12 cross-point gates corresponding to gates 9401 and 9402 and cross-point gate 9402 are prevented from passing a negative pulse in time position 12 at this time regardless of the idle or busy condition of time position channel 12 on their respective highways since amplifiers 9502–9506 are conductive and the C terminals of said gates are clamped to ground potential. Terminal A of each of the cross-point coupling diodes corresponding to diode 9403 terminates at an individual terminal on the long distance trunks intermediate distributing frame, shown in Fig. 100.

Returning to the consideration of flip-flop circuit 9101, it will be recalled that positive-going pulses in time position 32 are used to trigger that flip-flop alternately to its set and reset conditions. Since it was assumed that flip-flop 9101 was reset, the first occurring pulse in time position 32 is coupled through a steering diode to its terminal B and flip-flop 9101 is triggered to its set condition so that amplifier 9102 becomes conductive and amplifier 9103 becomes non-conductive. When amplifier 9102 becomes conductive, a positive-going pulse is coupled through gate 8909 to reset flip-flip 8901 and set flip-flip 8902. When amplifier 9103 becomes non-conductive, both inputs to gate 9013 are negative and that gate is thereby enabled to pass a positive-going pulse when amplifier 9103 again becomes conductive at the termination of the next pulse frame. Now, with amplifier 9103 non-conductive and flip-flip 9001 still in its set condition, all inputs to gate 9005 are negative and time position pulse 13 is applied to the time position and highway matrix in the same manner as described for time position pulse 12. If time position 13 is not marked as busy on busy test conductor BT1, a negative pulse appears in time position 13 at the individual terminal at the long distance trunk IDF which corresponds to time position 13 on highway 1. The next occurring pulse in time position 32 triggers flip-flop 9101 to its reset condition, amplifier 9103 becomes conductive, amplifier 9102 becomes non-conductive, flip-flip 9001 is reset, flip-flip 9002 is set, and the output of gate 9006 goes negative. Thus, it can be seen that flip-flop 9101 is triggered at the termination of each pulse frame to advance the time position counters and that time position pulses 12–28 are coupled to the B terminals of the corresponding cross-point gates in turn as long as the searching operation continues, each pulse is compared with the busy pulses on conductor BT1, and a negative pulse is applied to the individual terminal at the IDF corresponding to that time position on highway 1 if the time position is idle.

After the completion of eighteen pulse frames from the time that the call was initiated, the counters will be returned to the condition wherein flip-flips 8901 and 9001 are set, if, as was assumed, the counter was in that condition at the beginning of the call, a negative signal is again passed by gate 9004 to render amplifier 9010 conductive and thus enable amplifier 9011 to couple time position pulse 12 to the matrix. When amplifier 9010 becomes conductive, a positive-going pulse is coupled through gate 9014 to trigger delay multivibrator 9205 to its operated condition and to trigger highway counter control flip-flop 9206 to its set condition. When flip-flop 9206 is set, amplifier 9604 becomes conductive, and flip-flips 9201 and 9202 are triggered to their reset and set conditions, respectively, through gate 9207. Also when flip-flop 9206 is set, amplifier 9605 becomes non-conductive so that both inputs to gate 9606 are negative and that gate is enabled to pass a positive-going pulse when amplifier 9605 again becomes conductive. When flip-flip 9201 is reset, the output of gate 9204 goes to ground, amplifier 9111 becomes non-conductive, and amplifier 9501 becomes conductive to block the highway 1 cross-point gates. When amplifier 9605 becomes non-conductive, all inputs to gate 9607 are negative, since flip-flip 9601 is still set, amplifier 9507 becomes conductive, and amplifier 9502 becomes non-conductive to enable the highway 2 cross-point gates to make a busy test when time position pulses are coupled thereto. The operation continues in the manner just described. That is, the idle or busy condition of time position channels 12–28 on highway 2 is checked and when amplifier 9010 again becomes conductive, the highway counter is advanced one step to enable the highway 3 cross-point gates.

It is to be noted that dual counters are provided for both the time position selection and the highway selection so that if one counter of either pair should fail, it is still possible to extend calls through the illustrated long distance switching center. As will be described more fully hereinafter, the line terminating units in each trunk group are assigned time division channels on different highways so that service to the corresponding long distance switching center or local office is not completely disrupted in the event that one of the time position counters or highway counters should fail. It is also to be noted that the highway counter control flip-flop 9206 can be triggered by either time position 12 controlling amplifier 9010, which is controlled by flip-flip 8901 of the first time position counter, or by time position 13 controlling amplifier 9015, which is controlled by flip-flip 9001 of the second time position counter, so that the highway counter can be stepped even though one of the time position counters fails to function. Dual triggering of the highway counter control flip-flop 9206 is prevented when both time position counters are functioning properly since delay multivibrator 9205 is triggered to produce a two hundred and ten microsecond pulse when amplifier 9010 becomes conductive and said pulse overlaps the operation of amplifier 9015, which, of course, becomes conductive eighty microseconds or one pulse frame after amplifier 8010 becomes conductive.

As previously described, each of the cross-point coupling diodes terminates at an individual terminal on the long distance trunk IDF and a negative pulse will appear at a particular terminal in the time position corresponding to that terminal if the highway corresponding to that terminal is being scanned at that time and that time position channel is not marked busy within the long distance switchinng center. At the long distance trunk IDF, all of the terminals terminating cross-point coupling diodes, such as 9404, corresponding to the same group of line terminating units are strapped to the B terminal of the corresponding group amplifier, such as amplifier 10004 for the group of units represented by the digit "9."

To further illustrate the trunk finding operation, assume that there are twelve trunk lines interconnecting the illustrated long distance switching center and the long distance switching center represented by the digit "9" and that the line terminating units in the illustrated long distance switching center which terminate those trunk lines are individually assigned time positions 12 and 13 on each of the six highway transmission networks. Therefore, the twelve cross-point coupling diode terminals corresponding to time positions 12 and 13 on highways 1–6 are strapped to terminal 9 at the long distance trunk IDF and thus to the B terminal of the ninth group amplifier 10004. Further assume that the first ten trunk lines of the group are busy so that busy pulses appear in time positions 12 and 13 on busy test conductors BT1–BT5. Thus, when time positions 12 and 13 are scanned on highways 1–5, no pulses appear at the B terminal of amplifier 10004, which is the only one of the group amplifiers enabled for conduction at this time since it was assumed that the digit "9" was received by the route selector and that amplifier 10002 is therefore conductive. Negative pulses appear at the terminals representing idle units in any of the time positions 14–28 on any of the first five highways but since these terminals are not strapped to terminal 9 at the long distance trunk IDF, the pulses have no effect on the circuit. When amplifier 9010 becomes conductive and highway amplifier 9506 becomes non-conductive to mark the beginning of the scanning of the time position channels of the sixth highway, a negative pulse in time position 12 is coupled through gate 9402 and diode 9404 to terminal 9 at the long distance trunk IDF and thus to terminal B of the ninth group pulse amplifier 10004. The amplified negative pulse in time position 12 appearing at the output of amplifier 10004 is coupled through gate 10101 to conductor TSP and is also amplified and inverted by amplifier 10102 and utilized to trigger flip-flip 11005 to its set condition. When flip-flip 11005 is set, ground potential is applied to terminal C of gate 11004 and that gate is thereby blocked so that further operation of the time position counter control flip-flop 9101 is prevented and the time position counters and highway counters remain set in the condition corresponding to the found unit. Thus, a time position 12 pulse appears at the output of amplifier 10004 once each pulse frame until the route selector is released from the connection.

The time position and highway identity of the selected called unit is transmitted to the control connector associated with the route selector so that the control connector can establish a connection to the time division channel assigned to the selected unit for the purpose of determining if a call involving that unit is being initiated or terminated at this time. This is a so-called secondary busy test which is made at this time since the selected unit could be transmitting a seize or release signal even though it is not marked busy within the long distance switching center at this time. Time position identification is forwarded over conductor TSP and highway identification is forwarded over one of the conductors HI–1 to HI–6 to the control connector. In the assumed case, a negative pulse in time position 12 is applied to conductor TSP and ground potential appearing at the output of conducting amplifier 9508 is applied to conductor HI–6. Thus, the route selector control connector is controlled to connect to time division channel 12 on highway 6 and any signals appearing on that channel are demodulated in the control connector and the demodulated signals are transmitted over conductors AC–R to multifrequency signal detector 10701. If the selected unit is not origniating or terminating a call, no seize or release signal is detected by multifrequency signal detector 10701 and the output from that circuit remains negative.

It will be recalled that when digit marking was first received by the route selector, delay multivibrator 11002 was triggered to produce an eighty millisecond negative pulse at its terminal A. The trailing edge of that pulse triggers flip-flip 11008 to its set condition. When flip-flip 11008 is set and its D terminal goes negative, gate 11009 is enabled to pass the next occurring negative pulse on conductor CDR to render amplifier 10902 conductive and thus trigger flip-flip 10903 to its set condition. When flip-flip 10903 is set, ground at terminal E of that flip-flip is coupled through gate 10904 to allotter inhibit conductor AI for the purpose of preventing the setting up of any calls while information is being transferred over the identification busbars, as previously described. The second occurring negative pulse on conductor CDR renders amplifier 10902 conductive and flip-flip 10906 is triggered to its set condition since terminal *b* of gate 10905 is returned to negative potential at terminal D of flip-flip 10903. The third occurring negative pulse on conductor CDR renders amplifier 10902 conductive and read out control flip-flip 10907 is triggered to its set condition. Thus, three hundred and twenty microseconds after an inhibit signal is applied to conductor AI, the read out control flip-flip 10907 is triggered to its set condition to initiate the read out operation of the route selector.

It will be recalled that if the calling register is a direct dialing or a position register, ground is applied to either conductor DD or conductor PD, respectively, at the time that digit information is forwarded to the route selector so that flip-flop 10801 is triggered to its set condition. Under these conditions, gate 10802 is blocked by a ground potential applied to its terminal D so that a negative signal is not applied to conductor WRO when flip-flip 10907 is triggered to its set condition. With flip-flop 10801 in its set condition, gate 10803 is enabled so that amplifier 10804 becomes conductive, amplifier 10805 becomes non-conductive, and a negative signal is applied to conductor RTD when read out control flip-flip 10907 is set. Negative potential applied to conductor RTD controls the calling register, whether it be a direct dialing or the position register, to read in the identity of the selected called unit transmitted by the route selector. On the other hand, if the calling register is an incoming register, ground potential is not applied to conductors DD or PD, flip-flop 10801 remains reset, and negative potential is applied to conductor WRO. Under these conditions, the calling incoming register is controlled to read out the identification of the calling unit and the allotted link circuit is controlled to read in the identification of the calling and called units transmitted by the incoming register and the route selector, respectively.

The negative potential appearing at terminal D of read out control flip-flip 10907 renders amplifier 10301 conductive to apply ground potential to terminal C of gated pulse amplifier 10302. The negative pulse in time position 12 appearing at the output of the ninth trunk group amplifier 10004 is coupled through gate 10303, since terminal C of that gate is returned to negative potential at the output of non-conducting amplifier 10709, and through gate 10304 to terminal B of amplifier 10302. Thus, the negative pulse in time position 12 is amplified by amplifier 10302 and applied to the terminating slot pulse identification conductor TSP–I. The ground potential appearing at terminal E of read out control flip-flip 10907 serves to render amplifier 10908 non-conductive and negative potential is thereby applied to terminal C of each of the highway read out gates 10201–10204. It will be recalled that it was assumed that the selected unit is assigned a time position channel on highway 6 and that amplifier 9508 is therefore conductive to apply ground potential to conductor HI–6, which extends to the control connector. The ground on conductor HI–6 also serves to render amplifiers 10103 and 10104 conductive so that a negative signal is coupled through gates 10203 and 10204 to render amplifiers 10205 and 10206 conductive when negative potential is applied to the C terminals of gates 10201–10204. When amplifiers 10205 and 10206 are conductive, ground potential is applied to the terminating highway identification conductors THI–2 and THI–4 to identify highway 6 to the circuit which is controlled to read in at this time. When the identification information has been read in, the calling register removes negative potential from conductors 1VF and 1YF of the digit marking cable DM1, amplifier 9902 becomes non-conductive, and amplifier 11003 becomes conductive to apply ground potential to the master reset conductor. When ground potential is applied to the master reset conductor, which extends from terminal A of amplifier 11003, flip-flips 11008, 10903, 10906, 10907, and 11005 are reset, flip-flop 10801 is reset, if set, and the counter control gate 11004 is blocked at its terminal D. Also when digit marking is terminated, amplifier 10002 becomes non-conductive to block further operation of the ninth group amplifier 10004. It is to be noted that the time position and highway counters are not reset but, rather, remain in the setting in which time division channel 12 on highway 6 is being tested for a busy condition. Thus when the next call is received by the route selector, the trunk finding operation will start from that point.

In the above description, it was assumed that the route selector was successful in finding an idle line terminating unit in the desired group of units. Next assume that all of the line terminating units in the desired group of units are busy so that a negative pulse is not applied to terminal B of the ninth group pulse amplifier 10004 and the time position counters and the highway counters continue their stepping operation. It can be seen that the first time that flip-flip 9201 of the upper highway counter is set and amplifier 9604 is non-conductive, amplifier 9111 becomes conductive, ground potential is coupled through gate 9105, delay multivibrator 9106 is triggered to its operated condition, and flip-flip 9107 is triggered to its set condition. It is to be noted that multivibrator 9106 and flip-flip 9107 can be triggered through gate 9108 when amplifier 9605 becomes non-conductive and amplifier 9507 therefore becomes conductive on the next step of the highway counter if these circuits are not already triggered. Multiple triggering paths are provided so that an all trunks busy condition can be recognized even in the event that one of the highway counters should fail to operate. Dual triggering of flip-flip 9107 is prevented when both highway counters are functioning properly since the two millisecond ground pulse produced by multivibrator 9106 overlaps the operation of amplifiers 9111 and 9507. Under normal operating conditions, eighteen pulse frames or 1.44 milliseconds elapse between the time that amplifier 9111 first becomes conductive and the time that amplifier 9507 becomes conductive. When the highway counters have completed one complete cycle of operation after flip-flip 9107 is set and amplifier 9111 again becomes conductive, a positive-going pulse is coupled through gate 9109 and all trunks busy flip-flip 9110 is triggered to its set condition.

When all trunks busy flip-flip 9110 is set, the negative potential appearing at its terminal D is applied to terminal B of gate 10602 and through gate 10702 to terminal B of gate 10703 but without effect at this time. The ground potential appearing at terminal E of set flip-flip 9110 is applied to the C terminals of the highway gates corresponding to 9204 and 9607 and amplifier 9103 is thereby rendered non-conductive so that ground marking is removed from conductor HI–1, which extends to the control connector of the route selector. The ground potential appearing at terminal E of set flip-flip 9110 is also coupled through gate 10704 to render amplifier 10705 non-conductive but terminal A of amplifier 10705 remains clamped at ground potential since ground is coupled from the output of conducting amplifier 10908 through gate 10706 to terminal A of amplifier 10705. The ground at terminal E of set flip-flip 9110 is also coupled through gate 10708 to trigger flip-flip 11008 to its set condition and to trigger flip-flop 10801 to its reset condition if that flip-flop was set by ground marking on conductor DD from a direct dialing register. Flip-flop 10801 is reset on an all trunks busy condition if the calling register is a direct dialing register since it is necessary to transmit a WRO signal rather than an RTD signal to the direct dialing register so that the identity of the tape announcement unit can be read into the allotted link circuit, as previously described. On the other hand, if the calling register is the position register, as denoted by ground potential on conductor PD, flip-flop 10801 is held in its set condition even though a ground pulse is applied to its terminal A. It will be recalled that an RTD signal is transmitted to the position register even on a busy condition since the position register must register the identity of the selected unit and then transfer that information to the particular link circuit which was answered by the operator to initiate the call through the position register.

When flip-flip 11008 is set, the pulses appearing on conductor CDR are gated through gate 11009 to set flip-flips 10903, 10906, and 10907, as previously described. When flip-flip 10903 is set, an allotter inhibit signal is transmitted over conductor AI and three hundred and twenty microseconds later when read out control flip-flip 10907 is set, a signal is applied to either conductor WRO or conductor RTD, as explained above. When read out control flip-flip 10907 is set, the ground potential appearing at its terminal E renders amplifier 10908 non-conductive and negative potential is coupled through gate 10703 to busy conductor BY since terminal B of gate 10703 is returned to negative potential through gate 10702, as previously described. Also when amplifier 10908 becomes non-conductive, ground clamping through diode 10706 is removed from the A terminal of non-conducting amplifier 10705 so that terminal A of that amplifier goes negative. The negative potential at terminal D of read out control flip-flip 10907 renders amplifier 10301 conductive and ground potential is applied to terminal C of gated pulse amplifier 10302, as previously described. Since the desired trunk group is the group identified by the digit "9" and amplifiers 10002 and 10003 are therefore conductive and non-conductive, respectively, negative potential is applied through gate 10401 to the B terminal of gate 10402 and, since the C terminal of that gate is returned to negative potential at the output of amplifier 10705, amplifier 10403 is rendered conductive. When amplifier 10403 becomes conductive, ground is coupled through gate 10404 to render amplifier 10305 non-conductive so that ground clamping is removed from terminal A of emitter follower 10306 and the negative pulse in time position 30 is therefore applied to the B terminal of amplifier 10302. Thus, the pulse in time position 30 is applied to conductor TSP–I by amplifier 10302 to identify the time division channel assigned to the ninth trunk group tape announcement coupling unit. It should be noted at this point that an all trunks busy condition in the eighth trunk group also causes gate 10401 to pass a negative signal and thus control the application of time position pulse 30 to conductor TSP–I while an all trunks busy condition in any of the trunk groups 2–7 causes gate 10405 to pass a negative signal and thus control the application of time position pulse 29 to conductor TSP–I. As shown in the time position and highway assignment chart of Fig. 36, trunk groups 2–7 tape announcement coupling units are assigned time position 29 on highways 1–5.

Returning to the call under consideration, the negative potential at the output of non-conducting amplifier10003 is also applied to the B terminals of gates 10501, 10502, and 10503 and, since the C terminals of each of said gates are returned to negative potential at terminal A of amplifier 10705, negative potential is applied to the lost call meter conductor LCM–9, negative potential is applied to tape announcement start conductor TAS–9, and amplifier 10504 is rendered conductive. The negative potential applied to conductor LCM–9 is used to operate any well known peg count meter device and the negative potential applied to conductor TAS–9 is used to initiate the operation of any well known tape announcement machine in the well known manner. When amplifier 10504 becomes conductive, ground potential is coupled through gates 10603 and 10604 to render amplifiers 10105 and 10104, respectively, conductive. When amplifiers 10105 and 10104 become conductive, amplifiers 10207 and 10206 are rendered conductive and ground potential is thereby applied to conductors THI–0 and THI–2, respectively, to identify highway 2. Thus, time position 30 on highway 2, which as shown in Fig. 36 is assigned to the tape announcement machine for trunk group 9, is identified over the terminating identification busbars to either the allotted link circuit or the position register, as previously explained. When the read in operation is completed, digit marking is removed from the conductors of cable DM1 and the route selector is reset in the manner previously described.

It will be recalled that a secondary busy test is made on the selected unit by the route selector to determine if that unit is initiating or terminating a call even though said unit is not marked busy by busy marking pulses in its time position within a long distance switching center. As previously explained, any signals appearing on the channel assigned to the selected unit are demodulated in the control connector and the demodulated signals are transmitted over conductors AC–R to multifrequency signal detector 10701. If a seize or release signal is detected by multifrequency signal detector 10701, flip-flip 10707 is triggered to its set condition and the resulting ground potential at its terminal E is coupled through gate 10708 to immediately trigger flip-flip 11008 to its set condition and to trigger flip-flop 10801 to its reset condition if that flip-flop was set by ground potential applied to conductor DD by a direct dialing register, all as previously described. The negative potential appearing at terminal D of set flip-flip 10707 renders amplifier 10709 conductive to apply ground potential through gate 10404 and render amplifier 10305 non-conductive. When amplifier 10305 becomes non-conductive, ground clamping is removed from terminal A of emitter follower 10306 and negative pulses in time position 30 are applied to terminal B of gated pulse amplifier 10302. Also when amplifier 10709 becomes conductive, ground potential is applied to the F terminals of the highway gates corresponding to 9204 and 9607 so that the conducting one of the highway amplifiers corresponding to 9111 is rendered non-conductive. Ground potential at the output of amplifier 10709 is also coupled through gates 10605 and 10606 to render amplifiers 10106 and 10104, respectively, conductive.

When the read out control flip-flip 10907 is set responsive to the receipt of the third negative pulse on conductor CDR after flip-flip 11008 is set, amplifier 10301 becomes conductive and the pulse in time position 30 is amplified by amplifier 10302 and applied to conductor TSP–I. When the read out control flip-flip 10907 is set and amplifier 10908 is therefore non-conductive, negative potential is applied to the C terminals of gates 10201–10204 and, since amplifiers 10106 and 10104 are conductive, amplifiers 10208 and 10206 are rendered conductive to apply ground potential to conductors THI–1 and THI–4 to thereby identify highway 5. Thus, the identity of the 60 I.P.M. busy tone coupling unit, which as shown in the chart of Fig. 36 is assigned channel 30 on highway 5, is read out to the terminating highway and time slot busbars. The identification information is read in by the position register or the allotted link circuit, digit marking is removed from the conductors of cable DM1, and the route selector is reset in the manner previously described.

Next assume that a calling register applies negative potential to conductors 1VF and 1WF of cable DM1 and to conductors 2VF and 2YF of cable DM2, thus identifying the group of units terminating trunk lines extending to the local office identified by the digits "19." In the exact same manner as described for a long distance trunk call, amplifier 9902 becomes conductive when negative potential is received on any of the conductors 1UF–1YF, delay multivibrator 11002 is triggered to produce an eighty millisecond timing pulse, amplifier 11003 becomes non-conductive, negative pulses in time position 32 are passed by gate 11004, and the positive-going pulses in time position 32 appearing at the output of amplifier 11007 are coupled to the time position counter control flip-flop 9101 to initiate the steping of the time position selecting counters. Also when negative potential is received on conductors 1VF and 1WF, all inputs to gate 10006 are negative, and the digit "1" amplifier 10005 is rendered conductive. When amplifier 10005 is conductive, ground potential is applied to the D terminals of the long distance trunk gates 9004–9009 to block those gates. Also when amplifier 10005 is conductive, ground potential is coupled through gate 8914 to terminal B of gate 8915 and, since terminal C of that gate is also returned to ground potential, amplifier 8916 is rendered non-conductive to apply negative potential to the D terminals of the local gates 8904–8908 and thus enable those gates for operation. The negative potential applied to conductors 2VF and 2YF of the second digit marking cable DM2 renders the digit "9" amplifier 9801 conductive to apply ground potential to terminal C of the ninth local group gated pulse amplifier 9802 so that that amplifier is enabled for operation. Also when amplifier 9801 becomes conductive, amplifier 9903 is rendered conductive to apply negative potential to terminal B of gate 9904 but without effect at this time. Also when negative potential is received on any of the second digit marking conductors 2UF–2YF, amplifier 9701 becomes conductive to apply ground potential to the D terminals of gates 10402 and 10406 to block those gates and ground potential is applied to terminal B of amplifier 10505 to render that amplifier non-conductive. When amplifier 10505 becomes non-conductive, negative potential is applied to terminal C of local trunk group busy gate 10602 to enable that gate for operation.

The local trunk finding operation proceeds in the same manner as described for the long distance trunk finding operation. That is, control flip-flop 9101 is triggered by each time position 32 pulse coupled thereto and the first time position counter, comprising flip-flips 8901–8903, and the second time position counter, comprising flip-flips 9001–9003 and 9104, are alternately stepped each time that flip-flop 9101 is either set or reset. During each cycle of operation of the time position counters, a negative signal of one pulse frame duration is coupled through each of the local gates 8904–8908, one at a time and in turn, to control the gating of the time position pulse corresponding to that gate to the B terminals of the cross-point gates corresponding to that gate in the time position and highway matrix of Fig. 93. For example, whenever the time position counters are in the setting in which flip-flip 8901 is set and amplifier 9102 is non-conductive, a negative signal is coupled through gate 8904 to render amplifier 8910 conductive and thus enable gated pulse amplifier 8911 to couple the time position 1 pulse appearing at the output of emitter follower 8912 to the B terminal of the six cross-point gates corresponding to gates 9302 and 9303. As previously described, only the one of the highway amplifiers 9501–9506 corresponding to the highway being scanned is non-conductive so that only one of the cross-point gates corresponding to 9302 and 9303 is enabled to pass the negative pulse in time position 1 if there is not a positive-going busy pulse appearing in that time position at the output of the busy pulse amplifier corresponding to amplifier 9301. It will be recalled that the A terminal of each of the cross-point coupling diodes corresponding to 9304 in the local trunk matrix terminates at an individual terminal on the local trunk IDF of Fig. 98 and the terminals corresponding to the individual units of a group of local trunk line terminating units are all strapped to the terminal corresponding to that group at the local trunk IDF. Thus it can be seen that a negative pulse will appear at the terminal corresponding to each idle unit which terminates a local office trunk line as the scanning operation proceeds but a negative pulse will be applied to terminal 19 at the IDF and thus to terminal B of enabled amplifier 9802 only if the time position pulse corresponds to one of the units in the local office trunk group 19.

If an idle unit in the desired group is not found on the highway being scanned, the time position counters return to the setting in which a negative output is obtained from gate 8904, amplifier 8910 becomes conductive, and the highway counter control flip-flop 9206 is triggered through gate 8913 to advance the highway counters and thus enable the cross-point gates corresponding to the next highway, all in the manner described for the long distance trunk finding operation. The time division channels 1–10 on the next highway are then scanned and if an idle unit in group 19 is not found, the time division counters return to the above-described setting after eighteen pulse frames and the highway counter is advanced to enable the cross-point gates corresponding to the next highway. Assume that the first idle unit in local office trunk group 19 is assigned time position 10 on highway 6 so that when channel 10 on highway 6 is scanned, a negative pulse is passed by cross-point gate 9305 and cross-point coupling diode 9306 and is thus applied to terminal 19 at the IDF and to the B terminal of amplifier 9802. Thus, a negative pulse in time position 10 appears at the output of amplifier 9802 and is coupled through gate 10101 to conductor TSP, which extends to the control connector associated with the route selector. The pulse applied to conductor TSP is also amplified and inverted by amplifier 10102 and, as previously described, is utilized to trigger flip-flip 11005 to its set condition and thus terminate the stepping operation of the counters. Ground potential appearing at the output of the conducting sixth highway amplifier 9508 is applied to conductor HI–6, which also extends to the control connector.

In the exact same manner as described for a long distance call, a secondary busy test is made on time division channel 10 on highway 6 and if the selected unit is not initiating or terminating a call at this time, flip-flip 11008 is triggered to its set condition by the trailing edge of the eighty millisecond negative pulse at terminal A of multivibrator 11002. When read out control flip-flip 10907 is set, a negative signal is applied to either conductor WRO or RTD, as previously explained, the time position 10 pulse coupled through gates 10303 and 10304 is amplified by amplifier 10302 and applied to conductor TSP–I, and amplifiers 10205 and 10206 are rendered conductive to apply ground potential to the terminating highway identification conductors THI–2 and THI–4. When the time position and highway identification of the selected unit is read in by the calling direct dialing or position register or by the allotted link circuit, digit marking is removed from the conductors of cables DM1 and DM2 and the route selector is reset in the same manner as previously described.

If all units in the desired group of local office trunk line terminating units are busy, the trunk finding operation continues until flip-flip 9201 of the upper highway counter has twice been triggered to its set condition and flip-flip 9110 is triggered to its set condition, as described for a long distance call. When all trunks busy flip-flip 9110 is set, terminal B of gate 10602 goes negative and local trunk busy amplifier 10601 becomes conductive to render time position 30 blocking amplifier 10305 non-conductive. Also when amplifier 10601 becomes conductive, ground potential is coupled through gates 10604 and 10606 to render amplifiers 10103 and 10104 non-conductive. The negative potential appearing at terminal D of flip-flip 9110 is also applied through gate 10702 to terminal B of gate 10703. The ground potential appearing at terminal E of flip-flip 9110 renders amplifier 10705 non-conductive through gate 10704 and is also coupled through gate 10708 to trigger flip-flip 11008 to its set condition and to reset flip-flop 10801, if that flip-flop was set over conductor DD, as previously explained. When read out control flip-flip 10907 is set, the time position 30 pulse is amplified by amplifier 10302 and applied to conductor TSP–I, amplifiers 10205 and 10206 are rendered conductive to apply ground potential to conductors THI–2 and THI–4 and thus identify highway 6, negative potential is applied through gate 10703 to conductor BY, and the ground clamping through diode 10706 is removed from the A terminal of amplifier 10705. The negative potential now appearing at terminal A of amplifier 10705 is applied to the C terminals of the gates corresponding to 9904 and, since amplifier 9903 is conductive, negative potential is applied through gate 9904 to conductor LCM–19 for the purpose of operating the lost call meter corresponding to local trunk group 19. Thus, it can be seen that when all trunks in a local office trunk group are busy, time position 30 on highway 6, which as shown in the chart of Fig. 36 corresponds to the 120 I.P.M. busy tone coupling unit, is identified over the terminating identification busbars to the position register or the allotted link circuit. When the identification information is read in, digit marking is removed from the conductors of cables DM1 and DM2 and the route selector is reset.

If a seize or release signal is detected on the channel assigned to the selected local trunk terminating unit when secondary busy test is made, the operation is exactly the same as that described for a long distance trunk call. The identification of the 60 I.P.M. tone coupling unit is read out of the route selector and when the position register or the allotted link circuit has read in that information, the route selector is reset.

Next assume that a calling incoming or direct dialing register has registered the digits "00," which identify the operator position in the illustrated long distance switching center, and therefore applies negative potential to conductors 1UF and 1XF of digit marking cable DM1 and to conductors 2UF and 2XF of digit marking cable DM2. When negative potential is received on any of the conductors of cable DM1, amplifier 9902 becomes conductive and flip-flip 11002 is triggered to its operated condition to produce an eighty millisecond pulse, as previously described. When negative potential is received on conductors 1UF and 1XF, zero amplifier 10007 is rendered conductive to render amplifiers 9905 and 9906 non-conductive and conductive, respectively. The negative potential appearing at the output of conducting amplifier 9905 is coupled through gate 8915 to hold amplifier 8916 conductive and thus block the local gates 8904–8908 and is also coupled through gate 10008 to render amplifier 10005 conductive. When amplifier 10005 becomes conductive, ground potential is applied to the D terminals of long distance gates 9004–9009 to effectively block those gates. When amplifier 9906 becomes non-conductive, negative potential is applied to the D terminals of service line gates 9907 and 9908 without effect and is applied to the C terminals of gates 9702, 9703, and 9704. When negative potential is received on conductors 2UF and 2XF, zero amplifier 9803 is rendered conductive to apply ground potential to terminal C of local trunk group pulse amplifier 9804 but without effect since the local and long distance trunk finders are blocked from operation because the first digit is also "0," as described above. When amplifier 9803 becomes conductive, amplifier 9909 is rendered non-conductive and negative potential is applied to the B terminals of gates 9702 and 9705. When negative potential is applied to terminal B of gate 9705, both inputs to gate 9704 are negative and amplifier 9706 becomes conductive. When amplifier 9706 becomes conductive, ground potential is applied to terminal E of flip-flip 11005 and that flip-flip is triggered to its set condition to block gate 11004 and thus prevent the operation of counter control flip-flop 9101. Amplifier 9701, of course, becomes conductive when the digit is marked on the conductors of cable DM2 but has no effect when the call is to be routed to the operator position.

The trailing edge of the eighty millisecond pulse at terminal A of multivibrator 11002 triggers flip-flip 11008 to its set condition and the negative pulses thereafter occurring on conductor CDR trigger flip-flips 10903, 10906, and 10907, in turn, to their set conditions, as previously described. When read out control flip-flip 10907 is set, negative potential is applied to conductor WRO to control the calling register to read out and the allotted link circuit to read in the identification information corresponding to the calling unit. It is to be noted that ground potential is not received over conductor DD from a calling direct dialing register when the call is to the operator position so that the write-read signal is applied to conductor WRO regardless of the type of calling register. Also, when read out control flip-flip 10907 is set, amplifier 10908 becomes non-conductive and negative potential is applied to the D terminals of gates 9702 and 9703. Since all inputs to gate 9702 are now negative, a negative signal is coupled through gates 9702 and 9707 to conductor AM for the purpose of identifying the call to the allotted link circuit as a call to the operator position. When the identification information is read in by the allotted link circuit, digit marking is removed from the conductors of cables DM1 and DM2 and the route selector is reset.

It will be recalled from the description of control A that when a call handled by a direct dialing register is timed out, the call is automatically routed to the operator position. When a call is timed out, the direct dialing register transmits a connect demand to the register finder and when a demand answer is received, the direct dialing register functions to apply ground potential to write-direct conductor WD. When conductor WD goes from negative to ground potential, flip-flip 11008 in the route selector is triggered to its set condition and the third negative pulse thereafter appearing on conductor CDR triggers read out control flip-flip 10907 to its set condition. When flip-flip 10907 is set, negative potential is applied to conductor WRO to control the calling direct dialing register to read out the identity of the calling unit and to apply ground potential to conductor DAM, which extends to the route selector. When ground is received over conductor DAM by the route selector, amplifier 9708 becomes conductive and negative potential is coupled through gate 9707 to conductor AM which, as previously described, identifies the call to the allotted link circuit as a call to the operator position.

The next type of call to be described is a call to a service line in the illustrated long distance switching center. Assume that the digits "01" are marked by a calling incoming, direct dialing, or position register by the application of negative potential to conductors 1UF and 1XF of cable DM1 and to conductors 2VF and 2WF of cable DM2. In the same manner as described for an operator position call, the first digit "0" results in the blocking of both the local and long distance gates of the trunk finder, the application of negative potential to the D terminals of gates 9907 and 9908, and the application of negative potential to the C terminals of gates 9702, 9703, and 9704. Also when the digit "0" amplifier 10007 becomes conductive, ground potential is applied to terminal C of amplifier 9911 to enable that amplifier to thereafter amplify the pulses in time position 11 appearing at the output of emitter follower 9912. The pulses in time position 11, amplified by amplifier 9911, are coupled through gate 10101 to conductor TSP and are applied to terminal B of gate 10108. The ground potential appearing at terminal A of amplifier 10007 is also applied to the E terminals of the highway gates corresponding to 9204 and 9607 so as to assure that all of the highway amplifiers corresponding to 9103, 9507, and 9508 are non-conductive. When negative potential is received on conductors 2VF and 2WF, the digit "1" amplifier 9805 becomes conductive to apply ground potential to terminal C of the local trunk group 11 amplifier 9806 but without effect since the first digit "0" effectively blocks the local and long distance trunk finders, as described above. Also when amplifier 9805 becomes conductive, amplifier 9910 becomes conductive and a negative signal is coupled through gate 9913 to the B terminal of gate 9703 and to the C terminal of gate 9705. When a negative signal is applied to terminal C of gate 9705, both inputs to gate 9704 are negative and amplifier 9706 is rendered conductive to set flip-flip 11005 and thus block gate 11004 so as to prevent the operation of counter control flip-flop 9101, as previously described. Also when amplifier 9910 becomes conductive, all inputs to gate 9907 are negative and amplifier 10107 is rendered conductive. When amplifier 10107 becomes conductive, ground potential is applied to conductor HI-1 to identify highway 1 to the route selector control connector and amplifiers 10105 and 10106 are rendered conductive but without effect at this time. Also when amplifier 10107 becomes conductive, ground potential is applied to the C terminal of gate 9509 and amplifier 9501 is thus rendered non-conductive.

It can be seen that with amplifier 9501 non-conductive, amplifier 10109 is held conductive by negative potential at terminal A of amplifier 9501 through gate 9510 and diode 9511 except when a positive-going pulse appears at the output of busy test pulse amplifier 9301. Thus, amplifier 10109 is rendered non-conductive during the time position of each busy channel on highway 1 and serves to apply a negative pulse in each of those time positions to terminal C of gate 10108. Since negative pulses in time position 11 are applied to terminal B of gate 10108, a negative output will be realized from said gate and amplifier 10110 will be rendered conductive only if time position channel 11 on highway 1 is busy. Assuming that time position channel 11 on highway 1 is idle, amplifier 10110 remains non-conductive and the secondary busy test is made on that channel since the route selector control connector is controlled over conductors TSP and HI-1 to connect to that channel in the same manner as previously described.

If a call is not being initiated or terminated on time position channel 11 on highway 1, the output from multi-frequency signal detector 10701 remains negative and the trailing edge of the eighty millisecond pulse produced by multivibrator 11002 triggers flip-flip 11008 to its set condition. When read out control flip-flip 10907 is set, a negative signal is applied to conductor WRO if the calling register is a direct dialing or incoming register or is applied to conductor RTD if the calling register is the position register. It is to be noted that a calling direct dialing register does not transmit a signal over conductor DD when the call is to a service line so that the identity of said line will be read into an allotted link circuit. It will be recalled that the position register is responsive to the receipt of a signal on conductor RTD when the call is to a service line to immediately apply a signal to conductor KWR so that the link circuit answered by the operator will read in the identification of the service line. When read out control flip-flip 10907 is set, amplifier 10301 is rendered conductive and the time position 11 pulse coupled through gate 10307 is amplified by amplifier 10302 and applied to conductor TSP-I. Also when flip-flip 10907 is set, amplifier 10908 is rendered conductive and negative potential is applied to the C terminals of gates 10201–10204. Since amplifiers 10105 and 10106 are conductive, amplifiers 10207 and 10208 are rendered conductive to apply ground potential to conductors THI-0 and THI-1. Thus, time position 11 on highway 1, which as shown in the chart of Fig. 36 corresponds to service line 01, is identified to the terminating slot pulse and highway identification busbars. The negative potential appearing at the output of non-conducting amplifier 10908 is also applied to the D terminals of gates 9702 and 9703 and, since all inputs to gate 9703 are negative, a negative signal is applied to conductor SL to identify the call to the link circuit as a call to a service line.

As previously explained, if time position channel 11 on highway 1 is marked as busy on conductor BT1, a negative pulse in time position 11 is coupled through gate 10108 and amplifier 10110 is rendered conductive. When amplifier 10110 becomes conductive, ground potential is applied to terminal E of flip-flip 10707 and that flip-flip is triggered to its set condition. It is to be noted that if a seize or release signal is detected by multi-frequency signal detector 10701 on the secondary busy test of the channel, flip-flip 10707 is also triggered to its set condition. When flip-flip 10707 is set, flip-flip 11008 is immediately set through gate 10708 and amplifier 10709 is rendered conductive. When amplifier 10709 becomes conductive, time position 30 clamping amplifier 10305 is rendered non-conductive and ground potential is coupled through gates 10605 and 10606, as previously described. Ground potential appearing at the output of amplifier 10709 is also applied to the C terminals of gates 9907 and 9908, and through diode 9914 to terminal A of emitter follower 9912. When ground potential is applied to terminal C of gate 9907, amplifier 10107 becomes non-conductive so that ground potential is removed from conductor HI-1, amplifier 10105 becomes non-conductive, but amplifier 10106 remains conductive and amplifier 10104 becomes conductive because of the ground potential coupled through gates 10605 and 10606, as described above, and amplifier 9501 becomes conductive to block gate 9510. The ground potential coupled through diode 9914 to terminal A of emitter follower 9912 of course clamps the output of pulse amplifier 9911 to ground so that pulses in time position 11 are no longer applied to conductor TSP or to terminal B of busy test gate 10108. Now, when the read out control flip-flip 10907 is set, time position pulse 30 is applied to conductor TSP-I and ground potential is applied to conductors THI-1 and THI-4. Thus, time position 30 on highway 5, which is assigned to the 60 I.P.M. tone coupling unit, is transmitted over the terminating slot pulse and highway busbars by the route selector. It is to be noted that negative potential is applied to conductor BY from terminal D of flip-flip 10707 through gates 10702 and 10703 when read out is effected to indicate a busy condition to the allotted link circuit, as previously described.

Up to this point in the description it has been assumed that digit marking is forwarded over the digit marking conductors to initiate the operation of the route selector. It will be recalled that when the call is from a direct dialing or position register, the identity of the unit selected by the route selector in accordance with said digit marking is read back into the direct dialing or position register so that when the call is completed by either one of said registers, it becomes necessary to transfer the identification information to either an allotted link circuit, in the case of a direct dialing register, or to the link circuit answered by the operator in the case of the position register.

It will be recalled that when a call through a direct dialing register has been extended to its final destination or when a busy condition is encountered in the extended connection, an end of call signal is transmitted back over the extended connection to the direct dialing register and the direct dialing register functions to apply ground potential to write-direct conductor WD when the register is found by the register finder. When ground potential is received over conductor WD by the illustrated circuit, flip-flip 11008 is triggered to its set condition and the third negative pulse thereafter occurring on conductor CDR triggers read out control flip-flip 10907 to its set condtion. When flip-flip 10907 is set, negative potential is applied to conductor WRO and the calling direct dialing register is thereby controlled to read out time position and highway identification of both the calling and called units to the alloted ling circuit. It is to be noted that the ground potential on conductor WD is also coupled through gate 11001 to hold amplifier 11003 non-conductive and that when ground potential is removed from conductor WD, amplifier 11003 again becomes conductive to reset the set flip-flips in the route selector.

It will be recalled that when a call through the position register has been extended to its final destination or when a busy condition is encountered in the extended connection, an end of call signal is transmitted back over the extended connection to the position register and the position register functions to apply negative potential to conductor PA when the position register is found by the register finder. The only function of the route selector responsive to the receipt of negative potential on conductor PA is to apply ground potential to allotter inhibit conductor AI when amplifier 11010 becomes conductive. The position register then functions to read out the time position and highway identification of the called unit to the link circuit which originated the call and which was answered by the operator.

It will be recalled that alarm control delay multivibrator 10901 is triggered to its operated condition to produce a two hundred millisecond negative pulse at its terminal A whenever a call is initiated by the transmittal of digit marking information over the conductors of cable DM1. Under normal operating conditions, the route selector will have completed its operation well within two hundred milliseconds and when amplifier 11003 becomes conductive and ground potential is applied to the master reset conductor, multivibrator 10901 is reset through gate 10909 and the output of normally conducting amplifier 10911 is held at ground potential through gate 10910. If the route selector has not completed its operation within two hundred milliseconds, the trailing edge of the pulse of terminal A of multivibrator 10901 triggers amplifier 10911 non-conductive for a period of fifty microseconds and a negative pulse is applied to terminal B of gate 10916 and to terminal C of gate 10912. If the call being handled is a call for either a long distance or local trunk, as signified by the fact that amplifier 9706 is non-conductive and negative potential is therefore applied to terminal C of gate 10916, a negative signal appears at the output of gate 10916 if highway identification is not being applied to conductors TH–1—THI–0. If a highway is being marked, ground from the output of OR gate 10209 is applied to terminal A of gate 10916 and prevents that gate from passing a negative signal. Similarly, if amplifier 10301 is not conductive to enable amplifier 10302 to apply a time position pulse to conductor TSP–I, a negative signal appears at the output of gate 10912. A negative signal appearing at the output of either gate 10916 or gate 10912 serves to render amplifier 10807 conductive through gate 10806 to trigger alarm flip-flip 10808 to its set condition.

Alarm flip-flip 10808 can also be triggered to its set condition if any one of the flip-flips 11008, 10903, 10906, and 10907 should fail to reset within one hundred microseconds following the application of ground potential to the master reset conductor when amplifier 11003 becomes conductive. It can be seen that when amplifier 11003 becomes conductive, ground is coupled through gate 10913 to trigger amplifier 10914 non-cnductive for one hundred microseconds and the trailing edge of the resulting negative pulse at terminal A of amplifier 10914 triggers amplifier 10915 non-conductive for one hundred microseconds. The negative pulse appearing at terminal A of amplifier 10915 is applied to terminal C of gate 10809 and if a negative signal is coupled through gate 10810 at this time, indicating that one or more of the above-identified flip-flips is in its set condition, a negative pulse is coupled through gates 10809 and 10806, amplifier 10807 is rendered conductive, and alarm flip-flip 10808 is triggered to its set condition.

When alarm flip-flip 10808 is set, ground potential is applied to conductor ALM, which extends to any well known alarm indicating device. Flip-flip 10808 can be triggered to its reset condition only by the application of ground potential to the manual reset conductor of Fig. 110 by the operation of a key or any other well known device. The ground potential applied to conductor manual reset is also coupled through diode 11011 to terminal A of amplifier 11003 and thus to the master reset conductor to reset the various set flip-flips having their A terminals connected thereto. Ground potential on conductor manual reset is also transmitted to the highway and time division counters and serves to reset those counters to the condition wherein flip-flips 9201, 9601, 8901, and 9001 are set. The ground potential transmitted to the highway and time division counters also serves to trigger highway counter control flip-flop 9205 and time division counter control flip-flop 9101 to their reset conditions.

*Link allotter.*—The link allotter, shown in Figs. 111–113, inclusive, is provided in the system for the purpose of controlling the assignment of calls to the link circuits of the system in turn. Assignment of the link circuits is controlled by the link allotter over X marking and Y marking conductors with each link circuit of the system being connected to a unique combination of one X marking conductor and one Y marking conductor. As shown in Fig. 113, the link allotter comprises an X marking counting chain comprising stages XS1–XSN and a Y marking counting chain comprising stages YS1–YSN. The number of stages provided in each counting chain, of course, depends upon the number of link circuits provided in the system. For example, if twenty-five link circuits are provided in the system, five X counting stages and five Y counting stages are provided in the link allotter. The link allotter is of the preallotting type. That is, when an allotted link circuit has read in line terminating unit identification information, conductor LF, which is shown in Fig. 111 and which is common to all of the link circuits of the system, goes negative and the link allotter is thereby controlled to search for an idle link circuit to handle the next call. When an idle link circuit is found, conductor LF returns to ground potential and the searching operation of the link allotter is terminated as will be described more fully hereinafter.

To illustrate the finding operation of the link allotter, assume that conductor LF stands at negative potential so that amplifier 11101 is conductive, amplifier 11102 is non-conductive, and amplifier 11201 is non-conductive. Also assume that the X and Y counting chains have just advanced to the setting in which flip-flip 11301 in stage YS1 and the flip-flip corresponding to 11301 in stage XS1 are in their set condition. With the flip-flips in stages YS1 and XS1 set, amplifier 11302 in stage YS1 and the amplifier corresponding to 11302 in stage XS1 are non-conductive and negative potential is therefore applied to conductors YML1 and XML1, respectively. If the link circuit identified by conductors XML1 and YML1 is busy, conductor LF remains negative so that amplifier 11201 remains non-conductive and the next occurring negative pulse on conductor CDR is coupled through gate 11202 to render amplifier 11203 conductive. When amplifier 11203 becomes conductive, delay multivibrator 11303 is triggered to its operated condition and a thirty millisecond negative-to-ground pulse is applied to the C terminal of each of the gates corresponding to 11304 in the Y counting chain. Since it was assumed that flip-flip 11301 in stage YS1 was in its set condition, only gate 11304 is enabled to pass a negative-to-ground pulse at this time. Therefore, the negative-to-ground pulse applied to terminal C of gate 11304 serves to trigger flip-flip 11301 in stage YS1 to its reset condition and to trigger the flip-flip corresponding to 11301 in stage YS2 to its set condition. Thus, conductors XML1 and YML2 are marked with negative potential and the link circuit corresponding to said marking is tested to determine if it is idle or busy. If the marked link circuit is busy, conductor LF remains at negative potential and the next occurring negative pulse on conductor CDR serves to advance the Y counter in the same manner as just described. When the Y counter has advanced through one cycle of operation, flip-flip 11301 in stage YS1 is again triggered to its set condition and when terminal E of flip-flip 11301 in stage YS1 goes to ground, delay multivibrator 11305 is triggered to its operated condition to advance the X counting chain. Thus it can be seen that the conductors YML1–YMLN are marked with negative potential in turn while negative potential is applied to conductor XML1 and are again marked in turn while conductor XML2 is held at negative potential. If all link circuits are busy, the Y and X counters are, of course, continuously stepped. It is to be noted that as long as negative potential remains on conductor LF, amplifier 11102 remains non-conductive and negative potential is applied to conductor ALB as an all trunks busy indication to the incoming and direct dialing register allotters so that newly initiated incoming calls are not handled while an all trunks busy condition exists in the illustrated long distance switching center.

When an idle link circuit receives negative potential over its corresponding X and Y marking conductors, it serves to apply ground potential to conductor LF and amplifiers 11101 and 11102 in the link allotter are thereby rendered non-conductive and conductive, respectively. When amplifier 11101 becomes non-conductive, amplifier 11201 becomes conductive to block gate 11202 so that amplifier 11203 remains non-conductive and further stepping of the counting chains is prevented. When amplifier 11102 becomes conductive, ground potential is, of course, applied to conductor ALB. Thus, it can be seen that an idle link circuit is preallotted for use and the link allotter continues to mark that link circuit until that link circuit is used to establish a call.

It will be recalled that negative potential is applied to conductor WRO by the route selector when the allotted link circuit is to read in line terminating unit identification information. It will also be recalled that negative potential is applied to conductor WRO coincident with the leading edge of the negative-going waveform on conductor CDR, as explained in the description of the route selector.

When negative potential is received on conductor WRO, amplifier 11103 becomes conductive and a negative-to-ground pulse is coupled through gate 11104 to trigger flip-flop 11105 to its set condition. Since conductor CDR stands at negative potential at this time, and since amplifier 11101 is non-conductive, all inputs to gate 11106 are negative when flip-flop 11105 is set and amplifiers 11107 and 11108 are rendered conductive and non-conductive, respectively. When the potential on conductor CDR returns to ground, eighty microseconds after conductor WRO goes negative, amplifiers 11107 and 11108 are rendered non-conductive and conductive, respectively, and flip-flop 11110 is triggered to its set condition through gate 11109. If the allotted link circuit is functioning properly, identification information is read in by that link circuit when conductor CDR returns to ground potential. When identification information is read in by the allotted link circuit, conductor LF goes negative, amplifier 11101 becomes conductive, and amplifier 11102 becomes non-conductive to apply negative potential to conductor ALB. The output of gate 11204 now goes negative since the negative potential appearing at terminal C of set flip-flop 11110 is applied to its B terminal, the negative potential on conductor WRO is applied to its C terminal, and the negative potential appearing on conductor ALB is applied to its D terminal. The negative potential appearing at the output of gate 11204 is coupled through gate 11205 and amplifiers 11206 and 11207 are rendered conductive and non-conductive, respectively, to apply negative potential to conductor LM. As explained in the description of the register finder, negative potential on conductor LM serves to initiate the release of the register finder, the calling register, and the route selector. When the route selector is released, conductor WRO returns to ground potential, amplifier 11103 becomes non-conductive, and gate 11204 is blocked so that ground potential is reapplied to conductor LM.

When the potential of conductor CDR goes negative, approximately eighty microseconds after the line terminating unit identification information is read in by the allotted link circuit, amplifier 11203 is rendered conductive through gate 11202 to step the Y counter since amplifier 11201 is non-conductive. If it is assumed that the next marked link circuit is idle, amplifier 11101 becomes non-conductive, amplifier 11102 becomes conductive, and conductor ALB goes to ground, amplifier 11201 becomes conductive, and amplifier 11203 becomes non-conductive so that further stepping of the counter is prevented, as previously described. Also when amplifier 11201 becomes conductive, flip-flop 11105 is reset through gate 11111. When flip-flop 11105 is reset, the ground potential appearing at its terminal C is applied to terminal G of each of the flip-flops 11110, 11208–11210 so that any set ones of said flip-flops are triggered to their reset condition. If it is assumed that the link marked by the link allotter following the read in of identification information by the previously allotted link circuit is busy, conductor LF remains at negative potential. Under these conditions, the negative CDR pulse which advances the counter to the setting corresponding to that link circuit is also coupled through gate 11106 to render amplifiers 11107 and 11108 conductive and non-conductive, respectively. When amplifier 11107 becomes conductive, flip-flop 11210 is triggered to its set condition through gate 11211 but without effect at this time. Now, when conductor CDR returns to ground potential, amplifier 11108 becomes conductive to trigger flip-flop 11110 to its reset condition through gate 11112, and, simultaneously therewith, a ground pulse is coupled through gate 11111 to trigger flip-flop 11105 to its reset condition. As previously described, when flip-flop 11105 is reset, any set ones of the remaining flip-flops are triggered to their reset condition. Thus, the link allotter is reset to its initially described condition and each negative pulse thereafter occurring on conductor CDR serves to drive the Y counter until an idle link circuit is found.

In the above description it was assumed that the allotted link circuit correctly functioned to read in line terminating unit identification information and that conductor LF therefore went negative approximately eighty microseconds after a negative signal appeared on conductor WRO. Next assume that the allotted link circuit fails to read in the identification information so that conductor LF remains at ground potential and amplifier 11201 is held conductive to prevent the stepping of the counters. It will be recalled that flip-flop 11105 is triggered to its set condition when negative potential is received on conductor WRO and that flip-flop 11110 is triggered to its set condition when conductor CDR returns to ground potential eighty microseconds later. It is to be noted that negative potential is not applied to conductor LM to initiate the release of the register finder, the calling register, and the route selector since gate 11204 is blocked by the ground potential appearing at the output of conducting amplifier 11102. The next occurring negative pulse on conductor CDR renders amplifier 11107 conductive to trigger flip-flop 11210 to its set condition through gate 11211 but without effect at this time. When conductor CDR returns to ground, amplifiers 11107 and 11108 are rendered non-conductive and conductive, respectively, and flip-flop 11110 is triggered to its reset condition through gate 11112. When flip-flop 11110 is reset and its terminal C goes to ground potential, flip-flop 11208 is set through gate 11212. The next occurring negative pulse on conductor CDR renders amplifier 11107 conductive and flip-flop 11210 is reset through gate 11213. A negative signal now appears at the output of gate 11214 since flip-flop 11210 is reset, flip-flop 11209 is reset, flip-flop 11208 is set, and flip-flop 11110 is reset. The negative signal appearing at the output of gate 11214 is coupled through gate 11215 to render amplifier 11216 conductive and the resulting ground potential appearing at terminal A of amplifier 11216 is coupled through gate 11217 to render amplifier 11201 non-conductive. Since conductor CDR is negative at this time, amplifier 11203 becomes conductive and the counter is advanced to mark the next link circuit. When conductor CDR returns to ground potential, amplifier 11108 again becomes conductive and flip-flop 11110 is triggered to its set condition through gate 11109.

When the identification information is read in by the allotted link circuit, conductor LF goes negative, conductor ALB goes negative, amplifier 11206 becomes conductive through gate 11204, and amplifier 11207 becomes non-conductive to apply negative potential to conductor LM. Thus, it can be seen that when a link circuit fails to read in, the counter is stepped to mark the next idle link circuit and if that link circuit reads in, negative potential is applied to conductor LM to initiate the release of the register finder, the calling register, and the route selector.

Next assume that two link circuits in succession fail to read in identification information, thus indicating that the calling register is failing to read out identification information. It wll be recalled that when the first link circuit fails to read in, the link allotter is in the condition in which flip-flop 11208 is set and when the potential of conductor CDR goes negative, amplifier 11107 becomes conductive, flip-flop 11210 is reset, amplifier 11216 becomes conductive, amplifier 11201 becomes non-conductive, and amplifier 11203 becomes conductive to advance the counters to mark the next link circuit. It is to be noted that when the counter advances, conductor LF goes negative for a brief interval of time and then returns to ground if the marked link circuit is idle. When conductor LF returns to ground potential, amplifier 11101 becomes non-conductive, amplifier 11107 becomes conductive, and flip-flop 11210 is reset. When conductor CDR returns to ground potential, amplifiers 11107 and 11108 become non-conductive and conductive, respectively, and flip-flop 11110 is triggered to its set condition. The next occurring negative pulse on conductor CDR renders amplifier 11107 conductive and flip-flop 11210 is again triggered to its set condition. When flip-flop 11210 is set, all inputs to gate 11219 are negative since flip-flop 11209 is reset, flip-flop 11208 is set, flip-flop 11110 is set, and conductor WRO is negative. When the output of gate 11215 goes negative, amplifiers 11206 and 11207 become conductive and non-conductive, respectively, to apply negative potential to conductor LM. When the route selector is released, conductor WRO returns to ground potential, amplifier 11103 becomes non-conductive, gate 11215 is blocked, and ground potential is reapplied to conductor LM. When conductor CDR returns to ground potential, amplifiers 11107 and 11108 become non-conductive and conductive, respectively, and flip-flop 11110 is triggered to its reset condition through gate 11112. When flip-flop 11110 is reset, flip-flop 11208 is reset through gate 11221 and when flip-flop 11208 is reset, flip-flop 11209 is set through gate 11218. Now when conductor CDR again goes negative, amplifier 11107 becomes conductive and flip-flop 11210 is reset through gate 11213. All inputs to gate 11220 are now negative since flip-flop 11210 is reset, flip-flop 11209 is set, flip-flop 11208 is reset, and flip-flop 11110 is reset. The negative signal appearing at the output of gate 11220 is coupled through gate 11215 to render amplifier 11216 becomes conductive, amplifier 11201 becomes non-conductive. Since conductor CDR is negative at this time, both inputs to gate 11202 are negative and amplifier 11203 becomes conductive to advance the counter. When conductor CDR returns to ground potential, flip-flop 11105 is reset through gate 11111 and when flip-flop 11105 is reset, flip-flops 11110 and 11209 are reset by the ground potential applied to their G terminals. Thus, it can be seen that when two link circuits in succession fail to read in identification information, the calling register is released and the link allotter preallots the next idle link circuit to handle the next call.

*Link connector.*—A link connector, identical to the one shown in Figs. 114–116, is provided for each link circuit of the system. It will be recalled from the general description that on a call to a local office, another long distance switching center, or a service line, the link circuit stores the highway and time position channel identities of the calling and called line terminating units and the link connector associated with the link is thereafter controlled to establish a talking and signaling connection between those units. On the other hand, if the call is to the operator position, the link circuit initially stores the identity of only the calling unit and the link connector is controlled to connect to the calling unit. Signals received from the calling unit are demodulated in the link connector and coupled to and through the link circuit to the operator position. When the call is further extended under control of the position register, the identity of the selected called unit is read back from the position register to the link circuit and the link connector is then controlled to connect to the called unit. Connection to the highway assigned to the calling line terminating unit is accomplished by the selective operation of one of the highway connecting relays R1–R6 of Fig. 114 while connection to the time division channel assigned to the calling unit is effected by blocking oscillator gates 11401 and 11402. Connection to the highway assigned to the called line terminating unit is accomplished by the selective operation of one of the highway connecting relays R11–R16 of Fig. 116 while connection to the time division channel assigned to the called unit is effected by blocking oscillator gates 11601 and 11602.

The operation of the calling highway connecting relays is controlled over conductors CRM–1 to CRM–6 by the selective application of ground potential to one or more of said conductors and of negative potential to one or more of said conductors in the associated link circuit. For example, if the calling unit is assigned to highway 1, negative potential is applied to conductors CRM–1 and CRM–2 and ground potential is applied to conductor CRM–3 in the link circuit, as fully described in the description of the link circuit. Under these conditions, relay R1 operates to close its make contacts R1–1 and R1–2 since the lower winding terminal of relay R1 is returned to negative potential on conductor CRM–1 while the upper winding terminal of relay R1 is returned to ground potential on conductor CRM–3 through diode 11403. When relay R1 is operated, contacts R1–1 connect send conductor SD1 of highway 1 to terminal A of blocking oscillator gate 11401 and contacts R1–2 connect receive conductor REC1 of highway 1 to terminal A of blocking oscillator gate 11402. The time division channel of the calling unit is marked to the link connector by the application of negative pulses in that time position to conductor CSP–L by the link circuit. Each of the negative pulses appearing on conductor CSP–L serves to operate blocking oscillator gates 11401 and 11402 to close a very low impedance path between their terminals A and B.

Similarly, the operation of the terminating or called highway connecting relays is controlled over conductors TRM–1 to TRM–6 by the selective application of ground potential to one or more of said conductors and of negative potential to one or more of said conductors in the associated link circuit. For example, if the called unit is assigned to highway 6, negative potential is applied to conductor TRM–4 and ground potential is applied to conductors TRM–5 and TRM–6 in the associated link circuit. Under these conditions, relay R16 operates to close its make contacts R16–1 and R16–2 since the lower winding terminal of relay R16 is returned to negative potential on conductor TRM–4 while the upper winding terminal of relay R16 is returned to ground potential on conductor TRM–6 through diode 11604. When relay R16 is operated, contacts R16–1 connect receive conductor REC6 of highway 6 to terminal A of blocking oscillator gate 11601 and contacts R16–2 connect send conductor SD6 of highway 6 to terminal A of blocking oscillator gate 11602. The time division channel of the called unit is marked to the link connector by the application of negative pulses in that time position to conductor TSP–L in the associated link circuit. Each negative pulse appearing on conductor TSP–L serves to operate blocking oscillator gates 11601 and 11602 to close a very low impedance path between their terminals A and B.

It will be recalled from the general description and from the description of the line terminating unit that resonant transfer is utilized for the transmission of information between the line terminating units and the link connectors. That is, the blocking oscillator gates associated with the calling line terminating unit are closed in exact synchronism with blocking oscillator gates 11401 and 11402 of the control connector and the closed time of these gates is made equal to half the natural resonant period of oscillation of the end elements of the corresponding low-pass filters in the line terminating unit and the control connector. During the time position assigned to the calling line terminating unit, gate 11401 and the transmitting gate in the calling unit are closed to transfer energy from the storage capacitor in the transmitting low-pass filter of the calling unit over conductor SD1 and through gate 11401 to the storage capacitor in low-pass filter 11404. Simultaneously therewith, energy is transferred from the storage capacitor in low-pass filter 11405 through gate 11402 over conductor REC1 and through the receiving gate in the calling unit to the storage capacitor in the receive low-pass filter of the calling unit. Similarly, during the time position assigned to the called unit, energy is transferred from the called unit over conductor SD6 and through gate 11602 to the storage capacitor in low-pass filter 11603 and from the storage capacitor in low-pass filter 11501 through gate 11601, over conductor REC6, and through the receive gate in the called unit to the storage capacitor in the receive low-pass filter of the called unit. Thus in the assumed call, it can be seen that signal samples received over conductor SD1 in the time position of the calling unit are demodulated in the link connector and samples of those demodulated signals are transmitted over conductor REC6 in the time position of the called unit while signal samples received over conductor SD6 in the time position of the called unit are demodulated in the link connector and samples of those demodulated signals are transmitted over conductor REC1 in the time position of the calling unit.

Relay SR of Fig. 115 is provided in the link connector for the purpose of splitting the connection between the calling and called units when it is desired to transmit supervisory signals from the link circuit to the calling or called units or whenever the call is answered at the operator position, as will be fully described in the description of the link circuit. It can be seen that whenever negative potential is applied to conductor ZM in the link circuit, amplifiers 11502 and 11503 are rendered conductive and relay SR is operated to transfer its contacts SR–1 and SR–2. With contacts SR–1 in their operated condition, terminal B of low-pass filter 11404 is disconnected from terminal B of low-pass filter 11501 to thus open the talking path between the calling and called units and low-pass filter 11404 is terminated by resistor 11504. With contacts SR–2 in their operated condition, terminal B of low-pass filter 11603 is disconnected from terminal B of low-pass filter 11405 and low-pass filter 11603 is terminated by resistor 11505.

Demodulated audio signals appearing at terminal B of low-pass filter 11404 are coupled over conductor AB to the link circuit through inductance element 11506, which is bridged across the output of filter 11404, and audio amplifier 11507. Similarly, demodulated audio signals appearing at terminal B of filter 11603 are coupled over conductor AC–L to the link circuit through inductance element 11508, which is bridged across the output of filter 11603, and audio amplifier 11509. Audio signals received over conductors AE and AD from the link circuit are coupled through inductance elements 11510 and 11511, respectively, to low-pass filters 11501 and 11405, respectively. Thus, it can be seen that speech or voice frequency supervisory signals received from either the calling or called units can be transmitted to the link circuit and that speech or voice frequency supervisory signals can be transmitted from the link circuit to either the calling or called units. As will be described in the description of the link circuit, a voice frequency release signal received from either the calling or called unit is transmitted over either conductor AB or conductor AC–L, respectively, to the link circuit and the link circuit is responsive to the detection of a release signal to transmit a timed release signal over both conductors AD and AE. At the termination of the transmission of a timed release signal, the link circuit serves to remove highway marking from conductors CRM–1 to CRM–6 and TRM–1 to TRM–6 and time position channel identifying marking from conductors CSP–L and TSP–L to completely release the link connector.

*Link circuit.*—A plurality of link circuits, identical to the one shown in Figs. 117–123, inclusive, of the drawings, is provided in the illustrated system. As previously described, the illustrated system is of the common control type in which only a few registers and a single route selector are provided. The main function of each link circuit is to establish and maintain a connection between the calling and called units involved in a particular call, as denoted by the identification marking received from the common circuits, for the duration of the call between those units. The link circuit comprises a calling time slot storage counter 11801 and the equipment shown in Fig. 119 for storing the time position and highway identity, respectively, of a calling unit and a called time slot storage counter 11802 and the equipment shown in Fig. 120 for storing the time position and highway identity, respectively, of a called unit. As will be described in detail hereinafter, the identification information is retained by the link circuit and the link connector associated with the link circuit is controlled in accordance with the identification information stored in the link circuit to maintain a connection between the corresponding units until one of the parties to the connection hangs up.

Figure 117:
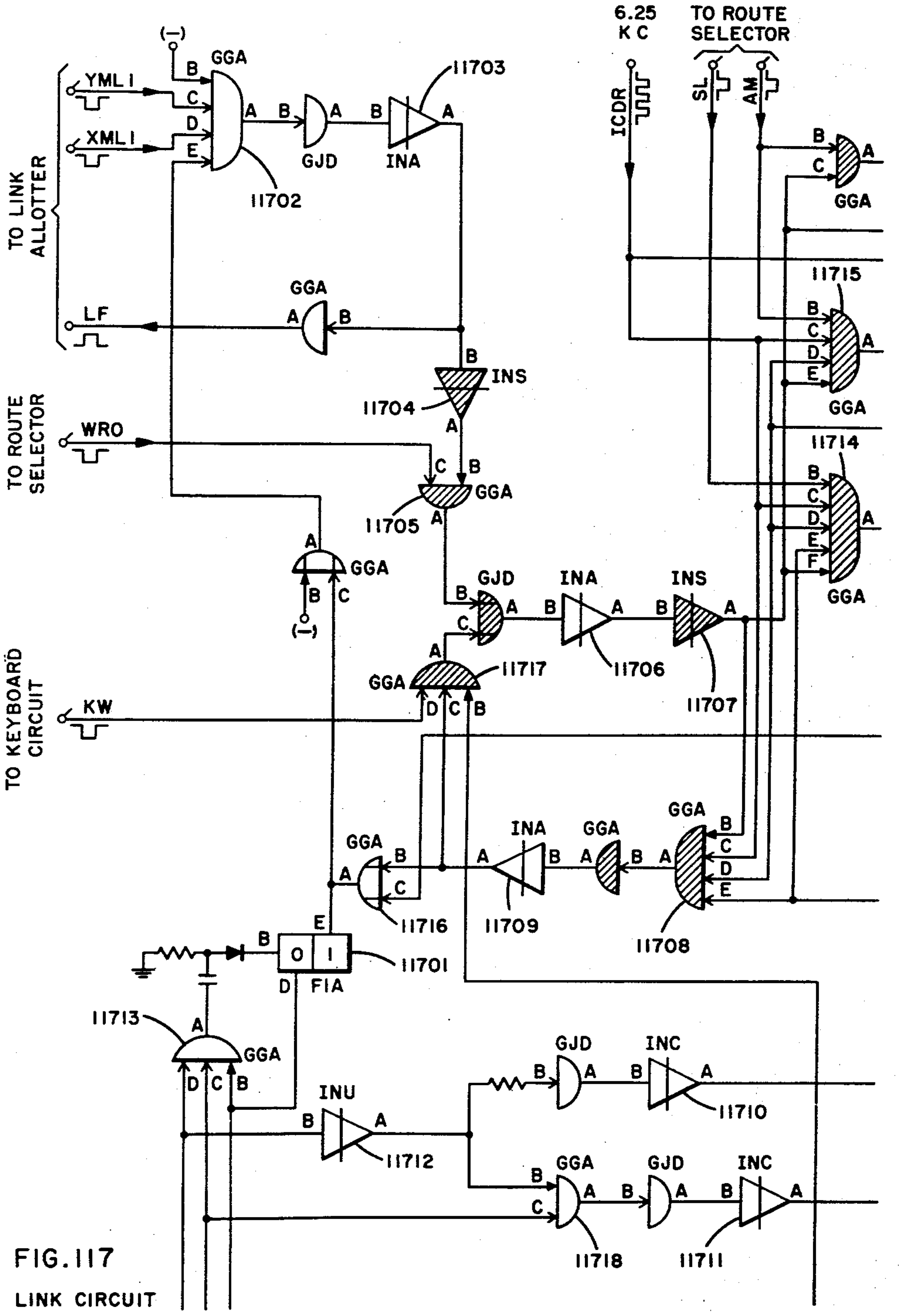
Figure 118:
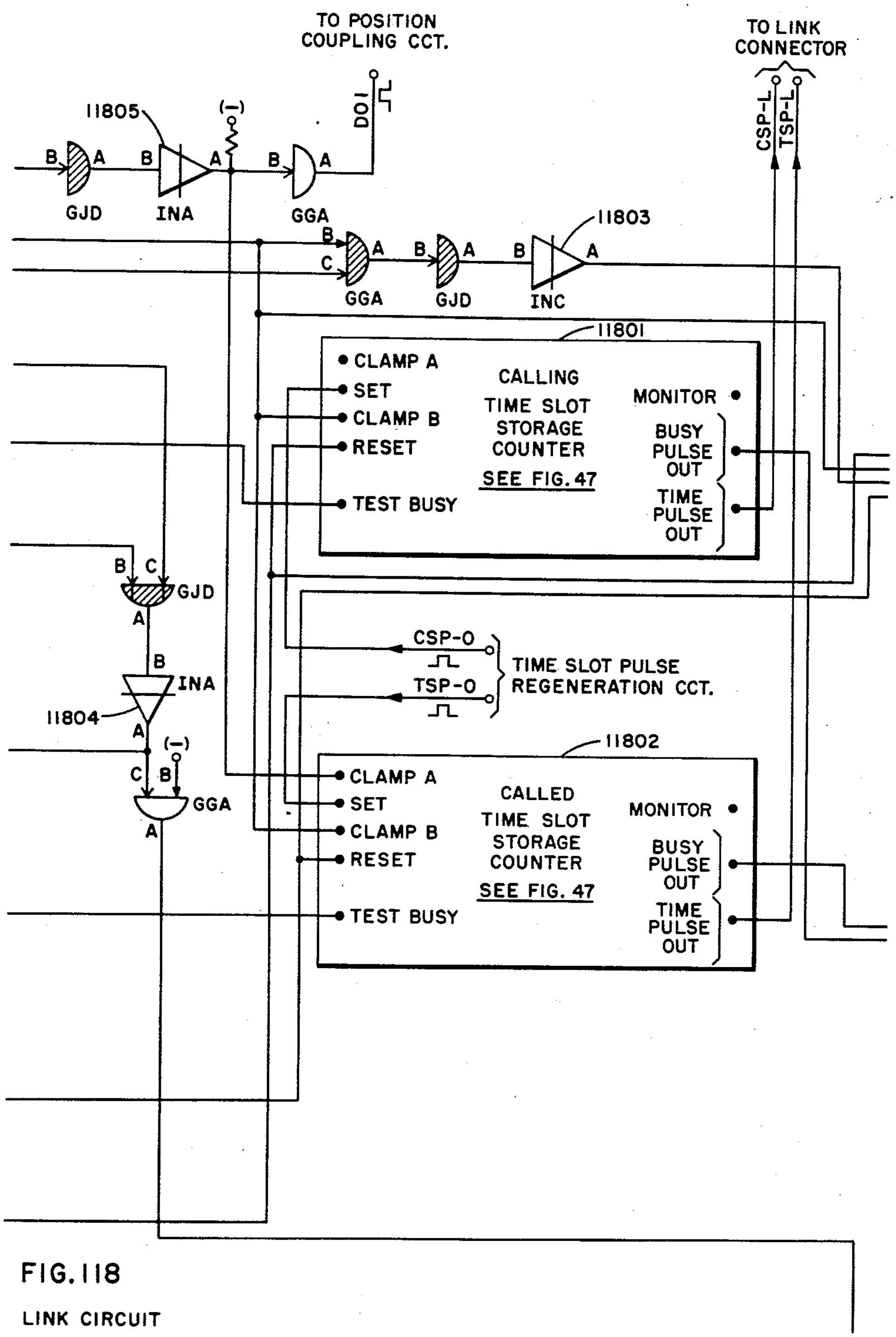

It will be recalled from the description of the link allotter that each link circuit is marked for use by the link allotter by the application of negative potential to the unique combination of one X marking conductor and one Y marking conductor corresponding to that link circuit. As shown in Fig. 117, the illustrated link circuit is identified by the X and Y marking conductors XML1 and YML1, respectively. If the illustrated link circuit is idle at the time that negative potential is simultaneously applied to conductor XML1 and YML1, flip-flop 11701 is in its reset condition, all inputs to gate 11702 are negative, and amplifiers 11703 and 11704 become conductive. When amplifier 11703 becomes conductive, ground potential is applied to conductor LF which, as described in the description of the link allotter, serves to terminate the searching operation of the link allotter. Thus, the illustrated link circuit is allotted for use and remains in the just described condition until a negative signal is received on conductor WRO from the route selector, signifying that the allotted link circuit is to read in identification information corresponding to a calling unit and a called unit. It will be recalled that if the register controlling the route selector is an incoming register, calling unit identification information is read out of the incoming register and called unit identification information is read out of the route selector while if the register controlling the route selector is a direct dialing register, both calling and called unit identification information is read out of the direct dialing register.

Figure 119:
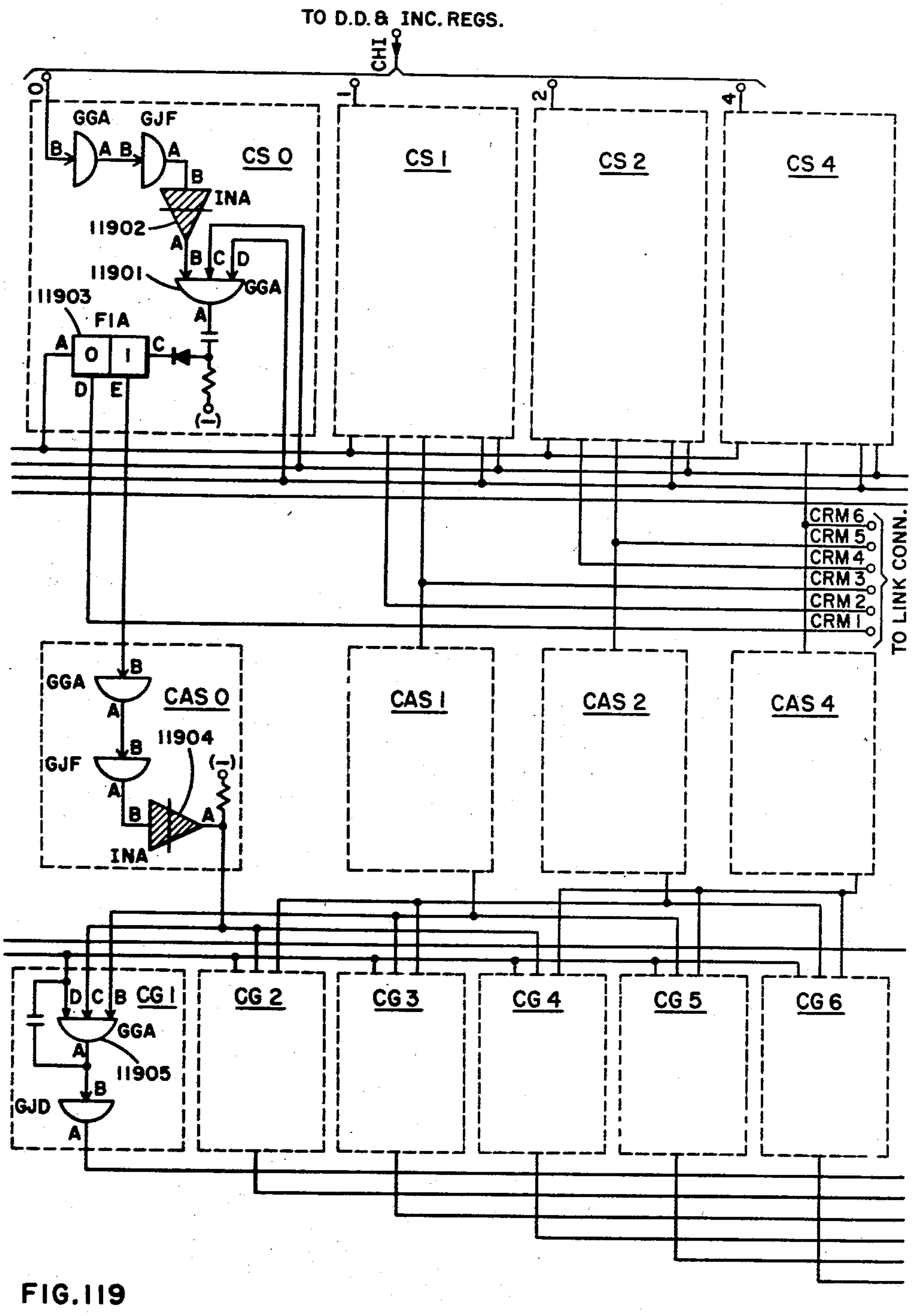
Figure 120:
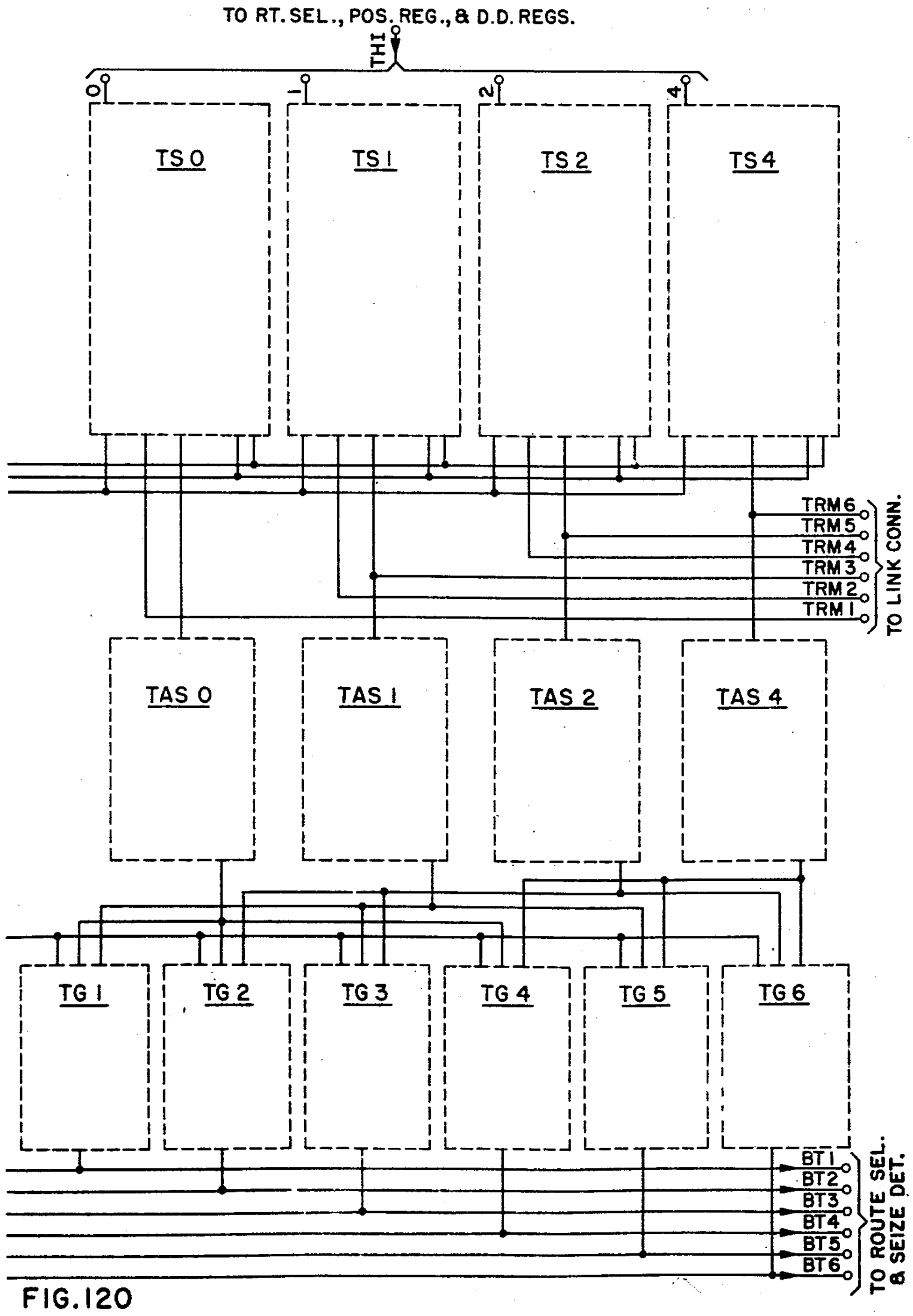

Since the operation of the link circuit differs slightly in accordance with whether the call is to a local or long distance switching center trunk line terminating unit, a service line terminating unit, or the operator position, first assume that the call to be established by the illustrated link circuit is to a line terminating unit which terminates a local office or long distance switching center trunk line. Under these conditions, when negative potential is received on conductor WRO, service line conductor SL and attendant's marking conductor AM remain at ground potential, two of the four calling highway conductors CHI of Fig. 119 are marked with ground potential to identify the highway assigned to the calling unit, a negative-to-ground pulse is received on conductor CSP–0 of Fig. 118 to identify the time position assigned to the calling unit, two of the four called or terminating highway conductors THI of Fig. 120 are marked with ground potential to identify the highway assigned to the called unit, and a negative-to-ground pulse is received on conductor TSP–0 to identify the time position assigned to the called unit.

When negative potential is received on conductor WRO, a negative signal is coupled through gate 11705 since amplifier 11704 is conductive in the allotted link circuit, and amplifiers 11706 and 11707 are rendered conductive. When amplifier 11707 becomes conductive, negative potential is applied to terminal clamp B of calling time slot storage counter 11801 and called time slot storage counter 11802 to enable those counters to read in the time position identity of the calling and called units, respectively. Also when amplifier 11707 becomes conductive, negative potential is applied to terminal C of each of the gates corresponding to 11901 in calling stages CS0–CS4 and in terminating stages TS0–TS4 of the highway storage circuits. Terminal D of each of the gates 11901 is also returned to negative potential at this time since amplifier 11803 is non-conductive. It will be recalled that conductor WRO goes negative coincident with the leading edge of the negative-going waveform on conductor CDR so that conductor ICDR stands at ground potential at this time and amplifier 11803 is therefore held non-conductive. The amplifiers corresponding to 11902 in two of the calling highway storage stages and in two of the terminating highway storage stages are non-conductive at this time and terminal B of the gate corresponding to 11901 in each of those stages is also returned to negative potential. For example, if the calling unit is assigned to highway 1 and the called unit is assigned to highway 6, the amplifier corresponding to 11902 in each of the stages CS0, CS1, TS2, and TS4 is non-conductive and terminal B of gate 11901 in each of those stages is returned to negative so that those gates are enabled to pass a negative-to-ground pulse. When the potential on conductor ICDR goes negative, eighty microseconds after conductor WRO goes negative, amplifier 11803 becomes conductive and ground potential is applied to terminal D of each of the gates corresponding to 11901. Thus, a positive-going pulse is coupled through the enabled ones of said gates and the flip-flop corresponding to 11903 in each of the stages CS0, CS1, TS2, and TS4 is triggered to its set condition. Also when the potential on conductor ICDR goes negative, the output of gate 11708 goes negative and amplifier 11709 becomes conductive if the calling and called time slot storage counters have read in identification information, as indicated by negative potential applied to terminals D and E, respectively, of gate 11708. When amplifier 11709 becomes conductive, flip-flop 11701 is triggered to its set condition and ground potential is thereby applied to terminal E of gate 11702 to render amplifier 11703 non-conductive. When amplifier 11703 becomes non-conductive, negative potential is applied to conductor LF to initiate the release of the register finder, the calling register and the route selector, and the link allotter then preallots the next idle link circuit for use on the next call. Also when amplifier 11703 becomes non-conductive, amplifiers 11704, 11706, 11707, 11709, ond 11803 become non-conductive to close all of the read in gates of the illustrated link circuit.

Returning to the consideration of the highway identification storage circuits, it can be seen that with the flip-flip corresponding to 11903 in each of the stages CS0 and CS1 in its set condition, negative potential is applied to conductors CRM1 and CRM2 and ground potential is applied to conductor CRM3. As explained in the description of the link connector, negative potential on conductor CRM1 in combination with ground potential on conductor CRM3 serves to operate the first highway connecting relay in the link connector and thus effectively connect the calling end of the link connector to highway 1. Similarly, with the flip-flip corresponding to 11903 in each of the stages TS2 and TS4 in its set condition, negative potential is applied to conductor TRM4 and ground potential is applied to conductors TRM5 and TRM6 to operate the sixth highway called or terminating relay in the link connector and thus effectively connect the called end of the link connector to highway 6. It should be obvious that the calling and called units can be assigned to any one or to the same highway. Also, with the flip-flip corresponding to 11903 in each of the stages CS0, CS1, TS2, and TS4 in its set condition, the amplifier corresponding to 11904 in each of the amplifier stages CAS0, CAS1, TAS2, and TAS4 is rendered non-conductive. A gate corresponding to 11905 is provided in each of the stages CG1–CG6 and TG1–TG6 for the purpose of converting the two out of four highway markings to one out of six markings so as to select the one of busy test conductors BT1–BT6 which corresponds to that highway. It is to be noted that the D terminal of gate 11905 in each of the stages CG1–CG6 is returned to the busy pulse out terminal of the calling time slot storage counter 11801 while the D terminal of gate 11905 in each of the stages TG1–TG6 is returned to the busy pulse out terminal of the called time slot storage counter 11802. It will be recalled from the description of the time slot storage counter that conductor busy pulse out normally stands at ground potential and goes negative only during the time position memorized by that counter. Only one of the calling gates and one of the called or terminating gates have negative potential applied to both their B and C terminals and are thus enabled to pass a negative-going busy pulse when two of the calling amplifiers in stages CAS0–CAS4 and two of the called amplifiers in stages TAS0–TAS4 are non-conductive. In the assumed case, gate 11905 in stage CAS0 is enabled to pass the busy pulse in the time position of the calling unit to conductor BT1 since amplifier 11904 in each of the stages CAS0 and CAS1 is non-conductive and gate 11905 in stage TG6 is enabled to pass the busy pulse in the time position of the called unit to conductor BT6 since amplifier 11904 in each of the stages TAS2 and TAS4 is non-conductive. Thus, the time positions of the calling and called units are marked busy to the route selector and the seize detector.

The negative pulse in the time position of the calling unit appearing once each pulse frame at terminal time pulse out from the calling time slot storage counter 11801 is coupled over conductor CSP–L to the link connector while the negative pulse in the time position of the called unit appearing once each pulse frame at terminal time pulse out of the called time slot storage counter 11802 is coupled over conductor TSP–L to the link connector. Thus, the link connector is controlled to establish a connection between the time position channel assigned to the calling unit on highway 1 and the time position channel assigned to the called unit on highway 6. The link circuit remains in the just described condition until one of the parties to the connection hangs up and a voice frequency release signal therefore appears on either conductor AB or conductor AC–L of Fig. 123 from the link connector.

It will be recalled from the general description that a release scanner and a release detector are provided in the system and that the release scanner serves to control the link circuits individually and in turn to couple the voice frequency signals appearing on the connection established between calling and called units by that link circuit to the common release detector. Thus, a negative signal is periodically applied to conductor RRS1 of Fig. 121 by the release scanner and if busy flip-flip 11701 is set, the output of gate 12101 goes negative and amplifiers 12102 and 12103 are rendered conductive. When amplifier 12103 becomes conductive, negative potential is applied to terminal C of voice gate 12301 to enable that gate to pass any signals appearing on conductors AB or AC–L to conductors RRB and RRC, which extend to the release detector. Signals appearing on conductor AB are coupled through phase splitter 12302 to the hybrid circuit 12305 and appear across the primary winding of transformers 12303 and 12304. Voice gate 12301 functions as a switch to selectively connect and disconnect the secondary windings of transformer 12303 so that when negative potential is applied to terminal C of gate 12301, the signals induced in the secondary windings of transformer 12303 are coupled to the release detector. In the same manner, signals appearing on conductor AC–L are coupled through phase splitter 12306 to the hybrid circuit and thus to the primary windings of transformers 12303 and 12304.

If a voice frequency release signal is detected by the release detector, negative potential is applied to conductor RM and the output of gate 12104 goes negative and amplifier 12105 becomes conductive since terminals B and D of gate 12104 are returned to negative potential at the outputs of amplifiers 12103 and 12105, respectively. When amplifier 12105 becomes conductive, flip-flop 12107 is triggered to its set condition. When terminal C of flip-flop 12107 goes negative, all inputs to gates 12108 and 12109 are negative, amplifiers 12110 and 12111 become conductive, and relays R1 and R2 are operated. Also when amplifiers 12110 and 12111 become conductive, ground potential is coupled through gate 12201 to conductor ZM for the purpose of splitting the connection between the calling and called units in the link connector. Also when flip-flop 12107 is set, negative potential is applied to terminal B of amplifier 11712 and to terminal D of gate 11713 to prepare those components to perform their functions when said flip-flop is reset. The release tone signal comprising frequencies Y and Z is now coupled through contacts R1–1 on operated relay R1 to conductor AD of Fig. 123 and through contacts R2–1 on operated relay R2 to conductor AE of Fig. 123 and thus through the link connector to the calling and called units, respectively.

Prior to the time that flip-flop 12107 is set, ground potential is coupled through gate 12112 to clamp the B terminals of diodes 12113–12115 so that the negative-to-ground two millisecond pulse appearing on conductor 2 Sec. Pulse every two seconds cannot be coupled through those diodes. When flip-flop 12107 is set, ground clamping is removed and the first occurring positive-going pulse on conductor 2 Sec. Pulse is coupled through diode 12115 to trigger flip-flop 12116 to its set condition. When flip-flop 12116 is set, both of the gates 12113 and 12114 are enabled and thus pass the next occurring positive-going pulse on conductor 2 Sec. Pulse to reset flip-flop 12107 and 12116. When flip-flop 12107 is reset, relays R1 and R2 are released to terminate the transmission of the release signal and a positive-going signal is applied to terminal B of amplifier 11712 and to terminal D of gate 11713. Amplifier 11712 is triggered conductive to render amplifiers 11710 and 11711 conductive for a period of approximately fifty microseconds. The positive-going pulse appearing at the output of amplifier 11710 is applied to the reset terminal of called time slot storage counter 11802 and to the A terminal of the flip-flop corresponding to 11903 in each of the stages TS0–TS4 for the purpose of erasing the called unit identification information. Similarly, the positive-going pulse appearing at the output of amplifier 11711 is applied to the reset terminal of calling time slot storage counter 11801 and to the A terminal of the flip-flop corresponding to 11903 in each of the stages CS0–CS4 for the purpose of erasing the calling unit identification information. Thus, the link connector is reset to its normal unoperated condition. When flip-flop 12107 is triggered to its reset condition, flip-flip 11701 is reset through gate 11713 and negative potential is applied to terminal E of gate 11702 so that the illustrated link circuit can be assigned for use on another call. Thus, it can be seen that when a release signal is detected on the connection established by the link circuit, a two to four second release signal is transmitted by the link circuit through the link connector in both the calling and called directions, the link circuit and link connector are then reset, and the link circuit is enabled to be allotted for use on another call.

Figure 123:
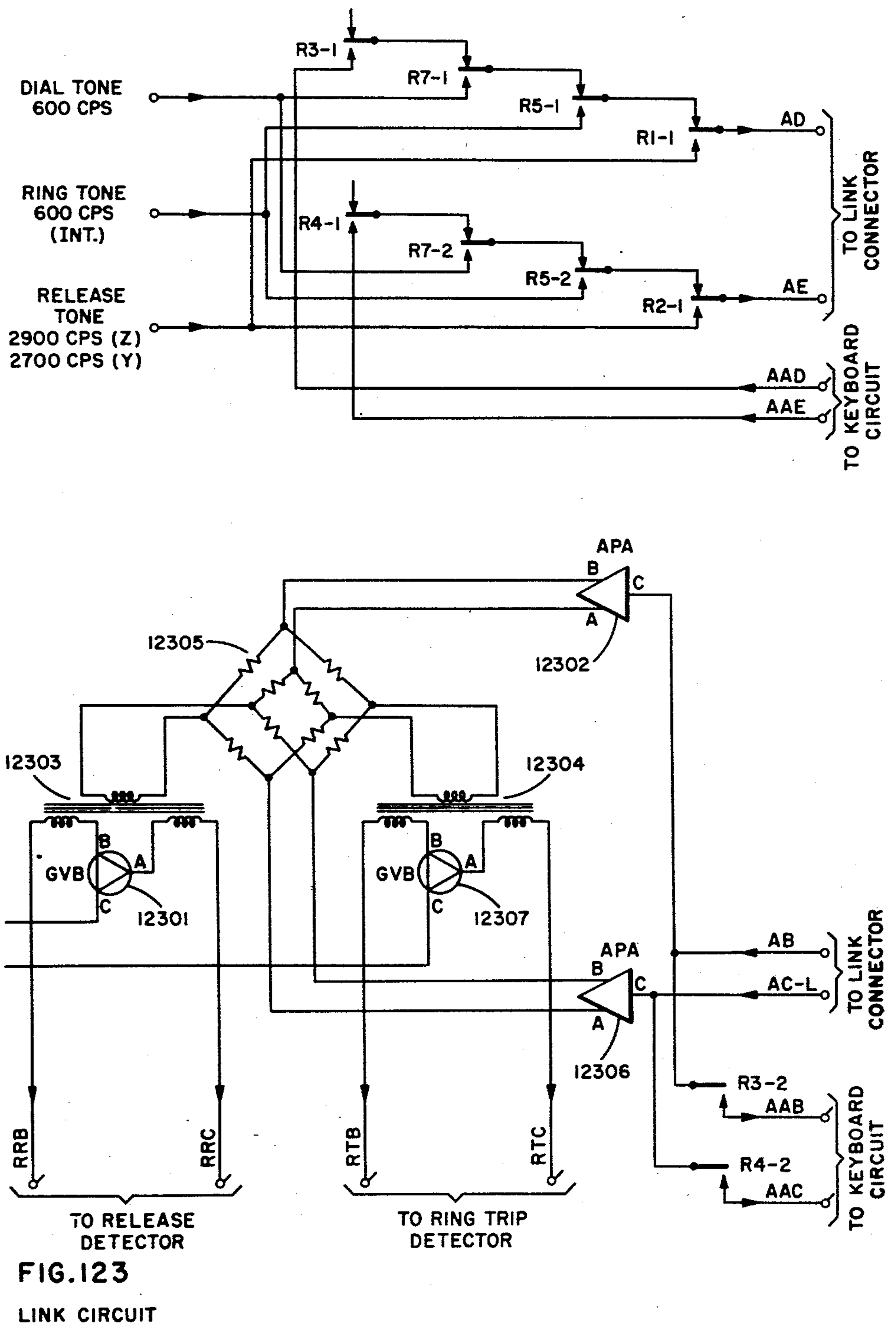

Assume that the link circuit is again allotted for use so that amplifiers 11703 and 11704 become conductive and that when a negative signal is received on conductor WRO and amplifiers 11706 and 11707 become conductive, a negative signal is also received on conductor SL. A negative signal is applied to conductor SL by the route selector when the called unit terminates a service line so that the link circuit will function to control the ringing of the station associated with that line. When amplifier 11707 becomes conductive, the time positions of the calling and called units are read in, as previously described, and when conductor ICDR goes negative, the highway identification of the calling and called units is read in, as previously described. Also when conductor ICDR goes negative, all inputs to service line gate 11714 are negative and amplifier 11804 is rendered conductive. Also, as previously described, all inputs to gate 11708 are negative when conductor ICDR goes negative and amplifier 11709 is rendered conductive to trigger busy flip-flip 11701 to its set condition and thus terminate the read in operation of the link circuit. Thus, a negative-to-ground pulse appears at the output of amplifier 11804 and serves to trigger ringing control flip-flip 12202 to its set condition. When flip-flip 12202 is set, ground potential is applied to conductor ZM to split the talking connection in the link connector and relay R5 is operated. When relay R5 is operated, ring tone is coupled through contacts R5–1 and R5–2, which are shown in Fig. 123, to conductors AD and AE, respectively. The ring tone applied to conductor AD is transmitted through the link connector to the calling unit and serves as a ringback tone to the originating subscriber while the ring tone applied to conductor AE is transmitted through the link connector to the called unit and serves as a ringing signal at the called service line station.

It will be recalled from the general description that a ring trip scanner and a ring trip detector are provided in the system and that the ring trip scanner serves to control the link circuits individually and in turn to couple the voice frequency signals appearing either on conductor AB or conductor AC–L to the ring trip detector. Thus, a negative signal is periodically applied to conductor RTS1 of Fig. 122 by the ring trip scanner and if busy flip-flip 11701 is set, amplifiers 12203 and 12204 are rendered conductive and voice gate 12307 is enabled to pass any signals appearing across the primary winding of transformer 12304 to conductrs RTB and RTC, which extend to the ring trip detector. If a voice frequency seize signal, which, as previously described, is transmitted when any subscriber or service line station goes off-hook, is detected by the ring trip detector, a negative signal is applied to conductor TR and amplifier 12205 is rendered conductive through gates 12206 and 12207. When amplifier 12205 becomes conductive, ringing control flip-flip 12202 is reset through diode 12208 and relay R5 is thereby released to terminate the transmission of a ring signal. Also when amplifier 12205 becomes conductive, delay multivibrator 12209 is triggered to its operated condition to produce a two millisecond negative pulse at its terminal A. Thus, amplifier 12210 is rendered conductive, relay R7 is operated, and ground potential is applied to conductor ZM for a period of two milliseconds. When relay R7 is operated, a burst of dial tone is coupled through contacts R7–1 and R7–2 of Fig. 123 to conductors AD and AE, respectively, for the purpose of tripping the seize signal at the answering station. At the end of the two millisecond period, relay R7, of course, releases and ground potential is removed from conductor ZM so that a talking connection is completed between the calling and called units in the link connector. The link circuit and the link connector remain in the just described condition until a release signal is detected, at which time the link circuit and link connector are released in the exact same manner as previously described.

If the desired service line is busy, the route selector reads out the time position and highway identification of the 60 I.P.M. busy tone coupling unit as the called unit to the allotted link circuit and also functions to apply negative potential to conductor BY of Fig. 22. Since negative potential is applied to conductor SL, amplifier 11804 becomes conductive to trigger ringing control flip-flip 12202 to its set condition, as previously described. When flip-flip 12202 is set, terminal B of gate 12211 is returned to negative potential and since conductor BY is negative, amplifier 12205 is rendered conductive and flip-flip 12202 is immediately reset through diode 12208. Thus, a connection is established in the link connector between the calling unit and the 60 I.P.M. busy tone coupling unit and ringing tone is not coupled to that connection. When the calling party hangs up responsive to the receipt of busy tone, the resulting release signal is detected and the link circuit and the link connector are released, as previously described.

It will be recalled that when a call is to be routed to the operator position, the route selector functions to apply negative potential to conductor AM simultaneously with the application of negative potential to conductor WRO. As previously described, amplifier 11707 becomes conductive when negative potential is received on conductor WRO and serves to apply negative potential to terminal clamp B to enable the calling and called time slot storage counters to read in time position information. However, on a call to an operator position, amplifier 11805 becomes conductive when amplifier 111707 becomes conductive since conductor AM is returned to negative potential. When amplifier 11805 becomes conductive, ground potential is applied to terminal clamp A of the called time slot storage counter to prevent that circuit from operating its read in gates even though there is no called time slot information coupled over conductor TSP-0 when the call is to the operator position. This is done to prevent the called time slot storage counter from reading in a false signal when amplifier 11707 again becomes nonconductive and ground potential is reapplied to terminal clamp B. Also when amplifier 11805 becomes conductive, ground potential is applied to demand operator conductor DO1 to control the position coupling circuit associated with the link circuit to demand connection to the operator position. When conductor ICDR goes negative, calling highway identification is read in, as previously described, and a negative signal is passed by operator call gate 11715 to render amplifier 11804 conductive. When amplifier 11804 becomes conductive, ringing control flip-flip 12202 is triggered to its set condition to initiate the ringing operation in the same manner as previously described. Ring tone is coupled to both conductors AD and AE but since the link connector is not connected to a called unit, the ring tone applied to conductor AE is without effect. Also when amplifier 11804 becomes conductive, busy flip-flip 11701 is triggered to its set condition through gate 11716 to terminate the read in operation of the link circuit, as previously described. It is to be noted that the alternate triggering path for flip-flip 11701 from amplifier 11804 is provided since on a call to the operator position, terminal test busy of the called time slot storage counter does not go negative and amplifier 11709 therefore remains non-conductive.

Figure 121:
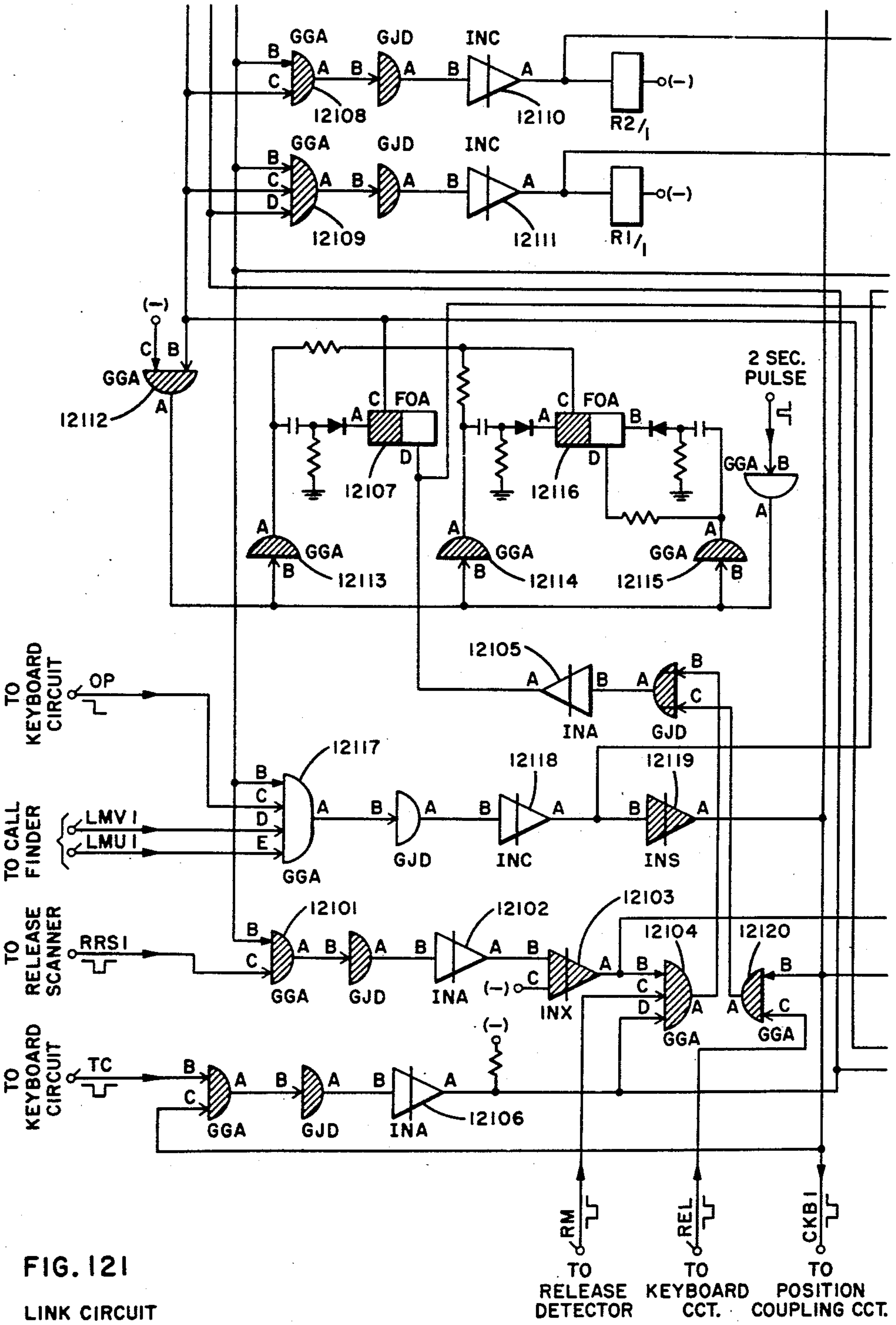
Figure 122:
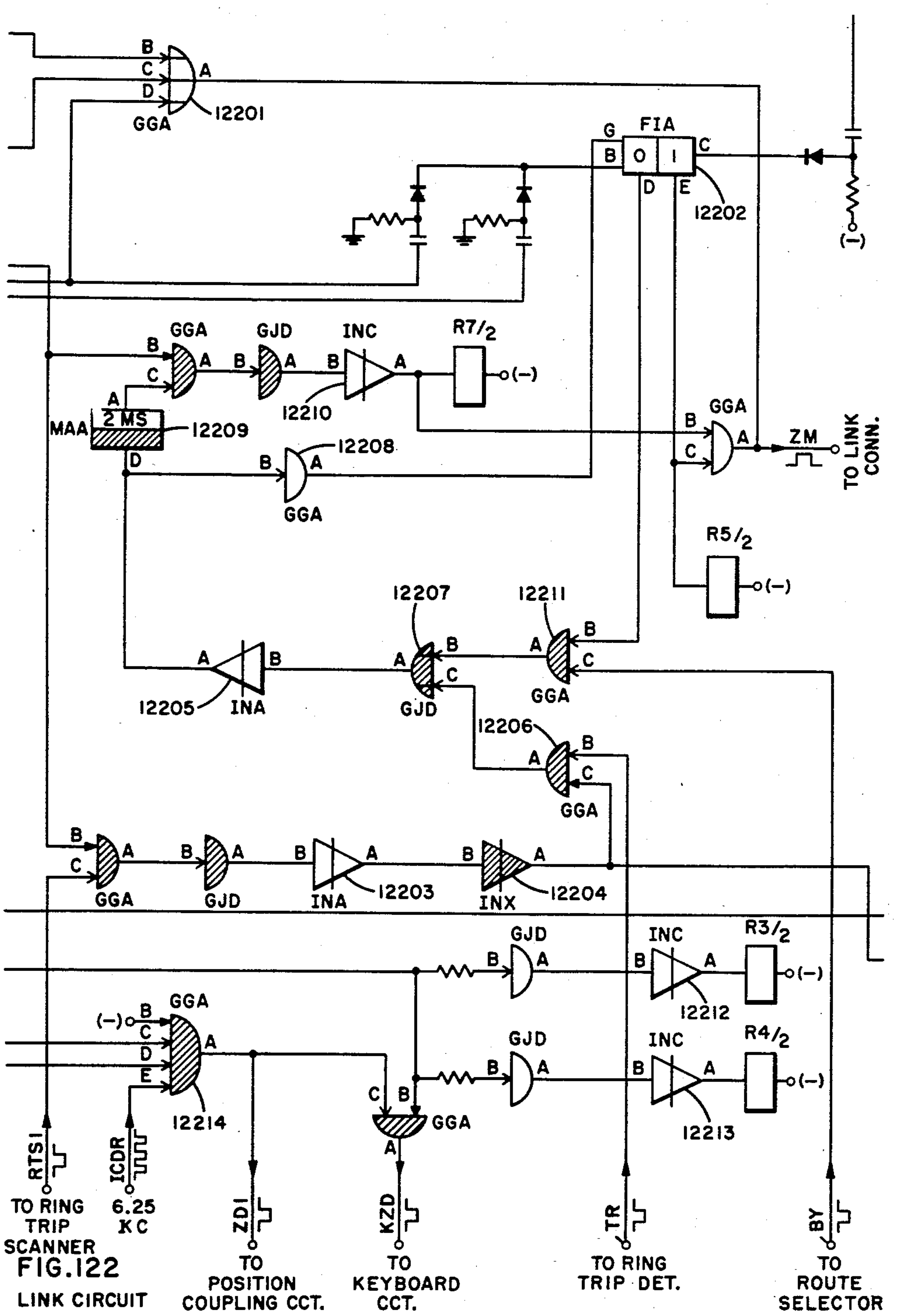

It will be recalled from the general description that the call finder, which controls the connection of the link circuits to the operator position in the same order in which calls are initiated by those link circuits, serves to enable the illustrated link circuit for connection to the operator position by applying negative potential to conductors LMU1 and LMV1 of Fig. 121. When the answer key at the keyboard circuit is operated, negative potential is applied to conductor OP and since negative potential is also applied to conductors LMU1 and LMV1 and flip-flip 11701 is set, all inputs to gate 12117 are negative, and plifier 12118 becomes conductive. When amplifier 12118 becomes conductive, ringing control flip-flip 12202 is triggered to its rest condition to terminate the transmission of ringback tone to the calling party and ground potential is applied through gate 12201 to conductor ZM to maintain the link connector in the split condition. Also when amplifier 12118 becomes conductive, amplifier 12119 is rendered conductive and the negative potential appearing at the output of amplifier 12119 renders amplifiers 12212 and 12213 conductive to operate relays R3 and R4, respectively. As shown in Fig. 123, conductors AB and AC–L from the link connector are connected through operated contacts R3–2 and R4–2 to conductors AAB and AAC, respectively, which extend to the keyboard circuit, and conductors AAD and AAE from the keyboard circuit are connected through operated contacts R3–1 and R4–1 to conductors AD and AE, respectively, which extend to the link connector. Thus, a talking connection is completed between the originating subscriber station and the operator position.

If the call extended to the operator position is to be further extended, the operator keys the desired number into the position register and the position register then controls the further extension of the call. It will be recalled from the description of position register control B that when the selection of the desired called unit is completed, or if a busy condition is encountered in the extended connection, an end of call signal is transmitted to the position register and the position register transmits a negative signal over conductor KW, via the keyboard circuit, to initiate the transfer of the connection to the link circuit answered by the operator. The negative signal on conductor KW is effective only in the link circuit answered by the operator since only in that link circuit is amplifier 12119 conductive to apply negative potential to terminal B of gate 11717. Therefore, in the illustrated link circuit, all inputs to gate 11717 are negative and amplifiers 11706 and 11707 are rendered conductive to initiate the read in of terminating unit highway and time position identification information. When amplifier 11707 becomes conductive, negative potential is applied to the clamp B conductor of the calling and called time slot storage counters and counter 11802 is thereby controlled to read in the time position of the called unit. When conductor ICDR goes negative, the highway identification of the called unit is read in, the link connector is controlled to connect to the called unit, and the called unit is marked busy on the appropriate one of the conductors BT1–BT6, all in the manner previously described. The operator monitors the connection and can talk to either party. When the operator retires from the connection by restoring the answer key, conductor OP goes to ground and amplifiers 12118 and 12119 become non-conductive. When amplifier 12118 becomes non-conductive, ground potential is removed from conductor ZM to remove the split condition from the link connector so that the connection is completed between the calling and called units in the link connector. When amplifier 12119 becomes non-conductive, relays R3 and R4 are released and conductors AB, AC–L, AD, and AE from the link connector are disconnected from conductors AAB, AAC, AAD, and AAE, respectively, which extend from all of the link circuits in common to the keyboard circuit. Also when amplifier 12119 becomes non-conductive, the negative-to-ground transition on conductor CKB1 serves to reset the position coupling circuit associated with the illustrated link circuit so that the call finder can enable the next link circuit for connection to the operator position. The link circuit remains in the just described condition until a voice frequency release signal is detected, at which time the link circuit and link connector are reset in the exact same manner as previously described.

If while the link circuit is connected to the operator position and after the identification information corresponding to the called unit has been tranferred from the position register to the link circuit the operator should wish to release the circuits in the forward or called direction because of a keying error or for some other reason, the split key and the release key at the keyboard circuit are operated in that order. When the split key is operated, negative potential is applied to conductor TC and amplifier 12106 in the answered link circuit is rendered conductive. When amplifier 12106 becomes conductive, ground potential is applied to terminal D of gate 12214, to terminal D of gate 12109, to terminal C of gate 11713, and to terminal C of gate 11718 to prevent the output of any of said gates from going negative during subsequent operation of the release key. When the release key is operated, negative potential is applied to conductor REL at the keyboard circuit, both inputs to gate 12120 are negative, amplifier 12105 is rendered conductive, and flip-flop 12107 is triggered to its set condition. When flip-flop 12107 is set, the negative potential appearing at its terminal C is coupled through gate 12108, amplifier 12110 becomes conductive, and relay R2 is operated to apply release tone to conductor AE and thus in the called direction through the link connector. It is to be noted that relay R1 remains unoperated since terminal D of gate 12109 is clamped at ground potential by conducting amplifier 12106 so that release tone is not coupled to the circuits in the calling direction. When flip-flop 12107 is reset after a period of two to four seconds, as previously described, amplifier 11712 is triggered conductive for approximately fifty microseconds to render amplifier 11710 conductive and thus reset the called time slot storage counter and the set ones of the flip-flips corresponding to 11903 in the terminating highway stages TS0–TS4. Thus, the identification information corresponding to the called unit is erased from the link circuit storage units. It is to be noted that amplifier 11711 is prevented from becoming conductive when amplifier 11712 becomes conductive since terminal C of gate 11718 is clamped at ground potential. The operator now restores the release and split keys at the keyboard circuit and rekeys the desired number.

Another condition which may be encountered while the operator is extending a connection is that the calling party may abandon the call and the calling station thus transmits a voice frequency release signal. Under these conditions, when the release scanner applies negative potential to conductor RRS1, the release signal is detected by the release detector, conductor RM goes negative, all inputs to gate 12104 are negative, amplifier 12105 becomes conductive, and flip-flop 12107 is set, all as previously described. When flip-flop 12107 is set, release tone is transmitted in both the calling and called directions for two to four seconds and the link circuit and link connector are then reset, all as previously described. It is to be noted that while flip-flop 12107 is in its set condition, all inputs to gate 12214 are negative while conductor ICDR is negative so that when conductor ICDR returns to ground potential, a negative-to-ground potential transition is coupled over conductor ZD1 to reset the position coupling circuit and over conductor KZD to reset the operator's incoming call lamp control flip-flip in the keyboard circuit. The operator then operates the release key at the keyboard circuit to control the position register to transmit a release signal in the forward or called direction and then restores the answer key to retire from the connection.

*Position coupling circuit.*—A position coupling circuit, identical to the one shown in Fig. 124 of the drawings, is provided for each link circuit of the system. It will be recalled from the description of the link circuit that when a call is to be routed to the operator position, the link circuit handling that call functions to apply ground potential to conductor DO1 during the read in operation of that link circuit. A ground pulse appearing on conductor DO1 triggers flip-flip 12401 to its set condition. When flip-flip 12401 is set, negative potential is coupled through diode 12402 to conductor CCL to illuminate the call control lamp in the keyboard circuit and is coupled through diode 12403 to conductor LU1 as a stop signal for the U counting chain of the call finder, which will be described in detail later in this description.

When the U counting chain of the call finder stops in the position corresponding to marking U1, negative potential appears on conductor LMU1, both inputs to gate 12404 are negative, amplifier 12405 becomes conductive, and ground potential is applied to conductor LV1 to stop the V counting chain of the call finder in the position corresponding to marking V1. It will be recalled from the description of the link circuit that the link circuit described is enabled for connection to the operator position when negative potential is applied to both conductors LMU1 and LMV1, and that the call finder continuously marks those conductors as long as the answer key at the keyboard circuit is in its operated condition. It will also be recalled that when the operator retires from the connection by restoring the answer key or the calling party abandons the call while the operator is answering said call, ground potential appears on conductor CKB1 or conductor CZD1, respectively. When ground potential appears on either conductor CKB1 or conductor CZD1, flip-flop 12401 is triggered to its reset condition so that negative potential is removed from conductor LU1 and ground potential is removed from conductor LV1. Thus, the call finder is enabled to advance and find the next position coupling circuit demanding connection to the operator position. Also when flip-flop 12401 is reset, negative potential is removed from conductor CCL so that the operator's call control lamp will extinguish if no other operator calls are awaiting attention.

*Call finder.*—The call finder, which is shown in Fig. 125 of the drawings, is provided in the system for the purpose of controlling the connection of link circuits having calls for the operator position to the operator position in the same order in which calls are extended to those link circuits. It will be recalled that the link circuits are assigned for use in turn by the link allotter by the application of a marking signal to the unique combination of one X marking conductor and one Y marking conductor corresponding to each link circuit. Similarly, each link circuit is identified for the purpose of extending connections to the operator position by a unique combination of one U marking conductor and one V marking conductor. If each link circuit is assigned U and V markings which correspond to the X and Y markings, respectively, assigned to that link circuit, it can be seen that the call finder will enable the link circuits for connection to the operator position in the same order that the link circuits are assigned for use by the link allotter. Thus, the calls for the operator position are automatically queued for connection to the operator's position in the same order that said calls are initiated.

The call finder comprises a U marking counting chain comprising stages U1–U5 and a V marking chain comprising stages V1–V5. Since each counting chain comprises five stages, the call finder has been illustrated as capable of producing twenty-five unique combinations of one U marking conductor and one V marking conductor and is thus capable of serving twenty-five link circuits. Each of the U and V counting chains is identical to the counting chain disclosed in copending application Serial Number 716,948, filed February 24, 1958, and assigned to the same assignee as the present invention. Briefly, the counting chain is free running in the absence of stopping signals since it comprises an odd number plurality of D.-C. amplifier stages connected output to input in a closed ring. To illustrate the above, assume that amplifier 12501 in stage U1 has just become non-conductive so that the amplifiers corresponding to 12501 in stages U4, U2, U5, and U3 are non-conductive, conductive, non-conductive, and conductive, respectively. When amplifier 12501 in stage U1 becomes non-conductive, the conductivity of the amplifiers corresponding to 12501 in stages U4, U2, U5, and U3 is changed in succession to conductive, non-conductive, conductive, and non-conductive, respectively, and when the amplifier in stage U3 becomes non-conductive, amplifier 12501 in stage U1 must, of course, become conductive. A useful output in the disclosed arrangement is produced from each stage only when that stage changes from conductive to non-conductive and its output therefore goes negative.

To illustrate the finding operation of the call finder, assume that link circuit 1 is the only link circuit demanding connection to the operator position so that conductor LU1 has negative potential applied thereto in the position coupling circuit associated with link circuit 1. If it is again assumed that amplifier 12501 has just become non-conductive, terminals C and D of gate 12502 in stage U1 are negative but terminal B of that gate is returned to ground potential to hold amplifier 12504 non-conductive since the amplifier corresponding to 12501 in stage U3 is conductive. When amplifier 12501 in stage U1 becomes non-conductive, the amplifiers corresponding to 12501 in stages U4, U2, U5, and U3 become conductive, non-conductive, conductive, and non-conductive, respectively, in turn, as previously described. When the amplifier corresponding to 12501 in stage U3 becomes non-conductive, negative potential is applied to terminal B of gate 12502, amplifier 12504 becomes conductive, and ground potential is applied to terminal B of gate 12503 to hold amplifier 12501 in stage U1 non-conductive. It is to be noted that interstage time delay capacitor 12506 assures that amplifier 12504 in stage U1 becomes conductive before amplifier 12501 in stage U1 when amplifier 12501 in stage U3 becomes non-conductive while negative potential is applied to conductor LU1. Thus, the U counting chain is stopped in the setting in which amplifier 12501 in each of the stages U1, U2, and U3 is non-conductive and the amplifier corresponding to 12501 in each of the stages U4 and U5 is conductive.

When amplifier 12504 in stage U1 becomes conductive, amplifier 12505 in stage U1 becomes non-conductive and negative potential is applied to conductor LMU1. It will be recalled from the description of the position coupling circuit that when negative potential is received on the U marking conductor corresponding to that coupling circuit, the coupling circuit serves to apply ground potential to its corresponding LV conductor. For example, if link circuit 1 is handling a call for the operator position, the position coupling circuit associated with link circuit 1 is responsive to the receipt of negative potential on conductor LMU1 to apply ground potential to conductor LV1 and thus to terminal C of gated amplifier 12507 in stage V1. When the V counting chain has stepped to the setting in which amplifier 12508 in stage V1 is non-conductive and the amplifier corresponding to 12508 in stage V3 has just become non-conductive, a negative signal is coupled through gate 12509 and amplifier 12507 becomes conductive to hold the V counting chain in that setting. Also when amplifier 12507 in stage V1 becomes conductive, amplifier 12510 in stage V1 becomes non-conductive and negative potential is applied to conductor LMV1. The negative potential applied to conductors LMU1 and LMV1 enables link circuit 1 for connection to the operator position when the answer key at the keyboard circuit is operated. It is to be noted that when the amplifier corresponding to 12507 in any of the stages V1–V5 becomes conductive, ground potential is applied to conductor ICL to illuminate the incoming call lamp in the keyboard circuit. The call finder remains in the just described condition until the operator retires from the connection extended by link circuit 1 and negative potential is removed from conductor LU1 and ground potential is removed from conductor LV1 by the position coupling circuit associated with link circuit 1.

If no other operator calls are awaiting answering at this time, both the U and V counting chains resume their stepping operation. However, if link circuit 2, which is identified by marking U1 and V2, has a call to the operator awaiting answering, the U counting chain remains in the just described setting since negative potential is maintained on conductor LU1 by the position coupling circuit associated with link circuit 2. Referring to the V counting chain, it can be seen that the position coupling circuit associated with link circuit 2 is applying ground potential to conductor LV2 but that terminal B of the gate corresponding to 12509 in stage V2 is at ground potential because the amplifier corresponding to 12508 in stage V4 is conductive at the time that the position coupling circuit associated with link circuit 1 is released and conductor LV1 goes negative. When conductor LV1 goes negative, amplifier 12507 in stage V1 becomes non-conductive and amplifier 12508 in stage V1 becomes conductive. When amplifier 12508 in stage V1 becomes conductive, the amplifier corresponding to 12508 in stage V4 becomes non-conductive, both inputs to gate 12509 in stage V2 go negative, negative potential is applied to conductor LMV2, and the stepping operation of the V counting chain is arrested.

To further illustrate the operation of the call finder, assume that link circuits 2–7 are controlled to extend calls to trunk lines or service lines while a call on link circuit 1 is answered by the operator and that link circuit 8, which corresponds to markings U2 and V3, is the next link circuit to handle a call for the operator position. Under these conditions, when negative potential is removed from conductor LU1 by the position coupling circuit associated with link circuit 1, amplifier 12501 in stage U1 becomes conductive, amplifier 12501 in stage U4 becomes non-conductive, and since negative potential is applied to conductor LU2 by link circuit 8, all three inputs to gate 12502 in stage U2 are negative, negative potential is applied to conductor LMU2, and the stepping operation of the U counting chain is terminated. When negative potential is applied to conductor LMU2, the position coupling circuit associated with link circuit 8 is responsive thereto to apply ground potential to conductor LV3. Simultaneously with the above described stepping of the U counter, the V counter is controlled to resume its stepping operation when ground potential is removed from conductor LV1 by the position coupling circuit associated with link circuit 1. When ground potential is removed from conductor LV1, amplifier 12507 in stage V1 becomes non-conductive, amplifier 12508 in stage V1 becomes conductive, amplifier 12508 in stage V4 becomes non-conductive, amplifier 12508 in stage V2 becomes conductive, and amplifier 12508 in stage V5 becomes non-conductive. When amplifier 12508 in stage V5 becomes non-conductive, both inputs to gate 12509 in stage V3 are negative, amplifier 12507 in stage V3 becomes conductive, negative potential is applied to conductor LMV3, and the stepping operation of the V counter is arrested. Thus, it can be seen that the call finder marks the LMU and LMV conductors corresponding to a particular link circuit as long as the call on that link circuit remains answered at the operator position and then advances to mark the next succeeding link circuit having a call awaiting answer by the operator when the operator retires from the connection on said particular link circuit.

*Keyboard circuit.*—The keyboard circuit is shown in Figs. 126 and 127 of the drawings. When one or more of the link circuits of the system has a call which is to be extended to the operator position, negative potential is applied to common conductor CCL in the position coupling circuits associated with those link circuits. When negative potential is received on conductor CCL, amplifier 12601 becomes conductive and lamp 12602 is illuminated. If the equipment is functioning properly, negative potential appears on conductor ICL, indicating that the call finder has enabled another link circuit for connection to the operator position, shortly after each restoration of answer key 12603 as long as at least one call is awaiting answer by the operator. It can be seen that if flip-flop 12604 is reset at the time that ground potential is received on conductor ICL from the call finder and amplifier 12605 becomes non-conductive, amplifier 12606 becomes conductive, and incoming call lamp 12607 is illuminated. In response to the illumination of incoming call lamp 12607, the operator moves answer key 12603 to its operated position.

When answer key 12603 is operated, flip-flop 12604 is triggered to its set condition from ground through contacts 12603*a* and when flip-flop 12604 is set, negative potential is applied to conductor OP as an answer indication to the link circuit enabled for connection to the operator position by the call finder. Also when flip-flop 12604 is set, amplifier 12606 is rendered non-conductive and incoming call lamp 12607 is extinguished. As explained in the description of the link circuit, the enabled link circuit is responsive to the receipt of negative potential on conductor OP to connect conductors AAB, AAC, AAD, and AAE from Fig. 127 of the keyboard circuit through to the link connector associated with the answered link circuit. Speech signals received from the calling party are coupled to conductor AAB, amplified by audio amplifier 12701, coupled through a hybrid network to the input of audio amplifier 12702, and the amplified signals appearing at the output of amplifier 12702 are coupled to the operator's receiver 12703, which may be of any well known type. Similarly, speech signals generated by operator's transmitter 12704, which may be of any well known type, are amplified by audio amplifiers 12705 and 12706 and coupled through the hybrid network to the inputs of audio amplifiers 12707 and 12708. The amplified signals appearing at the output of amplifier 12707 are applied to conductor AAD and are thus coupled through the answered link circuit and its associated link connector to the calling party. The amplified signals appearing at the output of amplifier 12708 are applied to conductor AAE but are without effect since the link connector associated with the answered link circuit has not established a connection to a called unit at this time. Thus, the operator is able to converse with the calling party.

If the call is to be further extended by the operator, the operator now keys the desired number by depressing the corresponding ones of the digit keys in succession. Ten digit keys, of which keys digit "1" and digit "0" are shown in Fig. 126, are provided in the keyboard circuit and the depression of any one of said keys results in the application of ground potential to a unique combination of the digit identifying conductors KDU–KDY, of Fig. 127, which extend to control B of the position register. For example, when the digit "1" key is depressed, ground potential is applied through OR gates 12709 and 12710 to conductors KVD and KDW, respectively. At the termination of the keying of each digit, ground potential is applied through the series connected back contacts of the digit keys to end of digit conductor KDE for the purpose of advancing the shift register in the five digit store, as described in the description of that circuit. Normally, digits are transmitted out of the position register as fast as they are keyed into said register but if all five digit registers should have digit information registered therein because of difficult transmission conditions, ground potential is applied to conductor KCF in the five digit store, amplifier 12609 is rendered non-conductive, and amplifier 12610 is rendered conductive to illuminate stop keying lamp 12608. Lamp 12608 will either extinguish quickly so that the operator can continue keying the digits of the desired number or, if the position register has timed out because of the failure to receive correct digit acknowledgment signals, negative potential is received over conductor KTO from control B and amplifier 12611 becomes conductive to illuminate incomplete call lamp 12612. Also if the call is timed out, ground potential is received over conductor KRR from control B to illuminate the stop keying lamp 12608 even though all five digit registers in the five digit store are not loaded.

If it is assumed that digits are transmitted by the position register and are correctly acknowledged by the circuits in the called direction, an end of call signal is eventually received by the position register and negative potential is applied to conductor KWR to initiate the transfer of called unit identifying information from the position register to the answered link circuit. When negative potential is received on conductor KWR, the output of emitter follower 12613 goes negative and negative potential is thereby applied to conductors KW and KWF, which extend to the link circuits and the register finder, respectively. As explained in the description of the link circuit, the answered link circuit is responsive to the receipt of negative potential on conductor KW to read in the called unit identifying information and, as explained in the description of the register finder, the negative potential transmitted over conductor KWF serves to release the register finder, the position register, and the route selector after a period of one hundred and sixty microseconds. Also when negative potential is received on conductor KWR, amplifier 12614 becomes conductive to illuminate call established lamp 12615 and to render amplifier 12616 non-conductive. When amplifier 12616 becomes non-conductive, it can be seen that amplifier 12614 will remain conductive, independently of the potential thereafter appearing on conductor KWR, until such time as the answer key 12603 is restored. The operator may now retire from the connection by restoring the answer key or may monitor the call until the called party answers.

It will be recalled that the connection between the calling and called parties remain split in the link connector associated with the answered link circuit until such time as the answer key at the keyboard circuit is restored. The calling and called parties and the operator can converse via the conference type hybrid circuit of Fig. 127, or the operator may split the connection and converse with either one of the calling or called parties. When the A section of the split key 12711 is operated, conductors AAC and AAE remain coupled to the operator's receiver and transmitter, respectively, so that the operator can converse with the called party but conductors AAB and AAD are disconnected from the operator's receiver and transmitter, respectively, and coupled through resistors to ground. Similarly, when the B section of the split key 12711 is operated, conductors AAB and AAD remain coupled to the operator's receiver and transmitter, respectively, so that the operator can converse with the calling party but conductors AAC and AAE are disconnected from the operator's receiver and transmitter, respectively, and coupled through resistors to ground.

The operator retires from the connection by restoring answer key 12603. When key 12603 is restored, flip-flop 12604 is triggered to its reset condition through contacts 12603*a* and ground potential is applied to conductor OP. Also when the answer key is restored, amplifier 12614 is rendered non-conductive to extinguish call established lamp 12615 and amplifier 12616 is rendered conductive. Also when the answer key is restored, end of digit conductor KDE is clamped to ground potential through diode 12617.

If the operator should wish to release the circuits in the called direction before called unit identifying information is transferred to the link circuit, as indicated by the fact that call established lamp 12615 is not illuminated, release key 12618 is operated. When key 12618 is operated, ground potential is applied to conductor KRS to control the position register to transmit a timed release signal in the called direction and to reset to normal. Also when the release key is operated, ground potential is applied to terminal B of amplifier 12614 but without effect since amplifier 12614 is non-conductive at this time. It is to be noted that conductor REL to the link circuits remains at ground potential when the release key is operated since split key 12711 is not operated at this time. The operator then restores the release key and rekeys the desired number.

If the operator should wish to release the circuits in the called direction after called unit identifying information has been transferred to the answered link circuit, as indicated by the fact that call established lamp 12615 is illuminated, the split and release keys are operated in that order. When the split key is operated, negative potential is applied through transfer contacts 12711*a* to conductor TC for the purpose of controlling the answered link circuit to prevent the release of the circuits in the calling direction when negative potential is subsequently received over conductor REL. When the release key is operated, negative potential is applied to conductor REL to release the circuits in the called direction, amplifier 12614 becomes non-conductive to extinguish lamp 12615, and amplifier 12616 is rendered conductive. The operator then restores the split and release keys and rekeys the desired number.

Another condition which may be encountered while the operator is answering a call is that the calling party abandons the call and the answered link circuit functions to apply a negative-to-ground pulse to conductor KZD. When a positive-going pulse is received on conductor KZD, flip-flop 12604 is triggered to its reset condition to apply ground potential to conductor OP and thus release the answered link circuit. The operator then operates the release key 12618 to apply negative potential to conductor KRS and thus control the position register to transmit a release signal in the forward or called direction. The operator then restores answer key 12603 and the keyboard circuit is in readiness to receive another call.

While there has been shown and described what is considered at present to be the preferred embodiment of the invention, modifications thereto will readily occur to those skilled in the art. It is not desired, therefore, that the invention be limited to the embodiments shown and described, and it is intended to cover in the appended claims all such modifications as fall within the true spirit and scope of the invention.

What is claimed is:

1. In a telephone system, a calling office, a called office, means for extending a connection from said calling office to said called office, means in said called office responsive to the extension of said connection thereto for transmitting a called office identifying signal to said calling office, means in said calling office responsive to the receipt of a called office identifying signal for transmitting an interlock request signal to said called office, means in said calling office for thereafter transmitting line selecting signals to said called office, and means in said called office effective only after an interlock request signal has been received for transmitting to said calling office an acknowledgment signal following the receipt of each line selecting signal.

2. In a telephone system, a calling office, a called office, means for extending a connection from said calling office to said called office, means in said called office responsive to the extension of a connection thereto for transmitting a called office identifying signal to said calling office, means in said calling office responsive to the receipt of a called office identifying signal for transmitting an interlock request signal to said called office, means in said calling office for thereafter transmitting line selecting signals to said called office, means in said called office for registering the numerical digital values of line selecting signals received from said calling office, and means in said called office effective only after an interlock request signal has been received for transmitting to said calling office an acknowledgment signal corresponding to the numerical digital value registered in said registering means following the receipt of each line selecting signal.

3. In a telephone system, a calling office and a called office interconnected by a trunk line, a register sender in said calling office, a register in said called office, means for extending a connection from said register sender over said trunk line to said register, means in said register responsive to the extension of a connection thereto for transmitting a called office identifying signal to said register sender, means in said register sender responsive to the receipt of a called office identifying signal for transmitting an interlock request signal to said register, means in said register sender for thereafter transmitting line selecting signals to said register, and means in said register effective only after an interlock request signal has been received for transmitting to said register sender an acknowledgement signal following the receipt of each line selecting signal.

4. In a telephone system, a calling office and a called office interconnected by a trunk line, a register sender in said calling office, a register in said called office, means for extending a connection from said register sender over said trunk line to said register, means in said register responsive to the extension of a connection thereto for transmitting a called office identifying signal to said register sender, means in said register sender responsive to the receipt of a called office identifying signal for transmitting an interlock request signal to said register, means in said register sender for thereafter transmitting line selecting signals to said register, means in said register for registering the numerical digital values of line selecting signals received from said register sender, and means in said register effective only after an interlock request signal has been received for transmitting to said register sender an acknowledgment signal corresponding to the numerical digital value registered therein following the receipt of each line selecting signal.

5. In a telephone system, first and second offices interconnected by a trunk line, a register sender in said first office, a plurality of subscriber lines terminating at said second office, a register in said second office for serving both calling subscriber lines and calling trunk lines and adapted to transmit dial tone to a calling line when connected thereto, means for extending a connection from said register sender over said trunk line to said register, means in said register sender responsive to the receipt of dial tone from said register for transmitting an interlock request signal to said register, means in said register sender for thereafter transmitting line selecting signals to said register, and means in said register effective only after an interlock request signal has been received for transmitting to said register sender an acknowledgment signal following the receipt of each line selecting signal.

6. In a telephone system, first and second offices interconnected by a trunk line, a register sender in said first office, a plurality of subscriber lines terminating at said second office, a register in said second office for serving both calling subscriber lines and calling trunk lines and adapted to transmit dial tone to a calling line when connected thereto and to thereafter register the numerical digital values of line selecting signals received from the calling line, means for extending a connection from said register sender over said trunk line to said register, means in said register sender responsive to the receipt of dial tone from said register for transmitting an interlock request signal to said register, means in said register sender for thereafter transmitting line selecting signals to said register, and means in said register effective only after an interlock request signal has been received for transmitting to said register sender an acknowledgment signal corresponding to the numerical digital value registered therein following the receipt of each line selecting signal.

7. In a telephone system, a calling office, a called office, means for extending a connection from said calling office to said called office, means in said called office responsive to the extension of said connection thereto for transmitting a called office identifying signal to said calling office, means in said calling office responsive to the receipt of a called office identifying signal for transmitting an interlock request signal to said called office, means in said calling office for thereafter transmitting the first one of a plurality of line selecting signals to said called office, means in said called office for registering the numerical digital value of each received line selecting signal, means in said called office effective only after an interlock request signal has been received for transmitting to said calling office an acknowledgment signal corresponding to the numerical digital value registered therein following the receipt of each line selecting signal, and means in said calling office for transmitting the next line selecting signal only if the acknowledgment signal received is correct for the line selecting signal previously transmitted.

8. The system of claim 7 including means in said calling office responsive to the receipt of an incorrect acknowledgment signal for the line selecting signal previously transmitted for transmitting a cancel signal to said called office, means in said called office responsive to the receipt of a cancel signal for canceling the numerical digital value registered in said registering means responsive to the receipt of said previously transmitted line selecting signal, and means in said calling office for then retransmitting said previously transmitted line selecting signal to said called office.

9. In a telephone system, a calling office and a called office interconnected by a trunk line, a register sender in said calling office, a register in said called office, means for extending a connection from said register sender over said trunk line to said register, means in said register responsive to the extension of a connection thereto for transmitting a called office identifying signal to said register sender, means in said register sender responsive to the receipt of a called office identifying signal for transmitting an interlock request signal to said register, means in said register sender for thereafter transmitting the first one of a plurality of line selecting signals to said register, means in said register for registering the numerical digital value of each received line selecting signal, means in said register effective only after an interlock request signal has been received for transmitting to said register sender an acknowledgment signal corresponding to the numerical digital value register therein following the receipt of each line selecting signal, and means in said register sender for transmitting the next line selecting signal only if the acknowledgment signal received is correct for the line selecting signal previously transmitted.

10. The system of claim 9 including means in said register sender responsive to the receipt of an incorrect acknowledgment signal for the line selecting signal previously transmitted for transmitting a cancel signal to said register, means in said register responsive to the receipt of a cancel signal for canceling the numerical digital value registered therein responsive to the receipt of said previously transmitted line selecting signal, and means in said register sender for then retransmitting said previously transmitted line selecting signal to said register.

11. In a telephone system, first and second offices interconnected by a trunk line, a register sender in said first office, a plurality of subscriber lines terminating at said second office, a register in said second office for serving both calling subscriber lines and calling trunk lines and adapted to transmit dial tone to a calling line when connected thereto and to thereafter register the numerical digital values of line selecting signals received from the calling line, means for extending a connection from said register sender over said trunk line to said register, means in said register sender responsive to the receipt of dial tone from said register for transmitting an interlock request signal to said register, means in said register sender for thereafter transmitting the first one of a plurality of line selecting signals to said register, means in said register effective only after an interlock request signal has been received for transmitting to said register sender an acknowledgment signal corresponding to the numerical digital value registered therein following the receipt of each line selecting signal, and means in said register sender for transmitting the next line selecting signal only if the acknowledgment signal received is correct for the line selecting signal previously transmitted.

12. The system of claim 11 including means in said register sender responsive to the receipt of an incorrect acknowledgment signal for the line selecting signal previously transmitted for transmitting a cancel signal to said register, means in said register responsive to the receipt of a cancel signal for canceling the numerical digital value registered therein responsive to the receipt of said previously transmitted line selecting signal, and means in said register sender for then retransmitting said previously transmitted line selecting signal to said register.

13. In a telephone system, first and second offices interconnected by a trunk line, a plurality of lines terminating at said first office, a register sender in said first office, a plurality of lines terminating at said second office, a register in said second office, means for extending a connection from a calling line in said first office to said register sender, means in said register sender for registering the numerical digital values of line selecting signals received from said calling line, means responsive to the registration in said register sender of the one or more numerical digital values corresponding to said trunk line for extending a connection from said register sender over said trunk line to said register, means in said register sender for transmitting to said register line selecting signals corresponding to the numerical digital values registered therein subsequent to the registration of the one or more numerical digital values corresponding to said trunk line, means in said register for transmitting to said register sender an acknowledgment signal following the receipt of each line selecting signal, means in said register responsive to the receipt of sufficient line selecting signals to identify one of the lines terminating at said second office for transmitting an end of call signal to said register sender, and means responsive to the receipt of an end of call signal by said register sender for completing a connection between the calling line and said trunk line in said first office.

14. In a telephone system, first and second offices interconnected by a trunk line, a plurality of lines terminating at said first office, a register sender in said first office, a plurality of lines terminating at said second office, a register in said second office, means for extending a connection from a calling line in said first office to said register sender, means in said register sender for registering the numerical digital values of line selecting signals received from said calling line, means responsive to the registration in said register sender of the one or more numerical digital values corresponding to said trunk line for extending a connection from said register sender over said trunk line to said register, means in said register sender for transmitting to said register line selecting signals corresponding to the numerical digital values registered therein subsequent to the registration of the one or more numerical digital values corresponding to said trunk line, means in said register for registering the numerical digital value of each received line selecting signal, means in said register for transmitting to said register sender an acknowledgment signal corresponding to the numerical digital value registered therein following the receipt of each line selecting signal, means in said register responsive to the receipt of sufficient line selecting signals to identify one of the lines terminating at said second office for transmitting an end of call signal to said register sender, and means responsive to the receipt of an end of call signal by said register sender for completing a connection between the calling line and said trunk line in said first office.

15. In a telephone system, first and second offices interconnected by a trunk line, a plurality of lines terminating at said first office, a register sender in said first office, a plurality of subscriber lines terminating at said second office, a register in said second office for serving both calling subscriber and trunk lines terminating at said second office and adapted to transmit dial tone to a calling line when connected thereto, means for extending a connection from a calling line in said first office to said register sender, means in said register sender for registering the numerical digital values of line selecting signals received from said calling line, means responsive to the registration in said register sender of the one or more numerical digital values corresponding to said trunk line for extending a connection from said register sender over said trunk line to said register, means in said register sender responsive to the receipt of dial tone from said register for transmitting an interlock request signal to said register, means in said register sender for thereafter transmitting to said register line selecting signals corresponding to the numerical digital values registered in said register sender subsequent to the registration of the one or more numerical digital values corresponding to said trunk line, means in said register effective only after an interlock request signal has been received for transmitting to said register sender an acknowledgment signal following the receipt of each line selecting signal, means in said register responsive to the receipt of sufficient line selecting signals to identify one of the subscriber lines terminating at said second office for transmitting an end of call signal to said register sender, and means responsive to the receipt of an end of call signal by said register sender for completing a connection between the calling line and said trunk line in said first office.

16. In a telephone system, first and second offices interconnected by a trunk line, a plurality of lines terminating at said first office, a register sender in said first office, a plurality of subscriber lines terminating at said second office, a register in said second office for serving both calling subscriber and trunk lines terminating at said second office and adapted to transmit dial tone to a calling line when connected thereto, means for extending a connection from a calling line in said first office to said register sender, means in said register sender for registering the numerical digital values of line selecting signals received from said calling line, means responsive to the registration in said register sender of the one or more numerical digital values corresponding to said trunk line for extending a connection from said register sender over said trunk line to said register, means in said register sender responsive to the receipt of dial tone from said register for transmitting an interlock request signal to said register, means in said register sender for thereafter transmitting to said register line selecting signals corresponding to the numerical digital values registered in said register sender subsequent to the registration of the one or more numerical digital values corresponding to said trunk line, means in said register for registering the numerical digital value of each received line selecting signal, means in said register effective only after an interlock request signal has been received for transmitting to said register sender an acknowledgment signal corresponding to the numerical digital value registered therein following the receipt of each line selecting signal, means in said register responsive to the receipt of sufficient line selecting signals to identify one of the subscriber lines terminating at said second office for transmitting an end of call signal to said register sender, and means responsive to the receipt of an end of call signal by said register sender for completing a connection betwen the calling line and said trunk line in said first office.

17. In a telephone system, first and second offices interconnected by a trunk line, a plurality of lines terminating at said first office, a register sender in said first office, a plurality of subscriber lines terminating at said second office, a register in said second office for serving both calling subscriber and trunk lines terminating at said second office and adapted to transmit dial tone to a calling line when connected thereto and to thereafter register the numerical digital values of line selecting signals received from the calling line, means for extending a connection from a calling line in said first office to said register sender, means in said register sender for registering the numerical digital values of line selecting signals received from said calling line, means responsive to the registration in said register sender of the one or more numerical digital values corresponding to said trunk line for extending a connection from said register sender over said trunk line to said register, means in said register sender responsive to the receipt of dial tone from said register for transmitting an interlock request signal to said register, means in said register sender for thereafter transmitting to said register a line selecting signal corresponding to the first numerical digital value registered in said register sender subsequent to the registration of the one or more numerical digital values corresponding to said trunk line, means in said register effective only after an interlock request signal has been received for transmitting to said register sender an acknowledgment signal corresponding to the numerical digital value registered therein following the receipt of each line selecting signal, means in said register sender for transmitting the line selecting signal corresponding to the next registered numerical digital value only if the acknowledgment signal received is correct for the line selecting signal previously transmitted, means in said register responsive to the receipt of sufficient line selecting signals to identify one of the subscriber lines terminating at said second office for transmitting an end of call signal to said register sender, and means responsive to the receipt of an end of call signal by said register sender for completing a connection between the calling line and said trunk line in said first office.

18. The system of claim 17 including means in said register sender responsive to the receipt of an incorrect acknowledgment signal for the line selecting signal previously transmitted for transmitting a cancel signal to said register, means in said register responsive to the receipt of a cancel signal for canceling the numerical digital value registered therein responsive to the receipt of said previously transmitted line selecting signal, and means in said register sender for then retransmitting said previously transmitted line selecting signal to said register.

19. In a telephone system, a calling office, a tandem office, a called office, means for extending a connection from said calling office to said tandem office, means in said calling office for transmitting line selecting signals representing the numerical digital value corresponding to said called office to said tandem office, registering means in said tandem office for registering the numerical digital value represented by the selecting signals received by that office, means in said tandem office for transmitting an acknowledgment signal to said calling office following the receipt of line selecting signals, means in said calling office responsive to the receipt of an acknowledgment signal from said tandem office for controlling said tandem office to extend the conection through said tandem office to said called office in accordance with the numerical digital value registered by the registering means in said tandem office, means in said called office responsive to the extension of said conection thereto for transmitting a called office identifying signal to said calling office, means in said calling office responsive to the receipt of a called office identifying signal for transmitting an interlock request signal to said called office, means in said calling office for thereafter transmitting line selecting signals to said called office, and means in said called office effective only after an interlock request signal has been received for transmitting to said calling office an acknowledgment signal following the receipt of each line selecting signal.

20. In a telephone system, a calling office, a tandem office, a called office, means for extending a connection from said calling office to said tandem office, means in said calling office for transmitting line selecting signals representing the numerical digital value corresponding to said called office to said tandem office, registering means in said tandem office for registering the numerical digital value represented by the selecting signals received by that office, means in said tandem office for transmitting an acknowledgment signal to said calling office corresponding to the numerical digital value registered by said registering means following the receipt of line selecting signals, means in said calling office for controlling said tandem office to extend the conection through said tandem office to said called office in accordance with the numerical digital value registered by the registering means in said tandem office only if the acknowledgment signal received from said tandem office is correct for the line selecting signals transmitted to said tandem office, means in said called office responsive to the extension of said connectio thereto for transmitting a called office identifying signal to said calling office, means in said calling office responsive to the receipt of a called office identifying signal for transmitting an interlock request signal to said called office, means in said calling office for thereafter transmitting line selecting signals to said called office, means in said called office for registering the numerical digital values of received line selecting signals, and means in said called office effective only after an interlock request signal has been received for transmitting to said calling office an acknowledgment signal corresponding to the numerical digital value registered in said called office registering means following the receipt of each line selecting signal.

21. In a telephone system, a calling office, a tandem office, a called office, means for extending a connection from said calling office to said tandem office, means in said calling office for transmitting line selecting signals representing the numerical digital value corresponding to said called office to said tandem office, registering means in said tandem office for registering the numerical digital value represented by the selecting signals received by that office, means in said tandem office for transmitting an acknowledgment signal to said calling office corresponding to the numerical digital value registered by said registering means following the receipt of line selecting signals, means in said calling office for controlling said tandem office to extend the connection through said tandem office to said called office in accordance with the numerical digital value registered by the registering means in said tandem office only if the acknowledgment signal received from said tandem office is correct for the line selecting signals transmitted to that office, means in said called office responsive to the extension of said connection thereto for transmitting a called office identifying signal to said calling office, means in said calling office responsive to the receipt of a called office identifying signal for transmitting an interlock request signal to said called office, means in said calling office for thereafter transmitting the first one of a plurality of line selecting signals to said called office, means in said called office for registering the numerical digital values of received line selecting signals, means in said called office effective only after an interlock request signal has been received for transmitting to said calling office an acknowledgment signal corresponding to the numerical digital value registered in said called office registering means following the receipt of each line selecting signal, and means in said calling office for transmitting the next line selecting signal to said called office only if the acknowledgment signal received from said called office is correct for the line selecting signal previously transmitted to that office.

22. The system of claim 21 including means in said calling office responsive to the receipt of an incorrect acknowledgment signal for the line selecting signal previously transmitted for transmitting a cancel signal to the office which transmitted the acknowledgment signal, means in both said tandem and called offices responsive to the receipt of a cancel signal for canceling the numerical digital value registered in the registering means in that office responsive to the receipt of the previously transmitted line selecting signal, and means in said calling office for then retransmitting said previously transmitted line selecting signal.

23. In a telephone system, first, second, and third offices, a first trunk line interconnecting said first and second offices, a second trunk line interconnecting said second and third offices, a register sender in said first office, a plurality of subscriber lines terminating at said third office, a register in said third office for serving both calling subscriber and trunk lines and adapted to transmit dial tone to a calling line when connected thereto, means for extending a connection from said register sender over said first trunk line to said second office, means in said register sender for transmitting line selecting signals representing the numerical digital value corresponding to said second trunk line to said second office, means in said second office for registering the numerical digital value of selecting signals received by that office, means in said second office for transmitting an acknowledgment signal to said register sender following the receipt of line selecting signals, means in said register sender responsive to the receipt of an acknowledgment signal from said second office for controlling said second office to complete a connection between said first and second trunk lines in said second office in accordance with the numerical digital value registered by the registering means in said second office, means responsive to the completion of a connection between the first and second trunk lines in said second office for controlling said register to connect to said second trunk line in said third office, means in said register sender responsive to the receipt of dial tone from said register for transmitting an interlock request signal to said register, means in said register sender for thereafter transmitting line selecting signals to said register, and means in said register effective only after an interlock request signal has been received for transmitting to said register sender an acknowledgment signal following the receipt of each line selecting signal.

24. In a telephone system, first, second, and third offices, a first trunk line interconnecting said first and second offices, a second trunk line interconnecting said second and third offices, a register sender in said first office, a plurality of subscriber lines terminating at said third office, a register in said third office for serving both calling subscriber and trunk lines and adapted to transmit dial tone to a calling line when connected thereto and to register the numerical digital values of line selecting signals thereafter received from the calling line, means for extending a connection from said register sender over said first trunk line to said second office, means in said register sender for transmitting line selecting signals representing the numerical digital value corresponding to said second trunk line to said second office, means in said second office for registering the numerical digital value of selecting signals received by that office, means in said second office for transmitting an acknowledgment signal to said register sender corresponding to the numerical digital value registered by said registering means following the receipt of line selecting signals, means in said register sender for controlling said second office to complete a connection between said first and second trunk lines in said second office in accordance with the numerical digital value registered by the registering means in said second office only if the acknowledgment signal received from said second office is correct for the line selecting signals transmitted to that office, means responsive to the completion of a connection between the first and second trunk lines in said second office for controlling said register to connect to said second trunk line in said third office, means in said register sender responsive to the receipt of dial tone from said register for transmitting an interlock request signal to said register, means in said register sender for thereafter transmitting line selecting signals to said register, and means in said register effective only after an interlock request signal has been received for transmitting to said register sender an acknowledgment signal corresponding to the numerical digital value registered therein following the receipt of each line selecting signal.

25. In a telephone system, first, second, and third offices, a first trunk line interconnecting said first and second offices, a second trunk line interconnecting said second and third offices, a register sender in said first office, a plurality of subscriber lines terminating at said third office, a register in said third office for serving both calling subscriber and trunk lines and adapted to transmit dial tone to a calling line when connected thereto and to register the numerical digital values of line selecting signals thereafter received from the calling line, means for extending a connection from said register sender over said first trunk line to said second office, means in said register sender for transmitting line selecting signals representing the numerical digital value corresponding to said second trunk line to said second office, means in said second office for registering the numerical digital value of the selecting signals received by that office, means in said second office for transmitting an acknowledgment signal to said register sender corresponding to the numerical digital value registered in said registering means following the receipt of line selecting signals, means in said register sender for controlling said second office to complete a connection between said first and second trunk lines in said second office in accordance with the numerical digital value registered by the registering means in said second office only if the acknowledgment signal received from said second office is correct for the line selecting signals transmitted to that office, means responsive to the completion of a connection between the first and second trunk lines in said second office for controlling said register to connect to said second trunk line in said third office, means in said register sender responsive to the receipt of dial tone from said register for transmitting an interlock request signal to said register, means in said register sender for thereafter transmitting the first one of a plurality of line selecting signals to said register, means in said register effective only after an interlock request signal has been received for transmitting to said register sender an acknowledgment signal corresponding to the numerical digital value registered therein following the receipt of each line selecting signal, and means in said register sender for transmitting the next line selecting signal to said register only if the acknowledgment signal received from said register is correct for the line selecting signal previously transmitted to said register.

26. In a telephone system, first, second, and third offices, a plurality of lines terminating at said first office, a plurality of lines terminating at said third office, a first trunk line interconnecting said first and second offices, a second trunk line interconnecting said second and third offices, a register sender in said first office, means for extending a connection from a calling line in said first office to said register sender, means in said register sender for registering the numerical digital values of line selecting signals received from said calling line, means responsive to the registration in said register sender of the numerical digital value corresponding to said first trunk line for completing a connection from said register sender over said first trunk line to said second office, means in said register sender for transmitting line selecting signals corresponding to the numerical digital values registered therein subsequent to the registration of the numerical digital value corresponding to said first trunk line over said first trunk line to said second office, means in said second office responsive to the receipt of line selecting signals corresponding to said second trunk line for testing the idle or busy condition of said second trunk line, means in said second office for completing a connection between said first and second trunk lines in said second office to thereby further extend the connection to said third office if said second trunk line is idle, means in said second office for tranmitting an end of call signal over said first trunk line to said register sender if said second trunk line is busy, means in said third office responsive to the receipt of sufficient line selecting signals to identify a line terminating at said third office for transmitting an end of call signal to said register sender, and means in said register sender responsive to the receipt of an end of call signal for completing a connection between said calling line and said first trunk line in said first office.

27. In a telephone system, a calling office, a called office, a plurality of tandem offices between said calling and called offices, a register sender in said calling office, means for connecting said register sender to a calling line in said first office, means in said register sender for registering line selecting signals received from said calling line, means in said register sender for transmitting line selecting signals corresponding to the signals registered therein to control the establishment of a connection from said register sender to and through said tandem offices in turn to a called line in said called office if there is at least one idle path available between each office and the succeeding office, means in each of said tandem offices for transmitting an end of call signal to said register sender if there are no idle paths available between that office and the next succeeding office, means in said cailled office for transmitting an end of call signal to said register sender when sufficient line selecting signals have been received to identify a line in said called office, and means responsive to the receipt of an end of call signal by said register sender for connecting said calling line to the established connection and for then releasing said register sender from the calling line and said established connection.

28. In a telephone system, first, second, and third offices, a register sender in said first office, means for extending a connection from said register sender to a selected one of said second and third offices, means in each of said second and third offices for transmitting an office identifying signal to said register sender when a connection is extended to that office, means in said register sender responsive to the receipt of a signal identifying said second office for transmitting line selecting signals over the extended connection, means in said register sender responsive to the receipt of a signal identifying said third office for transmitting an interlock request signal and for then transmitting line selecting signals over the extended connection, means in said second office for transmitting an acknowledgment signal to said register sender following the receipt of each line selecting signal, and means in said third office effective only after an interlock request signal has been received for transmitting an acknowledgement signal to said register sender following the receipt of each line selecting signal.

29. In a telephone system, first, second, and third offices, a first trunk line interconnecting said first and second offices, a second trunk line interconnecting said first and third offices, an incoming register in said second office for serving calling trunk lines and adapted to transmit a seize acknowledge signal to a calling line when connected thereto, a plurality of subscriber lines terminating at said third office, a register in said third office for serving both calling subscriber and trunk lines and adapted to transmit dial tone to a calling line when connected thereto, means for extending connections, one at a time, from said register sender over said first trunk line to said incoming register and over said second trunk line to said register, means in said register sender responsive to the receipt of a seize acknowledge signal for transmitting line selecting signals over the extended connection, means in said register sender responsive to the receipt of dial tone for transmitting an interlock request signal followed by line selecting signals over the extended connection, means in said incoming register for transmitting an acknowledgment signal to said register sender following the receipt of each line selecting signal, and means in said register effective only after an interlock request signal has been received for transmitting an acknowledgment signal to said register sender following the receipt of each line selecting signal.

30. In a telephone system, first, second, and third offices, a first trunk line interconnecting said first and second offices, a second trunk line interconnecting said first and third offices, a register sender in said first office, an incoming register in said second office, a plurality of subscriber lines terminating at said third office, a register in said third office for serving both calling subscriber lines and calling trunk lines, means in said register sender for transmitting a seize signal over a selected one of said first and second trunk lines, means in said second office responsive to the receipt of a seize signal over said first trunk line for connecting said incoming register to said first trunk line, means in said incoming register for transmitting a seize acknowledge signal to said register sender when said incoming register is connected to said first trunk line, means in said third office responsive to the receipt of a seize signal over said second trunk line for connecting said register to said second trunk line, means in said register for transmitting dial tone to said register sender when said register is connected to said second trunk line, means in said register sender responsive to the receipt of dial tone for transmitting an interlock request signal to said register, means in said register responsive to the receipt of an interlock request signal for transmitting a seize acknowledge signal to said register sender, means in said register sender responsive to the receipt of a seize acknowledge signal for transmitting line selecting signals over the extended connection, means in said incoming register for transmitting an acknowledgment signal to said register sender following the receipt of each line selecting signal, and means in said register effective only after an interlock request signal has been received for transmitting an acknowledgment signal to said register sender following the receipt of each line selecting signal.

No references cited.